United States Patent [19]
Bolan et al.

[11] Patent Number: 6,016,255
[45] Date of Patent: *Jan. 18, 2000

[54] PORTABLE DATA CARRIER MOUNTING SYSTEM

[75] Inventors: Michael L. Bolan, Dallas; Nicholas M. G. Fekete, Richardson, both of Tex.

[73] Assignee: Dallas Semiconductor Corp., Dallas, Tex.

[ * ] Notice: This patent issued on a continued prosecution application filed under 37 CFR 1.53(d), and is subject to the twenty year patent term provisions of 35 U.S.C. 154(a)(2).

[21] Appl. No.: 08/031,776

[22] Filed: Mar. 15, 1993

Related U.S. Application Data

[63] Continuation-in-part of application No. 08/022,258, Feb. 24, 1993, abandoned, which is a continuation-in-part of application No. 07/725,793, Jul. 9, 1991, abandoned, which is a continuation-in-part of application No. PCT/US90/02891, May 15, 1990, abandoned, application No. 07/615,606, Nov. 19, 1990, Pat. No. 5,206,905, application No. 07/615,615, Nov. 19, 1990, abandoned, application No. 07/615,608, Nov. 19, 1990, Pat. No. 5,226,137, application No. 07/882,244, May 8, 1992, Pat. No. 5,306,961, application No. 07/615,618, Nov. 19, 1990, abandoned, application No. 07/631,929, Dec. 19, 1990, Pat. No. 5,506,991, and application No. PCT/US91/03376, May 15, 1991, abandoned.

[51] Int. Cl.[7] .................................................... H05K 7/12
[52] U.S. Cl. ............................................ 361/807; 361/809
[58] Field of Search ............................ 395/800, 425; 235/492, 441; 365/189.01; 361/807, 808, 809, 810

[56] References Cited

U.S. PATENT DOCUMENTS

| | | | |
|---|---|---|---|
| 3,561,487 | 2/1971 | Reed, Jr. | 137/625.32 |
| 4,567,546 | 1/1986 | Zeller et al. | 361/810 |
| 4,621,190 | 11/1986 | Saito et al. | 235/492 |
| 4,646,130 | 2/1987 | Cretz | 257/689 |
| 4,674,175 | 6/1987 | Stampfli | 437/209 |
| 4,850,023 | 7/1989 | Yarush | 381/67 |
| 4,891,734 | 1/1990 | More et al. | 361/807 |
| 4,916,577 | 4/1990 | Dawkins | 361/417 |
| 4,926,996 | 5/1990 | Eglise et al. | 194/212 |
| 4,943,708 | 7/1990 | Simmons et al. | 235/492 |
| 4,948,954 | 8/1990 | Dias | 235/441 |
| 5,122,475 | 6/1992 | Heckaman et al. | 437/52 |
| 5,210,846 | 5/1993 | Lee | 395/425 |
| 5,278,426 | 1/1994 | Barbier | 250/577 |

*Primary Examiner*—Meng-Ai T. An
*Assistant Examiner*—Walter D. Davis, Jr.
*Attorney, Agent, or Firm*—Jenkens & Gilchrist P.C.

[57] ABSTRACT

Coin-shaped one-wire communication modules with a flange for mounting convenience may be attached to contact extensions on items such as work totes for ease of communication. A host computer can keep track and locate multiple items which have mounted communication modules with use of a single data line and a single ground line for all of the modules.

9 Claims, 78 Drawing Sheets

READ DATA TIME SLOTS
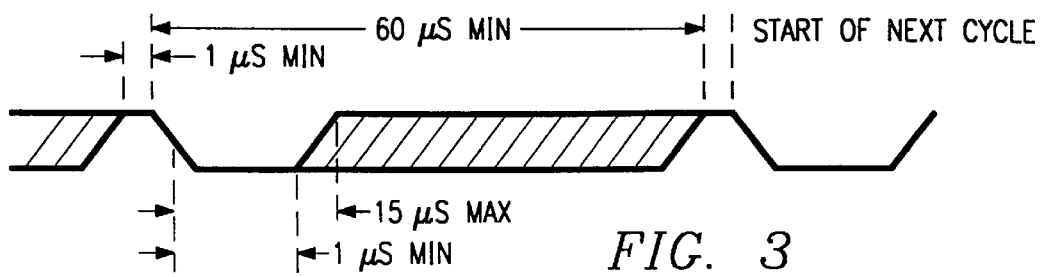
FIG. 3
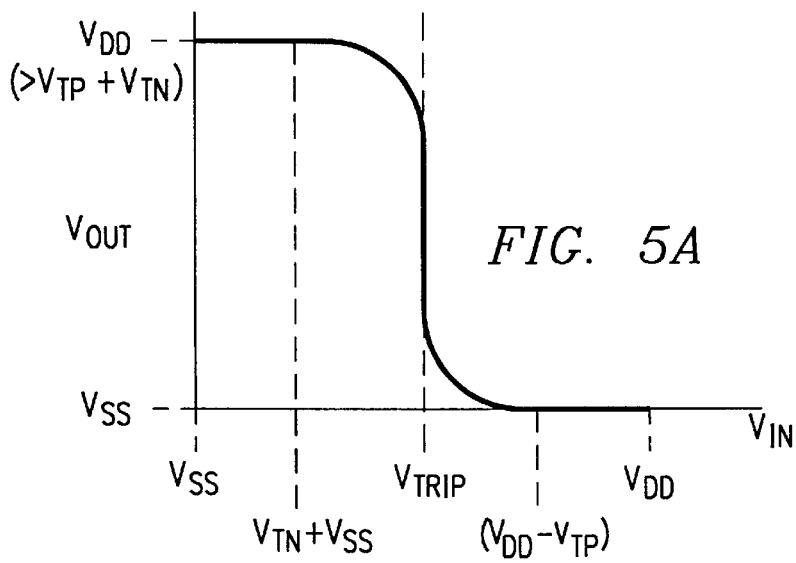
FIG. 5A
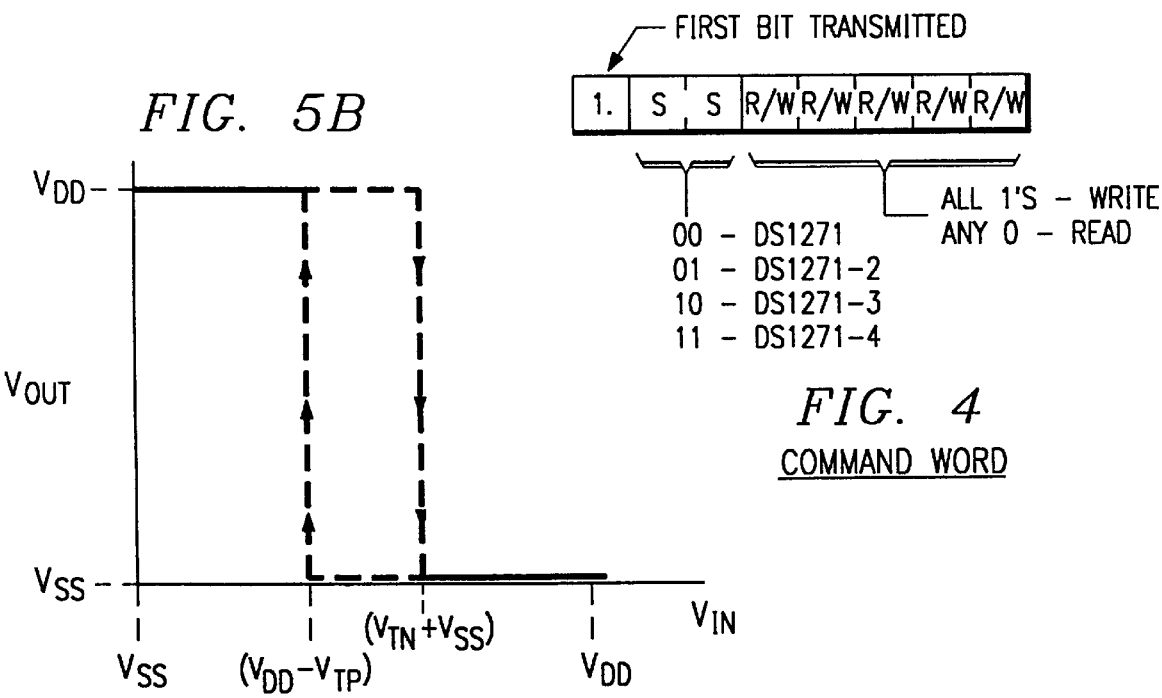
FIG. 5B
FIG. 4
COMMAND WORD

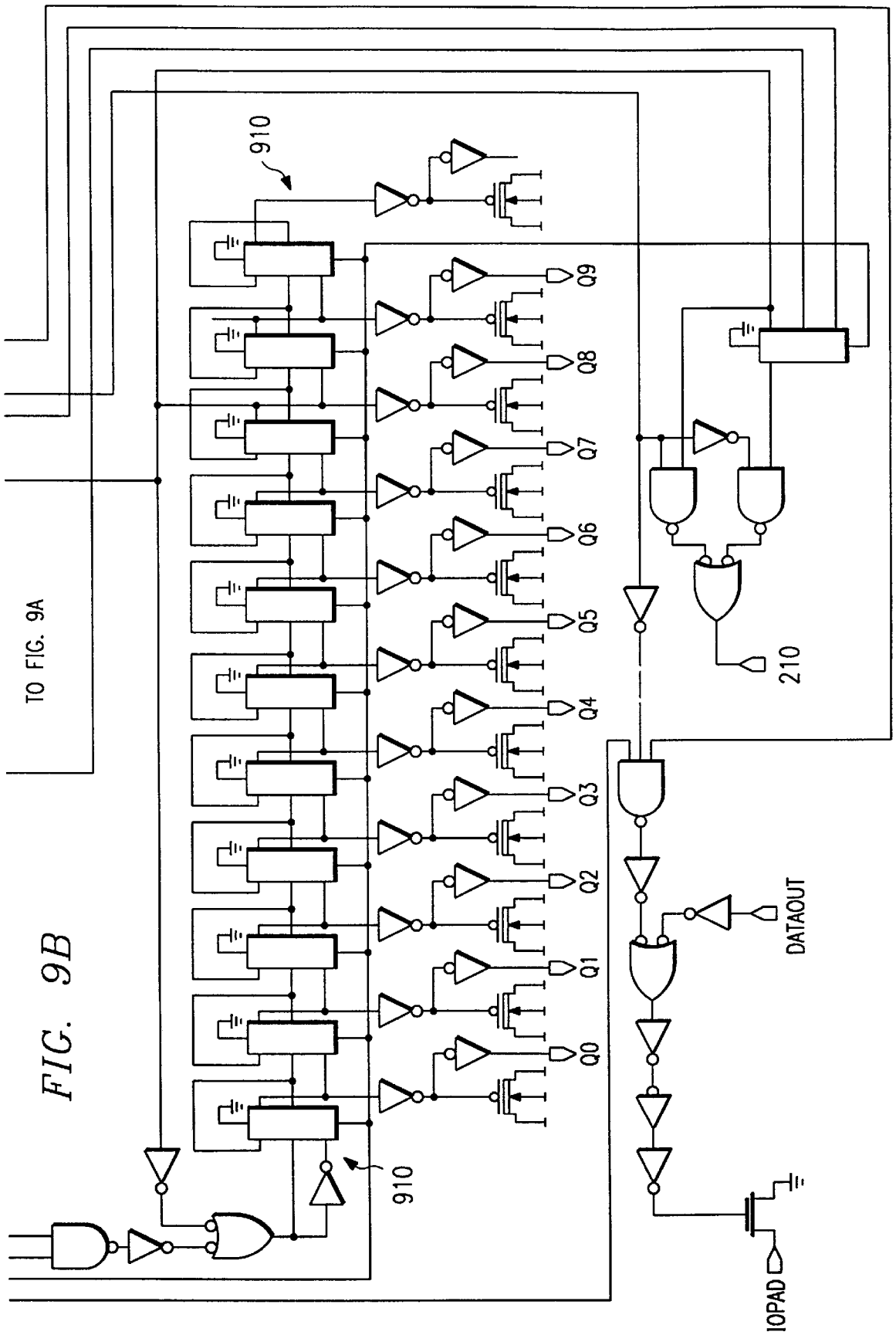

N-WELL

DEPLETION (INTERMEDIATE-DEPTH P-TYPE)

ACTIVE

N+ (COMPLEMENTED)

CONTACTS

PAD (PROTECTIVE OVERCOAT REMOVAL)

P+

METAL

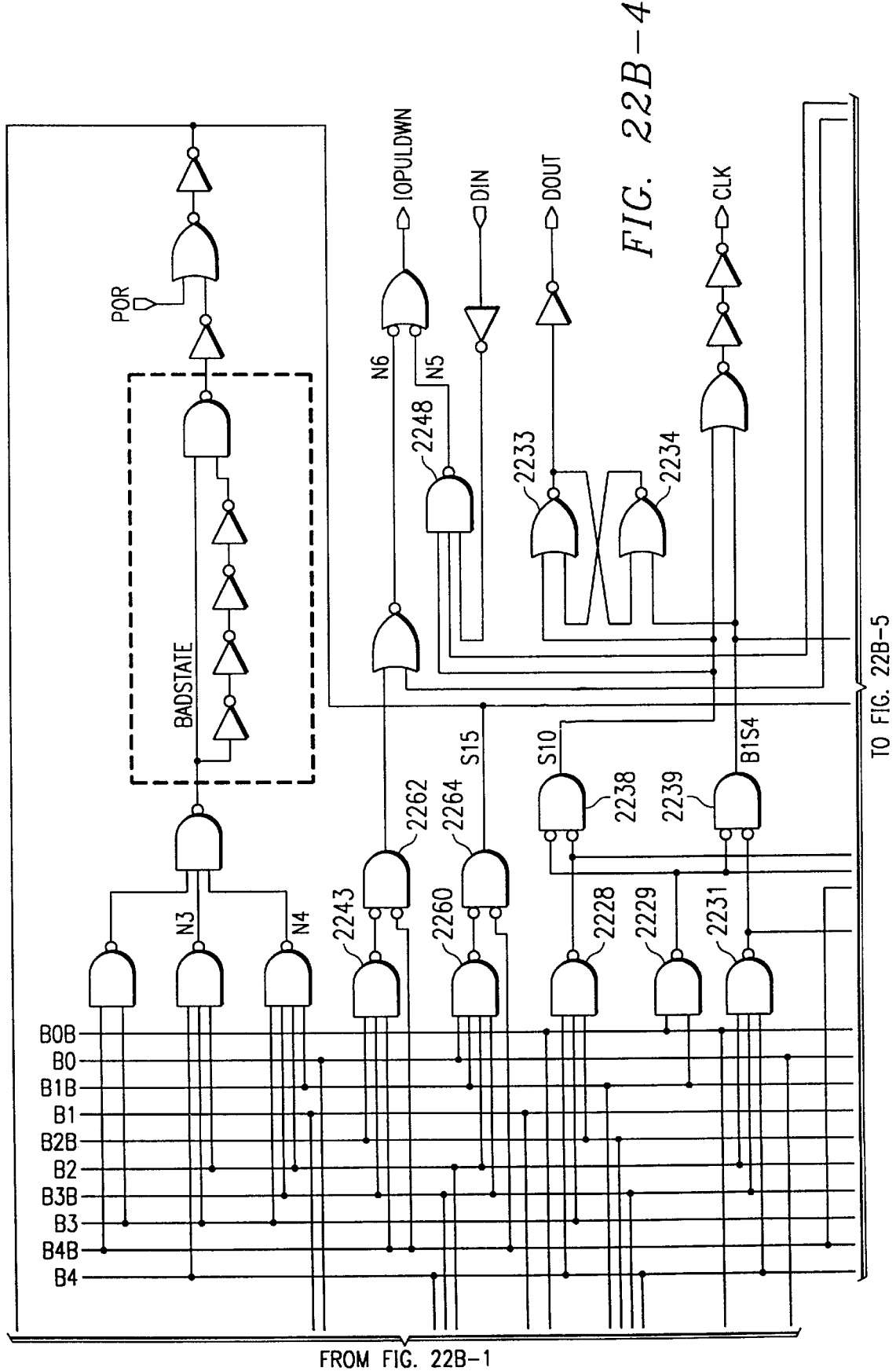

| PART TYPE<br>8 BITS | SERIAL NUMBER<br>48 BITS | CRC VALUE<br>8 BITS |
|---|---|---|

| SCRATCHPAD<br>512 BITS |||
|---|---|---|

<table>
<tr><td rowspan="3">SECURE<br>KEY 0</td><td colspan="2">ID 0</td><td>64 BITS</td></tr>
<tr><td colspan="2">PASSWORD 0</td><td>64 BITS</td></tr>
<tr><td colspan="3">SECURE DATA 0<br>384 BITS</td></tr>
<tr><td rowspan="3">SECURE<br>KEY 1</td><td colspan="2">ID 1</td><td>64 BITS</td></tr>
<tr><td colspan="2">PASSWORD 1</td><td>64 BITS</td></tr>
<tr><td colspan="3">SECURE DATA 1<br>384 BITS</td></tr>
<tr><td rowspan="3">SECURE<br>KEY 2</td><td colspan="2">ID 2</td><td>64 BITS</td></tr>
<tr><td colspan="2">PASSWORD 2</td><td>64 BITS</td></tr>
<tr><td colspan="3">SECURE DATA 2<br>384 BITS</td></tr>
</table>

*FIG. 23B*

MSB                                                                                 LSB

| $C_7\ C_6\ C_5\ C_4\ C_3\ C_2\ C_1\ C_0$ | $B_7\ B_6\ B_5\ B_4\ B_3\ B_2\ B_1\ B_0$ | $A_7\ A_6\ A_5\ A_4\ A_3\ A_2\ A_1\ A_0$ |
|---|---|---|
| BYTE 3 | BYTE 2 | BYTE 1 |

| | BYTE 1 |
|---|---|
| $A_7$–$A_0$ | COMMAND FIELD: |

| | BYTE 2 |
|---|---|
| $B_7$–$B_6$ | SUB-ADDRESS:<br>    2 BITS SPECIFYING WHICH PARTITION IS TO BE ACCESSED<br>        00-SUBKEY 0<br>        01-SUBKEY 1<br>        10-SUBKEY 2<br>        11-SCRATCHPAD |
| $B_5$–$B_0$ | ADDRESS FIELD:<br>    6 BITS THAT DEFINE THE STARTING BYTE ADDRESS<br>    IN THE SCRATCHPAD OR ANY SUBKEY |

| | BYTE 3 |
|---|---|
| $C_7$–$C_6$ | PARTITION IDENTIFIER FIELD:<br>    BIT FOR BIT COMPLEMENT OF BYTE 2 |
| $C_5$–$C_0$ | ADDRESS FIELD:<br>    BIT FOR BIT COMPLEMENT OF BYTE 2 |

*FIG. 23C*

WRITE1:
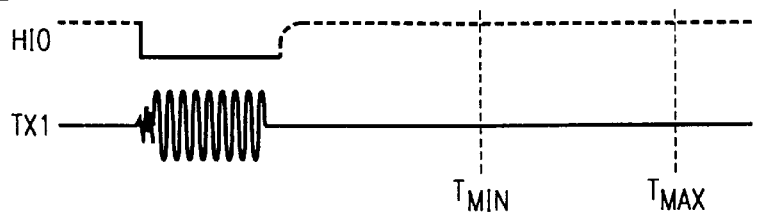
THE SIGNAL IS RECEIVED BY THE ONE-WIRE TRANSCEIVER
AND PRESENTS A ONE-WIRE LOGIC SIGNAL ON DATA
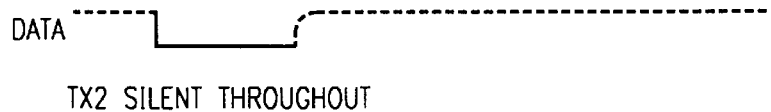
TX2 SILENT THROUGHOUT
WRITE0:
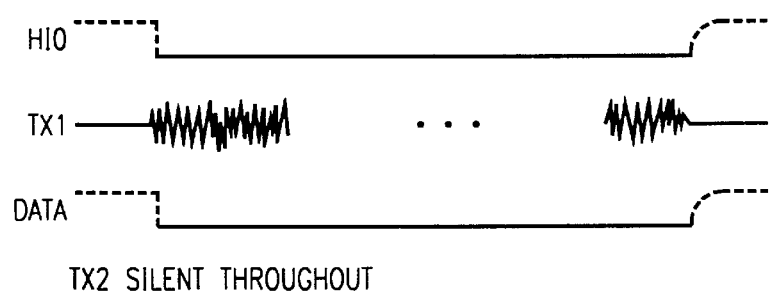
TX2 SILENT THROUGHOUT
READ1:
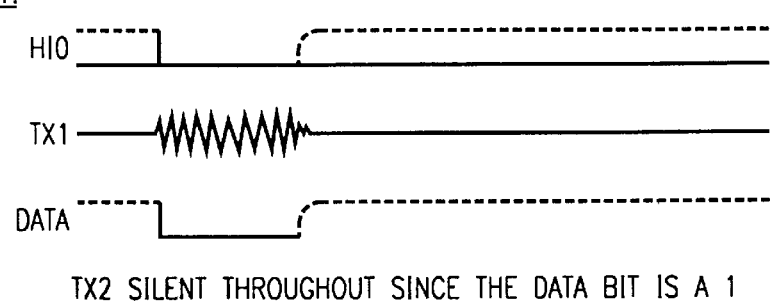
TX2 SILENT THROUGHOUT SINCE THE DATA BIT IS A 1
READ0:
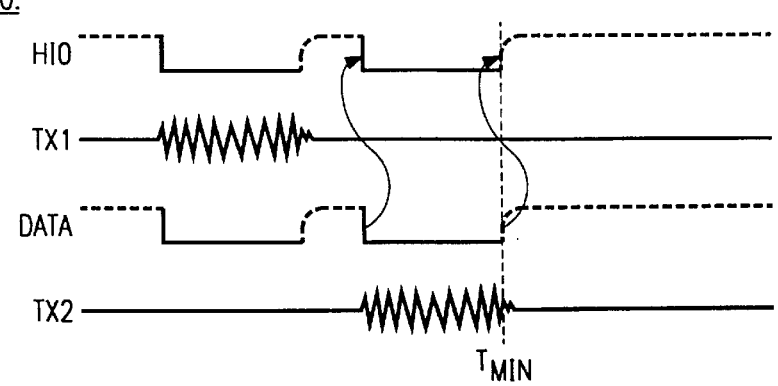
*FIG. 34B*

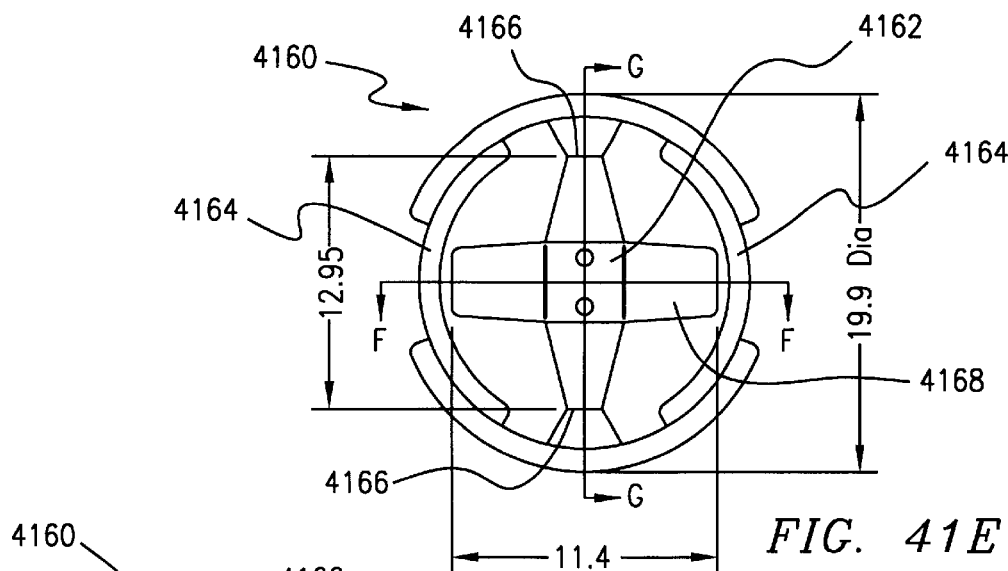
FIG. 41E
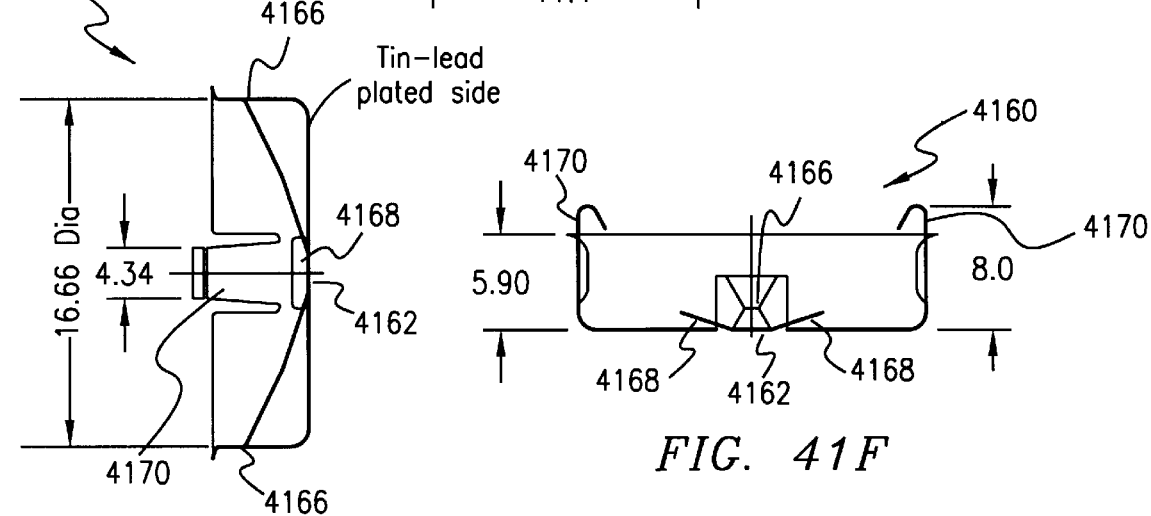
FIG. 41G
FIG. 41F
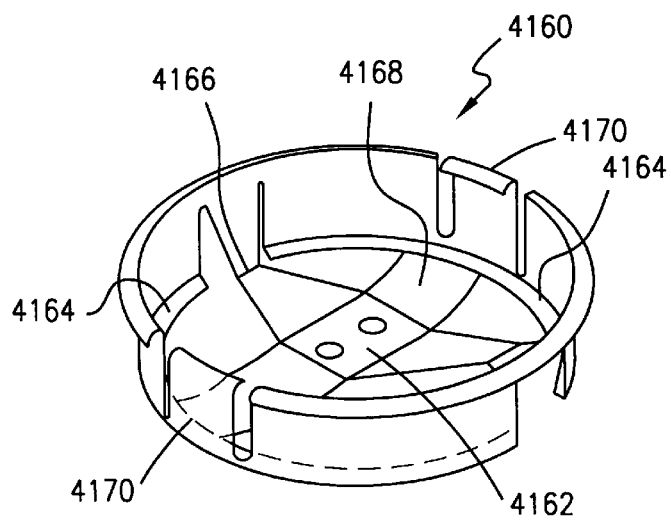
FIG. 41D

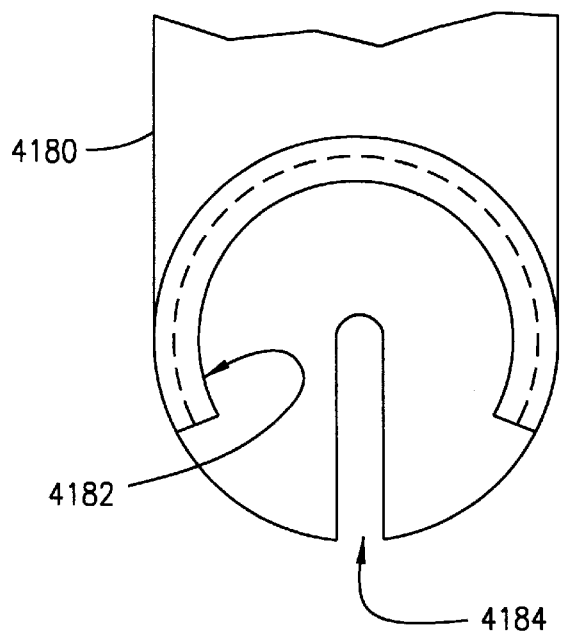
FIG. 41H
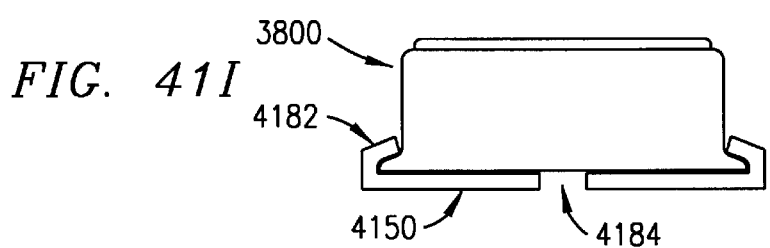
FIG. 41I
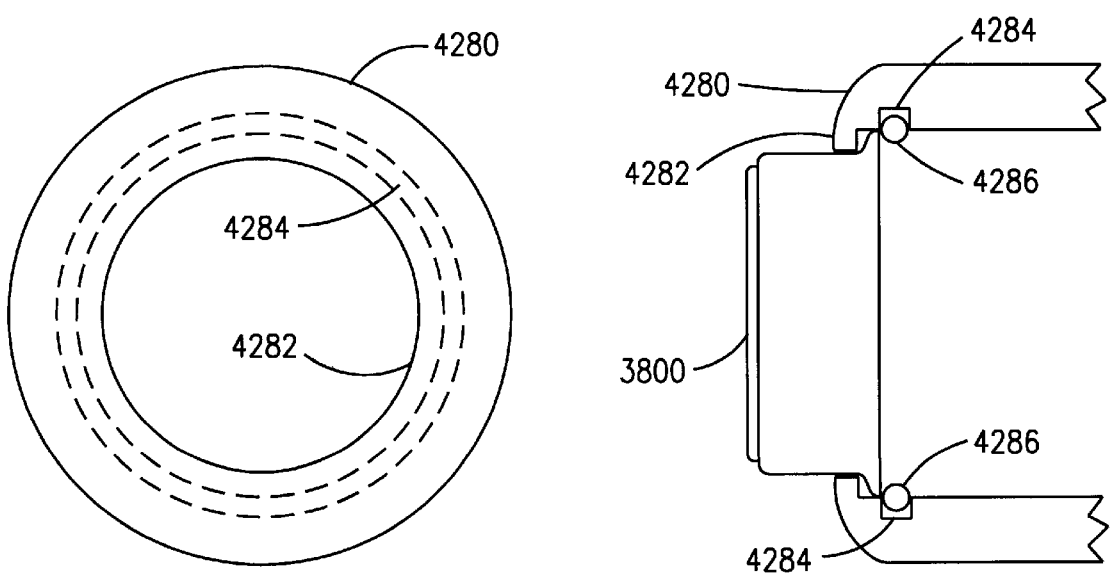
FIG. 42E
FIG. 42F

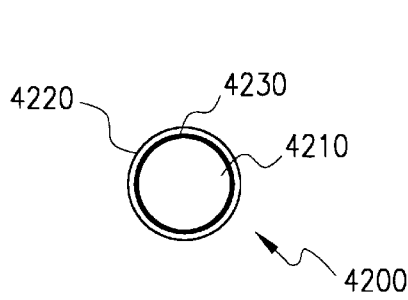
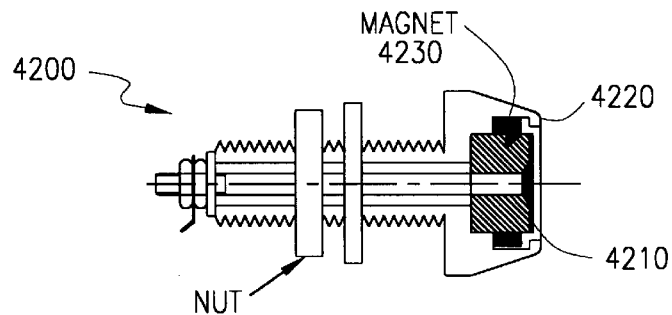
FIG. 42A  FIG. 42B
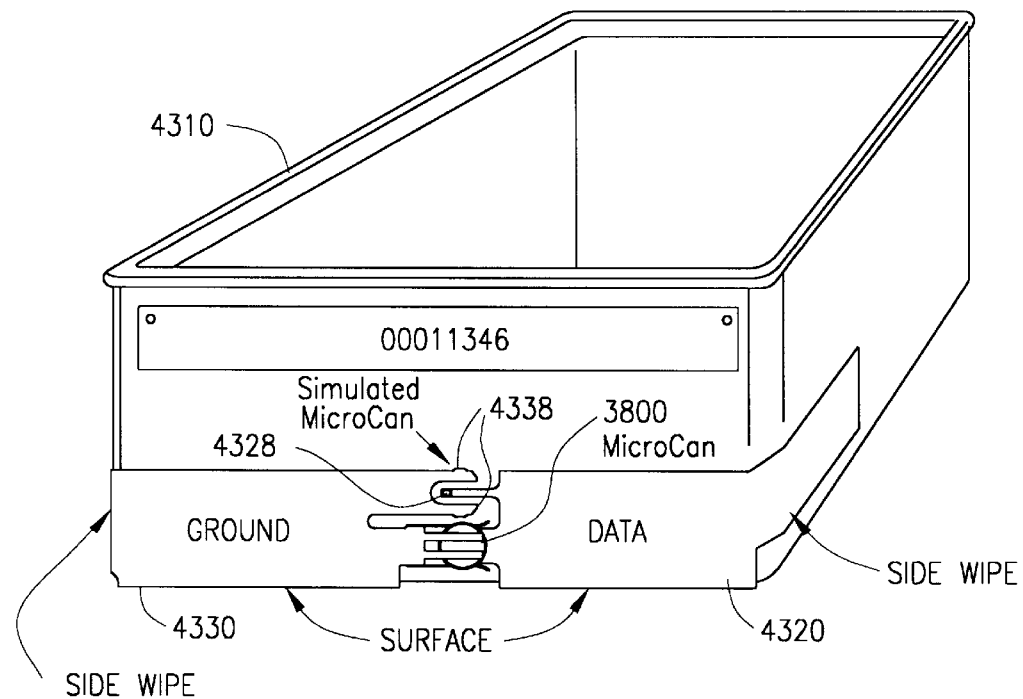
FIG. 43A
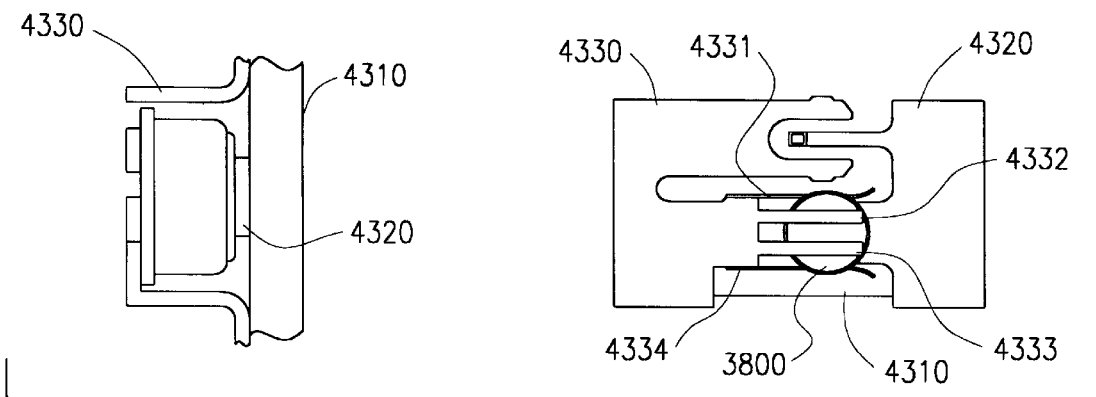
FIG. 43B

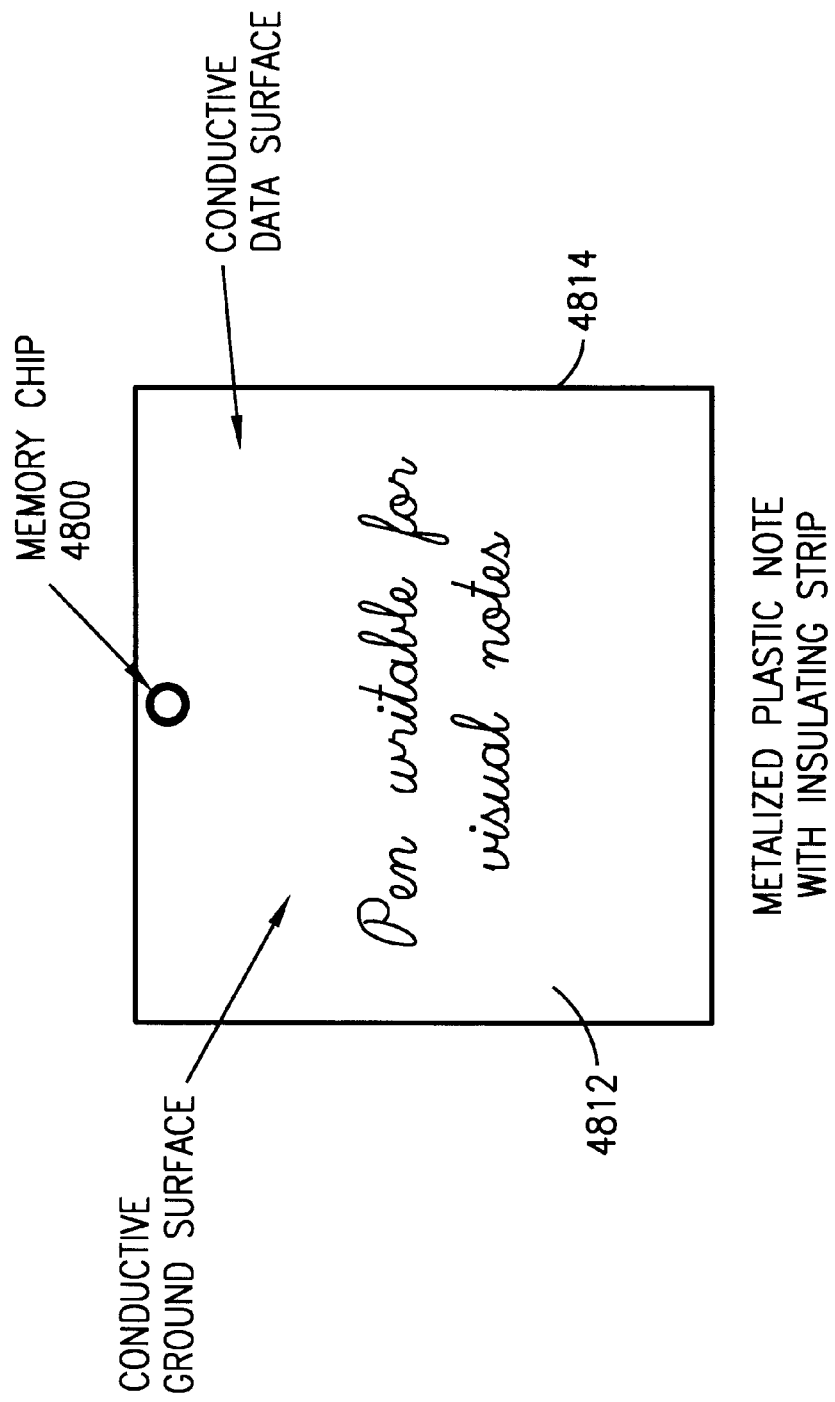

PORTABLE DATA CARRIER MOUNTING SYSTEM

CROSS-REFERENCE TO RELATED APPLICATIONS

This application is a continuation-in-part of application Ser. No. 08/022,258, filed Feb 24, 1993, abandoned, which is a CIP of application Ser. No. 07/725,793 (now abandoned), filed Jul. 9, 1991, "Memory" (DSC-175), which in turn is a continuation-in-part of the following applications of common assignee, all of which are hereby incorporated by reference: U.S. Ser. No. PCT/US90/02891 (now abandoned), filed May 15, 1990, "Systems with Data-Token/One-Wire-Bus" (DSC-83PCT); U.S. Ser. No. 615,606, filed Nov. 19, 1990; now U.S. Pat. No. 5,206,905, which issued on Apr. 27, 1993, "Electronic Key with Repeatable False Responses" (DSC-303); U.S. Ser. No. 615,615 (now abandoned), filed Nov. 19, 1990, "Low-Power Memory with Block Moves Implemented by Pointer Update" (DSC-304); U.S. Ser. No. 615,608, filed Nov. 19, 1990, now U.S. Pat. No. 5,226,137, which issued on Jul. 6, 1993, "Electronic Key with Multiple Subkeys Writable Via Scratchpad" (DSC-305); U.S. Ser. No. 615,618, filed Nov. 19, 1990, abandoned in favor of continuation-in-part application Ser. No. 07/882,244, now U.S. Pat. No. 5,306,961, which issued on Apr. 26, 1994, "Low-Power Integrated Circuit with Selectable Battery Modes" (DSC-306); U.S. Ser. No. 631,929, now U.S. Pat. No. 5,506,991 filed Dec. 19, 1990, "Printer Port Adapter with Overlaid One-Wire Interface for Electronic Key" (DSC-316); and U.S. Ser. No. PCT/US91/03376 (now abandoned), filed May 15, 1991, "Electronic Key Integrated Circuit" (DSC-303PCT).

The following applications of common assignee contain related subject matter:
- U.S. Ser. No. 728,230 (now abandoned), filed Jul. 10, 1991, entitled "Power History Monitor Chip" (DSC-317);
- U.S. Ser. No. 727,618 (now abandoned), filed Jul. 10, 1991, entitled "Integrated Counter/RAM Array Layout" (DSC-319);
- U.S. Ser. No. 727,619 (now abandoned), filed Jul. 10, 1991, entitled "Timekeeping Chip with Clock-to-Memory Update Only on Read Signal" (DSC-322);
- U.S. Ser. No. 727,638 (now abandoned), filed Jul. 10, 1991, entitled "Integrated Circuit with Scratchpad Copy to Any Portion of a Page" (DSC-324);
- U.S. Ser. No. 727,255 (now abandoned), filed Jul. 10, 1991, entitled "Electronic Key with Three Modes of Automatic Self-Disablement" (DSC-352);
- U.S. Ser. No. 727,639, filed Jul. 10, 1991, entitled "Integrated Circuit with Both Battery-Powered and Signal-Line-Powered Areas" (DSC-353) and now U.S. Pat. No. 5,297,099, which issued on Mar. 22, 1994;
- U.S. Ser. No. 728,229 (now abandoned), filed Jul. 10, 1991, entitled "Level-Shifter Circuit for Crossing Power-Supply-Domain Boundaries" (DSC-354);
- U.S. Ser. No. 727,270 (now abandoned), filed Jul. 10, 1991, entitled "Socket with Solder Option from Internal One-Wire Bus to Female Pin" (DSC-355);

and Ser. No. 727,273, filed Jul. 10, 1991, entitled "Power-On-Reset Circuit" (DSC-356), and now U.S. Patent 5,166,545 which issued on Nov. 24, 1992. These applications are hereby incorporated by reference.

All of the material in this patent application is subject to copyright protection under the copyright laws of the United States and of other countries. As of the first effective filing date of the present application, this material is protected as unpublished material.

Portions of the material in the specification and drawings of this patent application are also subject to protection under the maskwork registration laws of the United States and of other countries.

However, permission to copy this material is hereby granted to the extent that the copyright owner has no objection to the facsimile reproduction by anyone of the patent document or patent disclosure, as it appears in the United States Patent and Trademark Office patent file or records, but otherwise reserves all copyright rights whatsoever.

BACKGROUND AND SUMMARY OF THE INVENTION

The present invention relates to compact electronic modules, and to components and packaging for use with such modules.

One of the long-term trends in electronics has been to provide higher functionality at lower cost in a more compact package. Many pages have been written on this long-term trend, and it will not be analyzed here. However, the numerous innovations disclosed in the present application are believed to contribute to a major advance in this direction.

Module

The present application discloses a very compact electronic module, which includes an integrated circuit (preferably including memory) and a battery. The module is preferably coin-shaped, and the two faces of the module are isolated from each other. Host systems can read/write access such modules, by using a one-wire-bus protocol.

One-Wire-to-Three-Wire Converter

The module may contain one integrated circuit or several, but the integrated circuits in the module preferably include a one-wire-to-three-wire converter circuit. In the presently preferred embodiment, this is integrated on a single chip with a small amount of serial-access memory. However, alternatively the converter may be used to provide a standard three-wire serial bus output, which provides an interface to one or more other chips. The other chips may include, for example, electronic keys (such as the DS1207 from Dallas Semiconductor).

ESD Protection Needs

A common specification for integrated circuits is the ability to withstand 5 discharges (ESD) at 1000 Volts, without the leakage current increasing to 1 microAmpere. However, a de facto standard of 2000 V ESD immunity has been springing up for many applications.

However, even this level of ESD immunity may insufficient for high-noise applications. Specifically, in the large-scale systems environment of the presently preferred embodiment, the data modules will face some unusual integrity requirements. Since the modules may be exposed to very rough treatment, in consumer and industrial environments, they should preferably have a very high level of immunity to electrostatic discharge (ESD).

The electronic data module of the presently preferred embodiment includes an ESD protection diode structure, which helps to protect against data loss under severe electrostatic discharge conditions.

Packaging Scheme

To fit the integrated circuit into this very small space, a packaging scheme is used in the preferred embodiment. A two-part metal container is used, which has two shallow concave pieces which fit together. The integrated circuit (preferably in a low-height package, such as a flat-pack or SOIC) is mounted on a very small printed circuit board (preferably a flexible board), which fits inside the container. Laterally spaced from the integrated circuit, on the other end of the small board, the board end is sandwiched between a battery and a piece of elastic conductive material (such as conductive plastic foam). Thus, the battery is connected between one face of the container and a power conductor on the board. The piece of elastic conductive material makes contact between a data trace on the board and the other face of the container. Another trace on the board makes contact directly to the container face on which the battery's ground terminal is connected. Thus, simple wiring on the small board, using through-hole vias, suffices to route power, ground, and data lines to the integrated circuit, while providing a sealed durable package with two external contacts.

The battery is preferably a low-voltage battery (1.5 V, in the preferred embodiment.) This is cheaper, and maximizes power efficiency, but requires some circuit design features to accommodate the electrical interface. (Electronic watches have often been powered by 1.5 V batteries, but such devices do not have any direct electrical interface to the outside world. By contrast, the module of the presently preferred embodiment communicates over a one-wire bus which is driven by full CMOS voltage levels.)

Module Mounting and Adhesion

The electronic token modules can be used in several ways. For example, in some embodiments it may be preferable to use loose tokens. However, in many applications (such as inventory control, machinery maintenance records, or retail tagging) it may be preferable to mount the tokens on the physical items to which the data in the individual tokens refers. In this case, the token must be mounted so that both terminals of the token can be contacted by the user. In the presently preferred embodiment (using a package like that shown in FIG. 1A), only one of the possible orientations will work. (The inner casing piece 100A must be exposed, and therefore, if the token is to be mounted on a surface, it is the outer casing piece 100B which should be adhered to the surface.)

For such applications, the packaged modules (in embodiments using packages like those of FIGS. 1A and 1B) are preferably shipped with double-sided adhesive tape already affixed to the side of the module which is to be adhered to a surface (face 100B, in the example of FIG. 1B).

Integrated Circuit

The module, in the presently preferred embodiment, contains an integrated circuit which itself includes several features. This integrated circuit, in the presently preferred embodiment, includes an electrical interface to the one-wire bus (including heavy protection against minority carrier injection), a one-wire-to-three-wire converter circuit, and a small amount of serial-access memory.

The integrated circuit, in the preferred embodiment, contains 256 bits of serial-access memory. This memory is read- or write-accessed as a single block transfer. It is contemplated that larger amounts of memory may be advantageous. Of course, other types of memory organization can be used instead; but for many applications it is contemplated that use of a very small amount of memory (4K or less) may be particularly advantageous, since this extends the battery lifetime.

Low-Voltage SRAM Architecture

Among the teachings set forth in the present application is a low-power low-voltage CMOS six-transistor static random access memory (SRAM), which can operate on a power supply voltage which is less than the sum of the NMOS and PMOS threshold voltages, and which does not include any analog or metastable sense amplifier stages. The selected cell is allowed to pull one of its bitline pair all the way down to ground. Thus, full logic levels appear on the bitline pair. Only one line of the bitline pair is connected to the following gate stage. Preferably bitline precharge transistors are connected to pull up all bitline pairs whenever the RAM is not selected.

RAM/ROM Hybrid Memory

A further teaching, in the preferred embodiment, is the use of RAM/ROM hybrid for a portion of the memory array. An memory cell is used, which can operate as a static RAM, or which can be programmed to operate as a ROM cell. Thus users who need the extra security permitted by ROM encoding can have this capability, while users who do not need ROM encoding can use off-the-shelf parts as RAM only.

Chip Series with Unique Hard-wired Identifications

A further large-scale system concept is to use the capability to introduce ROM into the memory space to provide memory chips with completely unique hard-wired identifications. This provides tremendous advantages for security-related needs.

In this embodiment, an external system can test the chip's integrity, by performing a read-write-read operation on the memory space which is supposed to be ROM, and also on a portion of the memory space which is expected to be RAM. This will provide at least some insurance against the ROM identification being emulated in RAM. Optionally, the external system can even test the data output timing, to ascertain whether the RAM and ROM outputs are timed identically (and therefore to assure that the address inputs are not being decoded to address two different chips).

This also provides advantages of failure protection. Very few catastrophes will be able to eradicate the hardware encoding of the cells which have been converted to ROM. (Even if the electrical functionality is totally destroyed, the fuse pattern can be read optically.) Thus, recovery of these bits may provide useful information in failure analysis. (For example, a manufacturing lot number can be cross-referenced from a unique identification number in ROM. This would provide greatly enhanced capabilities for analysis of late failures.

For another example, where the nonvolatility is electrically programmable, a system which recognized an imminent catastrophic failure (e.g. an avionics system facing a crash) might be able to save some data in the memory at the last minute.

ESD Protection Diode

The presently preferred embodiment uses an protection diode structure, in which a significant device-level feature, is the provision of an intermediate-depth diffusion. This intermediate-depth diffusion will have a junction depth (inside the P-well or N-well) which is significantly deeper than the source/drain junction depth, but significantly shallower than the depth of the well. This intermediate-depth diffusion is useful in the diode structure described, but can also be used for other device structures. For example, this structure provides a compact bipolar transistor structure with reasonably high gain. This intermediate-depth diffusion can also be used for input protection structures (i.e. to provide device structures which will rapidly and recoverably break down, when a high-voltage pulse appears, to discharge the high-voltage pulse without damaging the primary circuitry of the chip). For another example, this intermediate-depth diffusion can also be used to form diffused capacitors with relatively large capacitance per unit area, or capacitors whose capacitance varies greatly with voltage (such capacitors are commonly referred to as varactors.)

A further advantage of this structure, and a further teaching set forth herein, is that the structure can be fabricated with minimal added process complexity. An intermediate-depth diffusion is added to a standard process flow; but the shallow diffusions in the battery protection structure simply make use of the source/drain implants, and the deepest diffusion simply uses the N-well (or P-well) fabrication steps.

For process simplicity, the intermediate-depth diffusion is most preferably formed by using an implant which is identical (in dose and energy) to another implant used in the same process. The additional junction depth is achieved by exposing the earlier implant to a high-temperature step before the later implant is performed, so that the earlier implant will have a correspondingly greater diffusion length (integral $(Dt)^{0.5}$).

A variety of "substrate" structures are commonly used for integrated circuits, and far more have been proposed or have seen limited use. For example, the "substrate" which surrounds the N-wells and P-wells is often an epitaxial layer atop a much more heavily doped underlying layer. For another example, the N-wells and P-wells are commonly formed by separate implantation (and drive-in) steps, and such processes are referred to as "twin tub" processes; but alternatively one of these steps may be omitted, so that, for example, the PMOS devices might be formed directly in an N-type upper substrate portion. Other important structure types include silicon-on-insulator structures and full dielectric isolation structures, where there is no electrically continuous body linking all of the wells. It is important to note that the teachings set forth herein can advantageously be adapted to a tremendous variety of substrate structures, including not only the embodiments listed or mentioned, but also many others.

It should be noted that the disclosed families of devices structures can also be used for a variety of other purposes. In particular, the disclosed structure provides a diode structure which may be adapted for use in other types of device structures, in very-low-power integrated circuit applications.

It should also be noted that some prior art CMOS structures have used guard ring structures to suppress latchup. The problem of latchup (suppressing the parasitic thyristor) is a quite different problem from the leakage problems discussed above, but in both cases collection of minority carriers is desirable. Guard ring structures are commonly used to surround locations (such as output drivers) where transient signals are most likely to cause injection of minority carriers. (A sufficient injection of minority carriers could fire the parasitic thyristor, and thus lead to latchup.)

In the preferred class of embodiments, the diffusion structure described is used to conserve the charge in the battery. One drain on the battery is caused by negative excursions on an incoming data line (for example, when a negative voltage spike occurs due to an electrostatic discharge (ESD) event). In a normal battery-powered integrated circuit, the current drawn during such a negative voltage surge would be drawn both from the ground connection and also from the power supply connection. However, in stringently power-limited applications, even this amount of current, over the lifetime of the part, can use enough of the battery capacity to shorten the part's lifetime substantially.

That is, when a negative transient occurs, a large number of electrons will be injected. If these electrons are allowed to diffuse freely, many of them will diffuse toward the high-potential regions which are connected to the battery. This charge transfer reduces the total charge available during the lifetime of the battery.

The shielded diode structure of FIG. 16K is protected: almost all electrons injected at first junction 111 will be collected at second junction 112. By contrast, a simple FET output driver, like transistor 150 in FIG. 16M, is not isolated: when the drain junction of such an NMOS FET is forward biased, electrons will be released into substrate 140, and many of these electrons can then diffuse to regions of high potential.

Therefore, a further teaching is to use the diffusion structure to source current to negative transients which may occur on the I/O lines of a chip. In this embodiment, an I/O line is connected so that the first junction (in a structure as described above) will be forward biased when the I/O line goes negative, and the other side of the first junction is connected to ground potential. Thus, when a negative-going transient occurs, current will be sourced, through the first junction, from ground.

When a negative-going transient occurs, some current will also be sourced, at the output transistor which drives the I/O line, and some of this current component will cause minority carrier diffusion; but the use of this teaching helps to reduce the amount of current sourced which can cause minority carrier diffusion. Preferably the area of the first junction is substantially larger than that of the junction area of the source/drain diffusion, in the output transistor, which is connected to the power supply.

This teaching also has two further advantages. First, the reduced risk of minority carrier injection means that the risk of stored data states being upset by transient signals is reduced. Second, the risk of latchup is reduced.

Thus, this teaching advantageously provides a battery-powered integrated circuit which is protected against battery depletion by electrical noise appearing at input/output connections. This teaching may be particularly advantageous in integrated circuits which are intended for use in systems where high levels of noise must be tolerated.

Bus Organization

To communicate with this memory, in the preferred embodiment, an one-wire bus protocol is used. This protocol is well adapted for interface to the low-cost architecture of the module of the presently preferred embodiment.

Time-Domain Relations

A bidirectional one-wire bus requires some use of time-domain or frequency-domain relations, to track the two half-channels of communication.

It is quite possible to put an accurate time base in a low-power integrated circuit, using CMOS oscillators stabilized with quartz crystals; but the use of such techniques adds to the cost of the part. A crude time base can be provided simply by using an oscillator which is not stabilized. However, the response time of a simple timing circuit will be dependent on processing parameters. In conventional integrated circuit processing, there will normally be significant variation in parameters such as layer thickness, line-to-space ratio, and net dopant concentration in various locations. Thus, the electrical parameters, such as the series resistance of a polysilicon resistor of a given nominal dimension, can easily vary by +20% or more, even in a well-controlled process. This means that the net speed of a timing circuit can vary by even more, since the net speed will be dependent on several electrical parameters, which may vary together or in opposition.

Parameter variation can be compensated for, by testing a newly fabricated wafer and programming elements on-chip (such as trimming capacitors) to adjust the net delay of timing elements; but this additional manufacturing step adds significant expense.

Low-Voltage CMOS Logic

Moreover, in a low-voltage CMOS system (i.e. where the supply voltage is less than the sum of the PMOS and NMOS threshold voltages), achieving even a crude time base is much more difficult. This is due to the transfer characteristics of a logic gate in this technology.

FIG. 5A shows the voltage transfer characteristics ($V_{OUT}$ graphed as a function of $V_{IN}$) for an inverter in conventional CMOS technology (e.g. where the supply voltage $V_{DD}$ is about 5 Volts, and the PMOS threshold voltage $V_{TP}$ and the NMOS threshold voltage $V_{TN}$ both have magnitudes in the range of about 0.8 V to 1.1 V.) Suppose that the input voltage $V_{IN}$ was initially at ground voltage $V_{SS}$ (0 V), so that the inverter's NMOS transistor is off and the inverter's PMOS transistor is on. Now, as $V_{IN}$ starts to rise, $V_{OUT}$ will stay at $V_{DD}$ until $V_{IN}$ rises to $V_{TN}$. At this point the NMOS device will start to pass current. However, the NMOS device will not be able to overpower the PMOS device until the voltage reaches a trip point $V_{TRIP}$. The trip point voltage $V_{TRIP}$ is well-defined for each particular logic gate, but is dependent on the device dimensions. (If the width of the PMOS device is increased, or the length of the PMOS device decreased, or the width of the NMOS device is decreased, or the length of the NMOS device increased, then the NMOS device will have more difficulty in overpowering the PMOS device, and the trip point $V_{TRIP}$ will occur at a higher voltage.) As the input voltage $V_{IN}$ increases, the NMOS device will pass more current and the PMOS device will pass less current, until at voltage $V_{DD}-V_{TP}$ the PMOS transistor turns off.

By contrast, the transfer characteristic of a low-voltage CMOS inverter, as shown in FIG. 5B, are quite different. (Suppose, for example, that $V_{DD}$=1.5 V, and $V_{TP}=V_{TN}$=0.9 V. Thus, note that FIGS. 5A and 5B are not drawn to the same scale.) Here there is no region where both the NMOS and PMOS devices are on. When the input voltage $V_{IN}$ increases above $V_{DD}-V_{TP}$ (0.6 V in this example), the PMOS device will turn off, but the NMOS device has not yet turned on. Therefore, until the input voltage increases to $V_{TN}$ (0.9 V in this example), the output node will be floated. (The node capacitance usually faces a fairly high-impedance load, and therefore, within the time normally required for the input voltage to swing across this voltage range, the output voltage will remain fairly constant. Moreover, a weak latch will typically be added to bridge this dead zone.) Thus, the transfer characteristic shown includes a significant hysteresis, since, between $V_{DD}-V_{TP}$ and $V_{TN}$, the output voltage is dependent on the direction of change of the input voltage.

Error of Crude Time Base

A response curve like that of FIG. 5B makes it more difficult to control the net delay of a circuit, since small changes in electrical parameters may produce large changes in the response characteristics. Thus, in such low-voltage technology, the frequency of an unstabilized oscillator may easily vary over a very large range (for example, over a range of 4:1), even in a well-controlled process.

The system of the presently preferred embodiment makes use of such an unstabilized oscillator to provide a crude time base within the module. This crude time base, together with electrical relationships, provides the necessary referent for communication over a one-wire bus. The use of a one-wire bus is very advantageous to the system user.

Electrical I/O Relationships

The bus protocol is also designed to minimize the charge transfer out of the battery in the module. This is done by using an "open-collector" type architecture. The protocol has been specified so that the module never sources current to the data line, but only sinks current.

When a data module is in contact with a host system, the host system initially pulls up the data line. (The module also preferably contains a very high-impedance pull-down resistor at this node, but this is included, in the preferred embodiment, merely to avoid the risk of floating nodes.) The host system initiates each stage of a data transfer operation by driving the data line low. The module detects this falling edge, and one of several further events can then occur.

If the module is being read (as previously determined by overhead bits), the module, after seeing the falling edge which starts the cycle, either will or will not turn on its NMOS pull-down transistor, depending on the value of the data bit being read at that cycle. When the NMOS pull-down is turned on, the module lets its preset timing period elapse, and then turns off the NMOS pull-down. Thus, when the system wants to read from the module, it applies a falling edge, waits a short time to be sure that the module has received the falling edge, and then attempts to pull up the data line, using a pull-up resistor which is not strong enough to overpower the NMOS pull-down transistor in the module. After waiting a sufficient time for the pull-up resistor to have raised the line to a high level (if the NMOS pull-down is off), the system tests the data voltage to ascertain the data bit. The system then waits for the maximum time period of the module delay to elapse, plus enough time for the data line to stabilize at a high level, and then sends another falling edge to read the next bit.

If the module is being written to (as previously determined by the overhead bits), the module, after seeing the falling edge which starts the cycle, waits for its preset timing period to elapse, and then stores the logic value of the data line. Thus, when the system wants to write to the module, it applies a falling edge, waits a short time to be sure that the module has received the falling edge, and then drives the data line either high or low, depending on the data bit. The system then waits for the maximum time period of the module delay to elapse, restores the data line to a high level, allows enough additional time for the data line to stabilize at a high level (and for the edge detector in the module to reset itself), and then sends another falling edge to write the next bit.

Block Transfer—Overhead and Reset

All data transfers are preferably done by reading or writing the entire contents of memory as a single serial stream. A short block of overhead bits, at the start of each transfer, defines the transfer type.

A further point of the protocol is a way to reset the module. Suppose, for example, that a module is pulled out of the slot in the middle of a data transfer, so that the memory pointer inside the module shows that the next bit to be written is bit number 117. The next system into which this module is inserted must not assume that the module's starting address is necessarily zero.

To make sure that the starting memory address of a newly inserted module is zero, as expected, the system sends a long string of write-zero commands, followed by a write-one command. The module contains simple sequential logic, which monitors the incoming bit stream for nonstop sequences of write-zero commands. If the module receives a nonstop sequence containing as many write-zero commands as the total length of the memory, the counter will freeze until the chip is reset. The chip will be reset if and only if an incoming "1" bit is seen while the counter is frozen.

This provides a reset capability, whereby the system can ensure that the starting address of the module is accurately known. Thus, on every insertion of a new module, the system can send such a reset sequence to initialize the address pointer in the module. Note that this address-pointer-reset is only necessary once per insertion. The sequence of write-zero commands will not normally destroy data, because the module never receives the overhead bit sequence which would tell it to enter write mode. (The only conditions under which data could be destroyed by these commands is when the module has been interrupted in the middle of a previous write sequence, and in this case the data may be presumed corrupt anyway.)

Of course, the data structures inside memory would normally include provisions for software error protection, such as overhead bits and checksum bits. However, a wide variety of such formatting schemes can be used, at the discretion of the user.

System Architecture

These ideas are used as parts of a very system architecture. The electronic module enabled by the teachings herein is extremely compact and extremely cheap. From a systems point of view, this module is in some ways more analogous to a read/write bar code than to a conventional electronic memory system.

Macro-System Architecture

Thus, this module can be used for price tags, for inventory tags, for work-in-process monitoring, for retail sales (to permit customers to select merchandise (e.g. by taking one module or a handful of modules to a cashier or to an automated check-out machine), without exposing the actual inventory to pilferage), and for a wide variety of other such compact data-transfer applications. Thus, the module described can be regarded as an electronic token, which is as portable and rugged as a metal token, but which is far more versatile.

This provides an large-scale systems architecture, wherein multiple host systems can each interface to small electronic "tokens." The tokens are small coin-shaped two-terminal read/write data modules, and are compact, rugged, and extremely cheap. Each of the tokens contains only two external contacts, a battery, and a small amount of memory. The memory is serially accessible, using a one-wire-bus protocol which minimizes the drain on the battery.

Electrical Interface from Token to Standard RS232 Interface

The presently preferred embodiment also uses an electrical interface to the tokens, which permits interfacing to tokens with a wide variety of computers, including a tremendous variety of personal or other computers, as long as the computer includes an interface to RS232 (or some comparable standard). The token has a one-wire-bus interface, implemented in a battery-backed open-collector architecture, which provides a read/write interface. The communication protocol expected by the token has been specified so that the token never sources current to the data line, but only sinks current. The communication protocol also includes time-domain relations which are referenced to a very crude time base in the token, and the system must preserve timing relations which will be satisfied by tokens in which the time base takes on any of the wide range of foreseeable speeds. To interface to this protocol, the programmable capabilities of the standard UART chip in the computer's RS232 interface are exploited to provide adaptation to the time base requirements of the module. This is done by writing an entire byte of output from the UART, at a much higher baud rate than the module can be relied on to accept, to write a single bit of data into the module. The read-data line (RX) of the UART is tied back to the transmit-data line (TX) through a resistor, so that the UART will also always report a read of the same data byte being written, unless the token has turned on its pull-down transistor. An electrical network is used at the interface which (in effect) reverses the ground plane identification of the two leads, but which does provide the correct signal polarity to the token for signal discrimination in read mode.

Physical Interface for Receiving Electronic Tokens

Preferably each host system uses a physical configuration of electrical contacts which provides rapid contact for electronic data modules (tokens). A slot, dimensioned to receive electronic tokens, includes a grounded contact positioned to make contact to the edge of a token which may be inserted, and two data contacts which are positioned to make contact to the opposite faces of the token. Each of the data contacts is connected to an open-collector driver circuit, including a pull-up resistor which will bring the potential of the contact high when the slot is empty. The token is shaped so that its edge, and one of its faces, are connected to the token's ground line, and the other face is the token's data line. Thus, when a token is inserted (no matter which way the token is facing), one of the two data contacts will be immediately pulled to ground, by short-circuiting across the ground plane of the token. The system can thereby recognize that a token has been inserted, and that the other data contact (the one which was not shorted to ground) can communicate with this token's data line. Thus, even though the token itself is asymmetric, and even though the directional orientation of the token is not initially known to the system, no physical asymmetry needs to be introduced into the token or the slot to assure proper data interface.

Alternative Physical Interface—Hand-Held Wand

A wand which provides rapid contact to a two-terminal electronic token data module. The wand includes one contact which will make contact to the periphery of an electronic token which the wand is pressed against, and one contact which will make contact to the center of the token. Preferably the wand includes a base portion which is shaped to be worn on the second joint of a user's finger. This wand can be used for very rapid manual contacting of electronic tokens in various physical positions. This can be very advantageous in a variety of data collection/updating applications such as retail checkout, or tracking work-in-progress in a computer-assisted-manufacturing environment.

BRIEF DESCRIPTION OF THE DRAWINGS

The present invention will be described with reference to the accompanying drawings, which show preferred embodiments of the invention.

FIG. 1A shows a version using a packaged integrated circuit on a flexible circuit board, and FIG. 1B shows a version using a chip-on-board mounting with a rigid circuit board.

FIG. 5A shows the voltage transfer characteristics ($V_{OUT}$ graphed as a function of $V_{IN}$) for a typical inverter in conventional CMOS technology (where $V_{DD} > V_{TP} + V_{TN}$), and FIG. 5B shows the transfer characteristic for a typical inverter in a low-voltage CMOS technology (where $V_{DD}<V_{TP}+V_{TN}$)

FIGS. 9A and 9B are two parts of a single Figure which shows the control logic used, in the presently preferred embodiment, in the integrated circuit of FIG. 6.

FIG. 16A shows the layout of the ESD protection diode, in the presently preferred embodiment. More specifically, FIG. 16A-1 depicts an N-well layer, FIG. 16A-2 a depletion layer, FIG. 16A-3 an active layer, FIG. 16A-4 an N+ layer, FIG. 16A-5 a P+ layer, FIG. 16A-6 contacts, FIG. 16A-7 metal, and FIG. 16A-8 a pad.

FIG. 16N shows a further alternative embodiment, wherein a diffusion structure is connected to provide ESD protection for an I/O connection of a battery-powered integrated circuit.

FIG. 22A, FIG. 22B, FIG. 22D, and FIG. 22G are schematic diagrams of various chips in the modules of FIGS. 1A-B. FIG. 22C, FIG. 22F, FIG. 22H, FIG. 22I, FIG. 22J, FIG. 22K, FIG. 22L, FIG. 22M, AND FIG. 22N are timing diagrams for the embodiment of FIG. 21.

FIGS. 23A-S 23B, 23C, 23D, 23E, 23F, 23G, 23H, 23I, 23J, 23K, 23L, 23M, 23N, 23O, 23P, 23Q, 23R, and 23S are schematic memory organization, command flowchart, and command structure diagrams.

FIGS. 34A, 34B, and 34C show modules and host communication by radio waves.

FIGS. 41A, 41B, 41C, 41D, 41E, 41F, 41G, 41H, and 41I show tokens with retainers.

FIGS. 42A, 42B, 42C, 42D, 42E, and 42F show token holders.

FIGS. 43A, 43B, 43C, 43D, 43E, 43F, 43G, 43H, and 43I show various contact extensions for a mounted token.

FIGS. 48A, 48B, and 49 show a mounted module die.

DESCRIPTION OF THE PREFERRED EMBODIMENTS

The numerous teachings of the present application will be described with particular reference to the presently preferred embodiment. However, it should be understood that this class of embodiments provides only a few examples of the many advantageous uses of the teachings herein. In general, statements made in the specification of the present application do not necessarily delimit any of the various claimed inventions. Moreover, some statements may apply to some inventive features but not to others.

Physical Packaging of Module

Figure 1A:
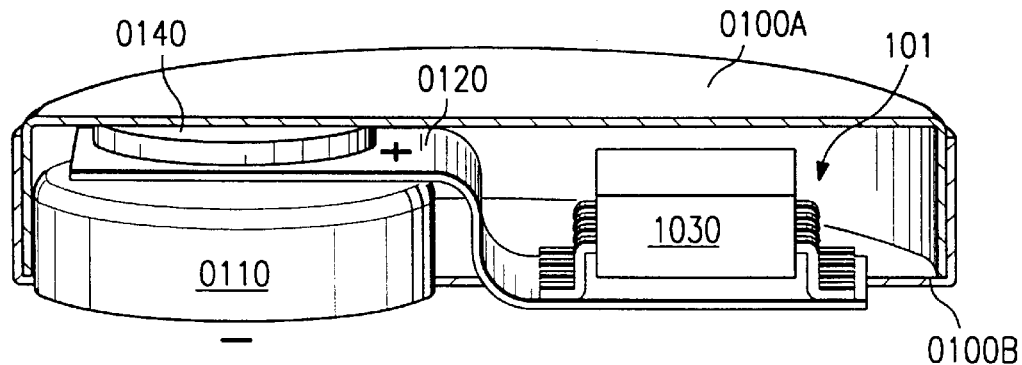
FIGS. 1A and 1B show two versions of the packaged module of the presently preferred embodiment.
Figure 1B:
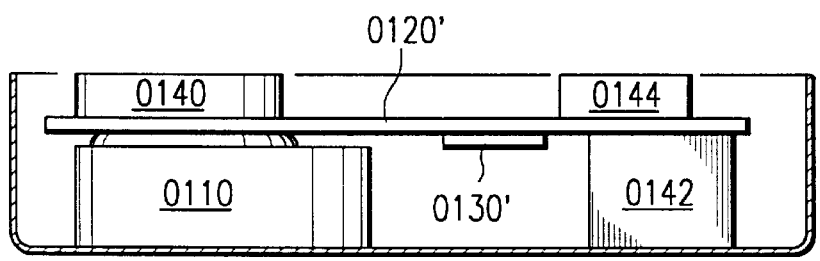

FIGS. 1A and 1B show the relation of assembled elements, in two versions of the packaged module of the presently preferred embodiment. (FIG. 1A shows a version using a packaged integrated circuit on a flexible circuit board, and FIG. 1B shows a version using a chip-on-board mounting with a rigid circuit board.) Note that the module shown includes an integrated circuit and a battery. The module is preferably coin-shaped, and the two faces of the module are isolated from each other.

To fit the integrated circuit into this very small space, a packaging scheme is used in the preferred embodiment. A two-part metal container is used, which has two shallow concave pieces 0100A and 0100B which fit together. The integrated circuit (in a low-height package 0130, such as a flat-pack or SOIC) is mounted on a very small flexible printed circuit board 0120, which fits inside the container 0100. Laterally spaced from the integrated circuit 0130, on the other end of the small flexible board 0120, the board end is sandwiched between a battery 0110 and a piece of elastic conductive material 0140 (such as conductive plastic foam). Thus, the battery 0110 is connected between one face 0100B of the container 0100 and a power conductor (not shown) on the board 0120. The piece of elastic conductive material 0140 makes contact between a data trace (not shown) on the board 0120 and the other face 0100A of the container 0100. Another trace (not shown) on the board 0120 makes contact directly to the container face 0100B on which the battery's ground terminal is connected. Thus, simple wiring on the small board 0120, using through-hole vias, suffices to route power, ground, and data lines to the integrated circuit 0130, while providing a sealed durable package with two external contacts.

In the alternative embodiment of FIG. 1B, a small rigid circuit board 0120' is used in place of the flexible board 0120. Note that an additional piece of conductive foam 0142 is used in this case, to provide electrical contact from a trace on the board 0120' to the ground side 0100B of the casing. Note also that, optionally, an insulating additional piece of foam 0144 provides spacing between the board 0120' and the casing piece 0100A. Note also that a chip-on board mounting 0130' is used instead of the package 0130

The casing halves 0100A/100B are preferably parts of a standard electronic battery package. Such a casing can be hermetically closed, simply by swaging the two parts together with sealant at their join. In the presently preferred embodiment, the casing 0100 has external finished dimensions (after the case is sealed) of 16 mm wide and 3.2 mm thick, and the battery 0110 is battery type AG1. However, of course, a wide variety of other dimensions and battery types can be used, as long as the dimensions are compatible.

The battery is preferably a low-voltage battery (1.5 V, in the preferred embodiment.) This is cheaper, and maximizes power efficiency, but requires some circuit design features to accommodate the electrical interface. (Electronic watches have often been powered by 1.5 V batteries, but such devices do not have any direct electrical interface to the outside world. By contrast, the module of the presently preferred embodiment communicates over a one-wire bus which is driven by full CMOS voltage levels.)

The integrated circuit, in the preferred embodiment, contains 256 bits of serial-access memory. This memory is read- or write-accessed as a single block transfer. It is contemplated that larger amounts of memory may be advantageous. Of course, other types of memory organization can be used instead; but for many applications it is contemplated that use of a very small amount of memory (4K or less) may be particularly advantageous, since this extends the battery lifetime.

Module Mounting and Adhesion

In many applications (such as inventory control, machinery maintenance records, or retail tagging) users will prefer to affix the tokens to the physical items to which the data in the individual tokens refers. In this case, the token must be mounted so that both terminals of the token can be contacted by the user. In the presently preferred embodiment (using a package like that shown in FIG. 1A), only one of the possible orientations will work. (The inner casing piece 0100A must be exposed, and therefore, if the token is to be mounted on a surface, it is the outer casing piece 0100B which should be adhered to the surface.)

For such applications, the packaged modules (in embodiments using packages like those of FIGS. 1A and 1B) are preferably shipped with double-sided adhesive tape already affixed to the side of the module which is to be adhered to a surface (face 0100B, in the example of FIG. 1B).

Preferably the double-sided tape has a high-tack face adhered to the casing piece 0100B. The other side of the tape may be high-tack, for permanent mounting; or may be low-tack, for applications (such as retail) where the tokens will be frequently reused; or may be medium-tack. For many applications, the tokens can be advantageously shipped with the low-tack face of many tokens stuck to a common cover sheet.

Integrated Circuit Organization

Figure 6:
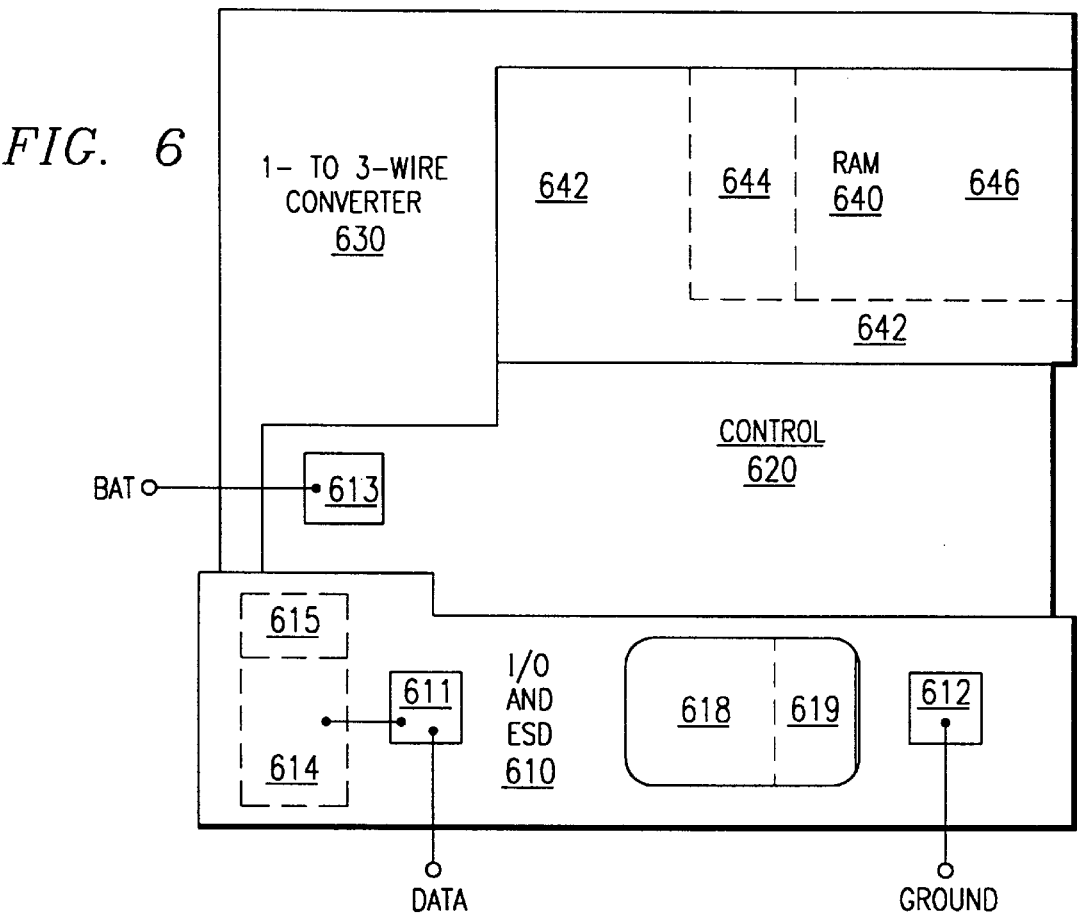
FIG. 6 is an overview of the physical organization of the integrated circuit which is used, in the presently preferred embodiment, in the module of FIG. 1.
Figures 1, 16A:
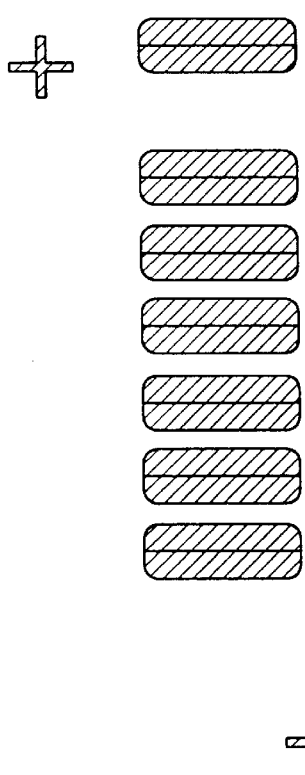

FIG. 6 is an overview of the physical organization of the integrated circuit which is used, in the presently preferred embodiment, in the module of FIG. 1. This is a fairly small integrated circuit, with a die size, in the preferred embodiment, of about 2,000 mil$^2$ (in 1.2 micron technology).

The incoming ground line is connected to a contact pad 612, and the incoming data line is connected to a contact pad 611, in an area 610 which contains I/O and ESD circuitry. (The battery terminal is connected to a third contact pad 613.) The contact pad 611 is connected to a large pull-down transistor 614, and to an ESD protection structure 618/619, which will be described in detail below. A very weak transistor 615, which is connected to be always turned on, is connected in parallel with the driver transistor 614, to provide a high-impedance leakage path which brings the two terminals of the module toward the same potential when the module is not connected to a system.

The incoming data interface is provided by 1-wire-to-3-wire conversion circuitry 630, which implements the one-wire bus protocol. This conversion circuitry connects to the memory 640, and to the control logic 620, through a more conventional three-wire bus (including data, clock, and reset lines).

The memory 640 is internally configured as a random-access memory array (although the host can only access the memory serially, as a single block). The memory includes peripheral logic 642, and two array portions. The overall array dimensions, in the preferred embodiment, are 16 rows by 16 columns, but two rows (shown as area 644) are preferably formed of RAM/ROM hybrid cells, which will be described below. The cells in the other 14 rows (shown as area 646) are conventional six-transistor SRAM cells.

Of course, a wide variety of other array sizes and layouts can also be used, as will be obvious to those skilled in the art of memory design. In fact, it is contemplated that, in the near future, the memory array size may be advantageously increased from 256 bits to 1024 bits.

Figure 7:
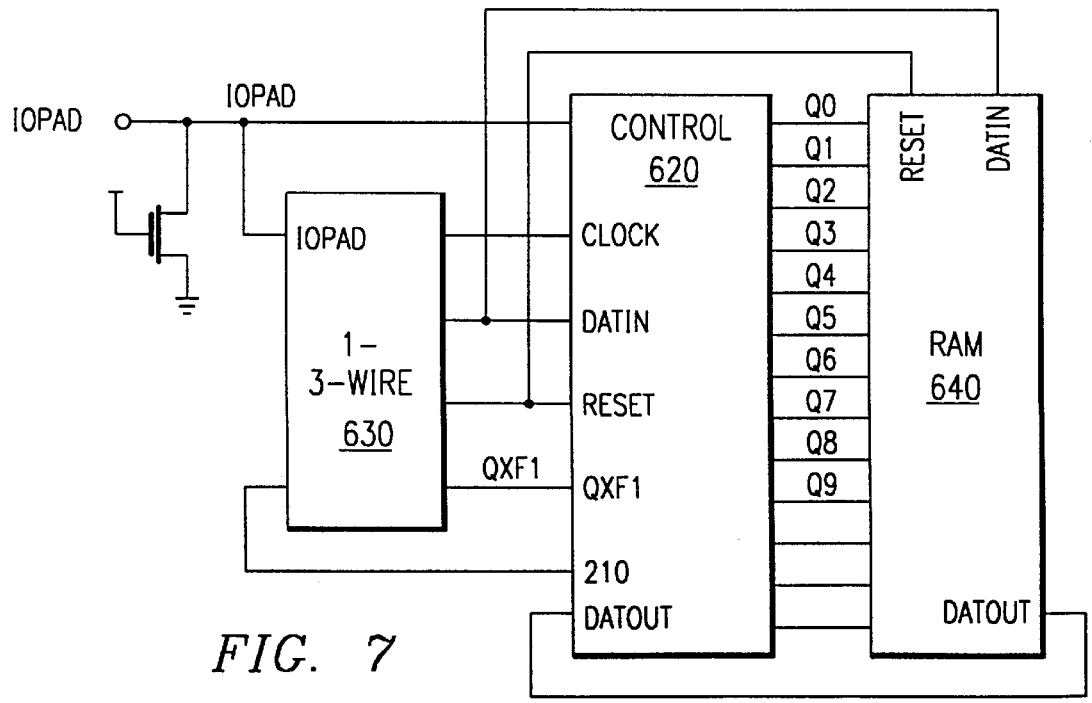
FIG. 7 shows the electrical organization of the integrated circuit of FIG. 6.

FIG. 7 shows the electrical organization of the integrated circuit of FIG. 6. The RAM 640 receives ten address bits Q0–Q9 from the control logic 620, as well as control signals ER2, SDOUTB, and RESET. Control signal ER2 enables the RAM. Control signal EWD selects read or write mode. Control signal SDOUTB is a strobe signal, which latches a data state for output. The RAM 640 also receives a data input DATIN, and can provide a data output DATOUT.

The 1-wire-to-3-wire conversion circuitry 630, in the preferred embodiment, interfaces from the external data line to a more conventional 3-wire serial bus, which includes RESET, CLOCK, and two data lines (DATIN and DATOUT). The control logic 620 also provides an output "210", which indicates when the counter is frozen. (This signal is used in implementing the reset logic, as discussed below.) The 1-wire-to-3-wire conversion circuitry 630 provides a timing output QXF1, which corresponds to the output pulse of a one-shot. (This pulse may be from 15 to 60 microseconds wide, and provides the basic timing reference inside the token module.)

Figure 8A:
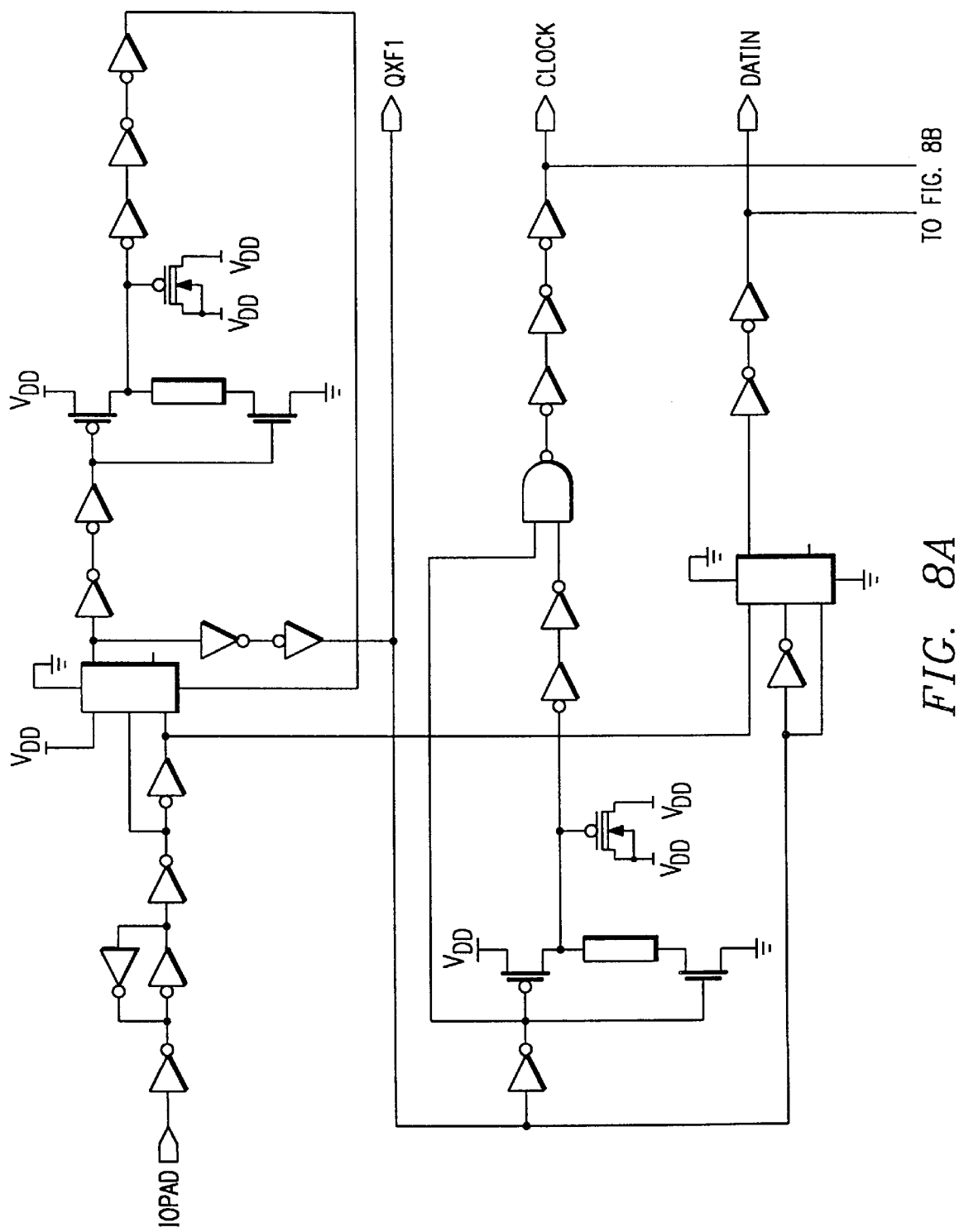
FIGS. 8A and 8B are two parts of a single Figure which shows the one-wire-to-three-wire conversion circuit used, in the presently preferred embodiment, in the integrated circuit of FIG. 6.
Figure 8B:
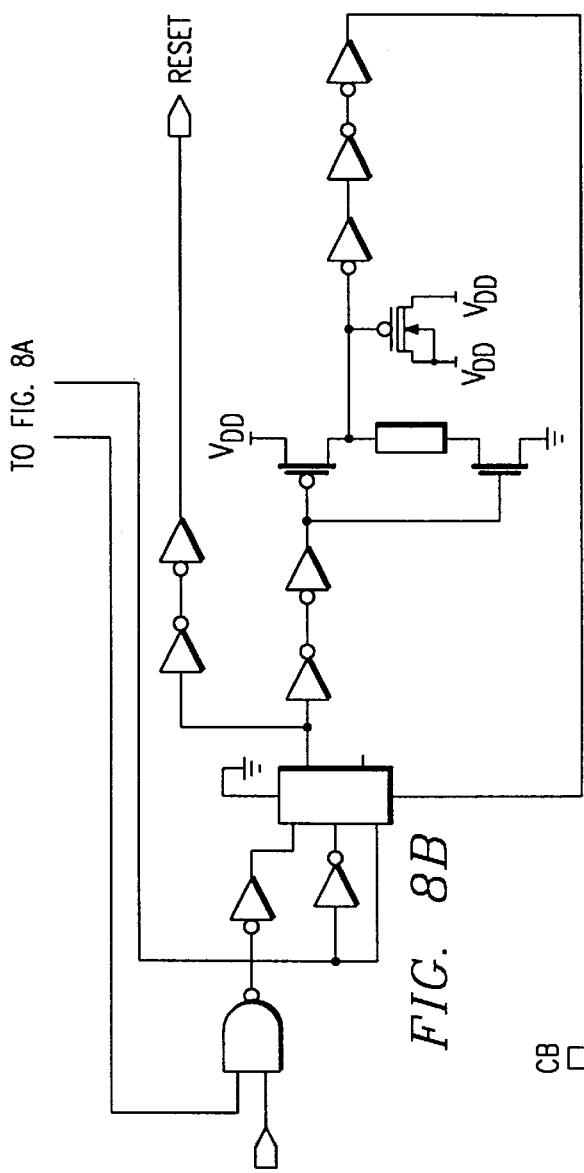

FIGS. 8A and 8B are two parts of a single Figure which shows the 1-wire-to-3-wire conversion circuitry 630 which is used, in the presently preferred embodiment, in the integrated circuit of FIG. 6. Every falling edge in the incoming data line fires a one-shot to produce a pulse on the line QXF1. (This pulse, in the presently preferred embodiment, has a width of 15–60 microseconds, and provides the time reference within the module.) In turn, every falling edge of signal QXF1 generates a short pulse (about 1.5 microseconds wide) on the CLOCK line. RESET signals are generated by simple logic which implements the conditions for reset, as described below.

Figure 9A:
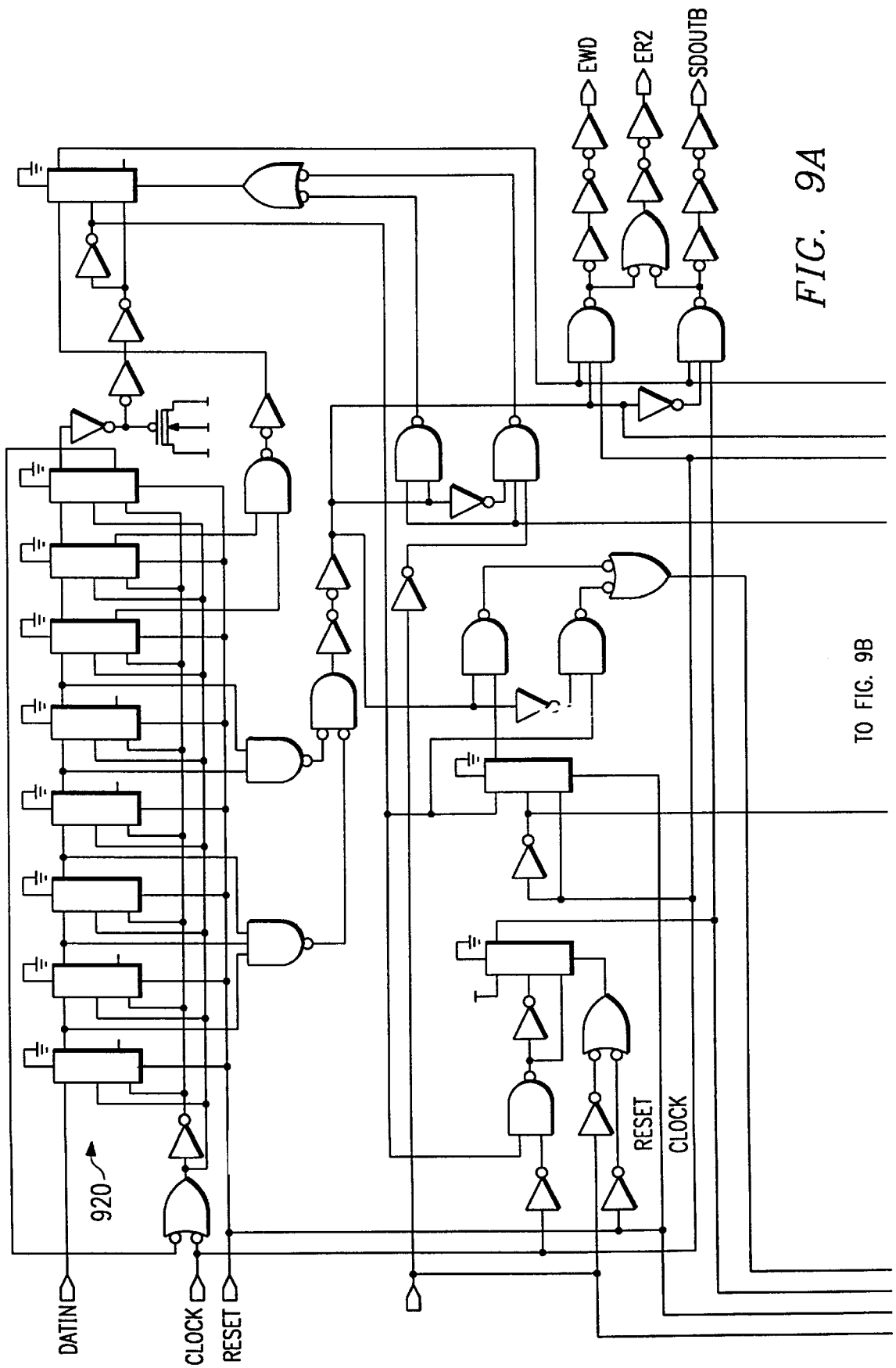

FIGS. 9A and 9B are two parts of a single Figure which shows the control logic used, in the presently preferred embodiment, in the integrated circuit of FIG. 6. After the protocol register 920 has been loaded, counter chain 910 counts successive clock pulses. (Every falling edge on the data line will lead to a clock pulse within the module, and these pulses are counted by counter 920.) The counter 910 is also connected to logic which will intercept the clock signal (to freeze the count), and activate signal 210, as soon as 256 bits of data have been read or written. (Note that the counter chain shown actually includes two more stages than are needed. This permits ready modification for 1024-bit embodiments.) Register 920 receives the protocol word. The stages of this register are connected so that a RESET will set the first stage, and clear the other stages. Thus, when a 1 propagates through to the last stage, a protocol word has been loaded.

Figures 2, 16A:
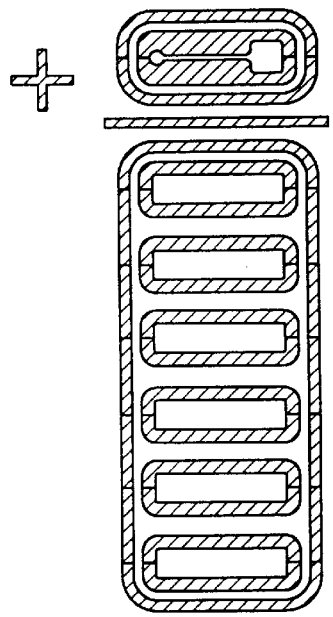
FIGS. 16A through 16N relate to several embodiments of a battery protection diode, of which one version is preferably used in the integrated circuit of FIG. 6. It should be appreciated that these drawings are not necessarily drawn to scale, and, in particular, that some of the vertical dimensions in the device sections shown have been exaggerated for clarity.
Figures 3, 16A:
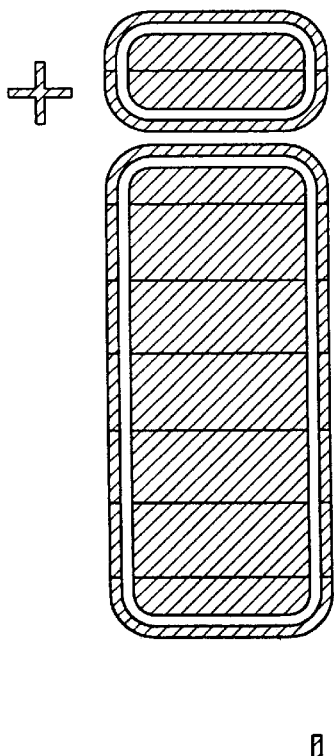
FIG. 3 is a timing diagram of a read operation, in the module of the presently preferred embodiment.
Figures 4, 16A:
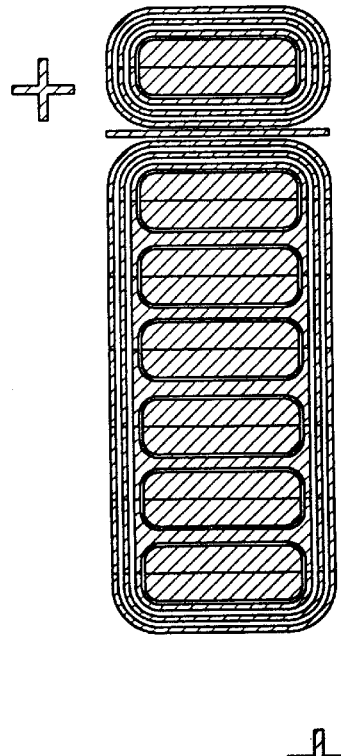
FIG. 4 shows the format of the overhead bits used for each block data transfer operation, in the module of the presently preferred embodiment.
Figures 6, 16A:
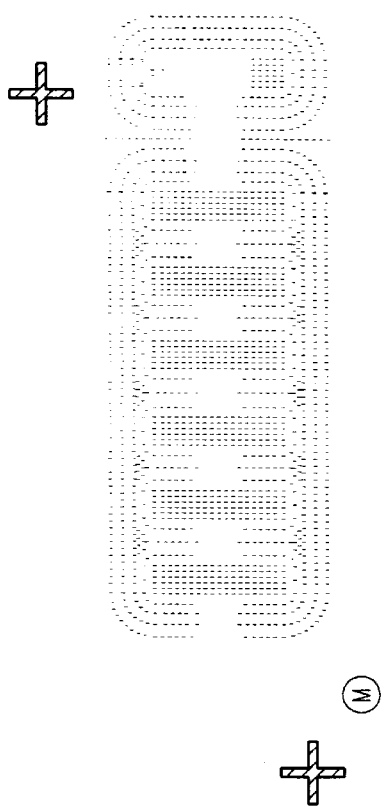

FIG. 4 shows the format of the protocol word, in the module of the presently preferred embodiment. Note that the first bit of the protocol word is always a 1. Note also that two bits have been reserved for module identification. Thus, memory expansion can be easily achieved by wiring as many as four memory chips in parallel, in a single token module. Note also that the read/write selection bits provide significant protection against accidental writes, in a high-noise environment.

Low-Voltage SRAM Architecture

Among the teachings set forth in the present application is a low-power low-voltage CMOS six-transistor static random access memory (SRAM), which can operate on a power supply voltage which is less than the sum of the NMOS and PMOS threshold voltages, and which does not include any analog or metastable sense amplifier stages. The selected cell is allowed to pull one of its bitline pair all the way down to ground. Thus, full logic levels appear on the bitline pair. Only one line of the bitline pair is connected to the following gate stage. Preferably bitline precharge transistors are connected to pull up all bitline pairs whenever the RAM is not selected.

Process Characteristics

In applications such as those of the preferred system embodiment, it is highly desirable to minimize unnecessary charge consumption. In particular, this means that the area-specific junction leakage of the semiconductor material, for the source/drain junctions, at 5 Volts and at 25° C., should be low (preferably much less than 1 femtoAmperes per square micron). For example, the process used in the presently preferred embodiment has junction leakage, for the source/drain junctions, in the neighborhood of about 100–200 attoAmperes per square micron at 25° C. and at 5 Volts. (As is well known, this parameter has a strong temperature dependence. For example, the process used in the presently preferred embodiment has junction leakage, for the source/drain junctions, in the neighborhood of a few femtoAmperes per square micron at 25° C. and at 5 Volts.) Such low leakage is achieved, as is well known to those in the semiconductor art, by using good quality monocrystalline silicon starting material with low levels of carbon and transition metals; optionally, growing epitaxial silicon on the starting wafers; rigorously isolating wafers in process from heavy metal contamination; minimizing the exposure of wafers in process to ionizing radiation, from sources such as implanters; and other such well-known precautions.

Electrical Organization

Figure 10:
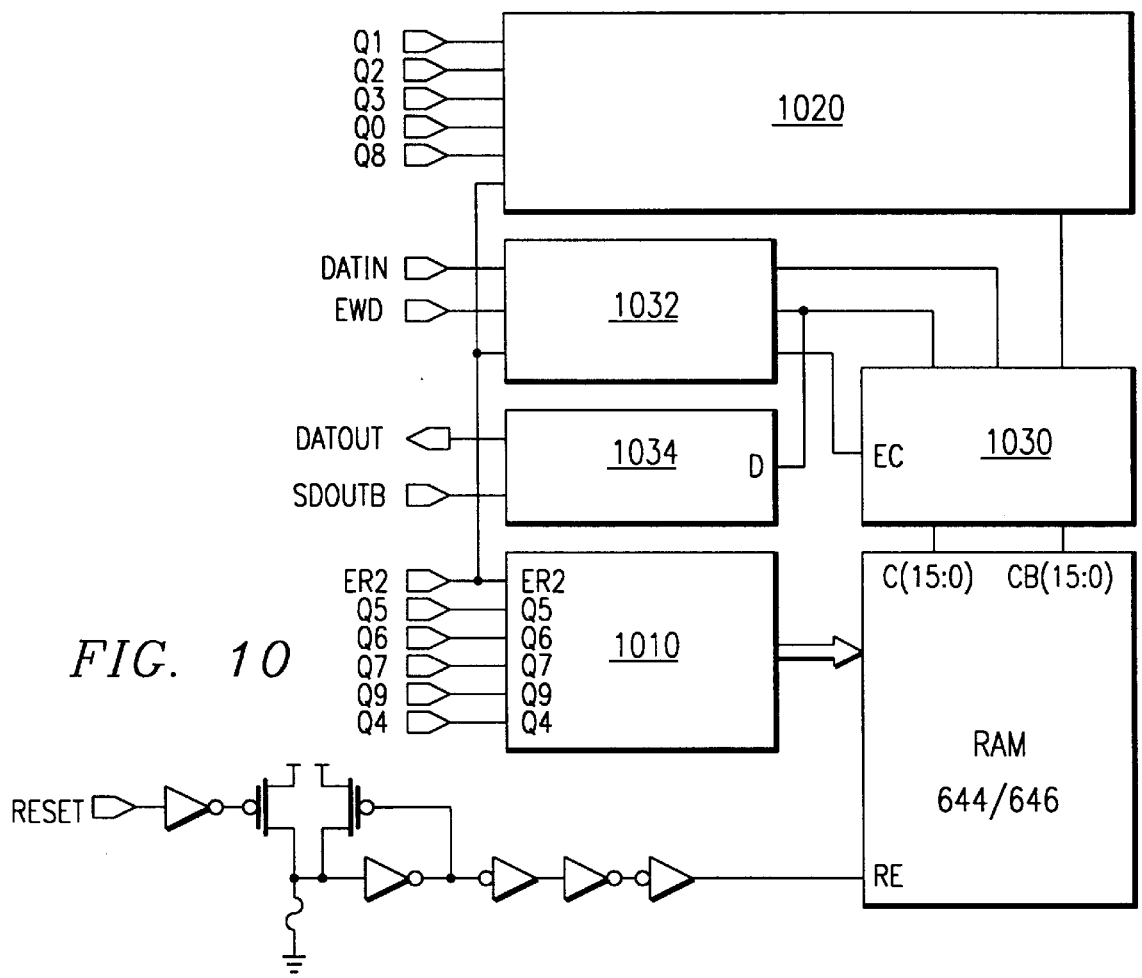
FIG. 10 shows the electrical organization of the memory, in the presently preferred embodiment, in the integrated circuit of FIG. 6.

FIG. 10 shows the electrical organization of the RAM 640, in the presently preferred embodiment, in the integrated circuit of FIG. 6. Five address bits are connected to row predecoder/decoder 1010, and five bits are connected to column predecoder/decoder 1020. (As noted above, it is contemplated that expansion to an array of 1024 bits may be advantageous, and the extra address bits are provided for this contingency.) The eight primary address bits provide 16 select lines, to the 16 parallel blocks of column driver logic 1030, to select a column. The column driver logic contains precharge transistors, and also contains pass gates which connect the selected column to a write driver circuit 1032 (in write mode) or to sense amplifier 1034 (in read mode).

Precharge Operation

The column lines (bitline pairs) are always held high when the memory is deselected. When the memory is selected, the bitline pairs are floated (until a row of cells turns on, and begins to pull down one side of each bitline pair). This always-high operation helps to provide power efficiency: one-half of the bitlines are discharged for each one-bit data access, but not under any other circumstance. Thus, the net charge consumption per access is acceptably low.

Sense Amplification and Output

The "sense amplifier" circuit 1034 does not function at all similarly to a conventional memory sense amplifier: this amplifier is a simple digital circuit, which receives a single-ended output, from only one of the bitlines in a bitline pair. (However, the write driver is double-ended, since one of the bitlines must be driven low.)

Figure 14:
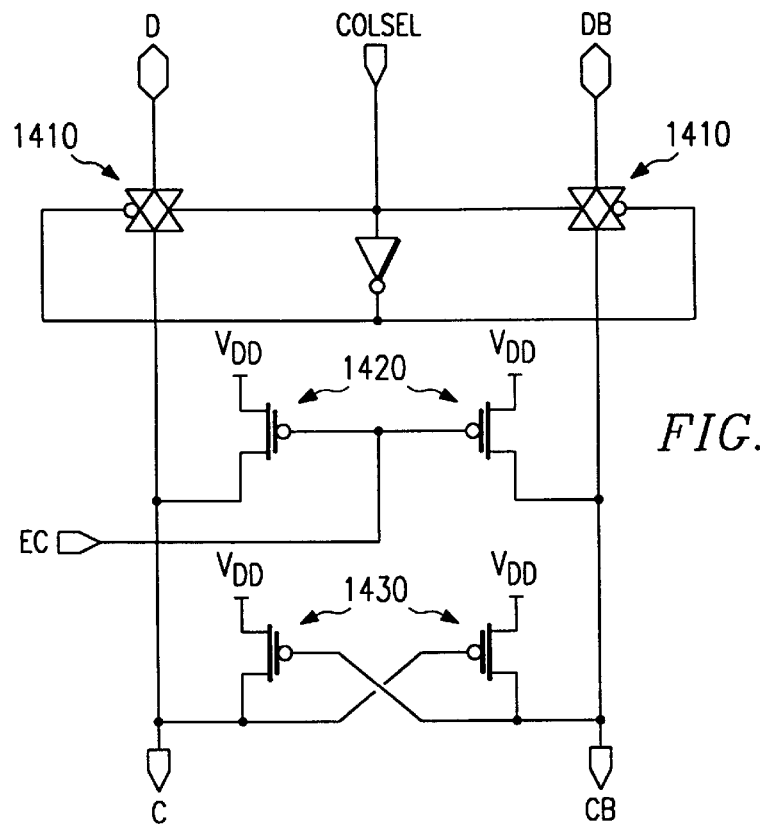
FIG. 14 shows the bitline precharge and pull-up logic used in the memory of FIG. 10, in the presently preferred embodiment.

FIG. 14 shows the bitline precharge and pull-up logic used for each column of the memory of FIG. 10, in the presently preferred embodiment. Note that full CMOS transmission gates are used to pass the output of the selected column. (This is required by the low operating voltage permitted in the presently preferred embodiment.) PMOS transistors 1420, when gated by signal EC, precharge the bitline pair C and CB to $V_{DD}$. When a selected cell begins to pull down one side of the bitline pair (either line C or line CB), one of the cross-coupled PMOS transistors 1430 will turn on (after the line sinks below $V_{DD}-V_{TR}$) to hold the other side of the bitline high. (Since the bitline was already precharged high, this transistor is not expected to source large amounts of current. These transistors are provided primarily to avoid the risk of a floating node.)

Figure 13:
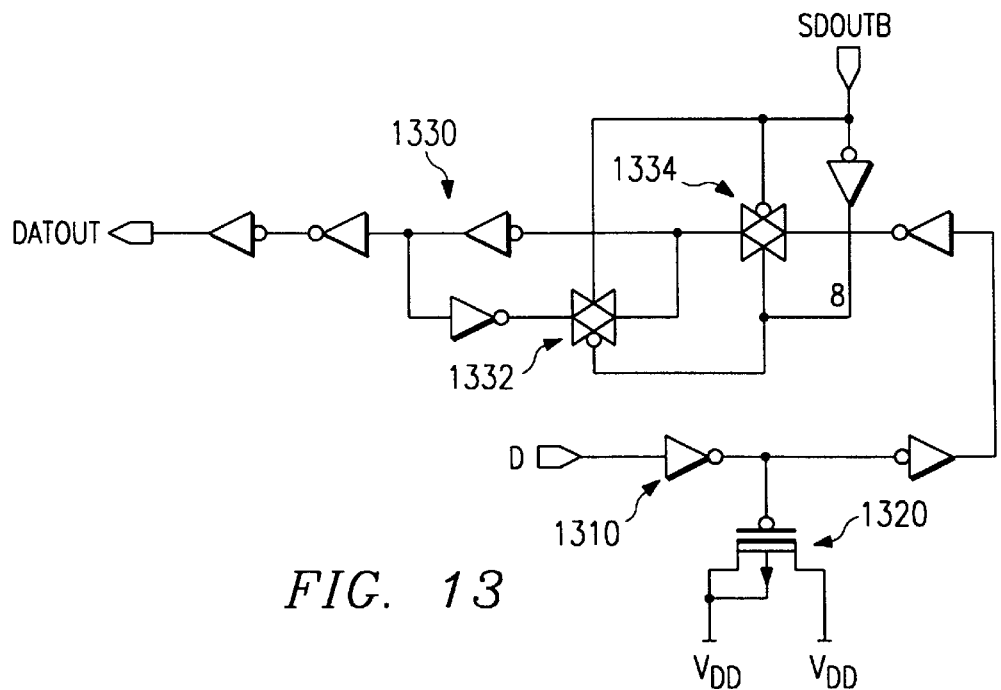
FIG. 13 shows the single-ended sense amplification stage used in the memory of FIG. 10, in the presently preferred embodiment.

FIG. 13 shows the single-ended sense amplification stage used in the memory of FIG. 10, in the presently preferred embodiment. The input labelled D is one side of a column bitline pair C and CB, selected by one of the selection gates shown in FIG. 14. Note that the first stage inverter 1310 is preferably asymmetric. In the presently preferred embodiment, this inverter includes a PMOS device which is 30 microns wide and 1.2 microns long, and an NMOS device which is 3 microns wide and 3 microns. This asymmetry helps to assure that inverter 1310 will switch strongly as soon as it receives a signal from a bitline which is being pulled down by the driver transistor in a cell. (In a normal CMOS circuit, this asymmetry would shift the trip point of the logic stage. However, in this low-voltage logic, this is not true, due to the hysteresis effect discussed above with reference to FIGS. 5A and 5B.) The output of inverter 1310 is loaded by capacitor 1320. This capacitive loading helps to provide data hold time after signal SDOUTB ends. The following inverters, in the preferred embodiment, have more normal relative device sizings (nominal W/L: PMOS 10/1.2, NMOS 5/1.2). The resulting logical signal is fed into a gated latch 1330, which is clocked by signal SDOUTB. Note that the latch is clocked in two places, so that the feedback connection is broken (by full CMOS transmission gate 1332) whenever full CMOS transmission gate 1334 turns on to admit a new data value. This prevents contention and saves power.

RAM/ROM Hybrid Memory

Another teaching set forth in the present application is a memory cell which can operate as a static RAM, or can be programmed to operate as a ROM cell. Thus users who need the extra security permitted by ROM encoding can have this capability, while users who do not need ROM encoding can use off-the-shelf parts as RAM only.

Figure 11:
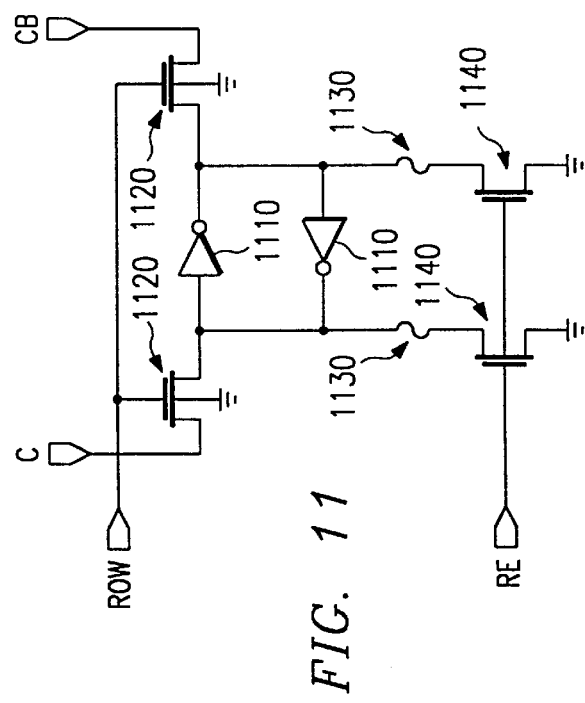
FIG. 11 shows a memory cell, which can operate as a RAM cell, or which can be programmed to operate as a ROM cell.

FIG. 11 shows a memory cell, which can operate as a RAM cell, or which can be programmed to operate as a ROM cell. The signal RE is itself derived from a fuse, and, if ROM operation has not been enabled, this signal will be low. Thus, in RAM mode, the cross-coupled inverters 1110 will provide normal latch operation, selectively accessed by pass transistors 1120.

When it is desired to convert a block of memory to ROM, a fuse is blown to hold the RE signal high. In addition, one of the two fuses 1130 is blown in each cell, to encode either a "1" or a "0". Thereafter, one of the two nodes of the latch will always be pulled to ground. Even if the cell is addressed in a write operation, the connection to ground will easily overpower the PMOS load transistor, to hold the latch in its permanently programmed state. (In the presently preferred embodiment, the NMOS driver transistors in the inverters 1110 each have nominal W/L dimensions of 8/1.2 microns, the PMOS load transistors in the inverters 1110 each have nominal W/L dimensions of 6/6 microns, and the NMOS ROM-mode transistors 1140 and the NMOS pass transistors 1120 each have nominal W/L dimensions of 4/1.2 microns.)

ESD Protection

The systems environment described above means that the data modules face some unusual integrity requirements. Since the modules may be exposed to very rough treatment, in consumer and industrial environments, they should preferably have a very high level of immunity to electrostatic discharge (ESD).

ESD Protection Diode Profile

Figures 8, 16A:
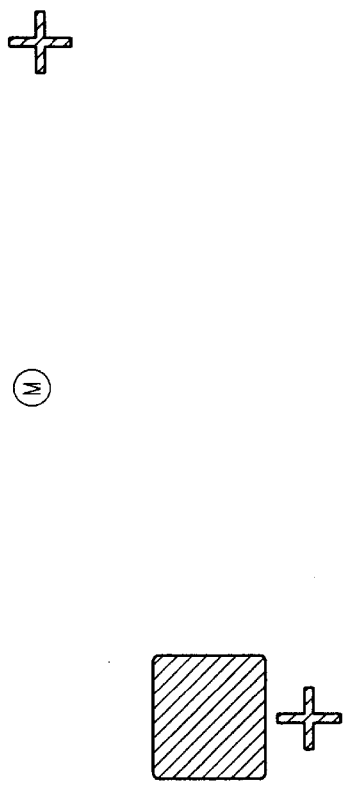
Figures 5, 16A:
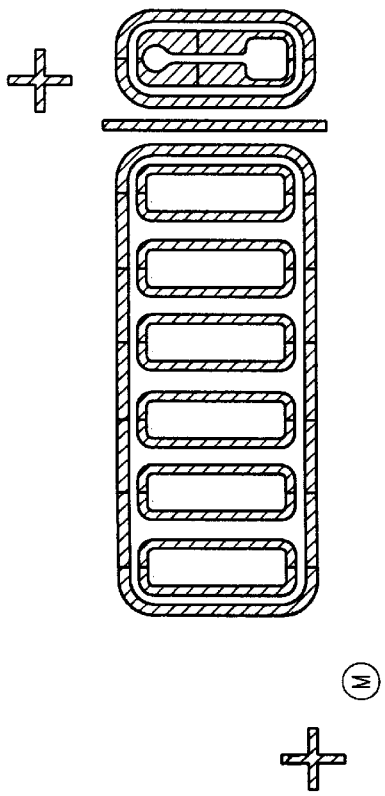
Figures 7, 16A:
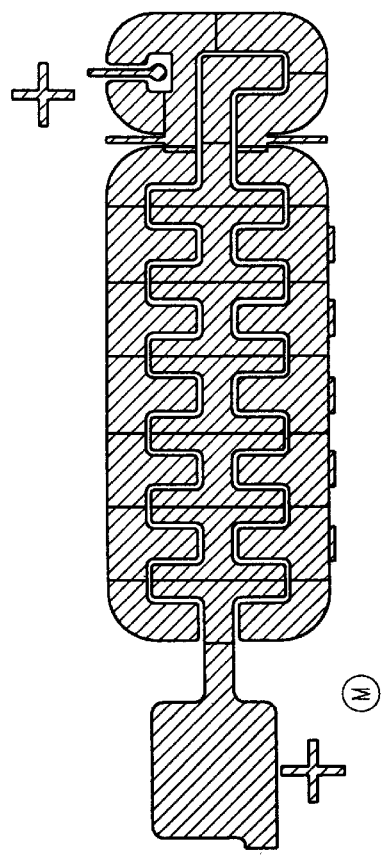
Figure 16B:
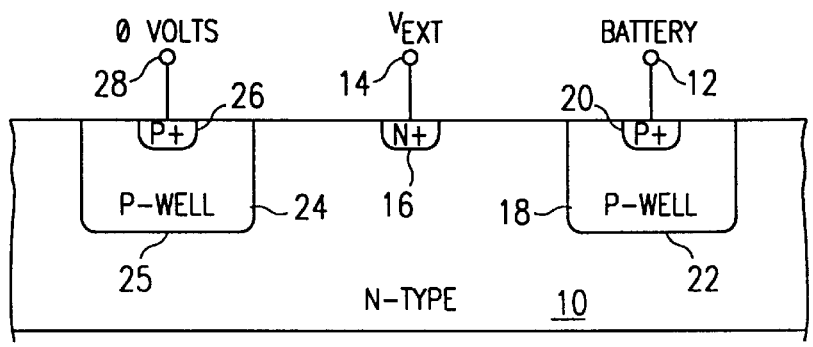
FIG. 16B illustrates a cross-sectional diagram of a prior art battery protection circuit.

Referring now to FIG. 16B, there is illustrated a cross-sectional diagram of a semiconductor substrate 10 utilizing a prior art battery protection device. In this type of device, a battery terminal 12 is provided for being connected to a battery (not shown) and an external voltage terminal 14 is provided for being connected to an external (system) supply voltage $V_{EXT}$. The battery terminal 12 is typically at a lower voltage than the external supply voltage $V_{EXT}$. For example, the battery voltage for most battery-backed systems is typically around three volts, whereas the external voltage $V_{EXT}$ is typically around five volts.

The external supply terminal 14 is connected to the substrate 10, which is an N-type semiconductor substrate in this example, through an n+ contact region 16. The battery terminal 12 is connected to a P-well 18 through a p+ contact region 20. The boundary of the P-well 18 forms a PN junction 22. Therefore, when the N-type substrate 10 is at a lower potential than the battery terminal 12, current will flow through the forward biased PN junction 22 from the battery terminal 12. However, when the external supply terminal 14 is a higher voltage than the battery terminal 12, the PN junction 22 is reverse biased and blocks current. This essentially prevents current flowing from the external terminal 14 to the battery terminal 12 and thus charging the battery.

In a typical CMOS semiconductor device utilizing P-wells and N-wells in a twin-tub process, there will be additional P-wells that are separated from the P-well 18. One of these is represented by a P-well 24, which is disposed in the N-type substrate 10 and separated from the P-well 18 by a predetermined minimum spacing in the N-type substrate 10. A PN junction 25 is formed between the N-type substrate 10 and the P-well 24. The P-well 24 can be utilized to configure any type of device. In order to contact the P-well 24, a p+ contact 26 is provided which is connected to an external circuit terminal 28. It should be understood that the illustrated structure merely represents a partial example of such a P-well structure. (For example, such a P-well would usually include at least two shallow N+ diffusions, to provide the source/drain regions of an MOS transistor. Such a P-well may contain three or more such N+ diffusions, to provide more than one transistor, and may also be configured to provide other elements as well, e.g. diodes or capacitors.)

Figure 16C:
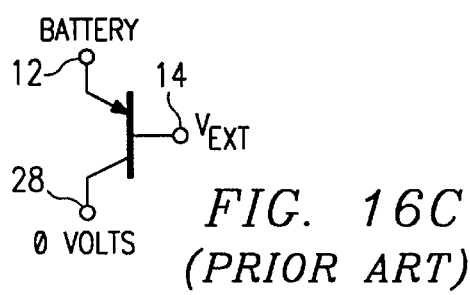
FIG. 16C illustrates a schematic diagram of the parasitic PNP transistor in the prior art structure of FIG. 16B.

A problem arises with the prior art device whenever the external voltage falls (e.g. when the terminal 14 is disconnected from $V_{EXT}$, or the system power supply fails), so that the external circuit terminal 28 is connected to a voltage lower than the battery terminal. In the structure shown in FIG. 16B, this will reverse bias the PN junction 25. In this mode, minority carriers (holes, in this example) which are injected into the substrate 10 at the forward biased PN junction 22 can be collected at the PN junction 25. This results in the formation of a leaky parasitic PNP transistor. This parasitic PNP transistor is illustrated in FIG. 16C. This transport of holes creates a net current, from the battery terminal 12 to the ground terminal 28, which dissipates power.

The parasitic transistor of FIG. 16C has the emitter junction formed between the P-well 18 and the N-type substrate 10 with the battery terminal 12 providing the emitter terminal. The base is formed by the N-type substrate 10 with the base terminal comprising the external voltage terminal 14. The collector junction is formed between the P-well 24 and the N-type substrate 10 with the external circuit terminal 28 representing the collector terminal. It can be seen that whenever the external voltage terminal 14 is disconnected, the parasitic transistor illustrated in FIG. 16C passes leakage current. This results in leakage current, which, in a relatively low power device, can comprise a significant portion of the supply current, since there are usually a number of adjacent P-wells on the substrate with a parasitic transistor connected to each of the adjacent P-wells. Since the bases of all of these transistors will be common, this effectively forms a multi-collector parasitic transistor.

FIGS. 2 and 8 show two important embodiments of the disclosed diode structure. In each, the battery power input is connected through a first junction 111, so that the battery cannot be charged when the external (system) power supply is active. The battery isolation diode junction 111 is surrounded by a second junction 112. In the embodiment of FIG. 16D, the first junction 111 is the boundary of P+ first region 36 and N-type second region 34, and the second junction 112 is the boundary of N-type second region 34 with P-type third region (P-well) 32. In the embodiment of FIG. 16K, the first junction 111 is the boundary of P-type first region 121 and N-type second region 122, and the second junction 112 is the boundary of P-type first region portion 121B with P-type third region 113. Note that, in FIG. 16D, the second region 34 encloses the first region 36, whereas, in the embodiment of FIG. 16I, the first region 121 encloses the second region 122.

The second junction 112 is preferably shorted out, by a wired connection which makes ohmic contact to the semiconductor regions on both sides of the junction. In the embodiment of FIG. 16D, the wiring 43 which shorts out the second junction makes ohmic contact to the second region 34 at N+ diffusion 40, and makes ohmic contact to the third region 32 at P+ diffusion 38, and is also ohmically connected to N-type extended region (substrate) 30 at N+ diffusion 42, and is also tied to external supply voltage $V_{EXT}$. In the embodiment of FIG. 16K, the wiring 131 which shorts out the second junction makes ohmic contact to the first region 121 at P+ diffusion 121A, and makes ohmic contact to the third region 113 at N+ diffusion 113A, and is also ohmically connected to the battery terminal $V_{BAT}$.

The built-in potential of second junction 112 provides efficient collection of minority carriers, which will recombine in the neighborhood of this junction. Thus, the second junction collects the minority carriers which can be generated when the first junction 111 is forward biased (i.e. when the integrated circuit is being powered from the battery). Otherwise, minority carriers could diffuse to other junctions, to cause leakage currents which can significantly degrade the lifetime of a low-powered device.

Note also that the structures of FIG. 16D and FIG. 16K both include an intermediate-depth diffusion, with a junction depth which is significantly deeper than the source/drain junction depth, but significantly shallower than the depth of the well. In the embodiment of FIG. 16D, this intermediate-depth diffusion is provided by the N-type second region 34. In the embodiment of FIG. 16K this intermediate-depth diffusion is provided by the P-type first region portion 121A.

Referring now to FIG. 16D, there is illustrated a cross-sectional diagram of a preferred embodiment of the disclosed battery protection circuit, as implemented in an N-type substrate 30. A P-well 32 is formed in the N-type substrate 30, having a depth of approximately four microns. An N-type region 34 is formed in the P-well 32 to a depth of approximately 0.8 microns. A p+ region 36 is formed within the N-type region 34. In this sample embodiment, the p+ region 36 has a thickness of approximately 0.40 microns. A p+ contact 38 is provided that surrounds or forms a ring around the N-type region 34 to provide a contact to the P-well 32. In a similar manner, an n+ contact 40 is provided that surrounds the p+ region 36 to provide contact from the surface to the N-type region 34. An n+ contact 42 is provided in the N-type substrate 30 outside the boundaries of the P-well 32. The external voltage terminal 14, having the voltage $V_{ext}$ connected thereto, is interfaced with the n+ region 42. In a similar manner, the battery terminal 12 is interfaced with the p+ region 36. In addition, the external voltage terminal 14 is connected to the p+ region 38 and to the n+ region 40 through an interconnect line 43.

The P-well 24 and associated p+ region 26 and external circuit terminal 28 are also provided in the substrate 30 to illustrate the formation of the reverse biased PN junction 25. As will be described hereinbelow, the disclosed battery protection circuit prevents conduction from the battery terminal 12 to the PN junction 25 when the PN junction 25 is reverse biased. For illustrative purposes, the external circuit terminal 28 is connected to a voltage lower than the battery terminal, for example, zero volts.

Figure 16E:
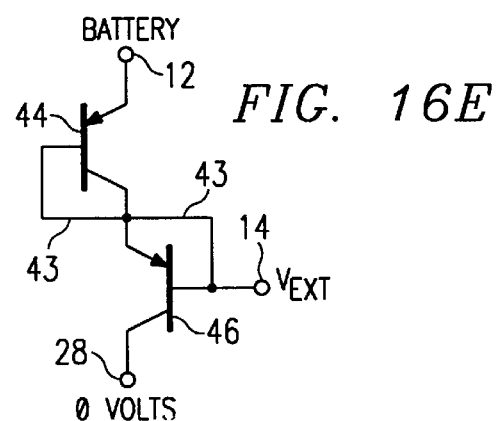
FIG. 16E illustrates an electrical schematic of the parasitic PNP transistors of the battery protection circuit of FIG. 16D.
Figure 16D:
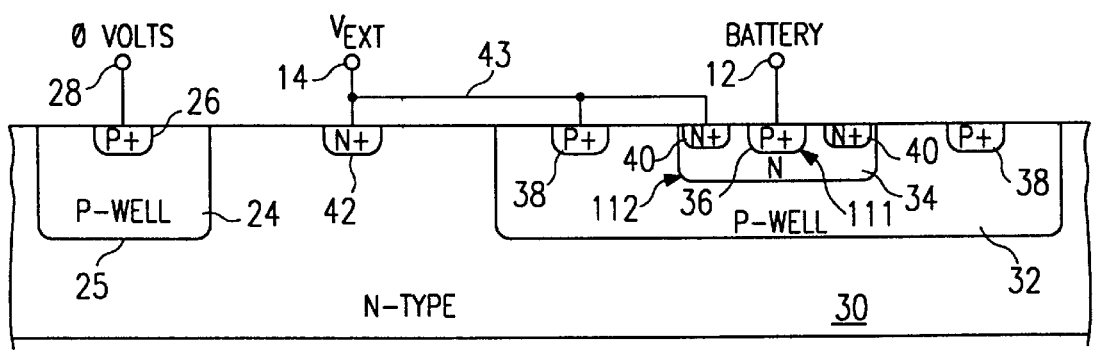
FIG. 16D illustrates a cross-sectional diagram of a first sample embodiment of the disclosed battery protection circuit.

The parasitic transistors formed in the structure of FIG. 16D are illustrated in FIG. 16E. A first PNP transistor 44 is formed having the emitter thereof connected to the battery terminal 12, the base thereof connected to the collector thereof and the collector thereof connected to the emitter of a second PNP transistor 46. The second PNP transistor 46 has the base thereof connected to the external supply terminal 14 and also connected to the emitter thereof. The collector of the second PNP transistor 46 is connected to the external circuit terminal 28. The transistor 44 has the emitter thereof formed by the junction between the p+ region 36 and the N-type region 34, the base thereof formed by the N-type region 34 and the collector thereof formed by the junction between the N-type region 34 and the P-well 32. The transistor 46 has the emitter thereof formed by the junction between the P-well 32 and the N-type region 30, the base thereof formed by the N-type region 30 and the collector thereof formed by the junction between the N-type region 30 and the P-well 24.

In operation, the P-type transistor 44 has the base thereof connected to the collector, and thus, it is configured as a diode. This allows current to flow through the collector of transistor 44 when the battery terminal 12 is at a higher voltage than the N-type substrate 30. However, the emitter-to-base junction of transistor 46 is shorted, thereby inhibiting operation of the transistor 46. Therefore, when the external voltage terminal 14 is at a lower voltage than the battery terminal 12, there is no parasitic transistor operation that results in leakage from the battery terminal 12 to the P-well 24.

Referring further to FIGS. 2 and 3, conduction in the parasitic transistor of the prior art normally occurs as a result of minority carriers being injected into the N-type substrate 30 and being collected in the P-well 24. This collection is a result of the reverse biased PN junction 25. In order to prevent conduction in the parasitic transistor, it is necessary to prevent either injection of the minority carriers into the N-type substrate 30, or prevent subsequent collection thereof by the P-well 24. This, in effect, kills the gain of the parasitic transistor.

In the disclosed battery protection circuit, the minority carriers exist in the N-type region 34 as holes. The P-well 32 is biased at the same potential as the N-region 34 and therefore acts as a collector for the minority carriers or holes. However, it should be understood that any barrier which prevents migration of minority carriers over to the PN junction 25 to allow collection there by the P-well 32 will produce the same result. For example, an insulating layer could be utilized that totally encloses the N-type region 34, which insulator would adequately prevent minority carrier injection. Further, the holes, which are collected in the P-well 32, could be recombined in a very heavily doped N-type region that was disposed around the N-region 34 in place of the P-well 32. This would effectively perform a recombination of the holes therein to prevent the holes from migrating into the N-type substrate 30. This heavily doped N-type region could also be disposed around the P-well 24.

With further reference to FIG. 16D, the P-well 32 is provided as a collector of minority carriers. The purpose of the electrical connection 43 is to provide a path for free electrons or majority carriers. The holes generated in the N-type region 34 as a result of the forward biased PN junction between p+ region 36 and N-type region 34 are recombined at the junction between the electrical connection 43 and the n+ region 40, thus preventing the minority carriers from flowing through electrical connection 43 to the N-type substrate 30. It is possible that this electrical connection 43 could be replaced by a conductive n++ plug that is disposed through the P-well 32 to the N-type substrate 30 to connect the N-region 34 and the N-type substrate 30. However, an electrical connection would still be required between the P-well 32 and the N-type region 34 to provide the correct bias therefore.

Although the just-described embodiments of the disclosed battery protection circuit were described with respect to an N-type substrate and parasitic PNP transistors, it should be understood that the dual of this structure could provide the same result wherein the battery voltage were a negative voltage and the overall system operated on a negative voltage. For example, the battery diode protection circuit would now have an n+ region connected to the battery and a P-type region providing the other side of the diode. An N-well would be disposed therearound isolating the diode from a P-type substrate. The N-well would provide the minority carrier isolation and act as a collector therefore, the minority carriers being electrons in this case. This would prevent minority carriers from being collected in an adjacent N-well to form a leaky NPN transistor.

Figure 16G:
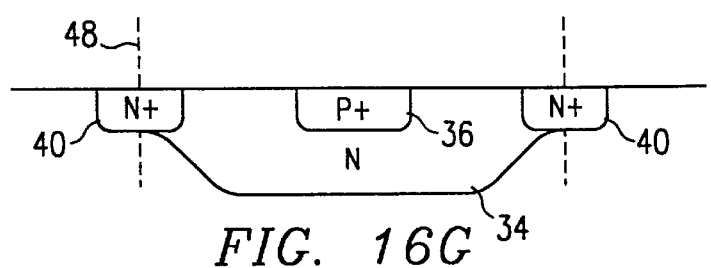
FIG. 16G illustrates a cross-section of a portion of the structure shown in FIG. 16D.
Figure 16F:
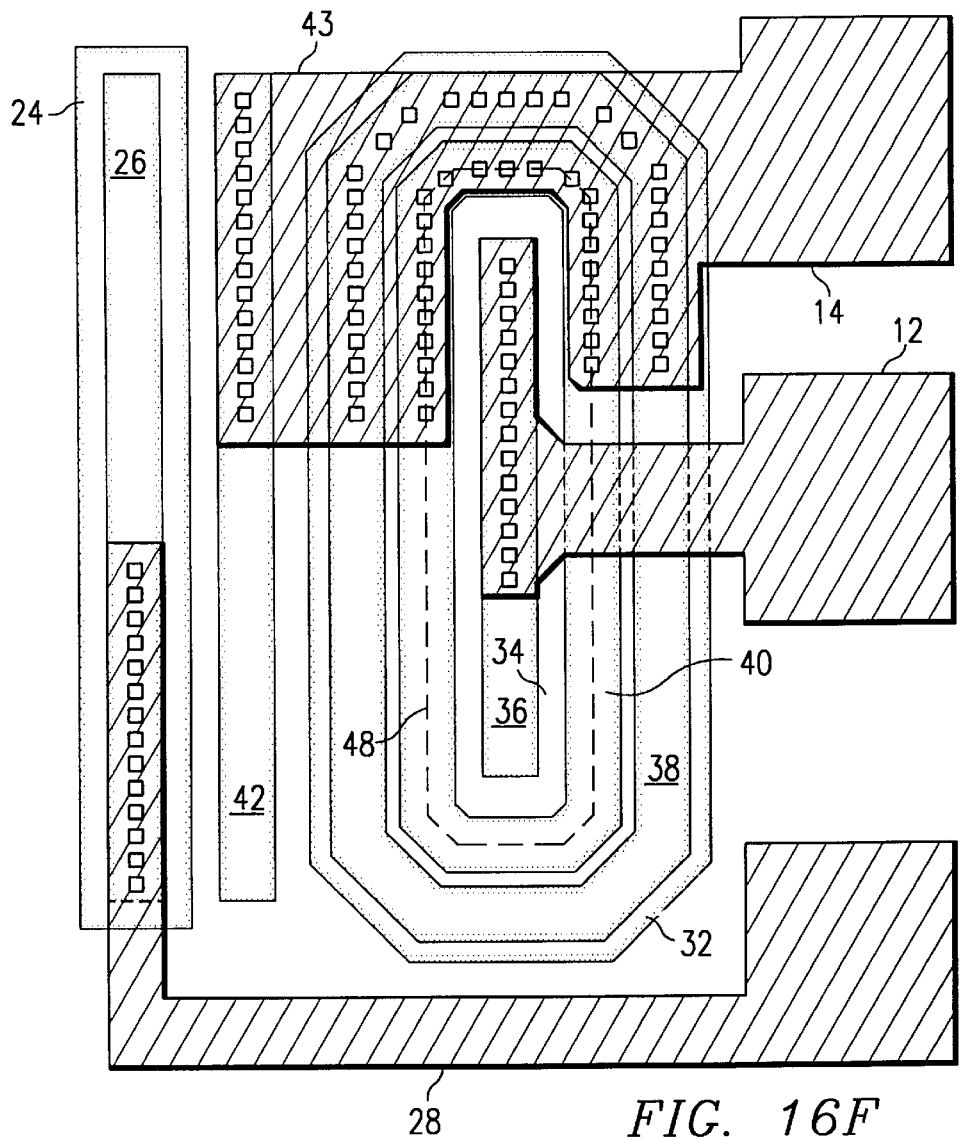
FIG. 16F illustrates a top view of the battery protection circuit of FIG. 16D.

Referring now to FIG. 16F, there is illustrated a top-level diagram of the structure of FIG. 16D. The p+ region 36 is formed as an elongated implant that is surrounded by the n+ region 40. The n+ region 40 is in turn surrounded by the p+ region 38. The N-type region 34 to which the n+ region 40 is connected, does not extend entirely under the n+ region 40 to the exterior boundary thereof. Rather, the external boundary of the N-type region 34 is defined by a border 48. A detail of the N-type region 34 is illustrated in FIG. 16G. The P-well 32 is illustrated as surrounding the p+ region 38. The n+ region 42 is formed from an elongated implanted region that is disposed adjacent to the P-well 32. In a similar manner, the P-well 24 is also elongated and disposed adjacent the n+ region 42 with the p+ region 26 disposed within the P-well 24 and also having an elongated configuration.

In this embodiment, the disclosed battery protection circuit is interleaved with a standard twin tub CMOS process flow. In the standard process, N- and P-channel device regions are defined and then a P-well formed by implanting boron into the N-channel device region and an N-well formed by implanting phosphorous into the P-channel device region. These implants are then driven down into the substrate and then active regions defined therein and separated by a layer of field oxide. Typically, a layer of nitride is disposed over a thin oxide layer to define the active regions and then a field oxide grown on the portions of the substrate not having nitride formed thereover.

After formation of the field oxide isolation regions, the residual nitride layers are removed. There is still a layer of gate oxide over the active region remaining on the surface thereof. The surface is then masked for the implanting of the N-type region 34. This implant is achieved with phosphorous at an energy level of 180 KeV at a dosage of $5\times10^{13}$ $cm^{-2}$. After implanting of the N-type region 34, the residual oxide on the surface of the active region is removed and then a strip gate oxide is formed over the substrate. The active regions are then implanted to adjust the transistor threshold voltages.

After threshold voltages are adjusted, the strip gate oxide is removed and the final gate oxidation is performed, followed by polysilicon deposition and subsequent doping thereof. The poly is then patterned and etched to define the various gates and interconnects at a first level of poly. The N-channel source and drain areas are then defined to form the source/drain implants. This is an n+ implant utilizing arsenic, which implant is also utilized to form the n+ regions 40 and 42. The substrate is then masked to form the p+ source/drain implants, at which time the p+ regions 36, 38 and 26 are formed. Thereafter, the interlevel oxide is formed by depositing oxide thereover and this oxide is subjected to a thermal cycle to reflow the oxide and to provide the source/drain activation and drive steps. The subsequent contacts are then defined and etched and then a layer of metal deposited thereover. The metal layer is then patterned and etched to define the various metal interconnects.

Figure 16H:
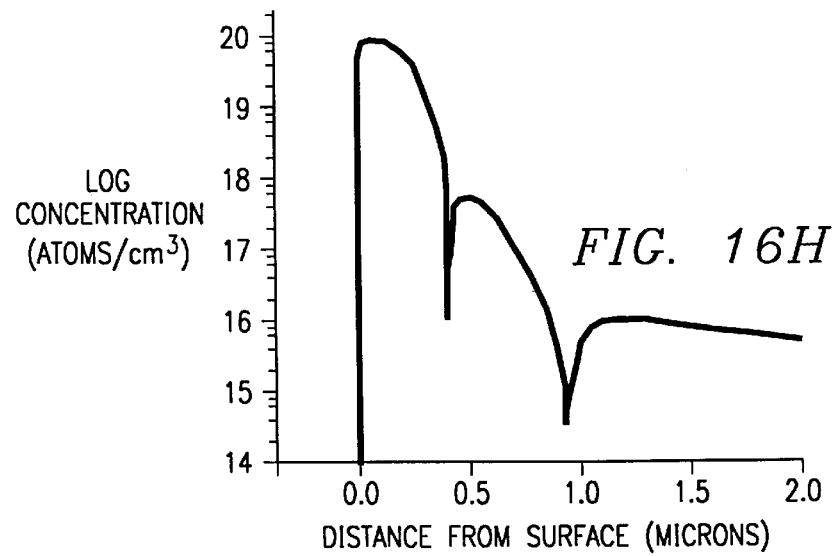
FIG. 16H illustrates a dopant profile of a sample embodiment of the battery protection circuit of FIG. 16D.

Referring now to FIG. 16H, there is illustrated a vertical dopant profile through regions 36, 34, and 32 of FIG. 16D. The dopant profile illustrates that the p+ region 36 has a surface concentration of approximately $1\times10^{20}$ $cm^{-3}$ and a thickness of approximately 0.35 microns. The N-type region 34 has a thickness of approximately 0.4 microns with a peak concentration of approximately $4 \times 10^{17}$ cm$^{-3}$. The concentration level of the P-well 32 is approximately $1 \times 10^{16}$ cm$^{-3}$. Therefore, the PNP transistor 44 formed by the p+ region 36, the N-type region 34 and the P-well region 32 has a base width of approximately 0.4 microns.

Figure 16I:
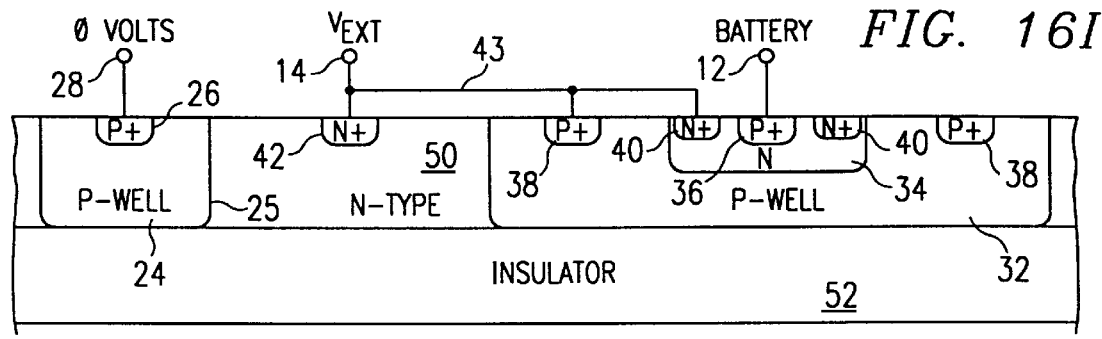
FIG. 16I illustrates a cross-sectional view of an alternate embodiment of the disclosed battery protection circuit utilizing a Silicon-On-Insulator construction.
Figure 16J:
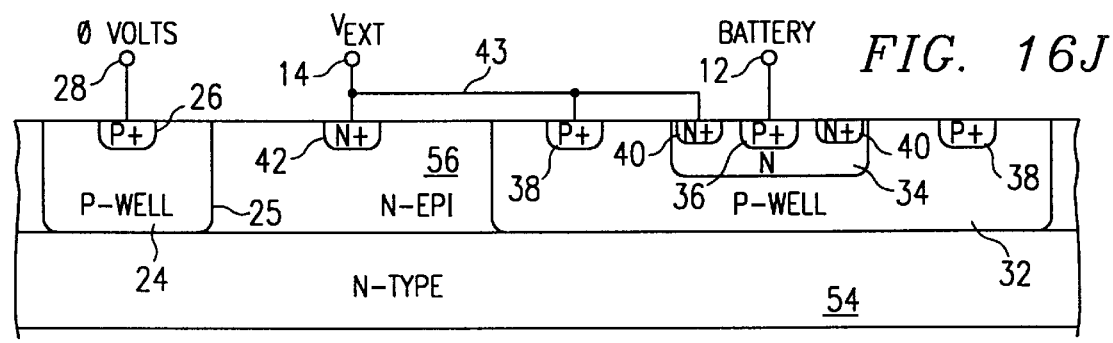
FIG. 16J illustrates a cross-sectional diagram of yet another embodiment of the disclosed battery protection circuit, wherein the structure is fabricated in an epitaxial layer disposed on top of semiconductor material.
Figure 16K:
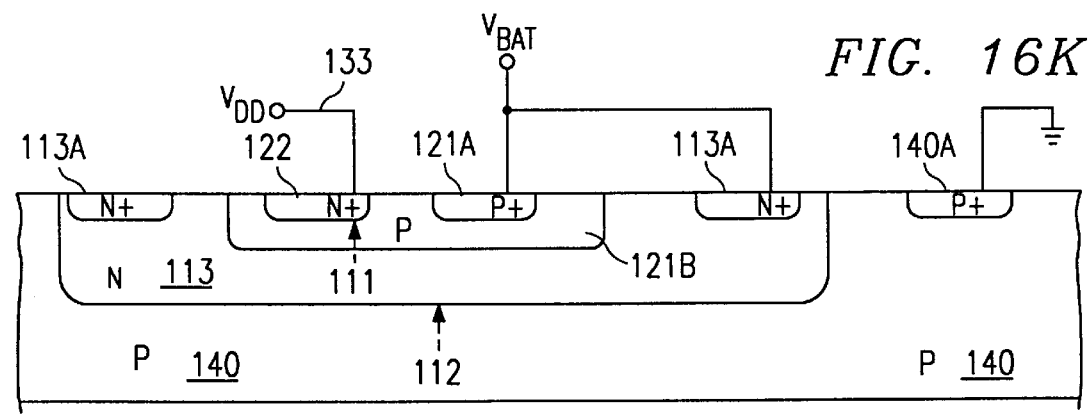
FIG. 16K shows an example of a battery protection circuit in a CMOS integrated circuit with a P-type substrate.

Referring now to FIG. 16I, there is illustrated an alternate embodiment of the disclosed battery protection circuit. In this alternate embodiment, the diode structure of the present invention is formed in an N-type substrate 50, which N-type substrate 50 is disposed over a layer of insulating material 52. This is normally referred to as Silicon-On-Insulator (SOI) technology. In this type of technology, an N-type substrate is first formed and then a layer of insulating material formed on the lower surface thereof. The N-type substrate 50 is typically dimensioned to equal the thickness of the P-well 32 and the P-well 24 such that no N-type material is disposed therebelow. In this manner, isolation between laterally disposed devices is increased.

There are numerous techniques for fabricating integrated circuits utilizing SOI technology. Some of these techniques require formation of the active device on the surface of an N-type substrate followed by deposition of a thick layer of oxide and polysilicon thereover. The substrate is then held from the upper side and the lower surface thereof etched down a predetermined distance. Typically, some type of heavily doped buried layer is implanted into the substrate to form an etch stop layer. The insulator is then formed on the remaining surface of the substrate under the active devices, the thick layer of polysilicon and oxide removed and the final patterning performed on the upper surface of the substrate. However, this is only one technique and numerous other techniques are available for realizing SOI technology.

Referring now to FIG. 16I, there is illustrated yet another embodiment of the disclosed battery protection circuit. An N-type substrate 54 is provided upon which a layer of epitaxially grown N-type semiconductor material 56 is grown. The P-well 24 and the P-well 32 are then formed therein with the N-type epitaxial layer 56 having a thickness approximately equal to that of the P-wells 24 and 32. The N-type substrate 54 has a higher doping level than the epitaxial layer 56, resulting in the parasitic transistors being confined primarily to the epitaxial layer 56. The epitaxial layer 56 is formed utilizing conventional processes well-known in the art.

In summary, there has been provided a battery protection device that reduces leakage due to the existence of a parasitic PNP transistor between the battery terminal and an adjacent P-well. The battery protection device includes a diode that is enclosed by a layer of P-type material. The layer of P-type material is operable to collect minority carriers to prevent collection thereof by an adjacent P-well with a reverse biased PN junction.

FIG. 16K shows another embodiment of the disclosed battery protection circuit, which has been found to be advantageous for use with P-type substrates. This is the embodiment which is preferably used, with the layout shown in FIG. 16A, in the integrated circuit layout of FIG. 6. Specifics for this embodiment will be described in the context of a 1.2 micron CMOS process, but of course the process can readily be scaled or modified, as will be apparent to skilled CMOS designers and process engineers.

The substrate 140, in this embodiment, is P-type silicon, doped to a bulk resistivity in the neighborhood of 30–40 ohm-cm. The substrate is shown ohmically connected to ground through a shallow P+ diffusion 140A, but in addition to (or instead of) this contact, a backside contact may also be used for connection to ground.

An N-well 113 has essentially the same doping profile as the N-wells which are used to build PMOS active devices, and is formed in the same series of implantation and drive steps. In this sample embodiment, the N-well is about 4 microns deep, and has a vertically graded dopant concentration in the neighborhood of $2-3 \times 10^{16}$ cm$^{-3}$. A shallow N+ diffusion 113A is formed inside this region, by using the same implant as is used to form the N+ source/drain regions in the active device regions. This shallow N+ diffusion will normally be quite heavily doped, but the depth and concentration of this region are not particularly critical for purposes of the structure of FIG. 16K. Typically the concentration might be in the range of $1 \times 10^{19}$ cm$^{-3}$ to $3E^{20}$ cm$^{-3}$, with an effective depth in the neighborhood of 0.3 microns. The shallow N+ diffusion 113A provides ohmic contact to wiring 131, which is electrically connected to the battery voltage $V_{BAT}$.

An intermediate-depth P-type region 121 is formed inside the N-well 113. In the presently preferred embodiment, this is formed by implanting boron at an areal dose in the approximate range of $6 \times 10^{13}$ cm$^{-2}$ to $1 \times 10^{14}$ cm$^{-2}$ at an energy of about 30 keV, but of course other doses or energies can be substituted.

A shallow N+ diffusion 122 is formed inside the region 121, by using the same implant as is used to form the N+ source/drain regions in the active device regions. This shallow N+ diffusion will normally be quite heavily doped, but the depth and concentration of this region are not particularly critical for purposes of the structure of FIG. 16K. Typically the concentration might be in the range of $1 \times 10^{19}$ cm$^{-3}$ to $3 \times 10^{20}$ cm$^{-3}$, with an effective depth in the neighborhood of 0.3 microns. The N+ diffusion 122 makes ohmic contact to wiring 133, which is routed to provide the $V_{DD}$ on-chip supply voltage for the active circuits on the chip.

A shallow P+ diffusion 121A is also formed inside the region 121B, by using the same implant as is used to form the P+ source/drain regions in the active device regions. This shallow P+ diffusion will normally be quite heavily doped, but the depth and concentration of this region are not particularly critical for purposes of the structure of FIG. 16K. Typically the concentration might be in the range of $1 \times 10^{19}$ cm$^{-3}$ to $3 \times 10^{20}$ cm$^{-3}$, with an effective depth in the neighborhood of 0.3 microns. The shallow P+ diffusion 121A provides ohmic contact to wiring 131, which is electrically connected to the battery voltage $V_{BAT}$.

Figure 16L:
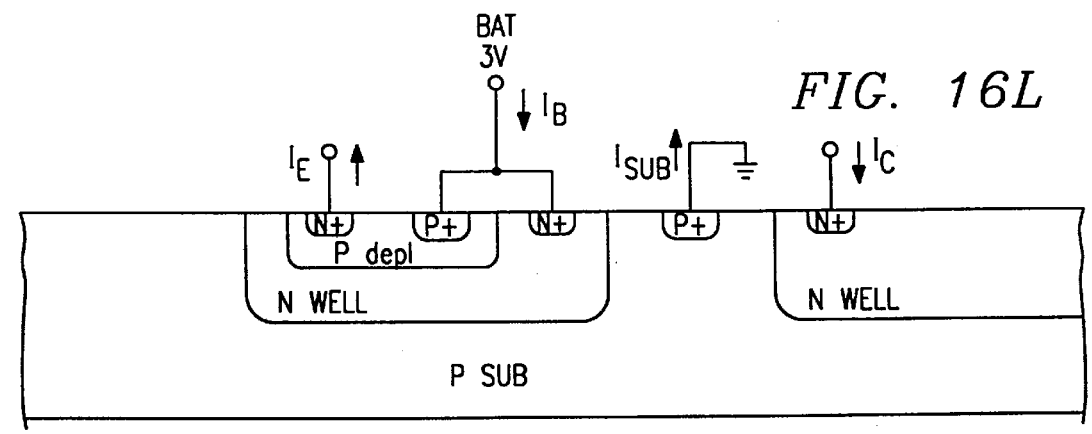
FIG. 16L shows a test structure which is similar to the device structure of FIG. 16K.
Figure 16M:
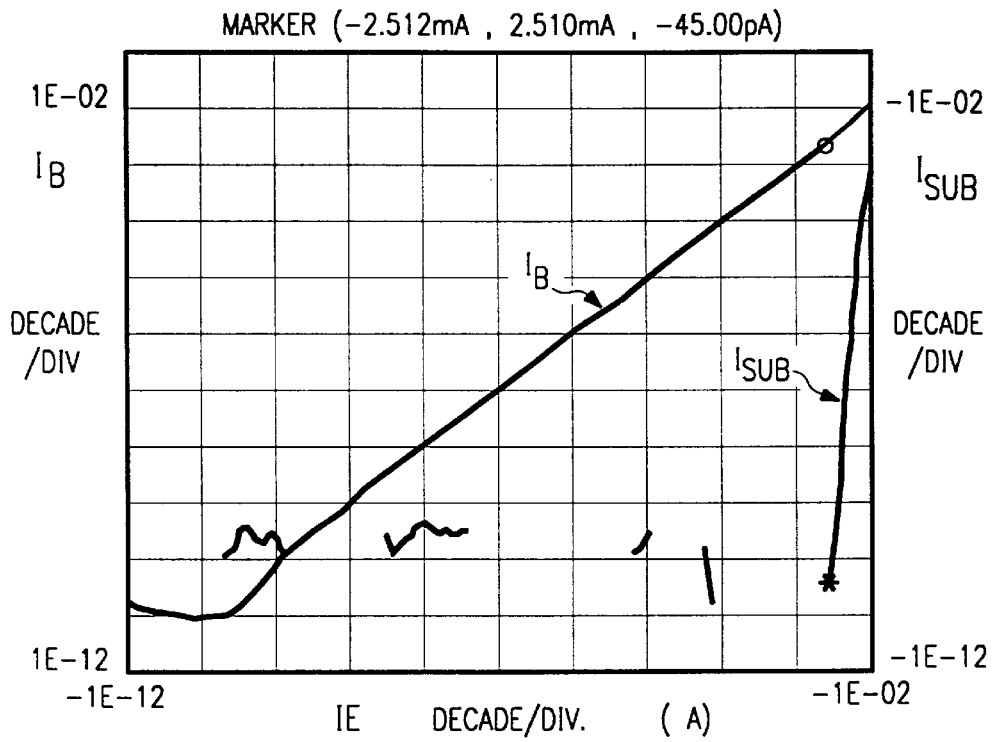
FIG. 16M shows test data for this structure.

FIG. 16L shows a test structure which is similar to the device structure of FIG. 16K, and FIG. 16M shows test data for this structure. In recording this data, collector terminal (marked $I_C$ in FIG. 16L) was connected to the emitter terminal (marked $I_E$). The battery was held at a constant voltage $V_{BAT}$=3 V. The battery current $I_B$ and substrate current $I_{SUB}$ were measured as a function of the emitter current $I_E$ drawn from the second region 122. Thus, two curves are shown in this log—log plot. Note that the substrate current $I_{SUB}$ remains down in the noise level until the emitter current $I_E$ becomes quite large. (This low value of the substrate current is highly advantageous.) At the point circled on the $I_B$ curve, $I_E$=−2.512 mA, and $I_B$=2.510 mA. At the point marked with an asterisk on the $I_{SUB}$ curve, $I_E$=−2.512 mA, and $I_{SUB}$=−45 pA.

Figure 16P:
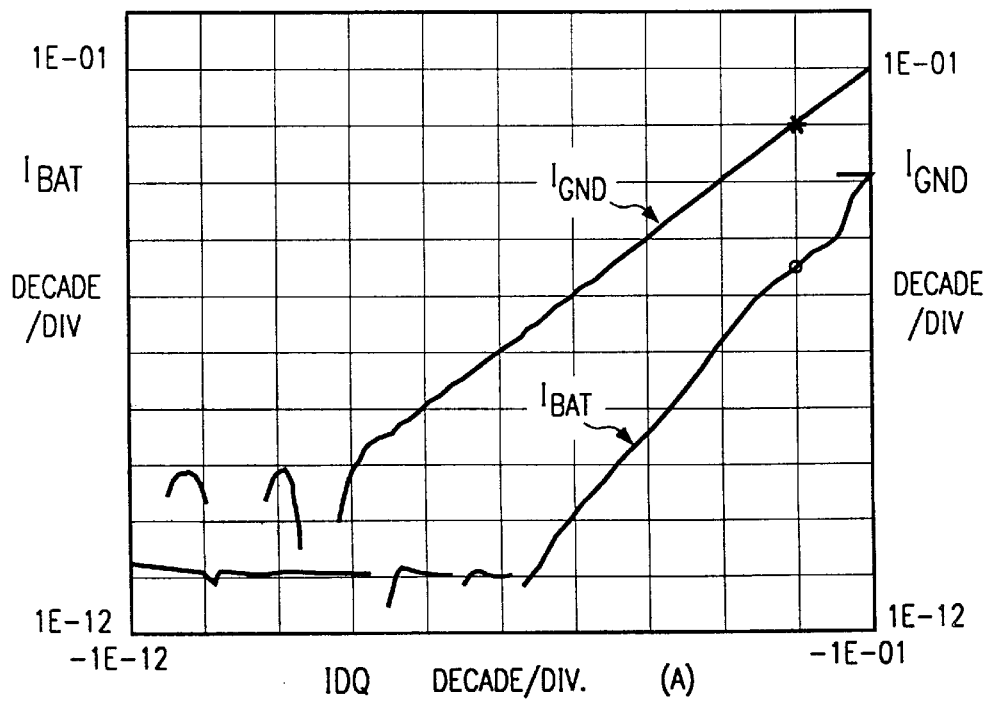
FIG. 16P shows test data for the device structure of FIG. 16N.
Figure 16N:
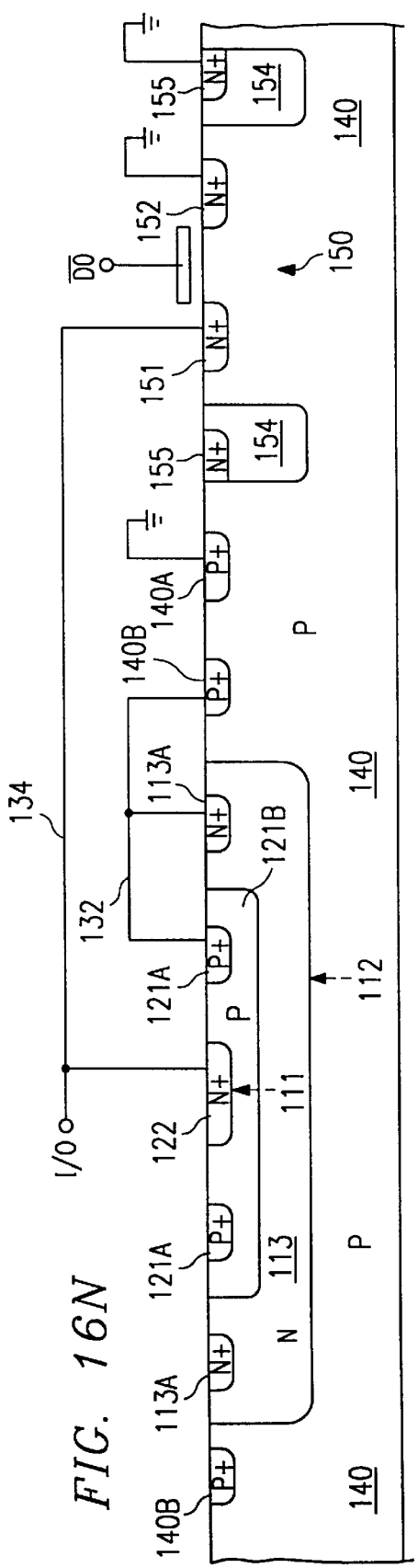

FIG. 16N shows a further alternative embodiment, wherein a diffusion structure is connected to provide ESD protection for an I/O connection of a battery-powered integrated circuit. Note that the region 122 is not connected to provide a $V_{DD}$ output, but instead is connected to an input/output line 134. (The I/O terminal can also optionally be connected to a transistor gate, for amplification of incoming data signals, but this is not necessary.) The I/O line 134 is also connected to be driven by an NMOS output driver 150. This transistor, as shown, includes a first source/drain diffusion 151, which is ohmically connected to the I/O line 134, a second source/drain diffusion 152, which is ohmically connected to ground, and a gate 153 which can be driven by a data-output signal DO-bar. (Of course, other device structures, such as additional ESD protection structures, can optionally be combined with the structure shown.)

The structure of FIG. 16N, in the preferred embodiment, uses several enclosure relationships in its geometry. The central diffusion 122 is shown small, for clarity, but may itself be large. The P+ diffusion 121A preferably runs all around the P-type intermediate diffusion 121. As presently contemplated, lateral dimensions for this example are as follows. (However, it must be understood that these dimensions are intended to be purely illustrative, and should not be strictly relied on. These dimensions are included merely to help show the inventors' present views as to the best mode of practicing this embodiment of the invention.) The N+ diffusion 122 is preferably separated from P+ diffusion 121A by a minimum spacing of at least 3 microns (in a 1.2 micron layout), and the ring diffusion 121A is preferably at least 5 microns wide. The N+ diffusion 113A preferably runs in a ring all around the edge of the well 113. The N+ diffusion 122 is preferably at least 5 microns wide, and is separated from the P+ diffusion 122 by at least 3 microns. The P+ diffusion 140B, in the substrate 140, preferably runs all the way around the outside of the N-well 113. The minimum spacing between P+ diffusion 140B and N+ diffusion 113A is preferably at least 3 microns, and P+ diffusion 140B is preferably at least 5 microns wide.

The output transistor 150 is preferably surrounded by a ring 154 of N-well, and this ring is tied to ground through a shallow N+ diffusion 155 at its surface.

The structure of FIG. 16N has the advantage that, when a negative transient appears on the I/O line 134 for any reason (such as electrical noise on a line, or electrostatic discharge), most of the current sourced to this negative transient will be taken from the junction 111, rather than from the output transistor. Thus, minority carrier diffusion to discharge the battery is minimized, and battery lifetime is not decreased by such transient events. This advantageously provides a system which is longer-lived and more reliable. However, when the I/O line 134 is in its normal range of positive voltages (e.g. during normal operation at TTL levels), the first junction in the diode structure will be reverse biased, and will not load the line 134.

FIG. 16P is a log—log plot of data for the device structure of FIG. 16N. A controlled current sink $I_{DQ}$, is applied to the I/O connection 134, and two current components are measured as a function of $I_{DQ}$: the current $I_{BAT}$ drawn from the supply voltage $V_{BAT}$, and the current component $I_{GND}$ drawn from the ground connection. At the point circled on the $I_{BAT}$ curve, $I_{DQ}=-10.00$ mA, and $I_{BAT}=18.15$ microA. At the point marked with an asterisk on the $I_{GND}$ curve, $I_{DQ}=-10.00$ mA, and $I_{GND}=9.982$ mA.

In the structure measured in FIG. 16P, the effective area of the first junction 111 (which is protected by the second junction 112) is approximately ten times that of the junction area in the output transistor 150 (which also can source current from ground). Thus, a current differential of about 10:1 might be expected, purely due to the geometrical ratios. However, higher ratios (almost 100:1) are actually achieved. Thus, FIG. 16P shows that the ratio of ground-sourced current to battery-sourced current is greater than 500:1 is achieved for a 10 mA load, and even higher ratios can be achieved at lower load currents.

ESD Protection Diode Layout

FIG. 16A shows the layout of the ESD protection diode, in the presently preferred embodiment. This diode has doping profiles as just described with reference to FIG. 16N. Note that the structure shown actually includes two diodes in series: diode 618 provides the primary protection. Diode 619 is interposed between diode 618 and the substrate, to provide some additional protection. Note that the n+ pattern of diode 619 is slightly different, to impose a longer current path. This provides a slight series resistance between the power output and the active circuits, which helps to isolate the active circuits from the ESD discharges.

Note that the pattern shown includes rounded corners on the metal, n-well, and n+ patterns. These rounded corners help to reduce the geometry-dependent electric field enhancement which would otherwise occur at corners.

It is contemplated that, for even greater ESD protection, it may be preferable to narrow the width of the n+ diffusions in the diode layout. This would further reduce series resistance in the path of electrostatic discharges.

The module of the presently preferred embodiment has been tested, and found to withstand a 7000 V positive discharge, and to be capable of withstanding negative discharges greater than 10,000 V. (Under positive discharges, data loss does not occur until 7000 V, and device damage does not begin to occur until 10000 V (one microAmp of leakage). Negative discharges cannot cause data loss or device damage until voltages greater than 10000 Volts (how much greater is not known.)

Operation

The implementation of data transfer operations, in the presently preferred embodiment, will now be described.

All communications to and from the token are accomplished via two physical connections, the "Data" line, and the ground return line. The reading and writing of token data is accomplished through the use of time slots and a command word protocol.

Electrical I/O Relationships

The bus protocol is also designed to minimize the charge transfer out of the battery in the module. This is done by using an "open-collector" type architecture. The protocol has been specified so that the module never sources current to the data line, but only sinks current.

When a data module is in contact with a host system, the host system initially pulls up the data line. (The module also preferably contains a very high-impedance pull-down resistor at this node, but this is done, in the preferred embodiment, merely to avoid the risk of floating nodes.) The host system initiates each stage of a data transfer operation by driving the data line low. The module detects this falling edge, and one of several further events can then occur.

If the module is being read (as previously determined by overhead bits), the module, after seeing the falling edge which starts the cycle, either will or will not turn on its NMOS pull-down transistor, depending on the value of the data bit being read at that cycle. When the NMOS pull-down is turned on, the module lets its preset timing period elapse, and then turns off the NMOS pull-down. Thus, when the system wants to read from the module, it applies a falling edge, waits a short time to be sure that the module has received the falling edge, and then attempts to pull up the data line, using a pull-up resistor which cannot overpower the NMOS pull-down transistor in the module. After waiting a sufficient time for the pull-up resistor to have raised the line to a high level (if the NMOS pull-down is off), the system tests the data voltage to ascertain the data bit. The system then waits for the maximum time period of the module delay to elapse, plus enough time for the data line to stabilize at a high level, and then sends another falling edge to read the next bit.

If the module is being written to (as previously determined by the overhead bits), the module, after seeing the falling edge which starts the cycle, waits for its preset timing period to elapse, and then stores the logic value of the data line. Thus, when the system wants to write to the module, it applies a falling edge, waits a short time to be sure that the module has received the falling edge, and then drives the data line either high or low, depending on the data bit. The system then waits for the maximum time period of the module delay to elapse, restores the data line to a high level, allows enough additional time for the data line to stabilize at a high level (and for the edge detector in the module to reset itself), and then sends another falling edge to write the next bit.

All Data Transfer operations are performed by initially setting the token into a known state, issuing a Command Word, and then performing the selected operation, either reading the contents of the token or writing new data into the token. Each Data Transfer operation consists of 264 Data Time Slots: 8 are for the Command Word and 256 are for the data bits.

To initially set the token into a known state, when a new token is first inserted into a host system, either 264 or 1032 Write Zero Time Slots are issued (depending on the memory density). These Write Zero Time Slots will not corrupt the data held within the token since a Command Word has not been written. This operation will increment the address pointer internal to the token to its maximum count value. Upon reaching this maximum value, the token will ignore all additional Write Zero Time Slots issued to it and the internal address pointer will remain locked at the top count value. (This backed condition is removed by the issuing of a Write One Time Slot.)

Once the token has been set into a known state, a Command Word is transmitted to the token, using 8 Write Data Time Slots. This resets the address pointer internal to the token and prepares it for the appropriate operation, either a read or a write.

After the Command Word has been transmitted to the token, the appropriate number of Data Time Slots will be issued to the token by the host. In the case of a read operation, these will be Read Data Time Slots. In the case of a write operation, these will be Write Data Time Slots. The exact number of Data Time Slots generated by the host is dependent upon the memory density of the part being used (256 or 1024).

Block Transfer

All data transfers are preferably done by reading or writing the entire contents of memory as a single serial stream.

Overhead Bits

A command word, which is a short block of overhead bits, is sent from the host system to the portable module at the start of each transfer, to define the transfer type. FIG. 4 shows the organization of the overhead bits which are used in each block transfer.

The Command Word consists of 8 bits which are transmitted from the host to the token with write data time slots (FIG. 4). The first bit of the Command Word must be set to a logic 1 level. The next two bits are the Select Bits which relate to the part dash number. The remaining five bits determine whether a read or a write operation is to follow. If a write operation is to be performed, all five bits are set to a logic 1 level. If a read operation is to be performed, any or all of these bits are reset to a logic 0 level. Each of these bits is transmitted to the token with a separate write data time slot.

Address-Pointer Reset

When a host system first makes contact with a module, the host system sends a long string of write-zero commands, followed by a write-one command, to the module. The module contains a counter, which monitors the incoming bit stream for nonstop sequences of write-zero commands. If the module receives a nonstop sequence containing as many write-zero commands as the total length of the memory, the counter will freeze until the chip is reset. The chip will be reset if and only if an incoming "1" bit is seen while the counter is frozen.

That is, in the presently preferred embodiment (256 bits of memory), the data output of the last counter stage (indicating that the counter has rolled over from 255 to 256) triggers a flip-flop whose output is connected, through a NOR gate, to cut off the counter's clock input.

This provides a reset capability, whereby the system can ensure that the starting address of the module is accurately known. Thus, on every insertion of a new module, the system can send such a reset sequence to initialize the address pointer in the module. Note that this address-pointer-reset is only necessary once per insertion. The sequence of write-zero commands will not normally destroy data, because the module never receives the overhead bit sequence which would tell it to enter write mode. (The only conditions under which data could be destroyed by these commands is when the module has been interrupted in the middle of a previous write sequence, and in this case the data may be presumed corrupt anyway.)

Read/Write Timing

There are two types of write data time slots, Write One Time Slots and Write Zero Time Slots. A write data time slot is initiated when the host pulls the Data line from a high logic level to a low logic level. All write data time slots must be a minimum of 60 microseconds in duration with a minimum of 1 micro-second recovery time between write cycles. In this example, the crude time base in the module provides a 4:1 range in the possible time durations: timing relations are defined with respect to a one-shot in the module which will provide a pulse width of at least 15 microseconds (but not more than 60 microseconds).

This one-shot is preferably trimmable, to a wide variety of speed ranges. Moreover, other circuit arrangements could be used instead, to generate a timing base. Thus, in the following example, the timing window of 15–60 microseconds does not delimit the claimed inventions, but merely serves to illustrate how the one-wire bus protocol can cope with timing uncertainty. The same principles of operation could be used if the modules were trimmed to have varying time delays within the range of (for example) 1–4 microseconds.

Figure 2A:
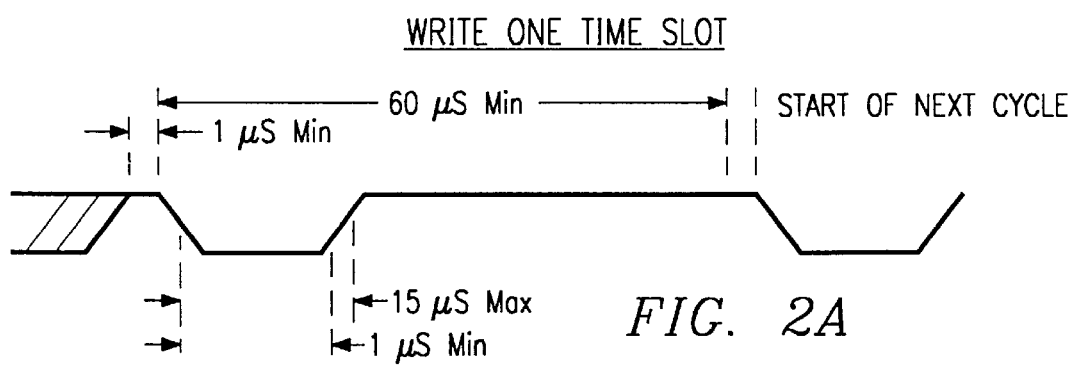
FIG. 2A is a timing diagram of a write-1 operation.

FIG. 2A is a timing diagram of a write-1 operation, in the module of the presently preferred embodiment. For the host to perform a Write-1 operation, the following steps occur:

1. The Data line is held at a high level for at least one microsecond. This ensures that the edge detector in the module will have sufficient set-up time.
2. The Data line is pulled to a logic low level. This provides the falling edge which the module uses to time its operations from.
3. The Data line is then held low for at least one microsecond, to ensure that the falling edge is detected by the module.

4. After the falling edge, the Data line must be driven high within 15 microseconds, and held high for at least 60 microseconds (from the time of the falling edge in Step 2). This ensures that the Data line will be high when the pulse generated by the one-shot in the module ends. When the pulse ends (producing a falling edge), the module will sample the logic level of the data line, to determine whether a 0 or a 1 is the data value.

Steps 1–4 can then be repeated, to write the next bit.

Figure 2B:
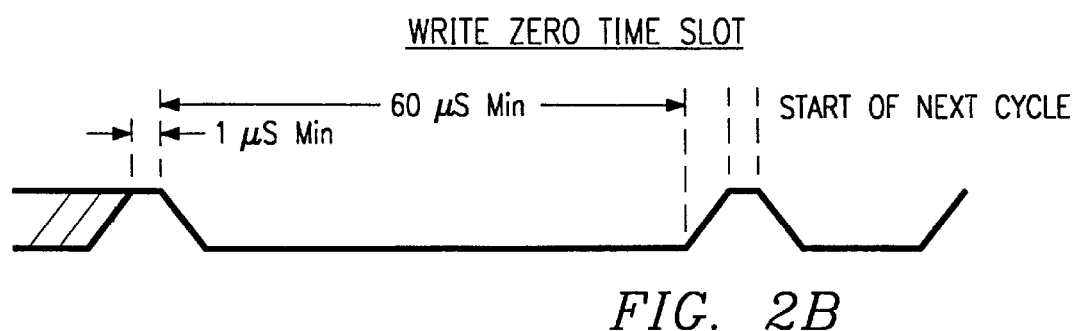
FIG. 2B is a timing diagram of a write-0 operation.

FIG. 2B is a timing diagram of a write-0 operation, in the module of the presently preferred embodiment. The steps in this operation are the same as the steps in a Write-1 operation, except that, in step 4, the Data line is held low during the window of 15–60 microseconds after the falling edge. This ensures that the Data line will be low at the end of the pulse generated by the one-shot in the module.

FIG. 3 is a timing diagram of a read operation, in the module of the presently preferred embodiment. When data is to be read from the token by the host, the host will generate the read data time slots. A read data time slot is initiated (as in steps 1–3 of the write-1 operation) when the host pulls the Data line from a logic high level to a logic low level. As soon as the module sees this falling edge, it will conditionally turn on its pull-down transistor (depending on the value of the data bit being read), and will leave the pull-down transistor turned on (conditionally) until the end of the pulse generated by the one-shot. Thus, during a read operation, after the falling edge (and the following guard time), the host waits for enough time for the data line to have been pulled up to a high level (if the module is not holding it down), and then samples the data line. In the presently preferred embodiment, where the host port has a 5 Kilohm pull-up resistor, the host preferably tests the data line 10 microseconds after the falling edge. From 15 to 60 microseconds after the falling edge, the state of the data line is uncertain, since it is not known whether the module has yet timed out and released the data line. All read data time slots must be a minimum of 60 microseconds in duration, with a minimum of 1 micro-second recovery time between read cycles.

The module's time base varies widely between parts, and may also be quite dependent on temperature (which will typically vary the battery voltage). However, the module's time base will not vary as widely from moment to moment. Thus, in a less-preferred alternative embodiment, the host can measure the time base of the module (by performing more frequent samplings during a read operation), and maximize the data rate for the particular module being read. However, this is not preferred, since the most preferred system embodiment will typically have only brief exchanges (one read, or one read plus one write) in each contact of a host with a particular module.

System Using Electronic Tokens

These ideas are used as parts of a very system architecture. The electronic module enabled by the teachings herein is extremely compact and extremely cheap. From a systems point of view, this module is in some ways more analogous to a read/write bar code than to a conventional electronic memory system.

Thus, this module can be used for price tags, for inventory tags, for work-in-process monitoring, for retail sales (to permit customers to select merchandise (e.g. by taking one module or a handful of modules to a cashier or to an automated check-out machine), without exposing the actual inventory to pilferage), and for a wide variety of other such compact data-transfer applications. Thus, the module described can be regarded as an electronic token, which is as portable and rugged as a metal token, but which is far more versatile.

Host System

An electronic token can be interfaced to by an open-collector pin in a very wide variety of microprocessors. Moreover, some port pins on some microprocessors have very weak pull-ups, so that these port pins could also be used. Alternatively, a microprocessor which did not have any such pins available could buffer its port through a standard TTL open-collector buffer.

It is particularly advantageous to interface a token receiver to a standard microcomputer system, such as an 80286- or 80386-based PC clone.

Figure 12:
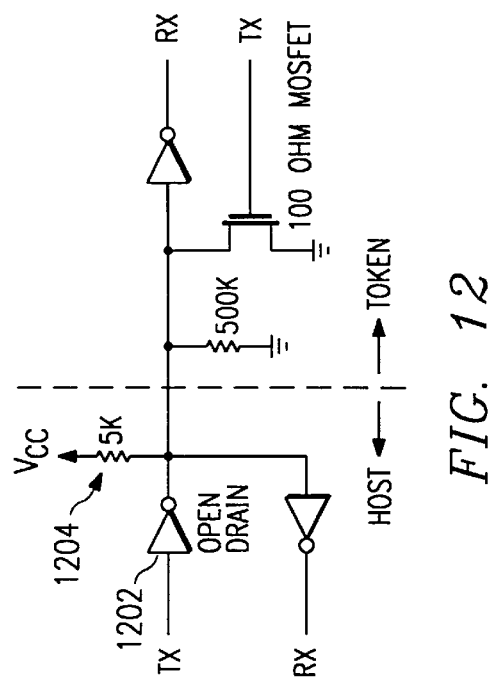
FIG. 12 shows a sample host system, which can interface to electronic token modules like the module of FIG. 1.

FIG. 12 shows a simple example of a host system, which can interface to electronic token modules like the module of FIG. 1. In this example, the token data line is taken from an open-collector pin of a microprocessor (such as a Motorola 68000). A 5 kilohm resistor 1204 provides a pull-up to $V_{CC}$, and an open-drain driver 1202 amplifies transmitted signals.

Other sample embodiments of the host system will be discussed below, with reference to FIGS. 19 and 20.

Physical Interface for Receiving Electronic Tokens

Preferably each host system uses a physical configuration of electrical contacts which provides rapid contact for electronic data modules (tokens). A slot, dimensioned to receive electronic tokens, includes a grounded contact positioned to make contact to the edge of a token which may be inserted, and two data contacts which are positioned to make contact to the opposite faces of the token. Each of the data contacts is connected to an open-collector driver circuit, including a pull-up resistor which will bring the potential of the contact high when the slot is empty. The token is shaped so that its edge, and one of its faces, are connected to the token's ground line, and the other face is the token's data line. Thus, when a token is inserted (no matter which way the token is facing), one of the two data contacts will be immediately pulled to ground, by short-circuiting across the ground plane of the token. The system can thereby recognize that a token has been inserted, and that the other data contact (the one which was not shorted to ground) can communicate with this token's data line. Thus, even though the token itself is asymmetric, and even though the directional orientation of the token is not initially known to the system, no physical asymmetry needs to be introduced into the token or the slot to assure proper data interface.

Figure 17:
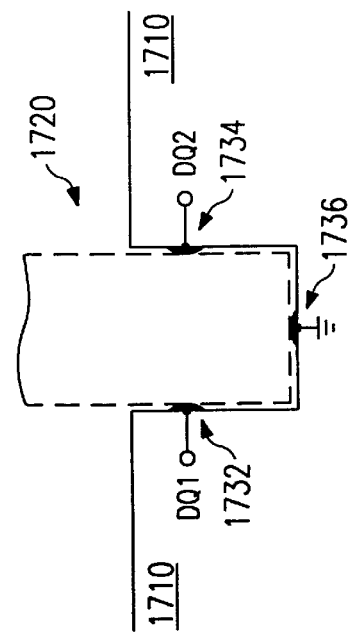
FIG. 17 shows the configuration of contacts used, in one embodiment, in a host system to contact electronic tokens.

FIG. 17 shows the configuration of contacts used, in one embodiment, in a host system to contact electronic tokens. A slot 1720 in a body 1710 is dimensioned to accept a token (e.g. like the tokens of FIGS. 1A or 1B). Contact 1736, in the bottom of the slot 1720, is positioned to contact the edge of an inserted token. Contacts 1734 and 1732, on opposite sides of the slot 1720, will contact the two opposite faces of the token.

Thus, when a token like that in FIG. 1 is inserted into a slot like that of FIG. 17, contact 1736 will always contact case portion 0100B. Case portion 0100B will also contact one of the other contacts 1732/1734, and pull it to ground. Thus, when a token is inserted, the host system will see one of the data lines DQ1/DQ2 pulled to ground. This tells the host that a token has been inserted, and it also tells the host which of the two data lines DQ1/DQ2 the token's data lead is connected to. (The token's data lead will be found connected to the data lead which was not pulled to ground.)

Alternative Physical Interface—Hand-Held Wand

In an alternative embodiment, a wand provides rapid contact to a two-terminal electronic token data module. The wand includes one contact which will make contact to the periphery of an electronic token which the wand is pressed against, and one contact which will make contact to the center of the token. Preferably the wand includes a base portion which is shaped to be worn on the second joint of a user's finger. This wand can be used for very rapid manual contacting of electronic tokens in various physical positions. This can be very advantageous in a variety of data collection/updating applications such as retail checkout, or tracking work-in-progress in a computer-assisted-manufacturing environment.

Figure 15A:
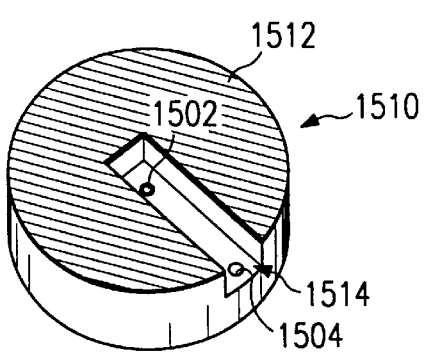
FIGS. 15A, 15B, and 15C show the finger-mounted wand used, in the presently preferred system embodiment, for manually contacting multiple electronic tokens successively.
Figure 15B:
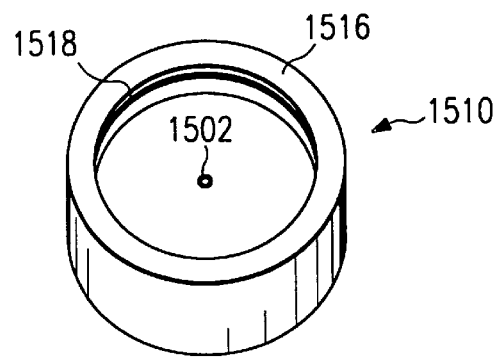
Figure 15C:
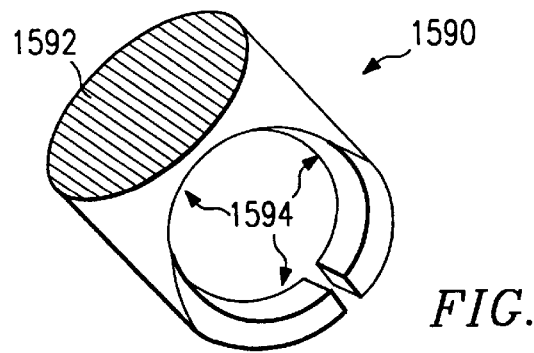

FIGS. 15A, 15B, and 15C show the finger-mounted wand used, in the presently preferred system embodiment, for manually contacting multiple electronic tokens successively. This wand is particularly suitable for contacting tokens which are firmly affixed to solid items, for applications such as workpiece identification in computer-integrated manufacturing, or inventory control, or equipment maintenance records.

FIGS. 15B and 15A shows the top portion 1510 of the wand of the presently preferred embodiment. The entire structure shown, except for conductive ring 1518, is preferably molded from a non-conductive polymer. A lip 1516 surrounds a recess which is dimensioned to mate with tokens of a known dimension. A thin ring of conductive polymer 1518 circles the inner edge of the lip 1516. This ring will make the actual electrical contact to the edge of a token. The ring 1518 provides sufficient elastic deformation to assure that secure contact is made. A through-hole 1502 in the center of the recess carries a wire (not shown, for clarity) which contacts the center of the token when contact is made. FIG. 15A shows the back side of the top portion 1510. Note that another through-hole 1504 permits a second wire (also not shown) to contact the backside of conductive ring 1518. A groove 1514 permits the two wires to be led out, for connection to a host computer system.

FIG. 15C shows the finger-mounted base portion 1590, which preferably is cemented (or otherwise attached) to a top portion 1510, like that shown in FIGS. 15A and 15B. The flat surface 1592 is attached to flat surface 1512 on the top portion 1510. Aperture 1594 is shaped to fit a user's finger. Preferably this is shaped to fit the second joint of the user's finger, unlike normal ring sizing, where the ring is placed on the first joint of the finger (nearest the palm).

Thus, the complete structure is compact, and can be easily worn on the user's finger without interfering with other activities. The lead wires can be connected to, for example, a belt-mounted small data-holding computer unit, or to a belt-mounted RF interface unit.

Electrical Interface from Host System

The host system must have an open drain driver with a pull-up resistor of approximately 5 Kilohms to $V_{CC}$ on the Data signal line. The token has internally an open drain driver with a 500 Kilohm pulldown resistor to ground (FIG. 6). The open drain driver allows the token to be powered by its small internal energy source and still have the ability to produce sufficiently large voltage swings at the outputs. The pulldown resistor holds the Data input pin at ground potential when the token is not connected to the host.

Figure 18:
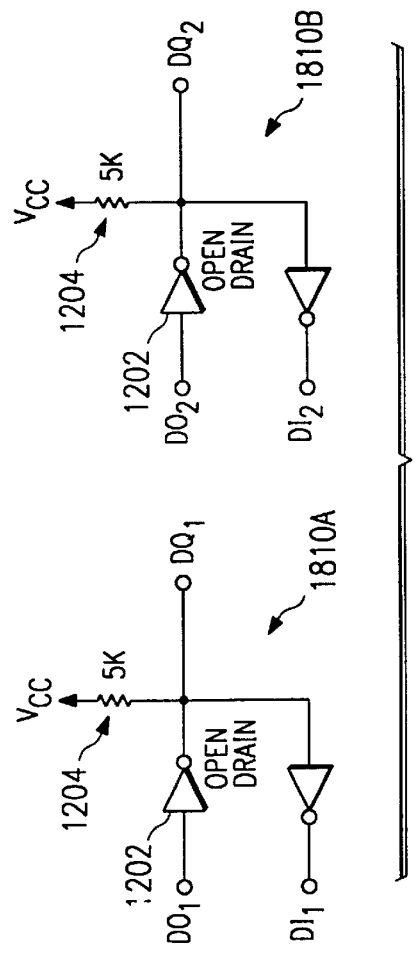
FIG. 18 shows the electrical driver configuration used on the host side, in one class of embodiments, to interface to electronic tokens.

FIG. 18 shows the electrical driver configuration used on the host side, in one class of embodiments, to interface to electronic tokens. Two open-collector interfaces are provided, 1810A and 1810B. The data line $DQ_1$, from a contacting fixture (e.g. like that shown in FIG. 17) is connected to one of the interface circuits 1810S, and the other data line $DQ_2$ is connected to the other interface circuit 1810B.

When the host system has not been communicating with a token, it can simply poll the XOR value the two data input lines $DI_1$ and $DI_2$ to test for the presence of a token. When a token has been inserted, the host can begin to drive the DQ line which was not pulled low by the insertion of the token. As discussed below, the host would normally issue a reset sequence, read the memory, and then (in some cases) write the memory.

Electrical Interface from Token to Standard RS232 Interface

The presently preferred embodiment also uses an electrical interface to the tokens, which permits interfacing to tokens with a wide variety of computers, including a tremendous variety of personal or other computers, as long as the computer includes an interface to RS232 (or some comparable standard). The token has a one-wire-bus interface, implemented in a battery-backed open-collector architecture, which provides a read/write interface. The communication protocol expected by the token has been specified so that the token never sources current to the data line, but only sinks current. The communication protocol also includes time-domain relations which are referenced to a very crude time base in the token, and the system must preserve timing relations which will be satisfied by tokens in which the time base takes on any of the wide range of foreseeable speeds. To interface to this protocol, the programmable capabilities of the standard UART chip in the computer's RS232 interface are exploited to provide adaptation to the time base requirements of the module. This is done by writing an entire byte of output from the UART, at a much higher baud rate than the module can be relied on to accept, to write a single bit of data into the module. The read-data line (RX) of the UART is tied back to the transmit-data line (TX) through a resistor, so that the UART will also always report a read of the same data byte being written, unless the token has turned on its pull-down transistor. An electrical network is used at the interface which (in effect) reverses the ground plane identification of the two leads, but which does provide the correct signal polarity to the token for signal discrimination in read mode.

Figure 19:
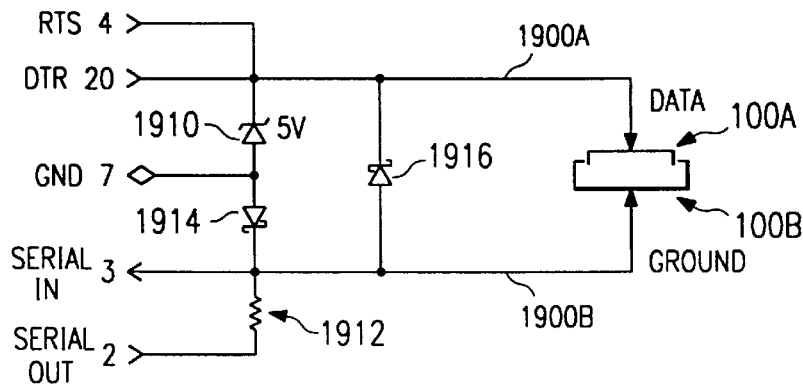
FIG. 19 shows a network used, in another embodiment, to interface from a serial port to an electronic token.

FIG. 19 shows a network used, in the preferred version of this embodiment, to interface from a serial port to an electronic token. Data line 1900A contacts the data terminal 0100A of a token, and ground line 1900B contacts the ground terminal 0100B of a token.

The example shown provides an interface to a standard PC's serial port. Lines RTS (pin 4) and DTR (pin 20) are used for a power supply in this embodiment, but either of these pins could optionally be used alone instead. When interfacing to a token, lines DTR and RTS are driven to a positive voltage level, Zener diode 1910 holds the data line 1900A to a constant potential at all times. In the presently preferred embodiment, Zener 1910 is a 5 V Zener.

The serial data out pin TX (pin 2) is used, with a series resistor 1912, to modulate the ground line 1900B which is connected to the ground contact 0100B of the token. The serial data in pin RX (pin 3) is used to receive data from the ground line 1900B. Thus, the token is in effect connected backwards.

Schottky diodes 1910 and 1914 clamp the excursion of the ground line 1900B. (These diodes can be implemented as a single 3-pin double-Schottky-diode package.)

The reversed connection of the token turns out to be surprisingly advantageous. All of the RS232 interface chips presently on the market provide a trip point voltage of about 1.5 Volt (with about a half Volt of hysteresis). (This is not part of the formal RS232 specification, which simply defines the voltage range from −3 V to +3 V as a "dead zone".) Thus, this reversed connection, and the DC offset, assures that the modulation effected by the token module will fall into a range around the line receiver chip's trip point.

Software for Interfacing from Token to Standard UART

The TX and RX signals referred to above will normally by translated by a line/driver receiver chip (which converts the voltage levels to normal logic levels), and will then be connected to a universal asynchronous receiver/transmitter (UART) chip.

Such UART chips are a widely used commercial part. They include logic to perform low-level signal formatting and manipulation, and byte-wide serial/parallel conversion of data streams. One example of a commonly used UART chip, suitable for use in the embodiment of FIGS. 19 and 20, is an Intel 8250. However, a wide variety of other chips could be used instead.

UARTs are normally programmable, for parameters such as number of bits, baud rate, etc. Since each UART contains its own time base, timing parameters can specified to the UART without considering what the speed of operation of the overall system may be. (For example, the PC-type systems currently in widespread use range from XTs operating at 4.77 MHz to 80386 systems operating at 33 MHz.) In the presently preferred version of this embodiment, the serial data lines are interfaced to a UART which has been programmed for operation at 115 kilobaud, with 1 start bit, 6 data bits, and 1 stop bit per byte. However, these parameters can readily be varied: for example, even without changing the specific timing parameters of this embodiment, the number of data bits can be increased to seven or eight or more without causing any problems.

Figure 20:
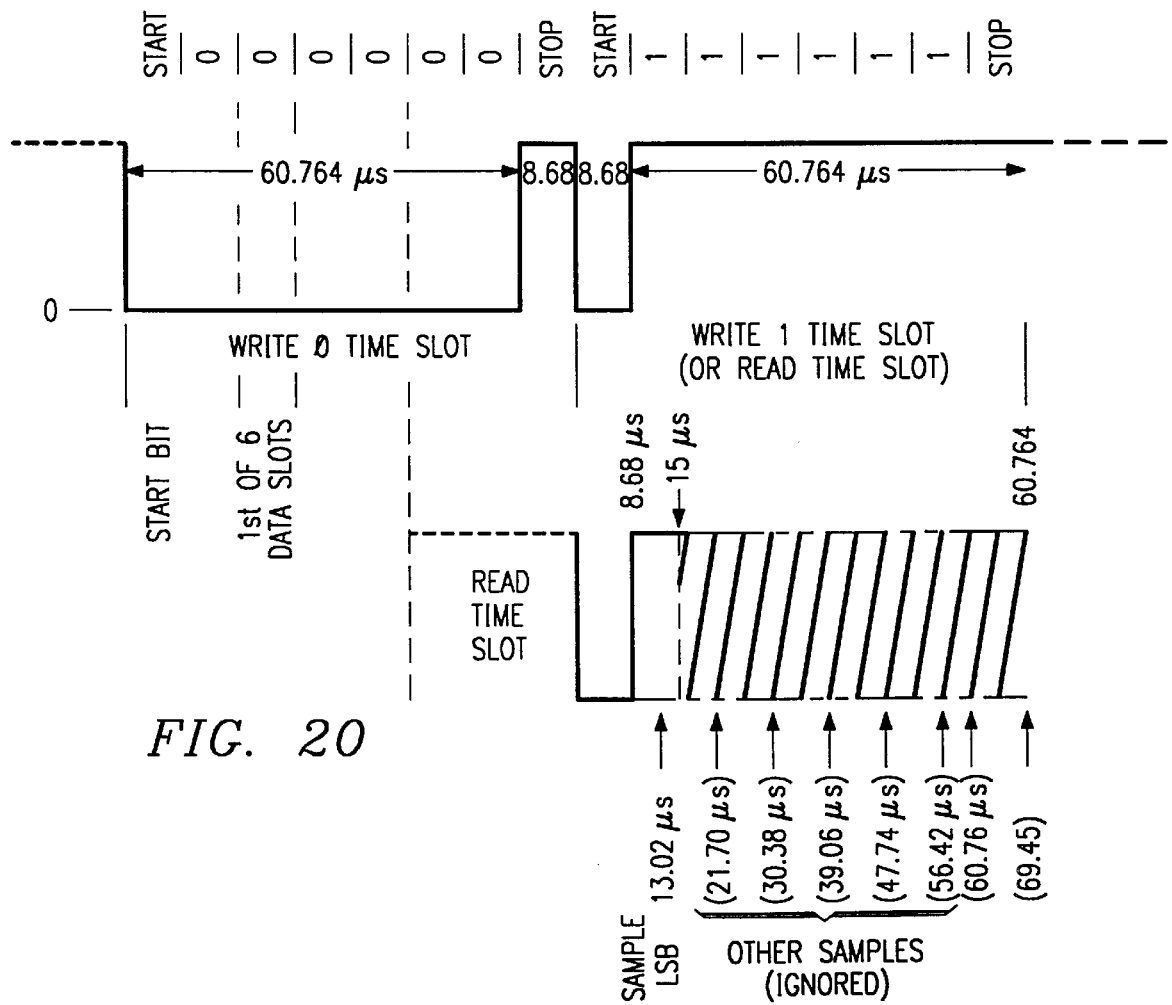
FIG. 20 shows timing relations preferably used, in a sample embodiment, for interfacing from a standard RS232 port to an electronic token.

FIG. 20 shows timing relations preferably used, in a sample embodiment, for interfacing from a standard RS232 port to an electronic token to perform a Write-0 operation. (These timing diagrams show signals with reference to the token's ground terminal, which, in this embodiment, is not the same as system ground.) When the UART sends a start bit, the token sees the falling edge which starts its time window. The start bit's time slot guarantees that the line level will be held low for 8.68 microseconds after the falling edge. Thereafter, the 6 data bits (all set to zero) keep the signal level low, from 8.68 microseconds after the falling edge until 60.764 microseconds after the falling edge. Thus, whenever the one-shot pulse ends, and the token samples the data line, it will see the desired data value. This is achieved by writing an entire byte of output for each bit desired. After the data bits, the stop bit provides a high level for 8.68 microseconds, which is more than long enough to reset the edge detector n the token.

A write-1 operation is almost the same as the write-0 operation, except that the data bits are all is (rather than all 0s).

The resistor 1912 means that signals driven onto the TX lie will be echoed on the RX line. This permits a simple read operation. After the token has been set into read mode, the host writes a byte of all is. At the same time, the receiving side of the UART will be receiving a byte of data. If the first received data bit is a zero, the host knows that the module has turned on its pull-down transistor. If the first received data bit is a one, the host knows that the module has not turned on its pull-down transistor. The remaining data bits are ignored, since even if the pull-down transistor was on, the module may already have turned it off at any time after 15 microseconds past the falling edge.

Source Code—Software Interface

In the presently preferred embodiment, the following code is used to drive the serial interface to a token. In this listing, "TBE" means "Transmit Buffer empty";

"TSRE" means "Transmit Shift Register Empty," i.e. no data is currently being sent;

"RDA" means "Received Data is Available," i.e. the receiver side of the UART is holding some data.

Thus, to perform a read operation, the host writes out hexadecimal byte $FF_H$ (or $3F_H$-with only six bits the two numbers appear the same. The first data bit in a byte is conventionally taken as the least significant bit. Therefore, the received data byte can simply be tested to see whether it is odd or even.

```
{
   This program performs a simple functionality test on a DS1272
   with 256 bit capacity and select bits of zero. The DS1272 is
   connected to COM1.
}
Uses CRT;    { Standard Pascal unit required for CRT control }
Procedure WByte(S: Word; X: Byte);
{
   This procedure sends out the byte X to the DS1272 connected
   to the serial port having port address S.
}
Var
   I : Byte;
Begin
   For I := 1 to 8 do Begin   { Send all eight bits in the byte }
      Repeat until Port[S + 5] and $20 = $20;  { Wait for TBE }
      If Odd(X) then Port[S] := $FF else Port[S] := 0;   { Send bit }
      X := X shr 1;           { Shift in the next bit }
   End;
End;
Function RByte(S: Word): Byte;
{
   This function returns one byte received from the DS1272 connected
   to the serial port having port address S.
}
Var
   I, X, B : Byte;
   T : LongInt Absolute $40:$6C;    { System timer tick }
   M : LongInt;                     { Time limit }
Begin
   X := 0;                          { Collect the bits in X }
   M := T + 1;                      { Set the wait time limit }
   For I := 1 to 8 do Begin   { Receive all eight bits in the byte }
      Repeat until Port[S+5] and $40 = $40;     { Wait for TSRE }
      If Port[S+5] and 1 = 1 then B := Port[S];  { Clear receiver }
      Port[S] := $FF;           { Send out read time slot }
      X := X shr 1;             { Position byte to receive bit }
      Repeat until (Port[S+5] and 1 = 1) or (T > M);  { Wait for RDA }
      If T > M then B := $FF else B := Port[S];  { Get the bit }
      If Odd(B) then X := X or $80;   { Put new bit into byte }
   End;
   RByte := X;               { Return the received byte }
End;
Const
   SB = 0;                   { Select Bits are zero }
   MS = 32;                  { Memory Size is 32 bytes }
Type
   DatAry = Array[0..31] of Byte;   { Data transfer buffer type }
Var
   PA : Word Absolute $40:0;        { Base port address of COM1 }
   S : String[31];                  { String to collect message }
   DA : DatAry;                     { Array of data to be transmitted }
   X, Y: Word;                      { Position of cursor }
   I : Byte;                        { Array index }
   C : Char;                        { Command character }
Begin                         { Main program code begins here }
   TextColor(Yellow); TextBackground(Blue); ClrScr;
   If PA = 0 then WriteLn('COM1 does not exist.') else Begin
   {
      This section sets up the serial port with port address PA for
      115200 baud with six data bits, one stop bit, and no parity.
   }
   Port[PA + 3] := $81;   { Set the DLAB }
   Port[PA + 0] := $01;   { Baud rate }
   Port[PA + 1] := $00;   { is 115200 }
   Port[PA + 3] := $01;   { 6 data, 1 stop, no parity }
   Port[PA + 1] := $00;   { No interrupts }
   Port[PA + 4] := $03;   { RTS and DTR on }
   {
      The next section provides a simple option menu for exercising
```

```
   the functions of the DS1272.
}
C := 'S';         { Display options the first time through }
While True do Begin
   If C = 'S' then Begin
      WriteLn('DS1272 Test Program'); WriteLn;
      WriteLn('I = Initialize DS1272');
      WriteLn('W = Write to DS1272');
      WriteLn('R = Read from DS1272');
      WriteLn('S = Show option list');
      WriteLn('<ESC> = End program');
      WriteLn;
   End;
   Write('Option = ');
   Repeat
      C := UpCase(ReadKey);
      If C = #27 then Begin       { Abort if ESC is received }
         WriteLn('<ESC>');
         WriteLn; Halt;
      End;
   Until (C = 'I') or (C = 'W') or (C = 'R') or (C = 'S'):
   WriteLn(C);
   Case C of
      'I': For I := 0 to MS do WByte(PA, 0);   { Initialize DS1272 }
      'W': Begin
         Write('Data to write = [');  X := Where X; Y := WhereY;
            Write('                           ]'); GotoXY(X, Y);
         ReadLn(S); DA := DatAry(S);  { Transfer string to buffer }
         WByte(PA, SB shl 1 or $F9);  { Send the command byte }
         For I := 0 to Pred(MS) do WByte(PA, DA[I]);  { Send data }
      End;
      'R': Begin
         WByte(PA, SB shl 1 or 1);           { Send the command byte }
         For I := 0 to Pred(MS) do DA[I] := RByte(PA);  { Get data }
         If DA[0] >31 then DA[0] := 31;      { Limit length to 31 }
         For I := 1 to DA[0] do if (DA[I] < Byte(' '))
            or (DA[I] > Byte('z')) then DA[I] := Byte('.');
         DatAry(S) := DA;    { Transfer data to string }
         WriteLn('Message Received = [', S, ']');      { Display it }
      End;
   End;
   WriteLn;
   End;
End;
End.
```

Sesign Considerations

Since the token is designed to be used as a removable tagging device, it can be viewed at the system level as a memory element plagued by numerous cold solder joints. During either reading or writing operations, physical contact with the token may be broken. This in turn will cause either the received data to be erroneous or the transmitted data to be incomplete. The recommended way around these problems is as follows:

1) Read Operation
   step 1—set token to a known state
   step 2—issue a read Cinnabd Word
   step 3—read the data into host memory
   step 4—repeat steps 1 through 3 five times
   step 5—use majority wins logic to derive data (i.e. 3 out of 5 wins)

2) Write Operation
   step 1—set token into known state
   step 2—issue a write Command Word
   step 3—write data into token memory
   step 4—perform Read Operation
   step 5—compare host transmit data to received data
   step 6—if not, equal, repeat steps 1 through 5.

Further Preferred Embodiments

Figure 21:
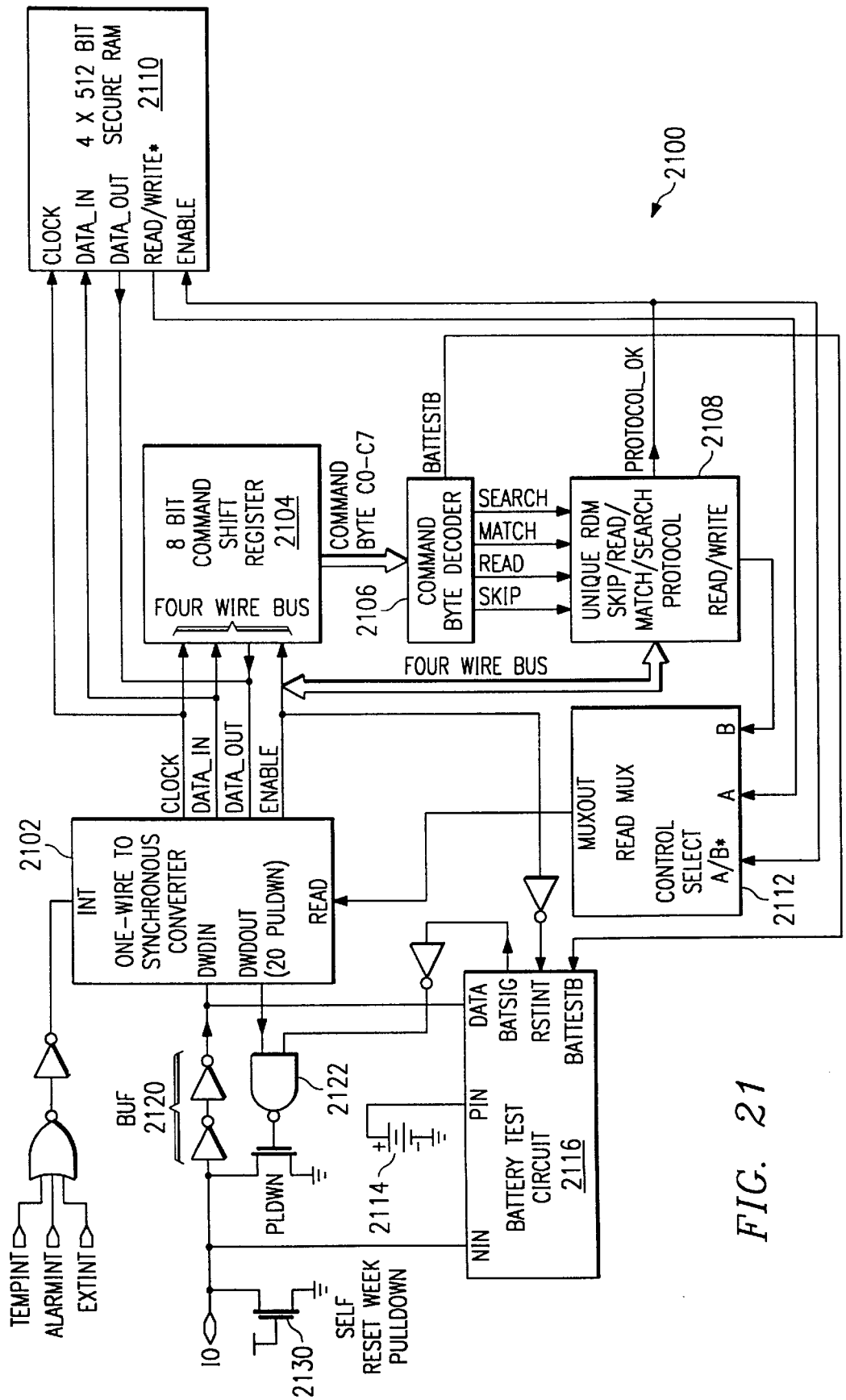
FIG. 21 is a block level schematic of a further preferred embodiment.

Further preferred embodiment circuitry for chips 0120 and 0130' in the modules of FIGS. 1A-B are shown schematically in FIGS. 21, 22A, 22B, 22D, and 22G. FIG. 21 is a top level schematic of the embodiment, denoted generally 2100, which includes a single input-output terminal IO, a 1-wire converter 2102, an 8-bit command shift register 2104, a command decoder 2106, ROM and control 2108, secure RAM 2110, multiplexer 2112, power supply battery 2114, and battery test circuit 2116. Embodiment 2100 receives and transmits serially over the IO terminal as previously described in connection with FIGS. 2A-B and 3: converter 2102 receives input (low pulses) at IO through buffer inverters 2120 and transmits output to IO by applying low pulses to NAND gate 2122 which turn on n-channel transistor PLDWN to pull down IO and generate low pulses. Converter 2102 translates between input and output at IO and four synchronous signals CLOCK, DATA_IN, DATA_OUT, and ENABLE for operation of 2100. The overall operation of embodiment 2100 follows a three layer hierarchical procedure: in the first layer the host sends a reset command by holding the IO node low for at least 480 microseconds and then returning 10 to high for at least 480 microseconds. This causes embodiment 2100 to generate a presence detect signal by pulling node IO low for at least 60 microseconds as described below in connection with FIG. 22F. The reset command also clears the command register 2104 and sets the module in a mode for the host to write a byte (8 bits) into command register 2104 in the next eight write cycles as illustrated in FIGS. 2A-B and described below in connection with FIGS. 22B–E. Once command register 2104 is loaded with a command byte, command byte decoder 2106 decodes the command byte to initiate one of the four allowed commands: READ ROM DATA, MATCH ROM DATA, SEARCH ROM DATA, and SKIP ROM SECTION of the second layer. (If the byte in command byte decoder 2106 fails to match one of the available commands, then the module will simply wait for a reset and ignore further commands at its inputs.) These commands employ identification data from the ROM in 2108 and incorporate the security aspects of the module. The upper portion of FIG. 23A illustrates the flow. Then after successful execution of the second layer command, the third layer commands are available for access to the secure RAM 2110. The lower portion of FIG. 23A shows the execution of these third layer commands. Note that the flow paths all end in a reset. Also, the second layer commands dealing with the 64 bit ROM in 2108 may have simple hardware support in that the entire 64 bits are always read or compared, so the addressing can be a simple incrementing with the successive comparisons just fed to a latch that switches if a mismatch occurs. The following preferred embodiment discussions explain these commands and variations in detail.

Figures 1, 22A:
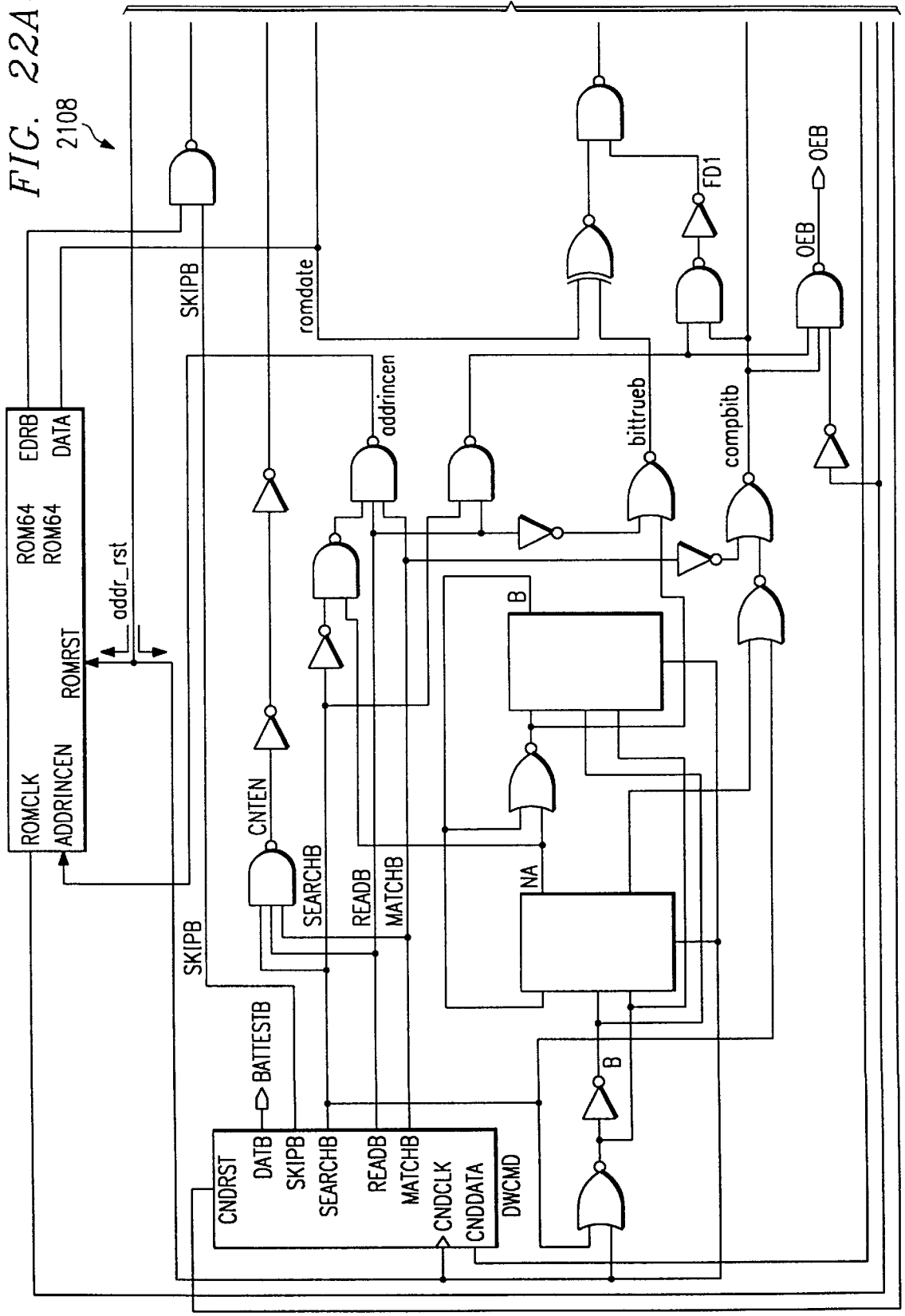
Figures 2, 22A:
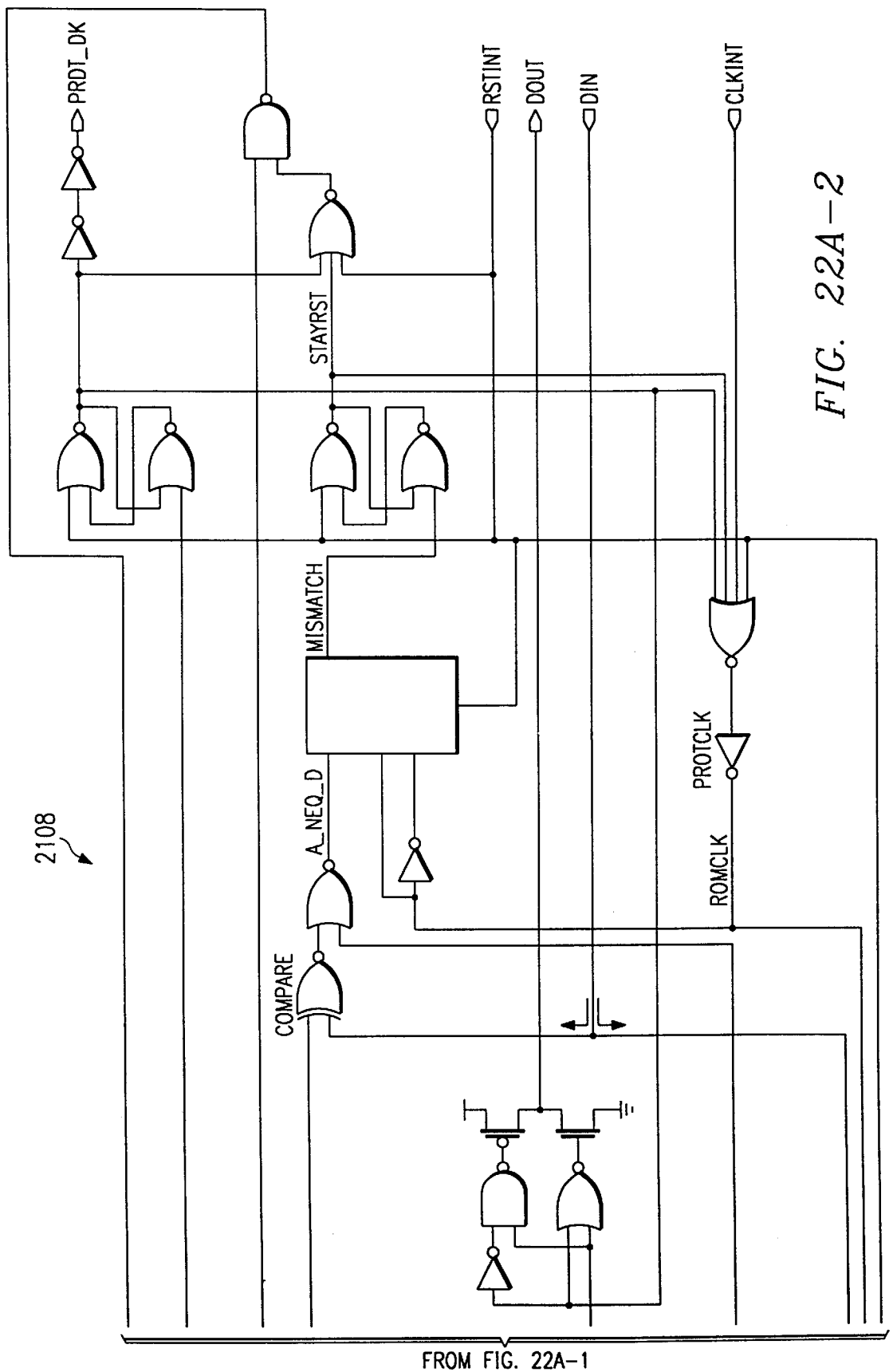
FIGS. 22A–N are schematic circuit, timing, and state diagrams of the embodiment of FIG. 21. More specifically.
Figures 1, 22B:
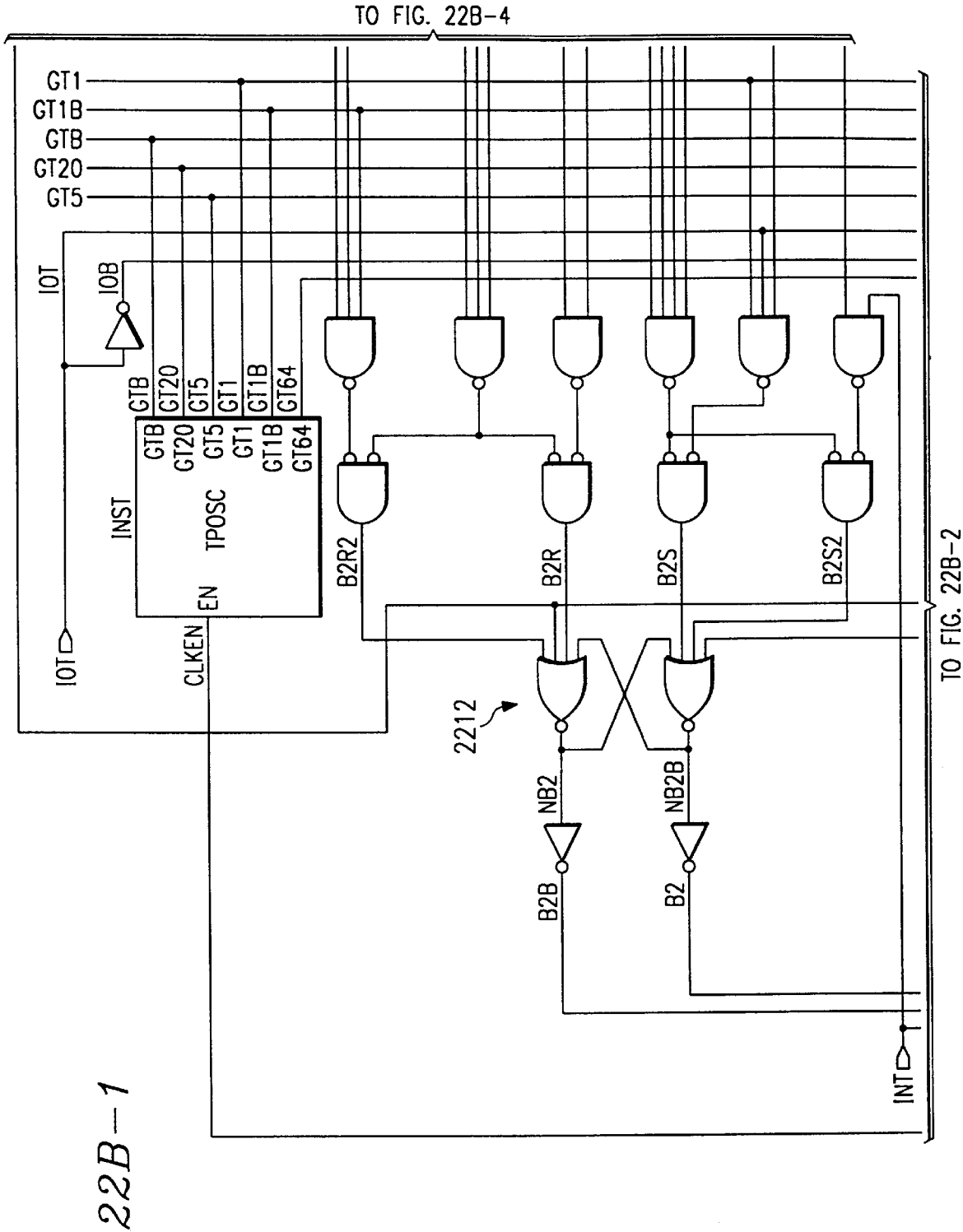
Figures 2, 22B:
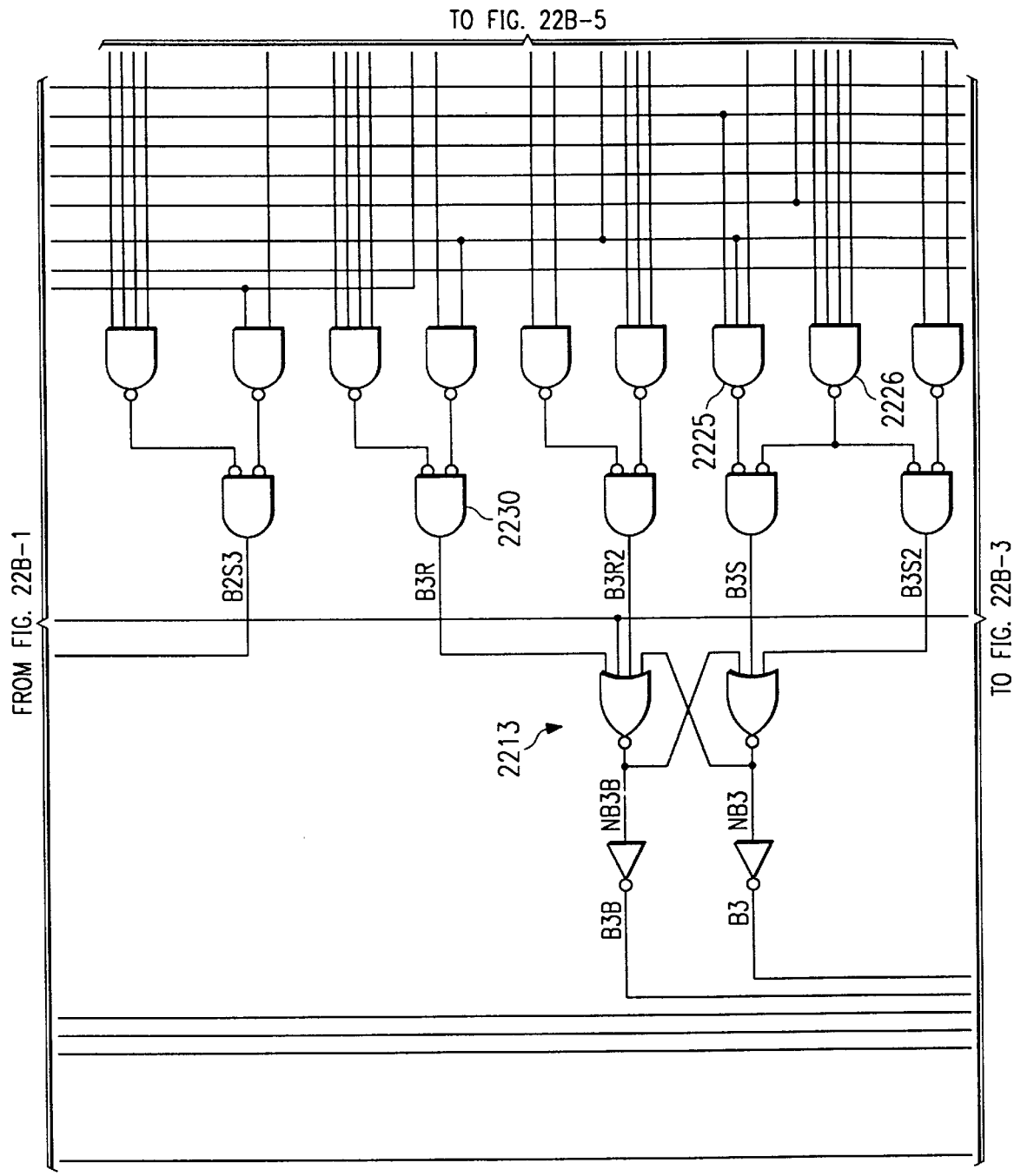
Figures 3, 22B:
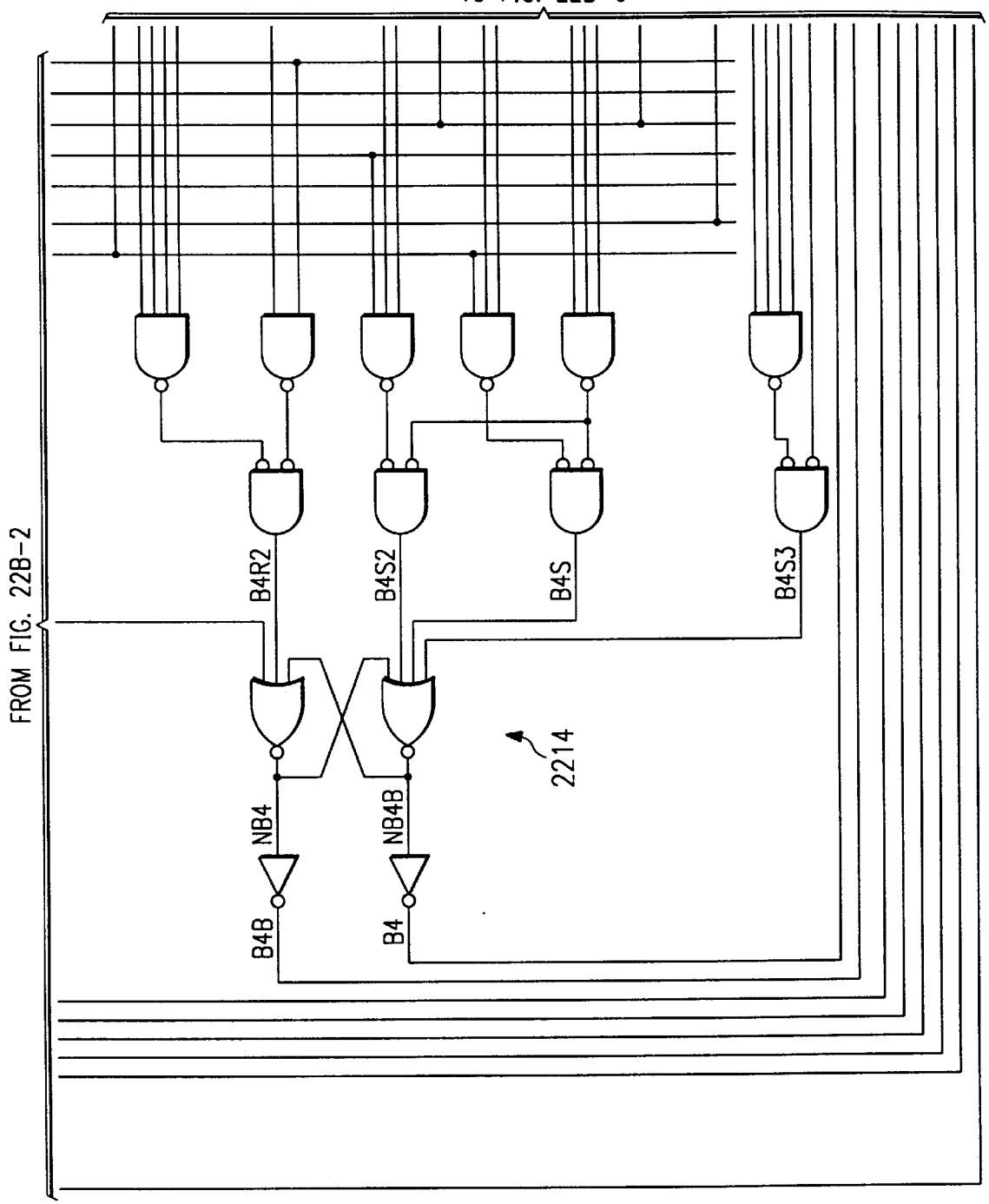
Figures 5, 22B:
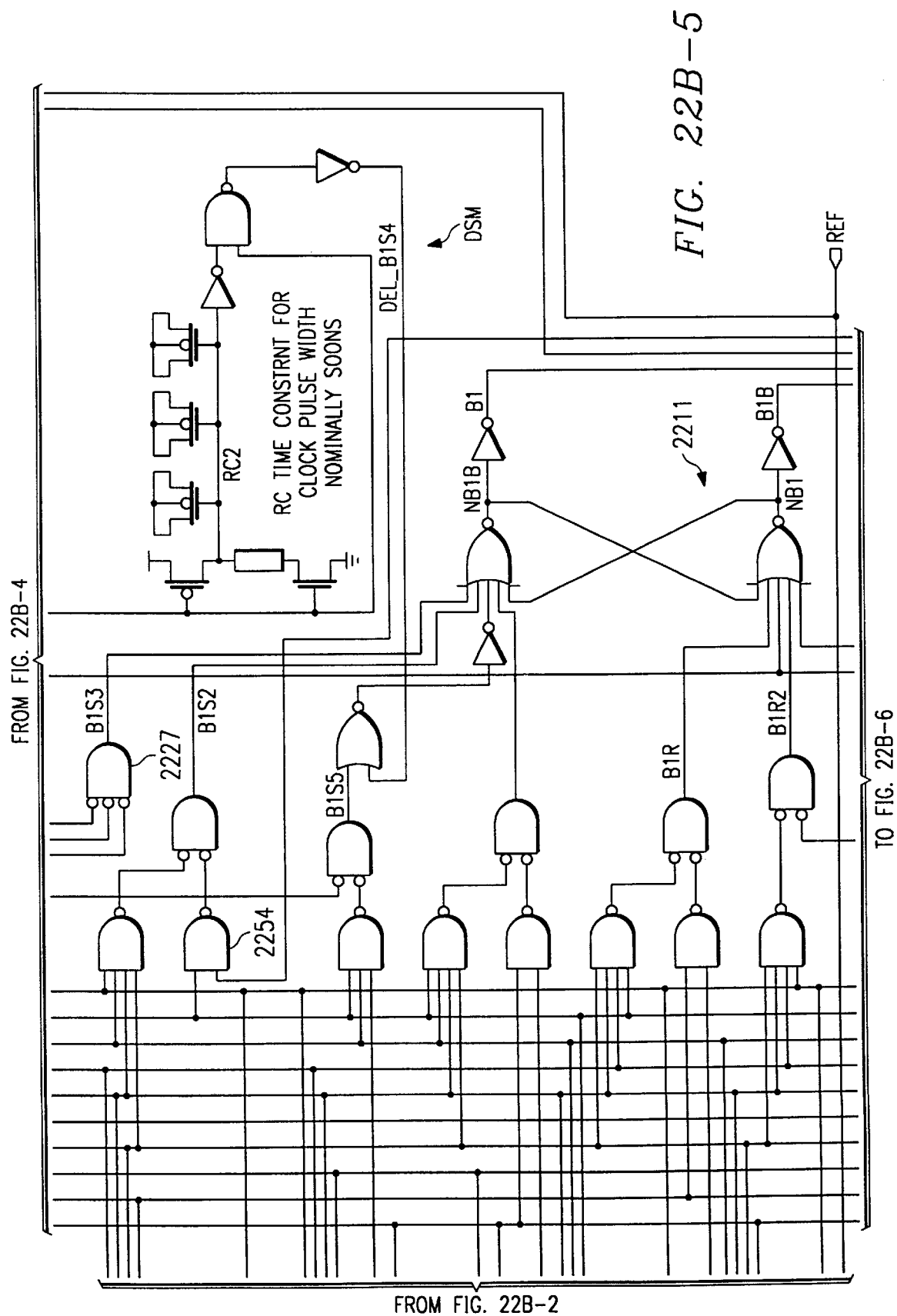
Figures 6, 22B:
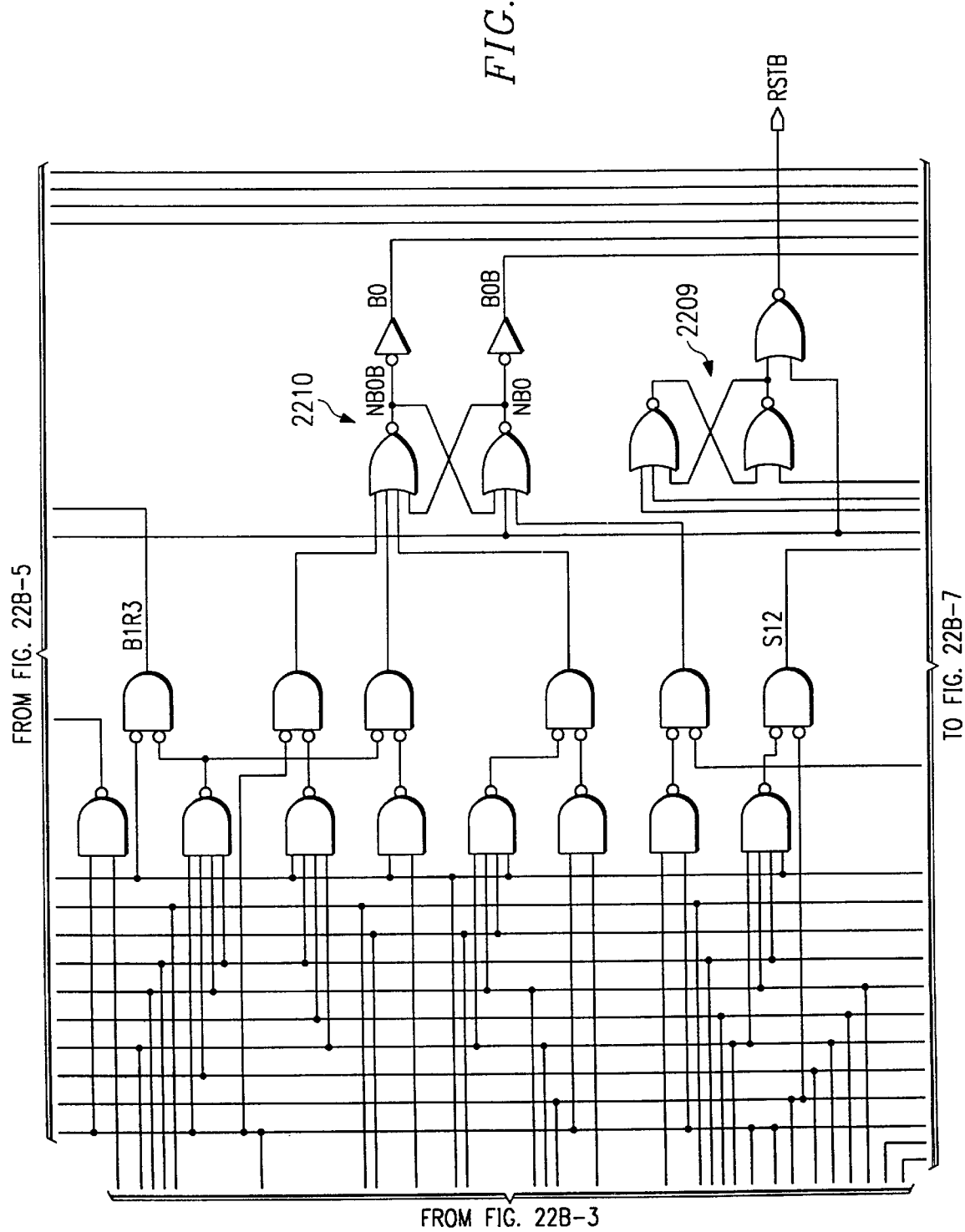
Figures 7, 22B:
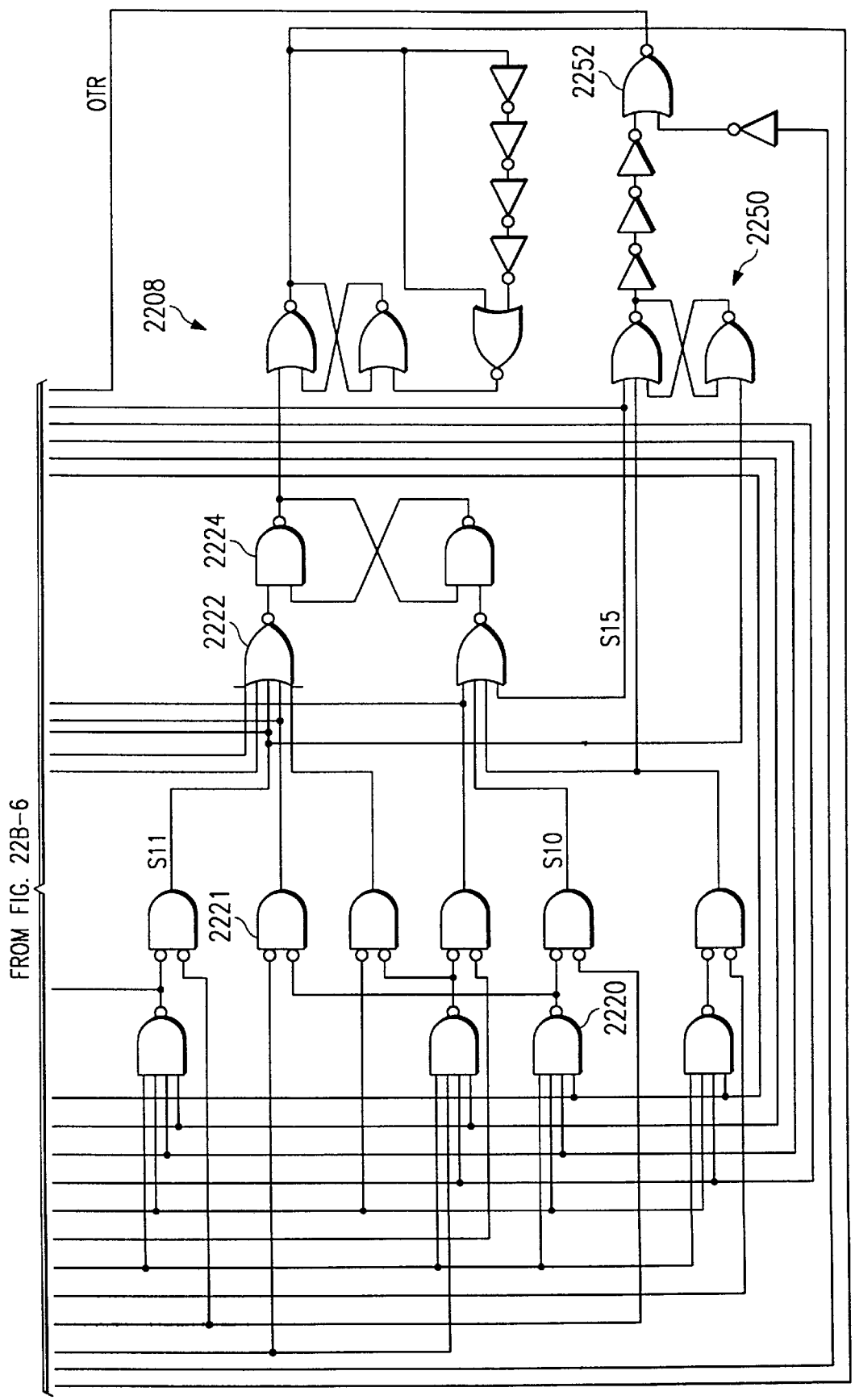
Figure 22C:
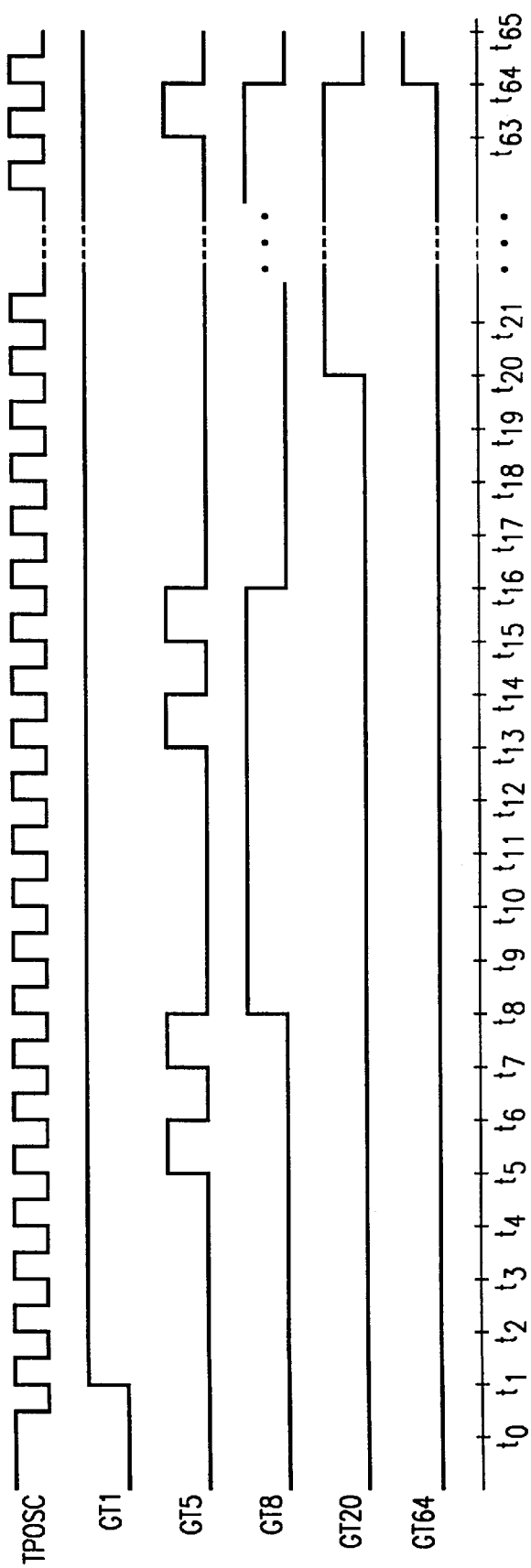
Figure 22F:
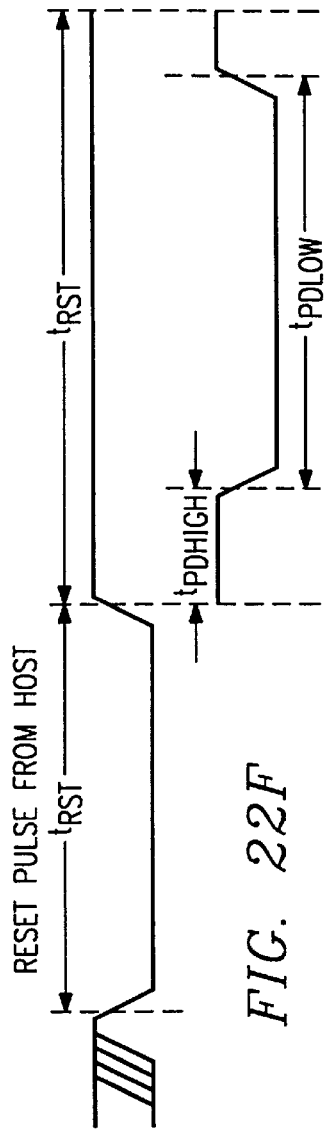
Figure 22D:
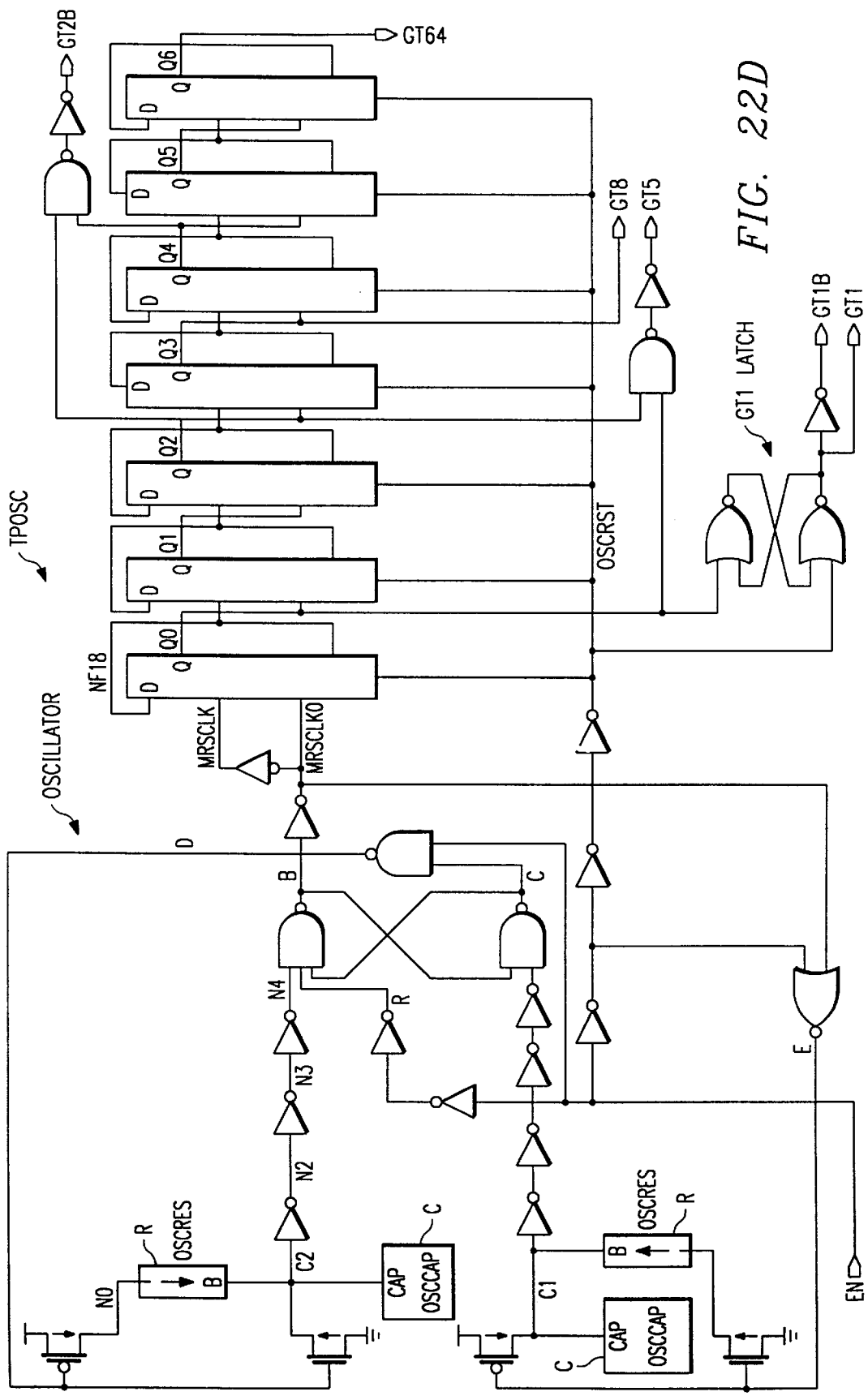
Figure 22E:
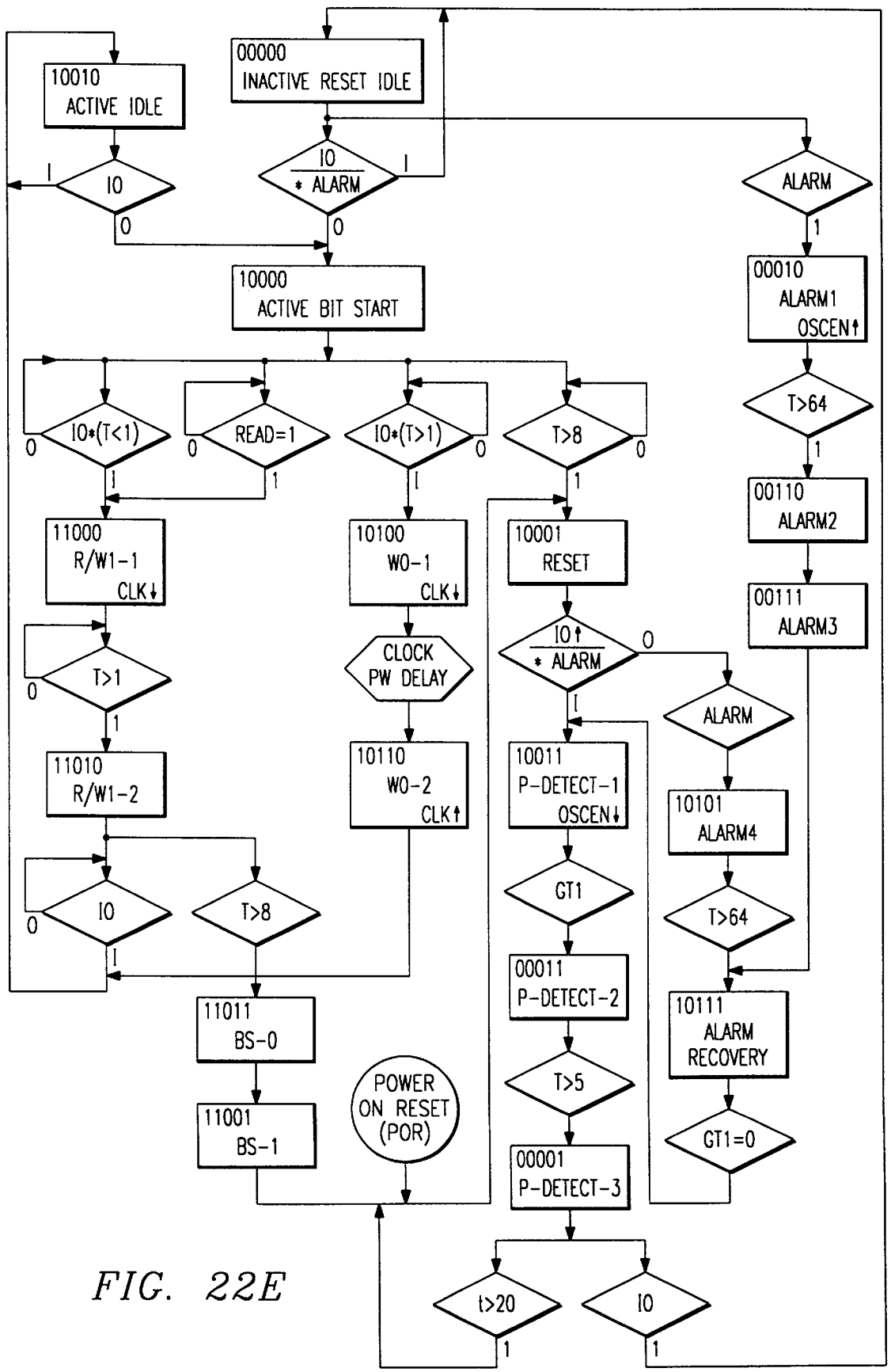
FIG. 22E is a state diagram for the embodiment of FIG. 21.
Figure 22G:
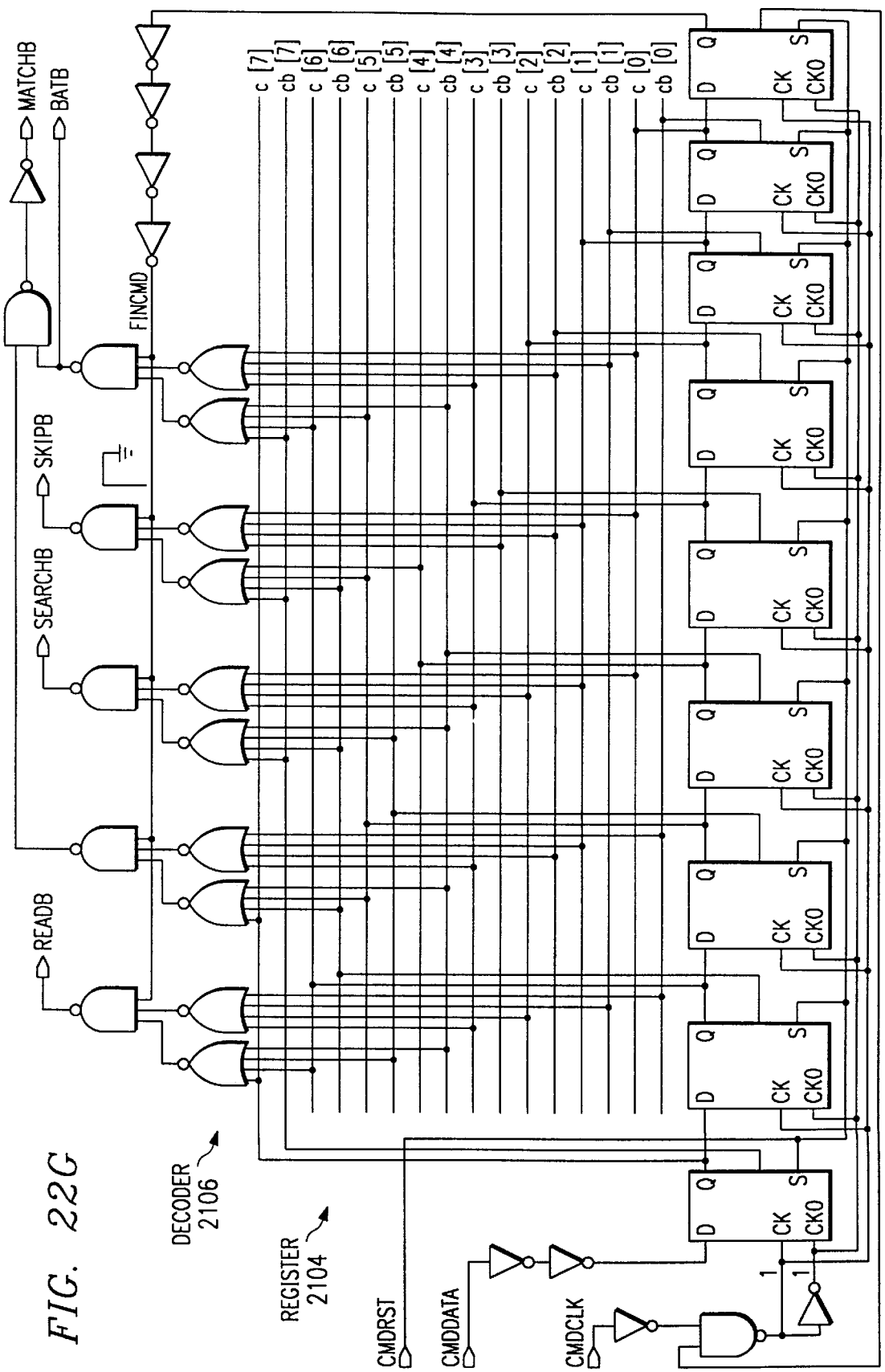
Figure 22H:
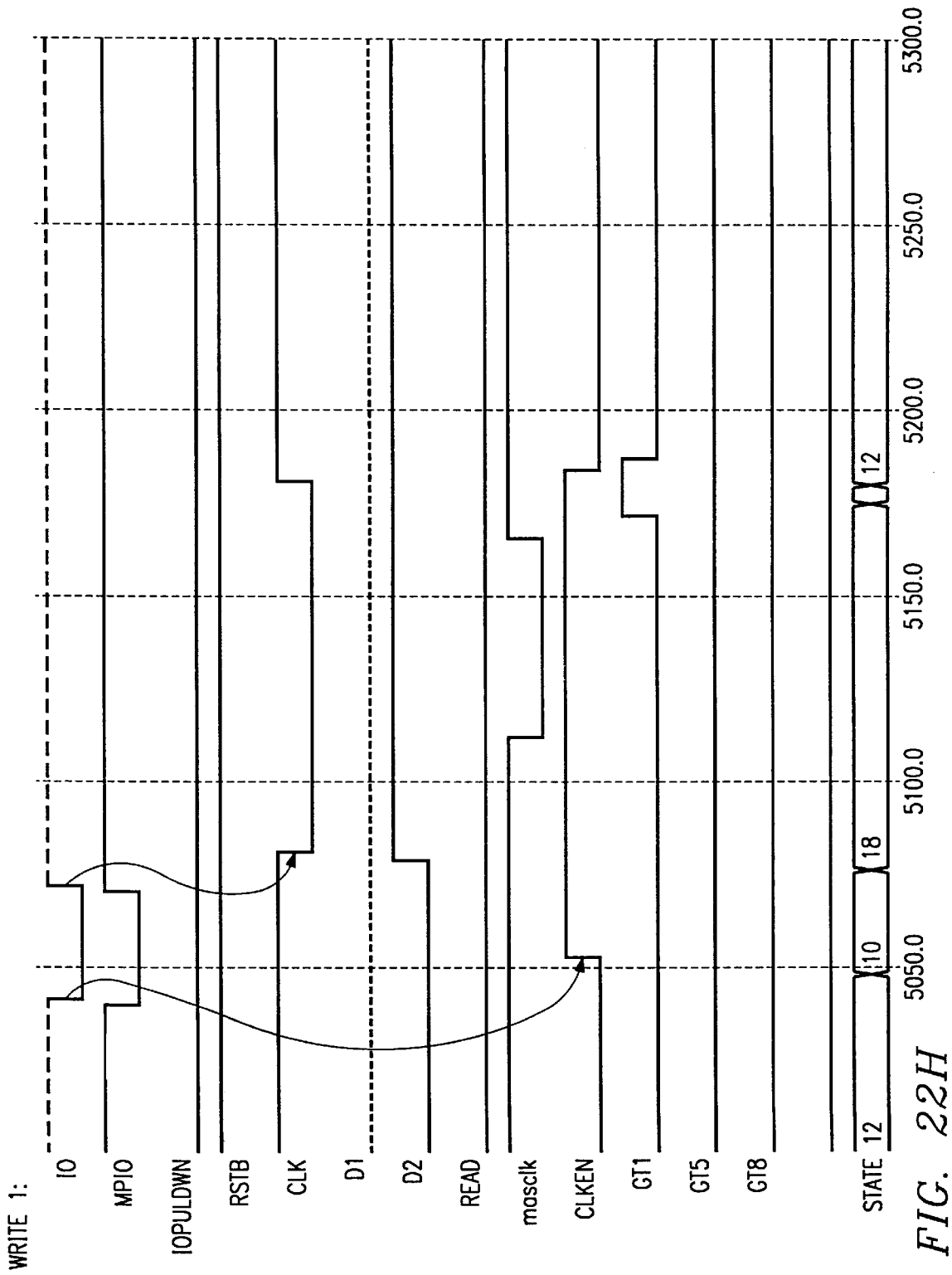
Figure 22I:
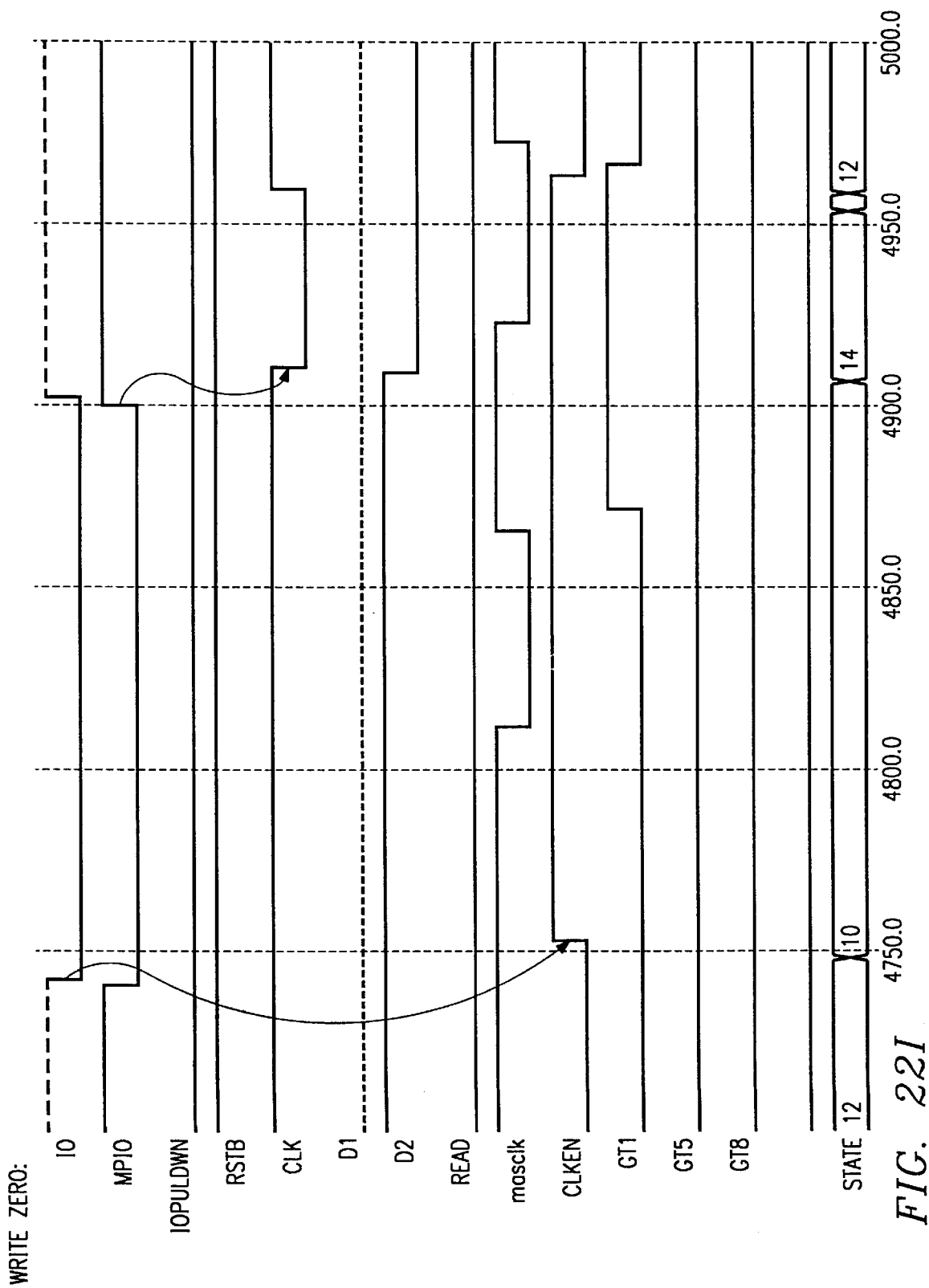
Figure 22J:
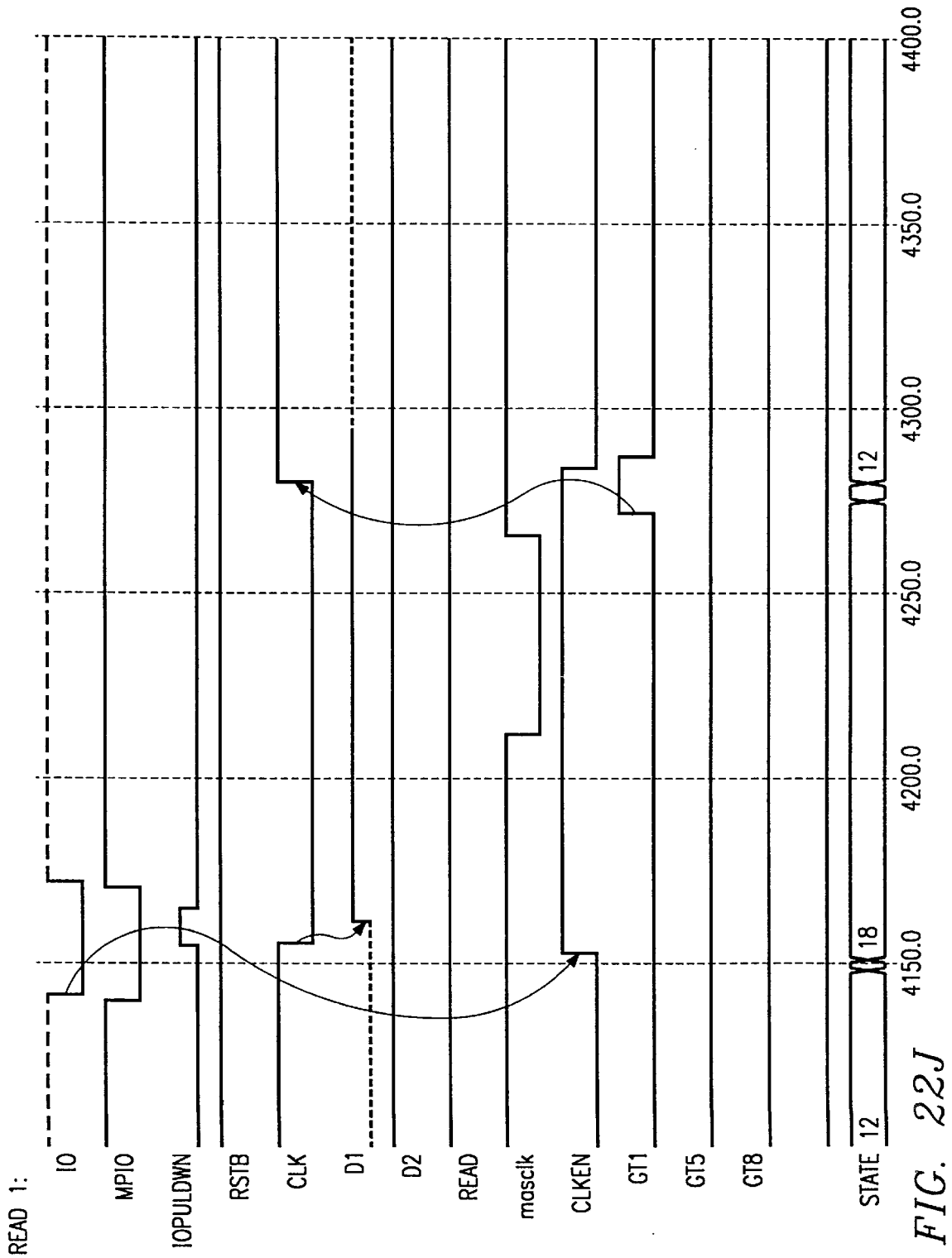
Figure 22K:
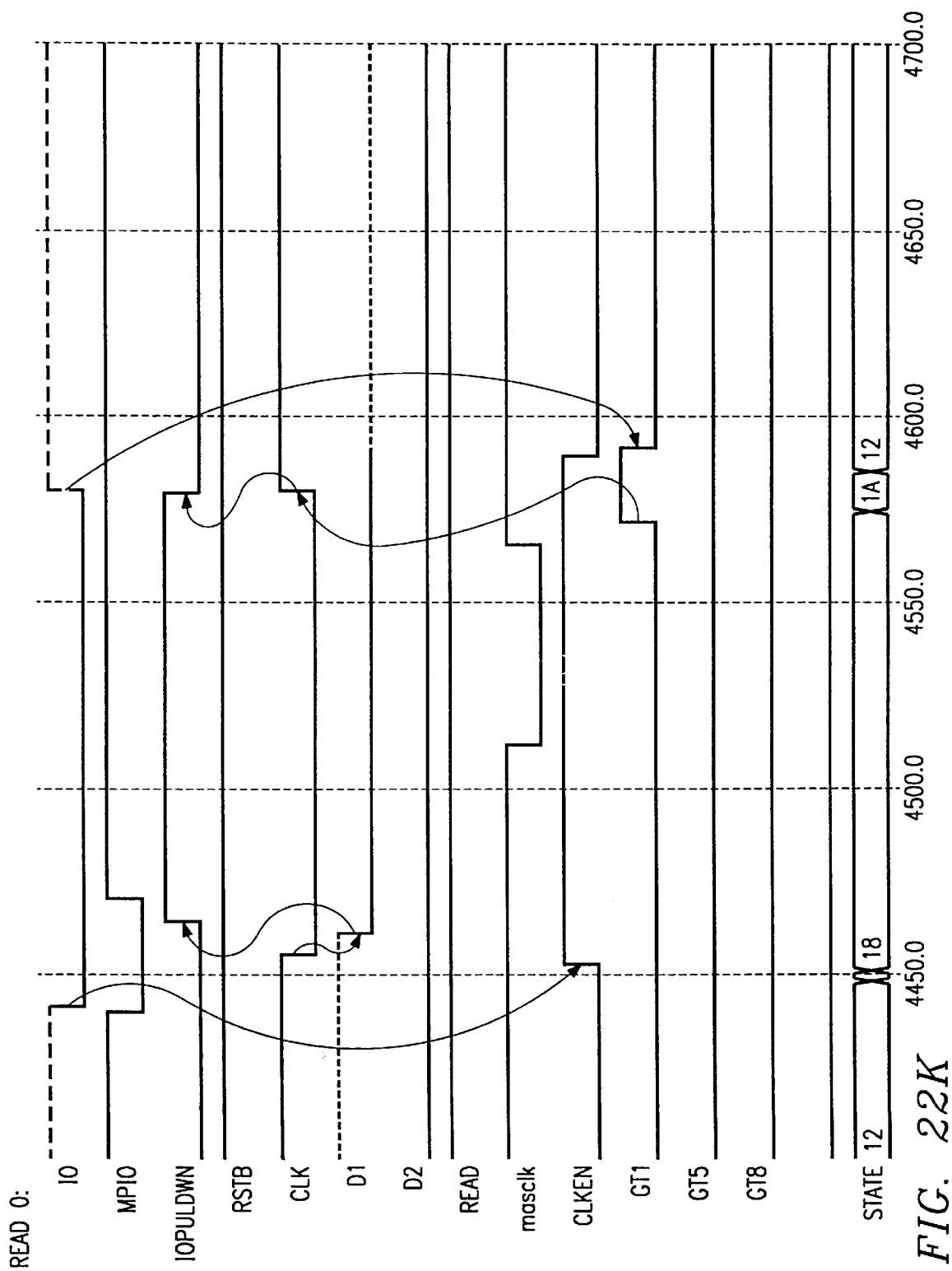
Figure 22L:
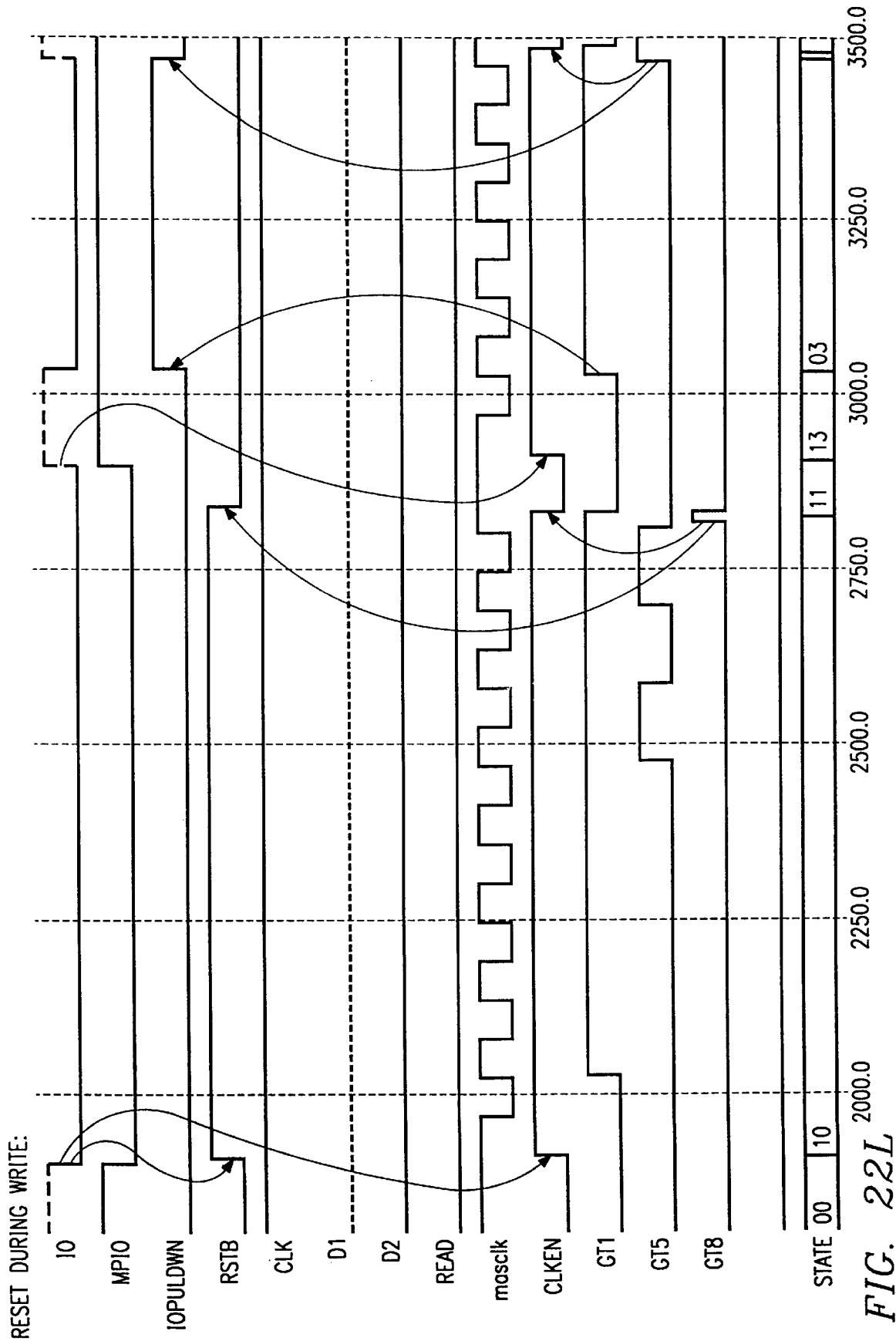
Figure 22M:
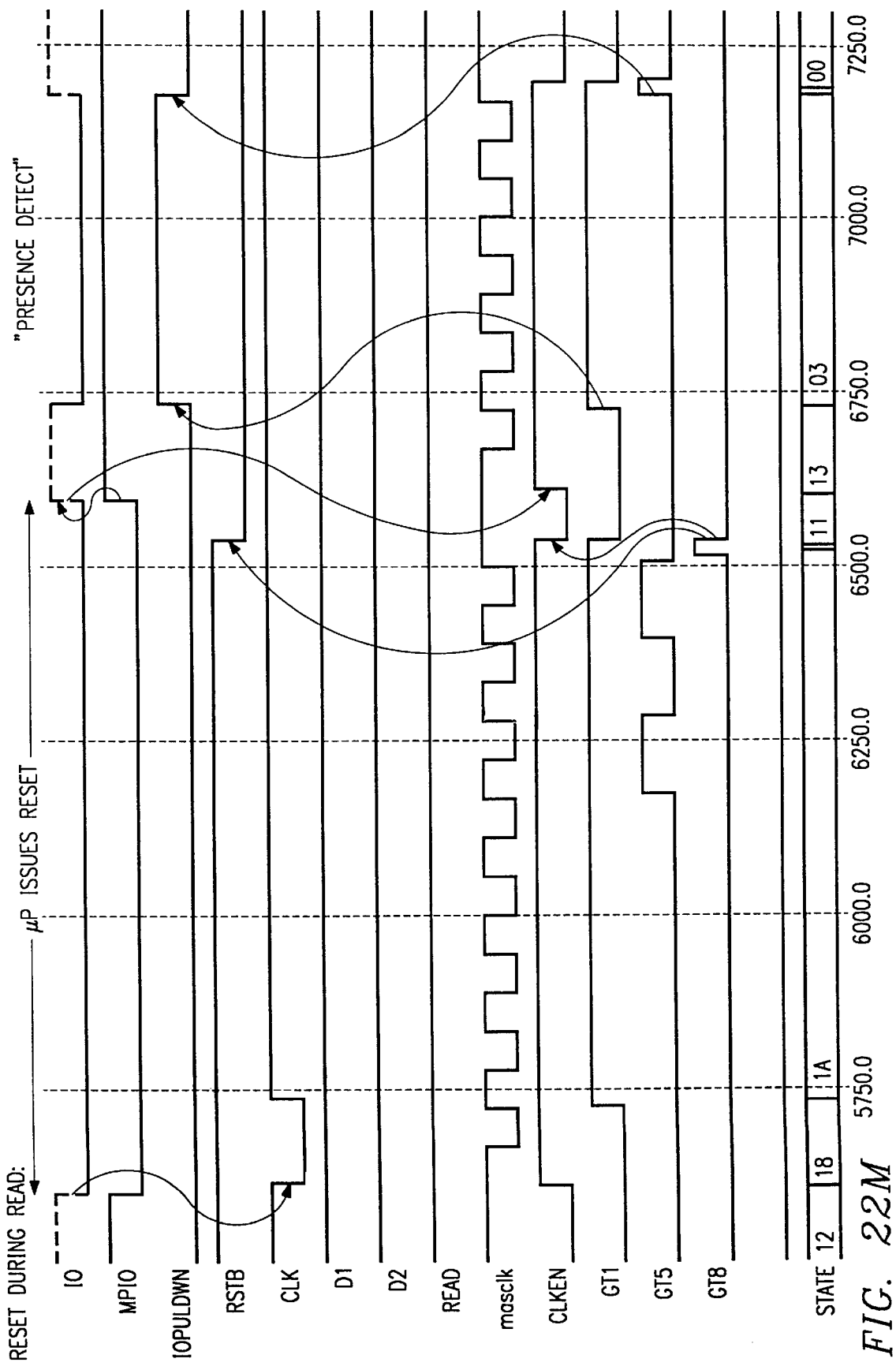
Figure 22N:
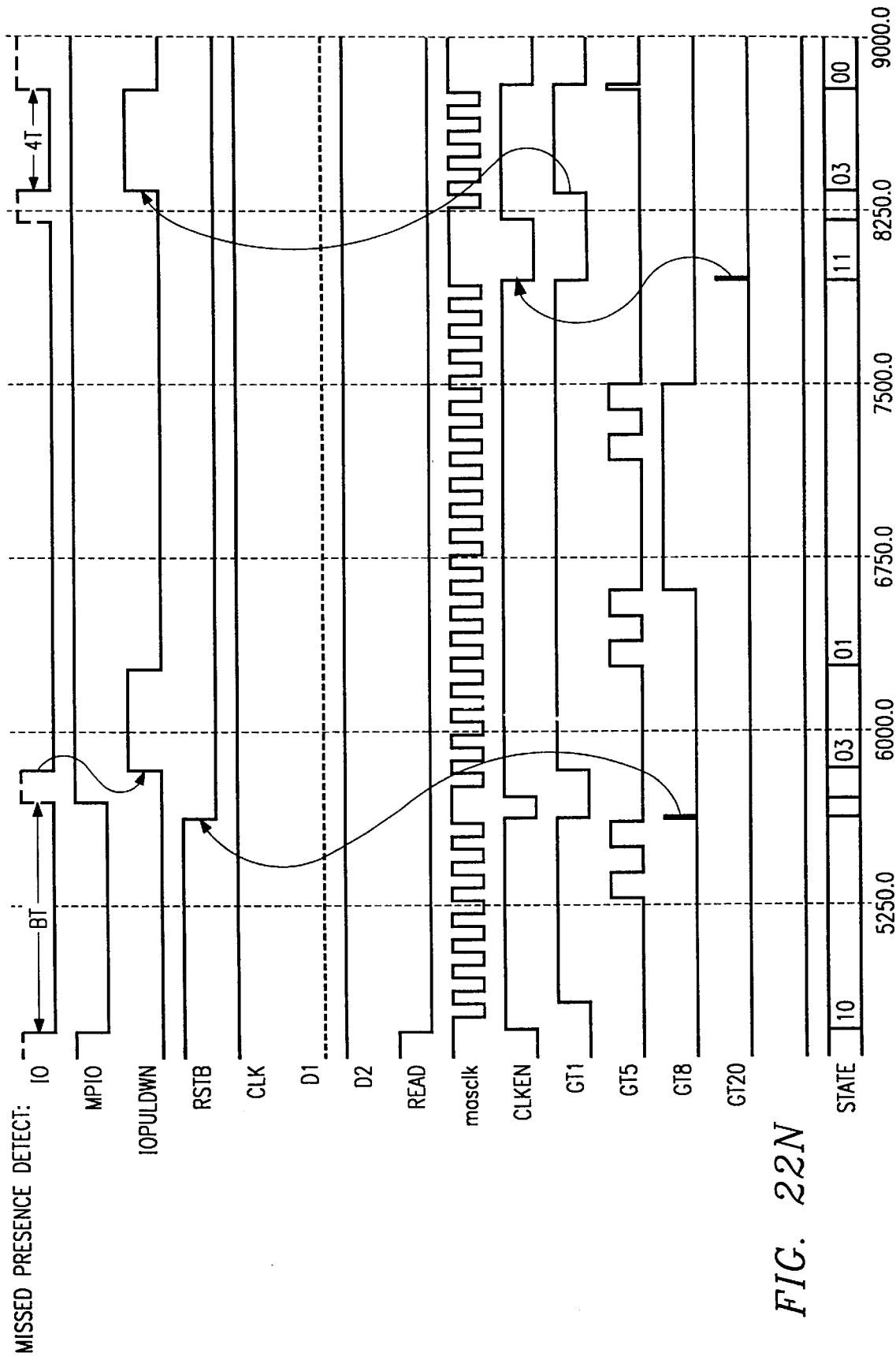
Figure 23A:
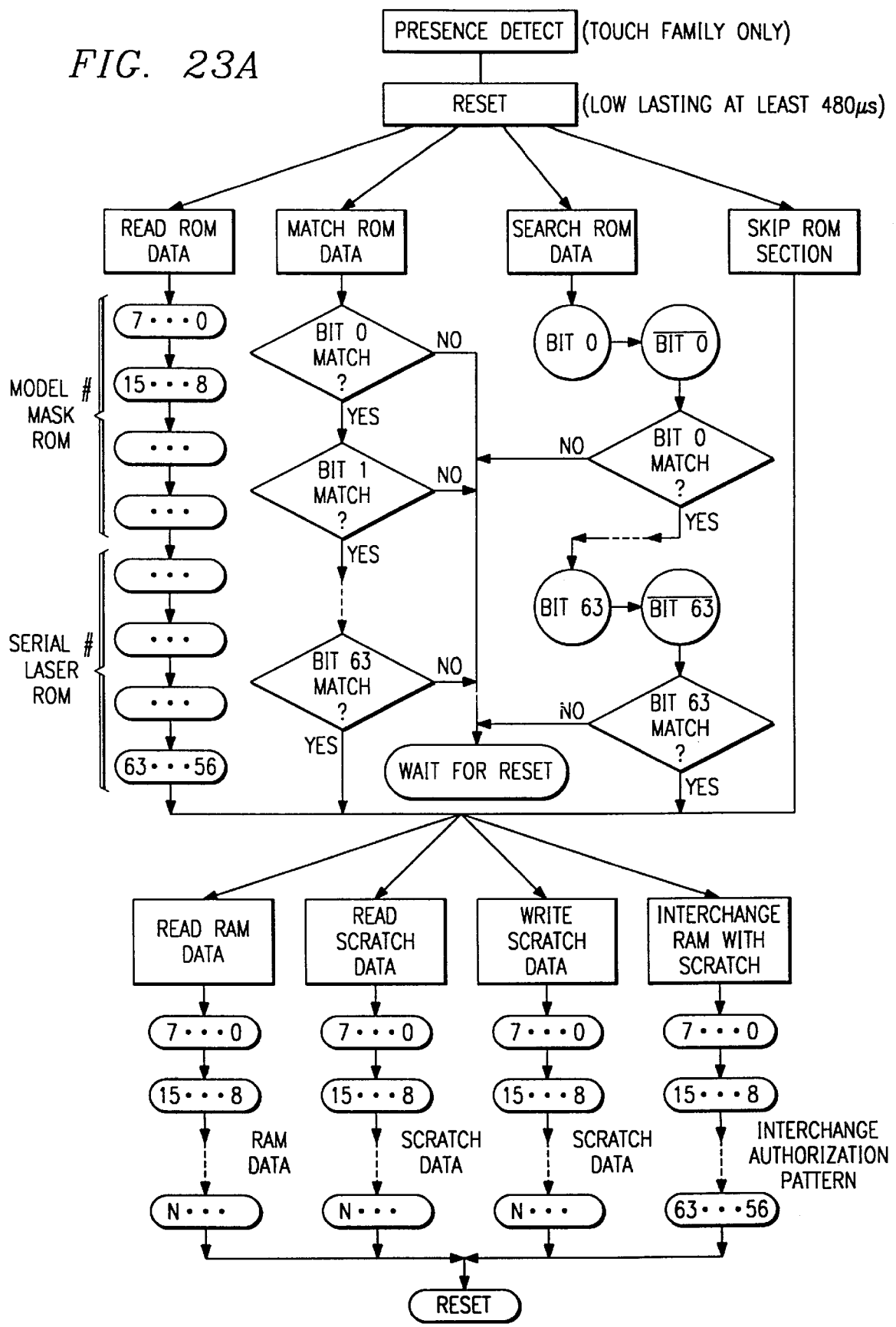

FIG. 22A shows decoder and ROM 2108, and FIG. 22G shows register 2104 and decoder 2106; both Figures are discussed below. FIG. 22 B shows the main portion of converter 2102 which is a state machine and oscillator with input node IOT, interrupt input node INT, power-on-reset input node POR, output node IOPULDWN, input internal data node DIN, output internal data node DOUT with adjacent latch made of cross-coupled NOR gates 2233 and 2234, internal clock output node CLK, status input node READ, internal reset output node RSTB, oscillator TPOSC, RC delay circuit DSM for timing in the state machine, and state machine 2200. State machine 2200 occupies most of FIG. 22B and includes cross-coupled NOR gate latches 2208–2214, eight input lines labelled GT60, IOB, IOT, GTS, GT20, GT8, GT1B, and GT1 (lefthand eight vertical lines in the center of FIG. 22B), ten feedback lines labelled B4, B4B, B3, B3B, . . . B0, and B0B (the righthand ten vertical lines in the center of FIG. 22B), and sundry NAND and inverted input AND gates from the eighteen input and feedback lines to the latches. B4B is the complement of B4, B3B is the complement of B3, and so forth. Note that the inputs to the eight input lines are node IOT (to line IOT) and its complement (to IOB) and six timing signals from oscillator TPOSC: GT1, GT1B (complement of GT1), GT5, GT8, GT20, and GT64. FIG. 22C shows the relation of these timing signals to the oscillator's clock which is presumed enabled at time $t_0$; the period of the oscillator's clock is about 60 microseconds. Thus GT1 goes high after one period (60 microseconds) and stays high, GT5 goes high after five periods (300 microseconds) and low after six periods and again high after seven periods and so forth, GT8 goes high after eight periods (480 microseconds) and low after sixteen periods and so forth, GT20 goes high after twenty periods (1.2 milliseconds), and GT64 goes high after sixty-four periods (3.84 milliseconds).

FIG. 22D is a schematic circuit diagram of oscillator TPOSC which includes a latch of cross-coupled NAND gates with two feedback loops of inverters with each loop having a resistor R and capacitor C to generate an RC delay which essentially sets the length of each half period of oscillation (about 30 microseconds). The RC exponential voltage decay causes the inverter to switch at approximately half the supply voltage and thus the delay for each phase is voltage supply independent and equals RC(1n2). The oscillator is a two phase oscillator and the RC time reference is relative to ground in one phase and to VDD in the other. This provides some degree of process insensitivity to variation in MOS thresholds and transconductances. Process variations between n-channel and p-channel devices cause the inverters to switch at some voltage Vsw not exactly equal to VDD/2. The circuit is such that if in one phase the voltage must swing greater than half the supply voltage in the alternate stage it will swing less. This accomplishes the desired stabilization of oscillator period to process variation.

The resistors can be laser trimmed during manufacture to insure a reasonably close to 30 microsecond half period. The oscillation output of the latch drives counter COUNTER made of seven flip-flops: each successive flip-flop clocks at half the rate of the preceding one. The GT1, GT5, GT8, GT20, and GT64 signals simply tap off of COUNTER in the standard manner except GT1 also has a NOR gate latch driven by COUNTER. Additionally, the input node EN connects to the NAND gate latch, the reset inputs of the flip-flops and the GT1 latch. A low at input node EN disables the oscillations, resets the counter to all zeros and forces the GT1 latch to make GT1 low; whereas, a high at node EN permits oscillations and counting by the counter and the GT1 latch to switch to make GT1 high after one oscillation period. Note that the GT1 latch holds GT1 high until a disabling of TPOSC by a low on node EN.

The operation of the state machine 2200 of FIG. 22B could be explained by tracing through all of the possible states: the five latches 2210–2214 set the ten feedback lines B4, B4B, . . . B0, B0B, so there would be $2^5$ possible states. (Latch 2209 only outputs to node RSTB and latch 2208 only outputs to the EN input of oscillator TPOSC.) Such an analysis would generate a state diagram which reveals that the state machine is gray coded (only one latch switches at a time) and that there are only four stable states. However, for simplicity and clarity just consider the state diagram FIG. 22E wherein each state is represented by a rectangle with a 5-bit binary number showing the high or low of lines B4, B3, . . . B0 (the outputs of latches 2214, 2213, . . . 2210, respectively) and the transitions between states that require an input are represented by the decision rhomboids. Note that many of the transitions are induced by timing signals from oscillator TPOSC. For example, RESET IDLE state 00000 (rectangle in the top center of FIG. 22E) has B4=B3=B2=B1=B0=0 and this implies that NAND gate 2220 is low (due to B3B=B2B=B1B=B0B=1) which, along with B4 low, drives inverted input AND gate 2221 high, thus NOR gate 2222 low, then NAND gate 2224 high, and hence latch 2208 outputs a low to input EN of oscillator TPOSC. EN low turns off and resets TPOSC so input lines GT1, GT5, GT8, GT20, and GT64 all remain low. Of the possible 32 states only 18 are used and all other states are collectively decoded as "badstate". If any bad states are detected the state machine is forced into a particular good state, the reset state (10001). This prevents the state machine from becoming permanently locked into a bad state. Furthermore most states are transitory in nature and even without any external activity will transition to a new state within a finite time. The only states which are stable are ACTIVE IDLE (10010), RESET IDLE (00000), RESET (10001), and ALARM RECOVERY (10111). In each of these stable states the oscillator is shut off and the circuitry only consumes leakage current from the battery. The first two of these states are stable if IOT is held high while the latter two only if IOT is held low. Typically, IOT will be internally pulled low by a weak pulldown (e.g., FET 2130 in FIG. 21), so that a disconnected device is automatically held in the RESET state. The state 00000 is stable provided input node IOT is high (so lines IOT=1 and IOB=0) and input node INT ("interrupt" or "alarm") is low, and this is the reset or inactive state for the state machine when the host is not communicating with the module. Now two different inputs will cause a state change as indicated by the two decision rhomboids on the outgoing lines from rectangle 00000: namely, (1) IOT going low while INT remains low and (2) INT going high. The operation of the state machine for these two inputs is as follows:

If the host applies a low signal at input node IO (see FIGS. 2A-B and 3 and related discussion above) when the state machine is in state 00000, this drives input line IOT low (and line IOB high) which switches latch 2214 to yield the state 10000 as indicated in FIG. 22E by the IO/ALARM decision rhomboid with IO=0 and ALARM=0 output going down to Active state 10000 from upper Inactive state 00000. State 10000 drives latch 2208 to output a high to the EN input of oscillator TPOSC and thereby turn on TPOSC. Thus the timing signals GT1, GT5, GT8, GT20, and GT64 begin as shown in FIG. 22C, although for a read or write, TPOSC is disabled just after one or two periods and only in response to a reset signal from the host do GT5, GT8, or GT20 ever go high. In particular, consider the possible cases as follows.

First, presume that READ=0 and the host applies a low signal that lasts about 10 microseconds and then returns to a high; this would be the situation for a write of a 1 as illustrated in FIG. 2A. In this case the input IOT returns high prior to GT1 going high, and NAND gate 2225 goes low to switch latch 2213 and put state machine 2200 into state 11000; see the lefthand portion of state diagram FIG. 22E. Also, latch 2213 switching high makes NAND gate 2228 go low and, because NAND gate 2229 is low, inverted input AND gate 2238 high to thereby drive CLK node low. This is the clock output of converter 2102. Next, after GTI goes high (a maximum of 60 microseconds after the host had first driven the input node IO low), NAND gate 2227 goes high and switches latch 2211 to yield state 11010 which also drives NAND gate 2229 high and thus inverted input AND gate 2238 low and thus CLK output high again. But state 11010 drives NAND gate 2230 high and thus latch 2213 switches to put state machine 2200 into state 10010 (upper lefthand portion of FIG. 22E) because IOT is high. State 10010 switches latch 2208 to turn off oscillator TPOSC, and state machine is in an active idle state waiting for the host to drive IOT low for the next cycle; see FIG. 2A. Note that when state machine 2200 switched to state 11000, the latch 2233–2234 switches to have DOUT high (write a 1), but inverted input AND 2238 returning low does not switch latch 2233–2234 and DOUT remains high when CLK returns high. Also, the enable (CMDRST low) for command register 2104 is activated, so this 1 at DOUT appears at input node CMDDATA and loads into the first flip-flop of command register 2104. See FIG. 22G which shows both command register 2104 and decoder 2106. Note that upon a reset signal (a high at input node CMDRST) all of the flip-flops of register 2104 reset to Q=0 except the first flip-flop which sets to Q=1. As successive writes fill up register 2104, the initial 1 in the first flip-flop propagates through the the other eight flip-flops until the last flip-flop loads it and thereby stops the further clocking of register 2104 and activates decoder 2106 by releasing the output NAND gates from their fixed highs.

Second, presume that the host applies a low signal that lasts about 100 microseconds and then returns high; this would be the situation for a write of a 0 as illustrated in FIG. 2B. Again the low at IOT first switches the state machine into the 10000 state (either from the reset idle state 00000 or the active idle state 10010) and starts oscillator TPOSC. But in this case GT1 goes high (a maximum of 60 microseconds after TPOSC is enabled) prior to IOT returning high, and thus the state machine switches into state 10100 rather than state 11000 when IOT returns high. Again, the switch of states when IOT returns high drives CLK low, but by making NAND gate 2231 low which drives inverted input AND 2239 high and thus CLK low plus switches latch 2233–2234 high to drive output node DOUT low (write a 0). The switching output of inverted input AND 2239 to high also drives delay circuit DSM which after a delay of about 1000 nanoseconds switches latch 2211 to put state machine 2200 into state 10110 (see hexagonal block near center of FIG. 22E) and this returns CLK high and switches latch 2212 to put state machine into active idle state 10010. Thus the delay circuit DSM sets the CLK low pulse duration. Of course, CLK making the low-to-high transition clocks command register 2104 and loads the 0 at DOUT into the first fip-flop.

Third, presume that the host applies a low signal that lasts about 10 microseconds and then releases terminal IO in order to read a 0 or 1 as described in FIG. 3. Again, IOT going low switches state machine 2200 into state 10000. Then node READ high implies an immediate switch into state 11000; see the lefthand portion of FIG. 22E. This is similar to the situation for a write of a 1 described previously, and again gate 2238 goes high to drive CLK low and also supplies a high to NAND gate 2248. Node READ high is another high input to gate 2248; then if the signal at node DIN is low (as read a 0), this provides the third high to gate 2248, and gate 2248 is low which drives node IOPULDWN high to turn on pull down transistor PLDWN to pull down terminal IO which the host can sense as a low. Contrarily, if the signal at node DIN is high, then gate 2248 is high and node IOPULDWN remains low and node IO is not pulled down so the host can sense a high. The distinction between read and write (node READ high or low) derives from the command in 2108 or RAM 2110 outside of state machine 2200. Note that if READ is low, then gate 2248 is held high and does not drive IOPULDWN, so the data from RAM or ROM (depending upon the command in register 2104) at input node DIN is just ignored.

Note that IOPULDWN can also be activated to pull down terminal IO by either of inverted input AND gates 2262 and 2264 being high. Now gate 2262 is high precisely when state machine is in the states 0001x (that is, 00010 or 00011), and gate 2264 is high precisely when state machine is in the state 10101. These states correspond to alarm and presence detect states described in the following.

Lastly, presume that the host applies a low signal that lasts more than 480 microseconds; that is, long enough for GT8 to go high. In this case, IOT going low again puts state machine 2200 into state 10000 and starts TPOSC. But IOT remains low until GT8 goes high which switches state machine 2200 into reset state 10001 (center portion of FIG. 22E) which turns off TPOSC. Then when IOT returns high state machine 2200 switches into state 10011 and restarts TPOSC, and GT1 going high (after about 60 microseconds) now switches state machine 2200 into state 00011 and this has both NAND gates 2242–2243 high which, in turn, drives node IOPULDWN high to turn on transistor PLDWN for the presence detect signal. The presence detect signal persists until GT5 goes high to switch state machine 2200 into state 00001 and then back into either reset idle state 00000 if IOT is high or reset state 10001 if GT20 goes high while IOT is still low. Note that this GT20 test assures that a module which is discharged to ground at its IO terminal will eventually enter the reset state and always issue a presence detect signal. Also, note that if module 2100 is not connected to a bus, then the internal weak pulldown FET 2130 will make IO low and module 2100 is self resetting.

FIGS. 22H–22N are simulated timing diagrams for the write and read operations plus resets in the midst of write and read operations plus a self reset. State diagram FIG. 22E also shows an alarm/interrupt branch of operation that begins with a high on input node INT in FIG. 22B. A high on node INT makes NOR gate 2252 go high (presuming pending alarm latch 2250 is high as is the case for state 00000) which drives NAND gate 2254 high and this leads to latch 2211 switching to put state machine 2200 into state 00010. This starts TPOSC and when GT64 goes high state machine switches successively from state 00010 to state 00110 to state 00111 to state 10111 as illustrated in the righthand portion of FIG. 22E. As noted previously, state machine 2200 in state 10010 implies a pull down of terminal IO; and as seen in FIG. 22E, state 00010 persists until GT64 goes high, that is an alarm signal is generated by pulling down terminal IO for about 3.84 milliseconds. Note that the other branch of alarm states beginning from the reset state 10001 (near the center of FIG. 22E) stays in alarm state 10101 (which also pulls down terminal IO as previously seen) until GT64 goes high.

For a one-wire multidrop system (that is, multiple modules on a 1-wire bus with a bus master host) supporting interrupts a particular concern is the collision of interrupts with either other interrupts or normal communication. Several interrupt priority schemes are possible and in this implementation normal communication is given priority over interrupts. Hence the state machine 2200 is designed such that an asynchronous interrupt will not corrupt an ongoing one-wire communication. There are two states from which a latched interrupt signal ALARM can cause state transitions. The first is the RESET IDLE state 00000 which is the normal idling condition of a system that wishes to enable interrupts. This state is entered after a reset and presence detect and allows interrupts to be issued as soon as they occur. A special one time only signal (OTA at NOR gate 2252) is used to service interrupt request from the RESET IDLE state. This is necessary because the module will eventually return to this same RESET IDLE state. In order to prevent a module from continuously issuing its alarm in a never ending cycle this one time only signal is used. The only other state from which an alarm may cause a transition is the RESET 10001 state. Thus ongoing communication is not disturbed and pending interrupts are not issued until the master of the bus has issued a reset and is prepared to check for interrupts. This mode of issuing an interrupt is not a one time only event and each time a reset is issued the module will enter the ALARM4 state 10101 until the interrupting source has been reset.

Note that various applications of the modules will use the interrupt/alarm capability during normal operation as discussed in connection with applications in the following.

When a module is first connected to a host (perhaps along with other similar modules on a bus), and the host is quiescent (holding the node IO high), the module eventually goes into one of the reset states 00000 and 10010, depending upon its previous condition, and waits for a low signal from the host. Note that in both of these states TPOSC is disabled, so the state machine does not draw any current. Indeed, consideration of the inputs to latch 2208 shows that each of the three inverted AND gates feeding the upper NOR gate corresponds to one of the reset states 10010, 10001, and 00000 to disable TPOSC. But a high node IO (as is the case for a disconnected module due to pull up transistor PULUP connected to node IO) will switch state machine from reset state 10001 to state active state 10011, then after GT1 goes high to state 00011 (presence detect signal), and next after GT5 goes high (300 microseconds) to state 00001, and then to 00000 due to IO still high. Thus reset state 10001 can only be maintained by holding IO low. And as previously noted, while in state 00011 IOPULDWN is active to pull down terminal IO and generate the presence detect signal.

Overall Module Operation

As previously noted, the overall module operation follows a three layer hierarchical procedure: in the first layer the host sends a reset command by holding the IO node low for at least 480 microseconds and then returning IO to high for at least 480 microseconds. This causes module to generate a presence detect signal by pulling node IO low for at least 60 microseconds as described in connection with FIG. 22F. The reset command also clears the command register 2104 and sets the module in a mode for the host to write a byte (8 bits) into command register 2104 in the next eight write cycles as illustrated in FIGS. 2A-B and described in connection with FIGS. 22B–E. Once command register 2104 is loaded with a command byte, command byte decoder 2106 decodes the command byte to initiate one of the four allowed commands: READ ROM DATA, MATCH ROM DATA, SEARCH ROM DATA, and SKIP ROM SECTION of the second layer. See FIG. 22G. (If the byte in command byte decoder 2106 fails to match one of the available commands, then the module will simply wait for a reset and ignore further commands at its inputs.) These commands employ identification data from the 64-bit ROM in 2108 and incorporate the security aspects of the module. The upper portion of FIG. 23A illustrates the flow. Successful execution of the second layer command outputs a high at node PROT_OK to activate RAM 2110 which has its own command register and decoding. The activated RAM 2110 reads the next three bytes sent by the host into a three-byte command register. These third layer commands are available for access to the secure RAM 2110. The lower portion of FIG. 23A shows the execution of these third layer commands. Note that the flow paths all end in a reset. Also, the second layer commands dealing with the 64 bit ROM may have simple hardware support in that the entire 64 bits are read or compared so the addressing can be simply incrementation and the successive comparisons just fed to a latch that switches if a mismatch occurs; see FIG. 22A. The following preferred embodiment discussions explain these commands and variations in detail.

A preferred embodiment module 2300 has memory 2110 partitioned into three secure and one nonsecure areas which provides functionality as follows. The embodiment is a miniature security system that can store data in three separate, secure memory areas (subkeys) or in a general-purpose scratchpad area. Each of the subkeys and the scratch memory can be directly accessed. In addition, data can be written to the scratchpad memory, verified, and then loaded into one of the subkeys. Each subkey has an 8-byte ID field and 8-byte password associated with it; see FIG. 23B. The module 2300 communicates over the 1-wire bus. Since the bus supports multiple modules, all bus elements have a unique 48-bit ID for identification on the bus. The durable token package (FIGS. 1A-B) has only two electrical contact points, or faces, which makes this a rugged device for use in harsh environments. A built-in battery maintains data up to two years, or power can be drawn from the 1-wire bus.

The module 2300 is accessed via a single data line using the 1-Wire protocol. The communication sequence, independent of the device, has two distinct subsequences: the 1-Wire device selection sequence (second layer command) and the device-specific command sequence (third layer command). The 1-Wire sequence precedes the device-specific command sequence to identify the particular device on the bus.

Second Layer Commands

The 1-Wire protocol defines the System as a single bus master system with single or multiple slaves. In all instances, the module 2300 is a slave. The bus master is typically a microcontroller. The discussion of this protocol is broken down into two topics: hardware configuration and transaction sequence.

The 1-Wire bus has only a single line, by definition; it is important that each device on the bus be able to drive it at the appropriate time. To facilitate this, each device attached to the 1-Wire bus must have open drain connections. The module 2300 is an open drain part with an internal circuit equivalent to that shown in FIG. 23L. Ideally, the bus master should also be open drain; but if this is not feasible, two standard TTL pins can be tied together, one as an output and one as an input. When using a bus master with an open drain port, the bus requires a pull-up resistor at the master end of the bus. The system bus master circuit should be equivalent to the one shown in FIGS. 23M-23N. The value of the pull-up resistor should be greater than 5K ohms. If the pull-up value is less, the bus may not be pulled to an adequately low state (<0.6 volts).

The idle state for the 1-Wire bus is high. If for any reason a transaction needs to be suspended, the bus MUST be left in the idle state if the transaction is to resume. If this does not occur and the bus is left low for more than 480 microseconds, all components on the bus will be reset.

The protocol for accessing the memory of module 2300 is as follows:

Reset

Presence Detect

1-Wire Command Word (second layer command)

Device Command Word (third layer command)

Transaction/Data

CRC

All transactions on the 1-Wire bus begin with the reset sequence. The reset sequence is started by holding the data line low for 480 microseconds. The module 2300 is designed to be held in the reset state whenever it is not connected to the bus. When it is connected to the bus, the data line is pulled high; the part is taken out of reset and the part is ready to issue the presence detect.

After detecting a high state on the data line, the module 2300 waits 15 microseconds minimum and issues its presence detect. This presence detect is a low-going pulse that lasts 60–240 microseconds. This response to the reset pulse lets the bus master know that the module 2300 is on the bus and is ready to operate. The presence detect helps the bus master to discriminate the communication signals from noise, as the module 2300 is taken on and off the bus. Refer to the timing diagram in FIG. 23O. In a zero power standby condition the bus master can be idle and the presence detect signal used to wakeup the system.

Figures 23D, 23E, 23F:
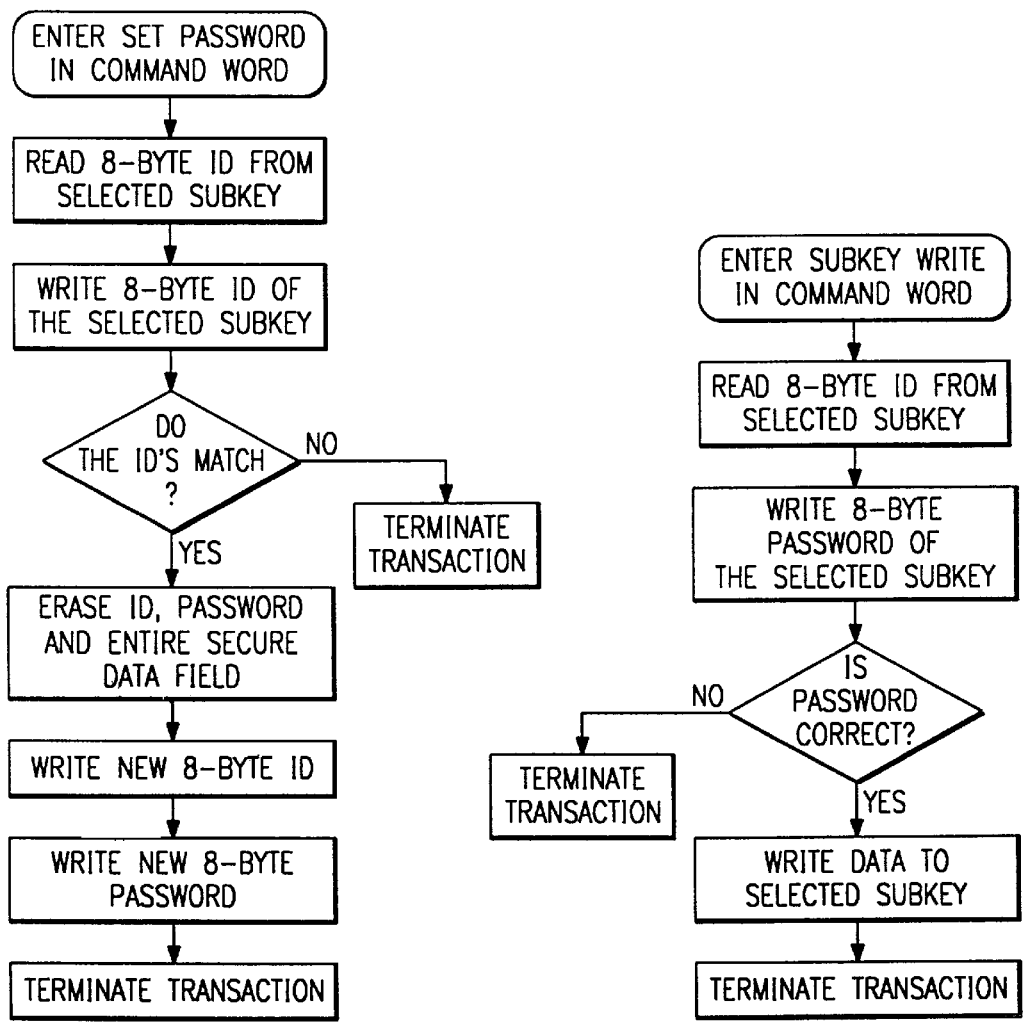
Figure 23G:
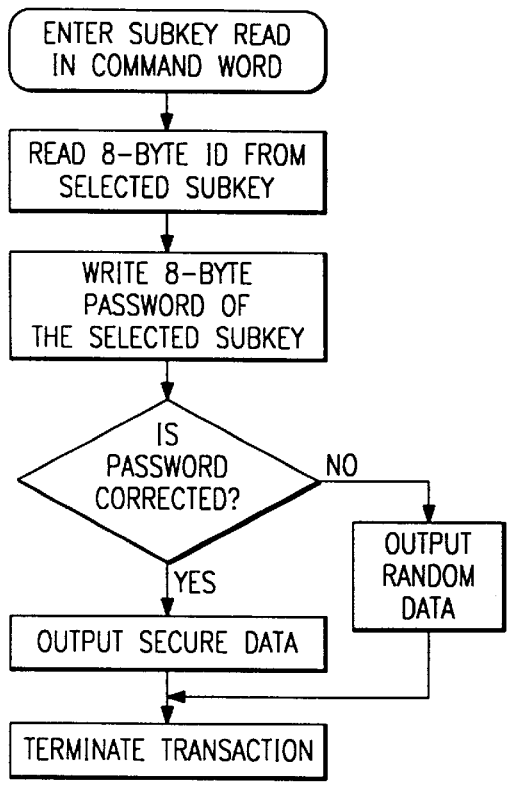
Figure 23H:
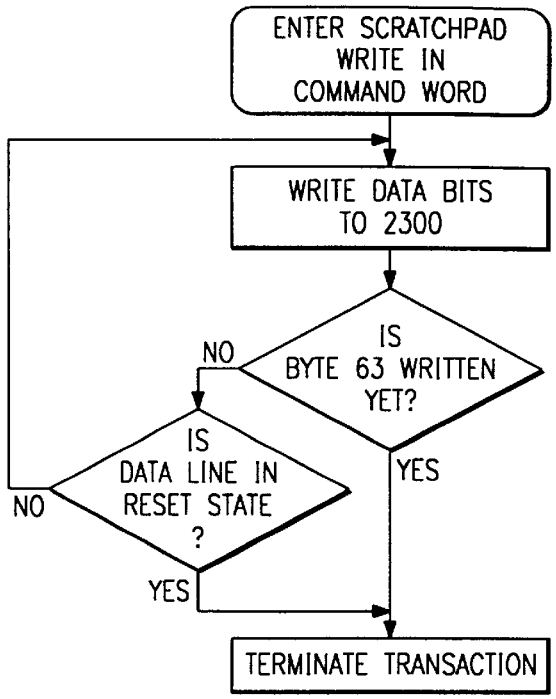
Figure 23I:
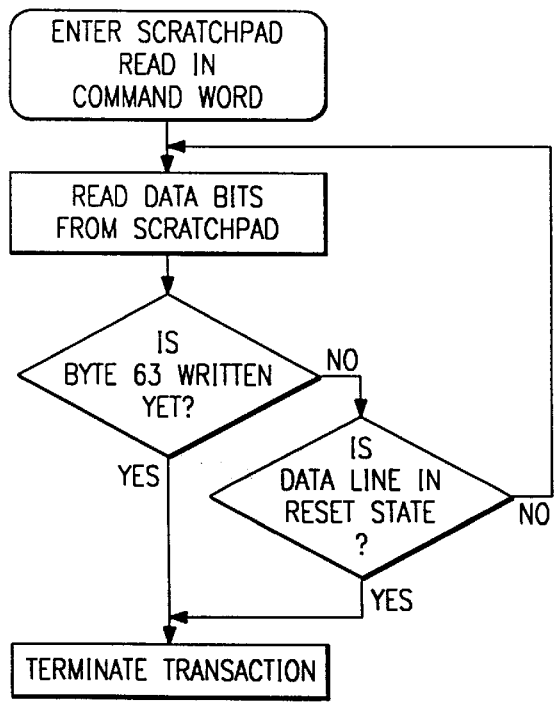
Figure 23L:
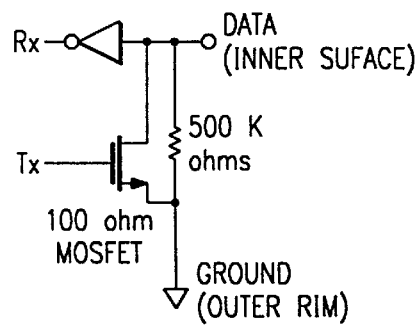
Figure 23J:
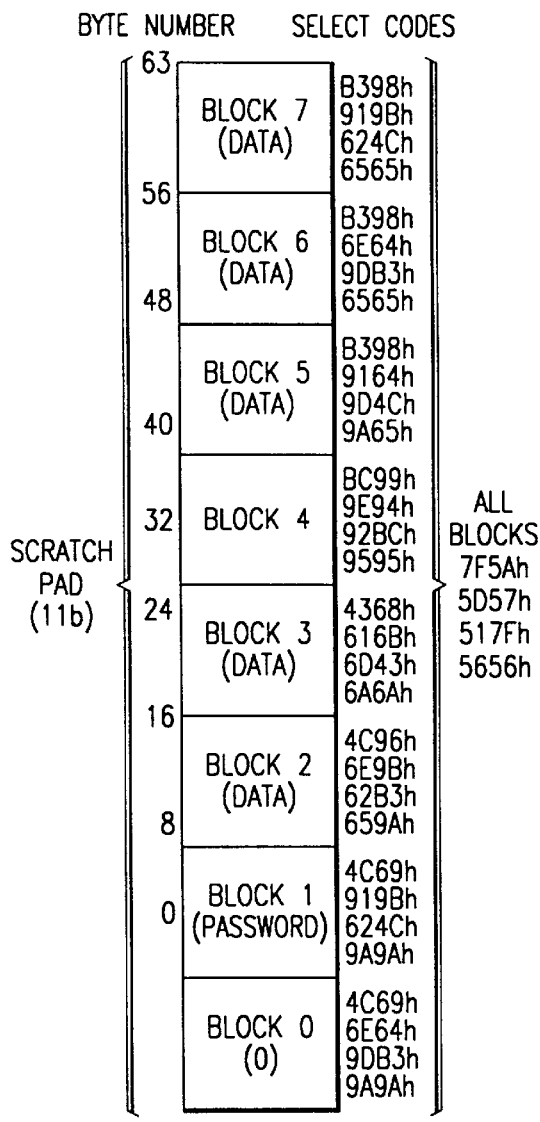
Figure 23K:
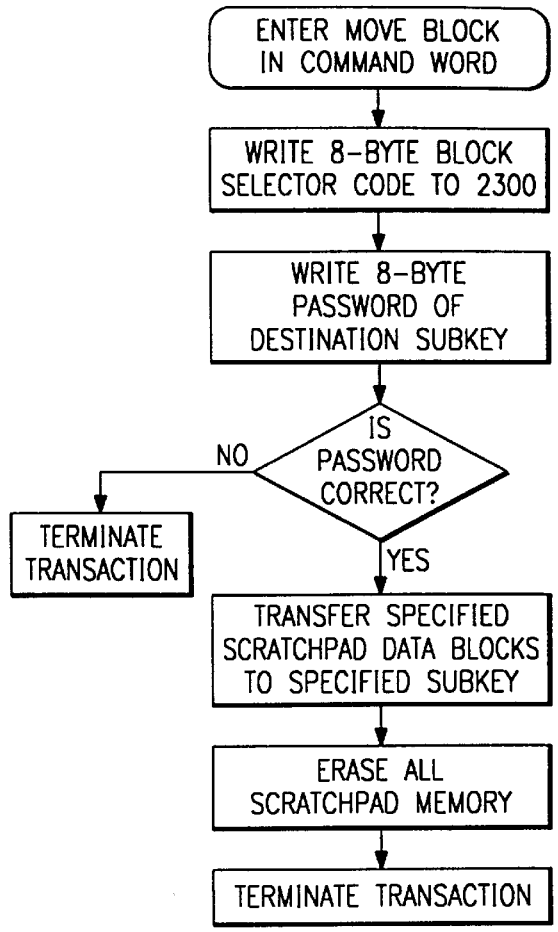
Figure 23M:
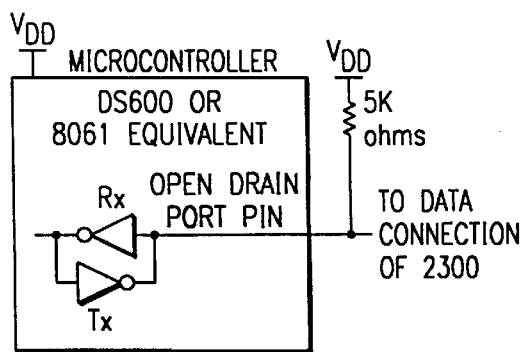
Figure 23N:
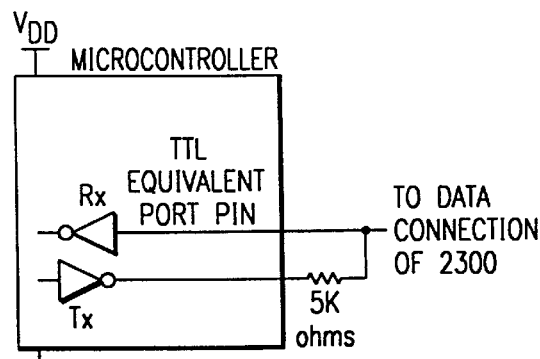
Figure 23O:
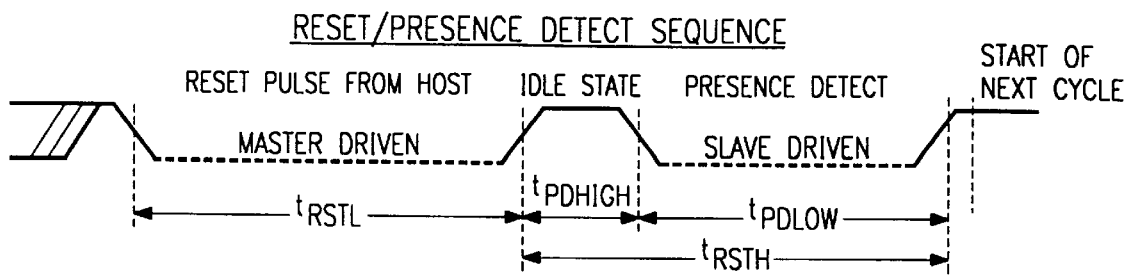

After the module 2300 has responded to the reset pulse with a presence detect, the bus master drives the bus to the idle state for a minimum of 1 microsecond. This 1 microsecond interval is like a frame sync. After each bit is transmitted on the bus, there is a frame strobe to sync up for the next transmission. Refer to FIG. 23O.

Once the bus master has detected a presence, it can issue one of the four different 1-Wire bus commands. Also, a fifth command to test a battery may be available; see the discussion in connection with the battery test circuitry illustrated in FIG. 33. All 1-Wire commands are 8-bits long and are loaded into the command register and decoded as previously described in connection with FIGS. 22A–H. A list of these commands is as follows:

CC (Hex) Pass Thru Mode

This command saves time by allowing direct access to the module 2300 without identifying it by ROM ID number. This command can only be used when there is a single slave on the bus. If more than one device is present, there will be bus contention.

33 Read ROM Data

This command allows the bus master to read the module 2300's unique 48-bit ID number and CRC. This command can only be used if there is a single module 2300 on the bus. If more than one is present, there will be bus contention.

55 Match ROM Data

This mode allows the bus master to single out a specific module 2300 on a multidrop bus. The bus master selects the specific slave by the ROM ID number for the transaction. This command can be used with a single or multiple devices on the bus; however, the specific ID of a desired module must be a prior known by the bus master.

FO Search ROM Data

When a system is initially brought up, the bus master might not know the number or types of devices on the bus. By invoking the Search ROM Data command, the bus master can, by process of elimination, find the ID numbers of all the devices on the bus. Once this is known, the bus master can then go back and read the device type that corresponds to each ID number.

ID SEARCH MODE

The ID search mode allows the host CPU to quickly compile a complete list of all the ID numbers of all the devices which are attached to a common one-wire data bus. In this mode, each of the bits of the ID requires three time slots of communication on the one-wire bus. The first two time slots are read time slots in which the device transmits back to the host CPU the value of the ID bit followed by its complement. The third time slot is a write time slot in which the host CPU supplies its desired value for the bit. The device then compares the desired value with the actual bit. If they disagree, the device waits for 480 microseconds of continuous low (reset) on the bus and then reverts to its initial state. If they agree, the device increments its internal counter to point to the next bit in the ID and then repeats the same set of three time slots for the next bit; see FIG. 23A. If all bits of the ID are matched correctly during this process, the bus is coupled internally to the underlying logic. After 480 microseconds of continuous low on the bus, the device decouples the underlying logic and reverts to its initial state. If there is 480 microseconds of continuous low on the bus at any time during the ID search process, the device reverts to its initial state.

EXAMPLE OF ID SEARCH

The following example of the ID search process assumes four different devices connected to the same data line. The ID numbers of the four devices begin as shown below:

ID0: 00110101 . . .
ID1: 10101010 . . .
ID2: 11110101 . . .
ID3: 00010001 . . .

A complete search to identify these four devices is described below:

1. The host CPU begins by waiting 480 microseconds with the bus pulled low, releasing the bus for another 480 microseconds, and then supplying the execution code to select the ID search mode.
2. The CPU executes two read time slots and receives two zero bits. This indicates that both one bits and zero bits exist as the first bit of the ID's on the bus.
3. The CPU supplies a write zero time slot as the third slot in the set of three. This deselects ID1 and ID2 for the remainder of this search pass, leaving only ID0 and ID3 coupled to the system.
4. The CPU executes two read time slots and receives a zero bit followed by a one bit. This indicates that all the devices still coupled (ID0 and ID3) have zero as their second ID bit.
5. The CPU supplies a write zero time slot as the third time slot to keep ID0 and ID3 coupled.
6. The CPU executes two read time slots and receives two zero bits. This indicates that both one bits and zero bits exist as the third bit of the ID's of devices still coupled.
7. The CPU supplies a write zero time slot as the third bit. This decouples ID0, leaving only ID3 still coupled.
8. The CPU reads the remainder of the ID bits for ID3 and communicates to the underlying logic if desired. This completes the first ID search pass, in which one of the ID's was found.
9. The CPU starts a new ID search sequence by repeating steps 1 through 6.
10. The CPU supplies a write one time slot as the third bit rather than the write zero of step 7. This decouples ID3, leaving only ID0 still coupled.
11. The CPU reads the remainder of the ID bits for ID0 and communicates to the underlying logic if desired. This completes the second ID search pass, in which another of the ID's was found.
12. The CPU starts a new ID search by repeating steps 1 through 2.
13. The CPU supplies a write one time slot as the third slot in the set of three rather than a write zero as in step 3. This deselects ID0 and ID3 for the remainder of this search pass, leaving only ID1 and ID2 coupled to the system.
14. The CPU executes two read time slots and receives two zeros.
15. The CPU supplies a write zero time slot as the third bit. This decouples ID2, leaving only ID1.

16. The CPU reads the remainder of the ID bits for ID1 and communicates to the underlying logic if desired. This completes the third ID search pass, in which another of the ID's was found.
17. The CPU starts a new ID search by repeating steps 12 through 14.
18. The CPU supplies a write one time slot as the third bit. This decouples ID1, leaving only ID2.
19. The CPU reads the remainder of the ID bits for ID2 and communicates to the underlying logic if desired. This completes the fourth ID search pass, in which another of the ID's was found.

Note the following points with regard to the above example:

1. The host CPU learns the unique ID code of one device on each ID search operation. The time required to find each ID, assuming that no communication is performed to the underlying logic, is:

960 microseconds+(8+3×64)×61 microseconds=13.16 milliseconds

The host CPU is therefore capable of identifying 75 device ID's per second.

2. The data obtained from the two read time slots of each set of three have the following interpretations:
   a. 00: There are devices still coupled which have conflicting ID bits in this position.
   b. 01: All devices still coupled have zero in this bit position.
   c. 10: All devices still coupled have one in this bit position.
   d. 11: There are no devices still coupled. (This is an error condition.)

In the event that the logic of the connection between the various devices on the common bus is such as to wire-or the data instead of wire-anding it, then the interpretations associated with 00 and 11 above are interchanged. (This might be the case for RF devices.)

All communications on the 1-Wire bus begin with the reset and presence detect sequence. This sequence ensures the module 2300 is in the listening mode. The bus master host CPU must then transmit the 1-Wire command to the module 2300. To transmit the first bit of the 1-Wire bus command word, the master pulls the bus low for 1 microsecond. This low-going edge informs the module 2300 that the first bit is being sent. After 1 microsecond, the master does one of two things:

1) holds the line low for an additional 60 microseconds to output a 0 (writes a zero) or
2) lets the bus go high for an additional 60 microseconds (writes a one).

Figure 23P:
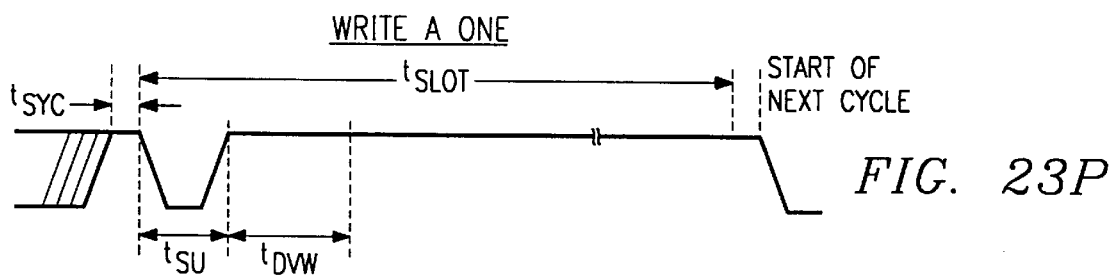
Figure 23Q:
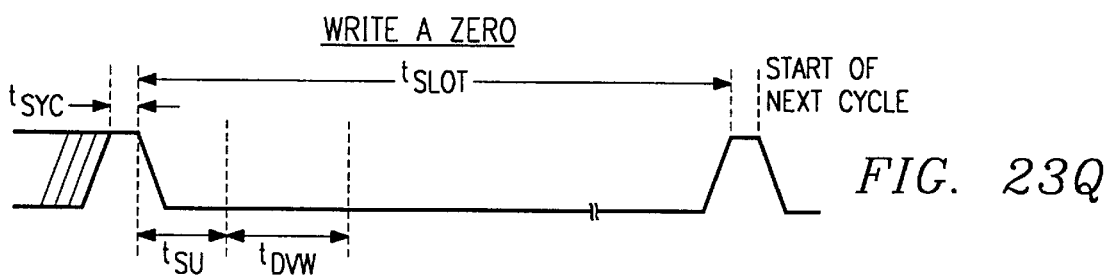

The state of the bus during this 60 microsecond time phase determines the value of the bit. The module 2300 will sense any rising edge during this 60 microsecond time phase as a one. After the 60 microseconds have lapsed, the bus master must then drive the bus high for 1 microsecond. This is the frame sync mentioned earlier. This process is repeated until all the 8 bits are transmitted. Refer to the timing diagram in FIGS. 23P-23Q.

Figure 23R:
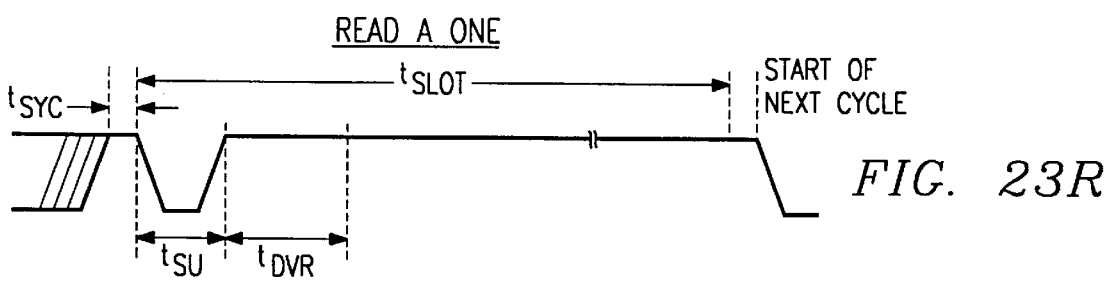
Figure 23S:
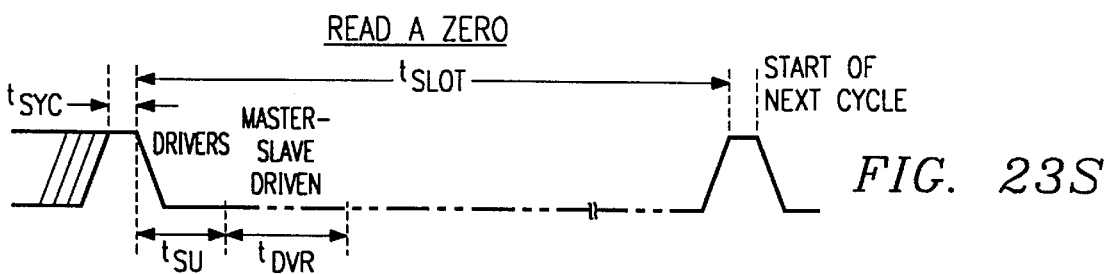

The bus master now reads the family code identifier, followed by the data and a CRC. The read cycle is similar to the write cycle. It is started with the bus master pulling the bus low for 1 microsecond. This informs the module 2300 that it should have data on the bus no later than the 1 microsecond from the falling edge. After the 1 microsecond, the bus master lets go of the bus and the module 2300 drives the bus. The slave must hold the data on the bus for an additional 14 microseconds minimum (59 microseconds maximum). During the module 2300 holding time, the bus master reads the state of the bus. Ideally, the bus master should read data from the bus 15 microseconds after the falling edge. The entire cycle time for one bit lasts a minimum of 60 microseconds (120 microseconds maximum) from the falling edge. At the end of the cycle, the bus master drives the bus high for 1 microsecond. Again, this is like a frame sync for the next bit. This read sequence is repeated until all the data has been read. See the timing diagram in FIGS. 23R-23S for details. If for any reason the transaction needs to be terminated before all the data is read, the module 2300 must be reset.

To validate the transmitted data from the module 2300, the bus master may generate a CRC value from the data as it is received. This generated value is compared to the value stored in the last eight bits of module 2300. The bus master computes the CRC over the 8-bit family code and all 48 ID number data bits, but NOT over the stored CRC value itself. If the two CRC values match, the transmission is error free.

Alternatively, the bus master computes the CRC over the 8-bit family code, all 48 ID number data bits, and the stored CRC value. If the value of the CRC value so computed is zero, then the transmission is error-free.

An example of how to generate the CRC using assembly language software is shown in Table 1.

TABLE 1

| DO_CRC: | PUSH | ACC | ;save the accumulator |
|---|---|---|---|
| | PUSH | B | ;save the B register |
| | PUSH | ACC | ;save bits to be shifted |
| | MOV | B,#8 | ;set shift = 8 bits |
| | | | ; |
| CRC_LOOP: | XRL | A,CRC | ;calculate CRC |
| | RRC | A | ;move it to the carry |
| | MOV | A,CRC | ;get the last CRC value |
| | JNC | ZERO | ;skip if data = 0 |
| | XRL | A,#18H | ;update the CRC value |
| | | | ; |
| ZERO: | RRC | A | ;position the new CRC |
| | MOV | CRC,A | ;store the new CRC |
| | POP | ACC | ;get the remaining bits |
| | RR | A | ;position the next bit |
| | PUSH | ACC | ;save the remaining bits |
| | DJNZ | B,CRC_LOOP | ;repeat for eight bits |
| | POP | ACC | ;clean up the stack |
| | POP | B | ;restore the B register |
| | POP | ACC | ;restore the accumulator |
| | RET | | |

This assembly language code is written for the DS5000 Soft Microcontroller. The procedure DO_CRC calculates the cumulative CRC of all the bytes passed to it in the accumulator. Note that the variable CRC needs to be initialized to zero before the procedure is executed. Each byte of the data is then placed in the accumulator and DO_CRC is called to update the CRC variable. After all the data has been passed to DO_CRC, the variable CRC will contain the result. The equivalent generating polynomial function of this software routine is:

$$x^4+x+1$$

Third Layer Commands are initiated after the completion of a second layer command and signalled by the PROT_OK line going active to indicate that a valid second layer protocol has been satisfied.

Third Layer Commands

The module 2300 has six device-specific commands: Scratchpad Write, Scratchpad Read, Subkey Write, Subkey Read, Set Password and Move Block. This constrasts with the preferred embodiments having the four commands illustrated at the bottom of FIG. 23A.

The module 2300 is controlled through a three-byte command word. After the device is selected (by a second layer command), the command word is written into a register in memory 2110. The command word is comprised of three fields, each one byte long. The least significant byte is the function code field. This field defines the six commands that can be executed. The second byte is the address field. The first six bits of this field define the starting address of the command. The last two bits of this field are the subkey address code. The third byte of the command word is a complement of the second byte (FIG. 23C). Each command in the command word is address specific and therefore precludes the use of certain subkey codes and starting address locations (FIG. 23D).

Each of the subkeys within the module 2300 is accessed individually. Transactions to read and write data to a secured subkey start at the address defined in the command word and proceed until the device is reset or the end of the subkey is reached. The three commands that operate on the secure subkeys are Set Password, Secure Data Write, and Secure Data Read.

The Set Password command is used to enter the ID and password of the selected subkey. This command will erase all of the data stored in the secure area as well as overwrite the ID and password fields with the new data. The module 2300 has a built-in check to ensure that the proper subkey was selected. The sequence begins by reading the ID field of the selected subkey; the ID of the subkey to be changed is then returned. If the ID's do not match, the sequence is terminated. The command sequence is shown in FIG. 23E.

The Subkey Write command is used to enter data into the selected subkey. Since the subkeys are secure, the correct password is required to access them. The sequence begins by reading the ID field; the password is then written back. If the password is incorrect, the transaction is terminated. Otherwise, the data following is written into the secure area. The starting address for the write sequence is specified in the command word. Data can be continuously written until the end of the secure subkey is reached or until the module 2300 is reset. The command sequence is shown in FIG. 23F.

The Subkey Read command is used to retrieve data from the selected subkey. Since the subkeys are secure, the correct password is required to access them. The sequence begins by reading the ID field; the password is then written back. If the password is incorrect, the module 2300 will transmit random data. Otherwise, the data can be read from the subkey. The starting address is specified in the command word. Data can be continuously read until the end of the subkey is reached or until the module 2300 is reset. The command sequence is shown in FIG. 23G.

The 64-byte read/write scratchpad of the module 2300 is not password-protected. The scratchpad can be used to store unsecured data or it can be used to build up a data structure which can be verified and transferred to a secure subkey. The three commands that operate on the scratchpad are Scratchpad Write, Scratchpad Read, and Move Block. A buffered write capability is particularly invaluable in systems with non-ideal communication links. In such a system without buffered writes there is a distinct possibility of communication problems occurring concurrent with updating of memory. This leads to the possibility of a supposed database consisting of partially old, partially new, and partially garbage data. The write then verify then transfer capability is enabling for a sacrosanct database.

The Scratchpad Write command is used to enter data into the scratchpad. The starting address for the write sequence is specified in the command word. Data can be continuously written until the end of the scratchpad is reached or until the module 2300 is reset. The command sequence is shown in FIG. 23H.

The Scratchpad read command is used to retrieve data from the scratchpad. The starting address is specified in the command word. Data can be continuously read until the end of the scratchpad is reached or until the module 2300 is reset. The command sequence is shown in FIG. 23I.

The Move Block command is used to transfer specified data blocks from the scratchpad to a selected subkey. This command might be used when data verification is required before storage in a secure subkey. Data can be transferred in single 8-byte blocks or a large 64-byte block. There are nine valid block selector codes that are used to specify which block is to be transferred (FIG. 23J). As a further precaution against accidental erasure of secure data, the 8-byte password of the destination must be entered. If the password does not match, the operation is terminated. After the block of data is transferred to the secure subkey, the data in that block of the scratchpad is erased. The command sequence is shown in FIG. 23K.

Application Modifications

Various applications make use of various capabilities of the module, and the module may be modified or simplified accordingly. Indeed, modules may be used one at a time or many may be simultaneously attached to a 1-wire bus; the module may be in the form of a coin-shaped token or may be a traditionally packaged integrated circuit; the module may have a self-contained power supply (battery) or may tap power from the host or may have a separate power supply input (which implies a third terminal and thus not easily adaptable to the coin-shaped package); and module may have a control or sense terminal (again a third terminal). The SEARCH ROM DATA command permits identification of individual modules among many simultaneously attached to a 1-wire bus, but this command would not be needed if only one module were used and the READ ROM DATA would suffice.

Some further applications for the module only use the identification data in ROM 2108 and RAM 2110 finds no use. In such a case the module circuitry could be simiplified by omission of the RAM 2110 and its attendant control circuitry. That is, only the upper center and lefthand portions of FIG. 23A would be used and after a successful bit match through all 64 bits the module would output an indicative signal. Note that if only a single module were to be used (such as for identification on a printed circuit board with the module packaged in a standard TO-92 plastic package and soldered to the board), then only the READ ROM DATA command may be needed and further simplify the circuitry. In such a case a further preferred embodiment module could be configured so that a host or bus master microcontroller need not send a read command, but rather after reset such module is in a read mode. Contrarily, note that multiple identification-only modules could be simultaneously connected to a bus so that the SEARCH ROM DATA command may be repeatedly used to determine each of the identification numbers of the modules.

The following application modifications and variations of the module aid understanding of its characteristics and features.

Figure 24A:
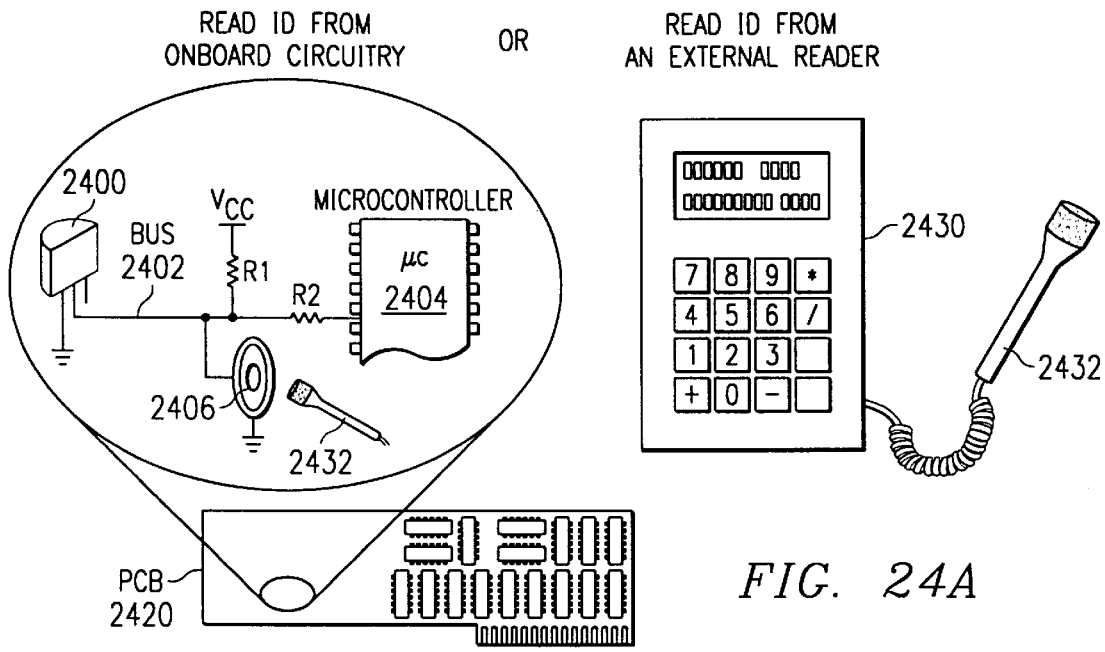
FIGS. 24A, 24B, 24C, 24D, and 24E show various connections of the embodiments on printed circuit boards.
Figure 24B:
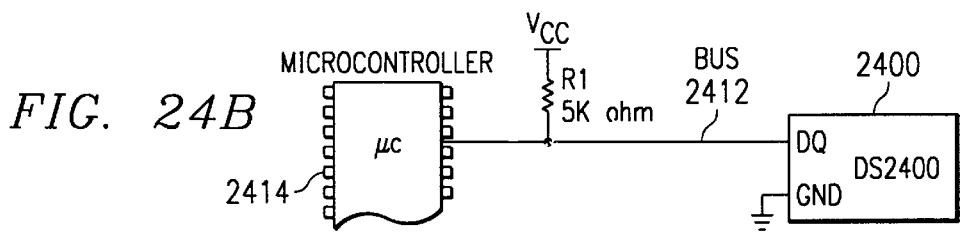

Preferred embodiment module 2400 includes a ROM containing a 48-bit serial number, an 8-bit model number, and an 8-bit cyclic redundancy check (CRC) byte. Module 2400 may be accessed to read its serial number as noted in connection with the READ ROM DATA, and thus attaching module 2400 to an item provides an identification tag for the item. Module 2400 has only two terminals for connection with the outside world: ground and the 1-wire bus connection IOPAD; the power for module may be a battery packaged within module 2400 or may be drawn from the 1-wire bus through a diode so (as to not affect bus operation) and stored on a capacitor. Note that the preferred battery setup would be a 1.5 volt lithium or silver oxide battery and low voltage CMOS FETs for the circuitry. If power is drawn from the 1-wire bus, then a diode plus storage capacitor with Zener diode voltage regulation could be used to power module 2400 at any convenient voltage up to the 5 volts that the 1-wire bus typically is driven by high outputs of the bus master. Of course, if module 2400 dissipates a large amount of power, then the bus master must be able to source large currents and the resistance of the bus must be kept low. A large number of low power dissipation modules can draw power from a single 1-wire bus. FIG. 24A shows module 2400 in a TO-92 package and mounted on printed circuit board (PCB) 2420; the ground terminal of module 2400 simply connects to the ground bus on PCB 2420, and terminal IOPAD connects by 1-wire bus 2402 to an input/output pin of microcontroller 2404 which is part of the array of integrated circuits on PCB 2420 and also to a probe point in the form of a plated through hole 2406 in PCB 2420 as shown in detail in FIG. 24C. This use of module 2400 provides an identification tag for PCB 2420 which may be read by microcontroller 2404 or by probe reader 2430 with probe 2432. FIG. 24B shows the basic connection of module 2400 to microcontroller 2414 without a probe point 2406 on PCB 2420. Module 2400 presents a high impedance to the I/O pin of microcontrollers 2404 and 2414 except when module 2400 applies a pull down. Thus module 2400 could be attached in parallel with other integrated circuits such as memories; the chip enable control of memories will keep them from contending with module 2400. Microcontrollers 2420 and 2414 typically will have open collector I/O pins when they are inactive, so 5K ohm pull up resistor Rl will hold an inactive I/O pin high. Of course, resistor R1 could be fabricated as part of module 2400 and the third lead from the TO-92 package could be connected to the power supply bus of PCB 2420. Additionally, the probe point on PCB 2420 for contact with an external probe 2432 would permit an external reader 2430 to communicate with module 2400 even if PCB 2420 is not powered up; external reader 2430 would pull up the 1-wire bus and supply the power for a module 2400 that draws power from the 1-wire bus.

The probe point 2406 on PCB 2420 could be replaced by a two-pin header affixed to PCB 2420, and probe reader 2430 could just be a two-pin header connector and plug directly into a personal computer or other reading device.

Microcontrollers 2404 and 2414 read the 48-bit serial number, the 8-bit model number, and the 8-bit CRC byte from module 2400 as follows. First, the microcontroller resets module 2400 by pulling 1-wire bus 2402 or 2414 low for at least 480 microseconds and then releasing bus 2402 or 2414 to go high for at least another 480 microseconds. Module 2400 recognizes the 480 microsecond low as a reset (see prior discussion) and in response resets its internal circuitry and provides a presence detect signal (to inform the microcontroller of the existence of module 2400) by pulling the bus low for between 60 and 240 microseconds during the 480 microsecond release by the microcontroller. See FIG. 22F which is a timing diagram. Note that the uncertainty in the duration of the presence detect signal generated by module 2400 reflects the uncertainty in the internal clock of module 2400.

After microcontroller 2404 or 2414 resets module 2400 and waits the 480 microseconds with bus 2402 or 2412 released and detects the presence signal of module 2400, it then serially writes the eight bits 0000 1111 (OF in hexadecimal) forming the read command into the command register of module 2400, one bit at a time, as previously described in connection with FIGS. 2A-B. The module clock period will be between 15 and 60 microseconds so the set up time is taken enough less than 15 microseconds to allow for the bus to be pulled high within 15 microseconds if the microcontroller is to write a 0. Now the set up time being less than 15 microseconds implies that the start of the second clock period after the initial pull down by the microcontroller will be during a constant low or a constant high on the bus according to whether a 0 or a 1 is being written; the minimum clock period of 15 microseconds means that the start of the second clock period is at 15 microseconds after the initial pull down and with the maximum clock period is at 60 microseconds after the initial pull down. After each bit write, the microcontroller releases the bus to return high, and then initiates the next bit write by pulling the bus low for the set up time again. Module 2400 recognizes each pulling of bus 2402 low as the beginning of a bit read or bit write or a reset and starts its internal clock, note that the reset is distinguishable because no pull down (new read or write beginning) occurs for at least eight clock periods (480 microseconds is at least eight clock periods if a clock period is between 15 and 60 microseconds).

Once the eight bits of the 1-wire command byte are written into the command register of module 2400, module 2400 recognizes the command byte and switches to read mode. Thus when microcontroller 2404 or 2414 next pulls down bus 2402 or 2412 for the set up time, the response of module 2400 is to immediately activate its pull down of the bus (which is already low due to the microcontroller) and access its memory: if the bit at the current address in memory is a 0, then module 2400 continues its pull down of the bus for the duration of a clock period (15 to 60 microseconds), whereas if the bit at the current address in memory is a 1, then module 2400 immediately release the bus. The microcontroller then reads the bit at the current address in module 2400's memory by sensing whether the bus stays low or returns high at the end of its pull down for time period. Of course, the microcontroller must complete its sensing of the status of the bus prior to module 2400 terminating its pull down in the case of a 0 in memory. Again, after the bus has returned high, the microcontroller is able to initiate another bit read by pulling down the bus for the set up time, but to simplify the timing microcontroller will wait a full time slot prior to the next read; see FIG. 3. The address counter in module 2400 increments each time the microcontroller reads a bit, and the initial reset of module 2400 puts the address counter a memory location 00. In this manner the microcontroller can sequentially read all 64 bits in module 2400's ROM by supplying the pull downs to initiate the reads. After reading the 8-bit model number and 48-bit serial number, the microcontroller can compute the CRC value for these 56 bits and compare the result with the 8-bit CRC byte read. If there is a disagreement in CRC values, then the reading process may be repeated, starting with the reset and command write. A discrepancy in CRC values indicates a likely corruption of data during transmission. In short, the microcontroller or external reader 2430 with probe 2432 can read the PCB identification number plus CRC check byte held in the ROM of module 2400 in a time of about $480+480+8t_{SLOT}+64t_{SLOT}$ which is typically about 8.2 microseconds for $t_{SLOT}$ taken to be about 100 microseconds.

The CRC byte stored in module 2400 ROM is computed from the serial number by the usual CRC algorithm using as generating polynomial $x^4+x^3+1$.

Note that since only the contents of module 2400 are read, there is no need of the flexibility of being able to write a read command to the command register of module 2400. Hence, a version of module 2400 without any command register and which just permits a host microcontroller to read its ROM contents after the reset (and presence detect, if incorporated) has been completed.

Figure 24D:
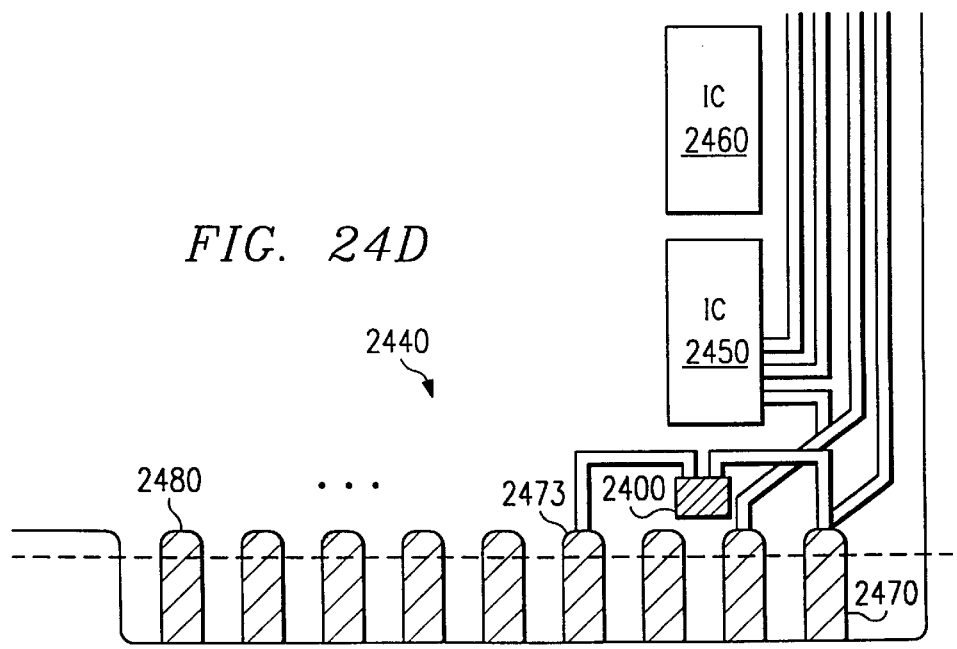
Figure 24C:
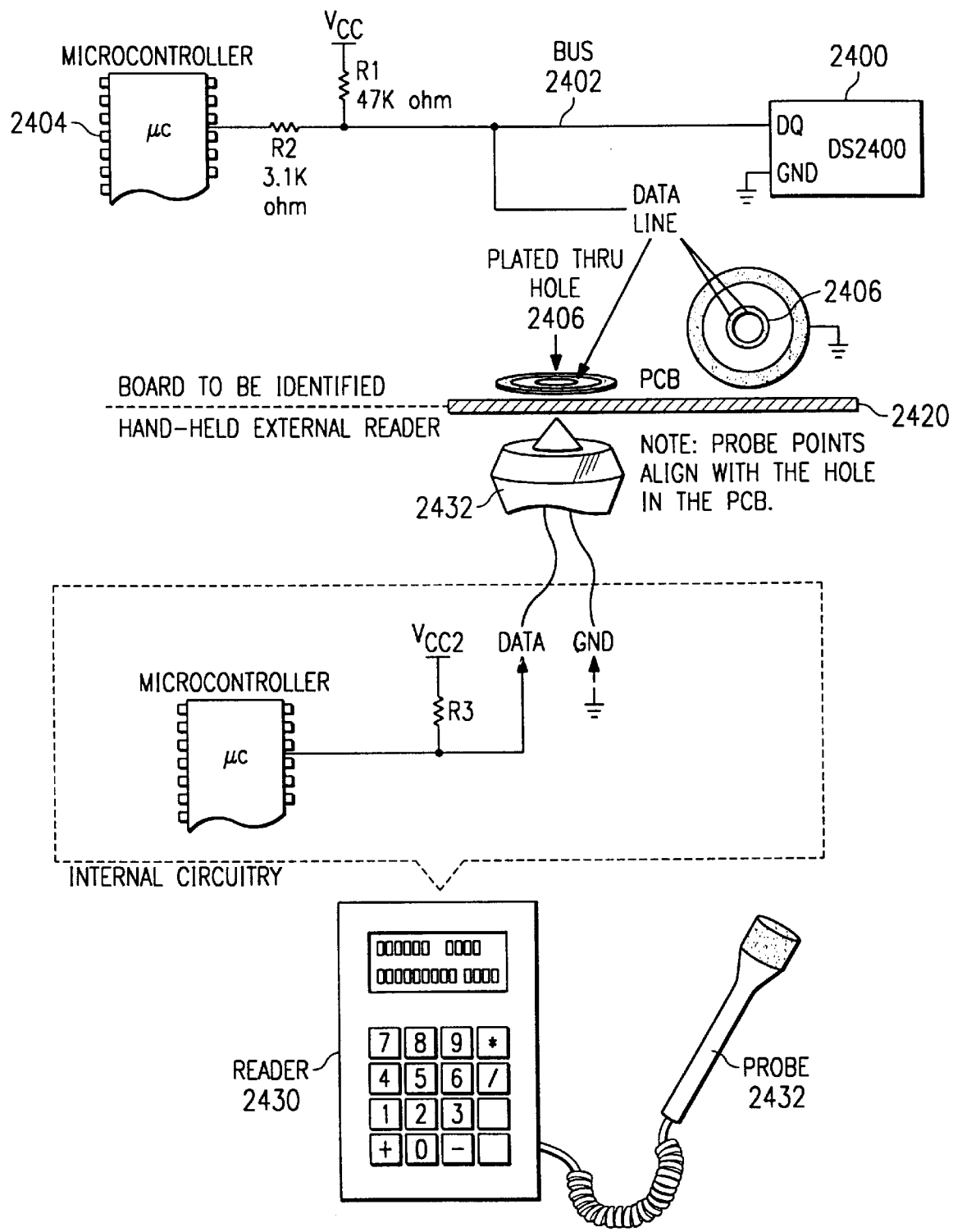

Module 2400 may be attached to a PCB in other ways. FIG. 24D shows in plan view PCB 2440 which contains various integrated circuits 2450–2460 (which may be items such as DRAMs, microcontrollers, and ASICs), module 2400, and the board wiring with edge connector tabs 2470–2480. Personal computers typically have a number of boards analogous to board 2440 and which are inserted into connectors mounted on a chassis. Wiring among connectors and between connectors and ports provides the interconnections of the various ICs and peripheral devices such as monitors, keyboards, and printers. FIG. 24D shows module 2400 connected between ground tab 2470 and tab 2473 which connects to a pin of a parallel port. Module 2400 may be in a small plastic package which will not consume board space and usually can be soldered to the tabs without obstructing the insertion of PCB into a connnector. In other words, module 2400 may be attached to preexisting boards and does not need to be designed in. Of course, a designed-in module would be more convenient and just take the place of serial number and other board identification. In any event, microcontroller would probably only infrequently access module 2400, so speed of the reads and writes is not crucial in this application. Furthermore, by putting a delay in the IO terminal of module 2400 to prevent module 2400 from responding to short duration lows and incorporating the wait-for-reset state at the end of a ROM read would permit attaching module 2400 directly to a port of a microcontroller that is used for general purposes if long duration lows can be ruled out. Or the reset for module 2400 could be extended to require a long duration high following the long duration low.

Figure 24E:
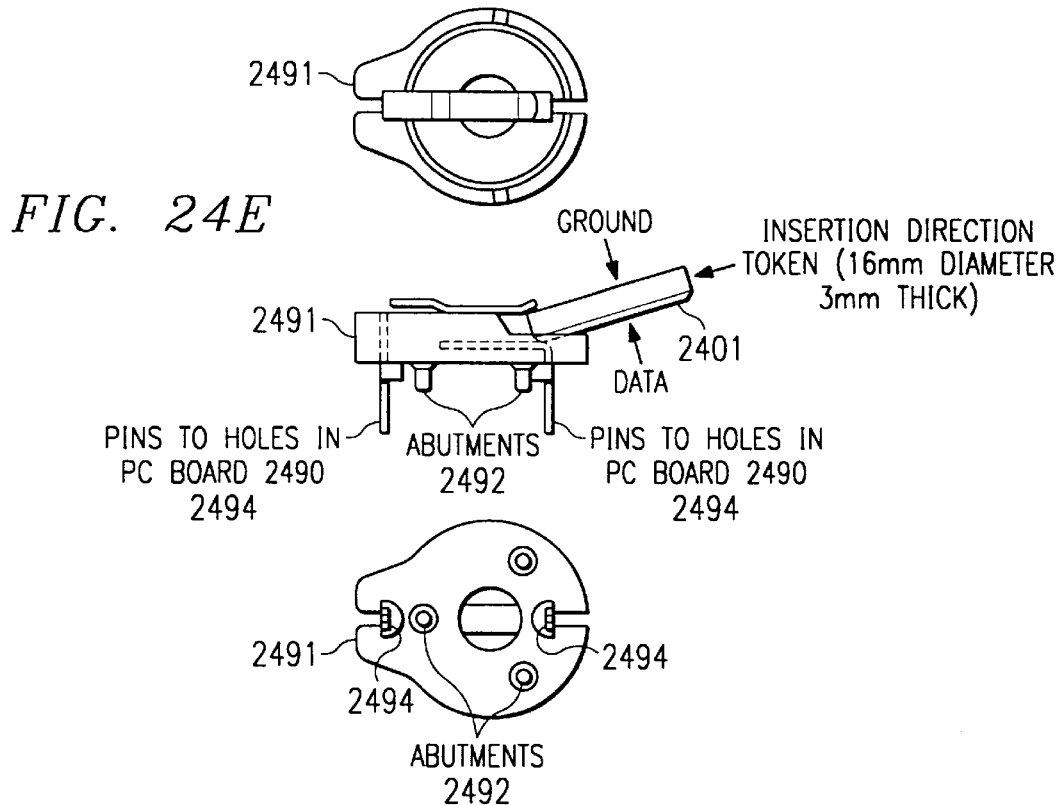

Alternatively, module 2400 could be in the form of a coin-sized token 2401 and inserted in a token receptacle 2491 mounted on PCB 2490; see FIG. 24E which shows both plan and elevation views of token receptacle 2491 with token 2401 indicating abutments 2492 that engage PCB 2490 and pins 2494 that extend into holes in PCB 2490 and are soldered to affix receptacle 2491 to PCB 2490. A token 2401 form for module 2400 may be a disk on the order of 3 mm thick by 16 mm diameter. Thus a token receptacle such as 2491 will take up more space on PCB 2490 than a TO-92 package; but token 2401 is large enough to contain a battery and has the flexibility of allowing a change in the identification number of PCB 2490 while still providing the serial number in ROM by just changing tokens.

Figure 25:
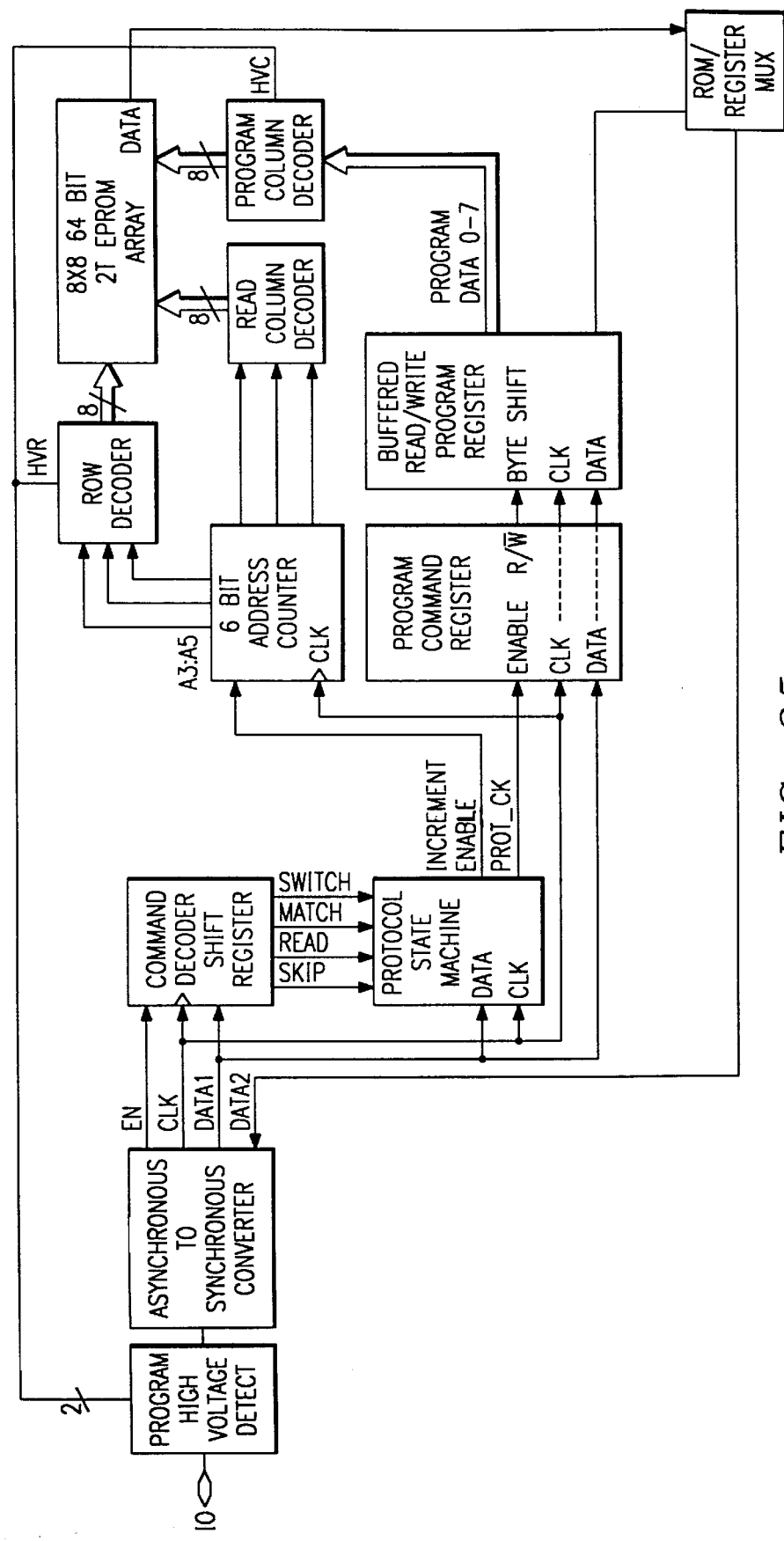
FIG. 25 schematically illustrates an EPROM embodiment.

Module 2400 on printed circuit board 2440 may also contain EPROM in place of all or part of the ROM and which can be programmed after packaging or possibly even after mounting on board 2440. This would permit customization of the identification number held by module 2400. For example, if module has 48 bits of factory lasered ROM identification and 16 bits of EPROM, then the full 64 bit identification is partially set electrically after packaging and to the requirements of the customer. FIG. 25 schematically illustrates circuitry for module 2400 with EPROM bits in addition to the RAM plus lasered ROM memory. Module 2400 includes a high voltage detector 2502; for a 5 volt CMOS module, a 12-13 volt programming voltage usually suffices for FAMOS programming. The programming proceeds as follows. Following the satisfactory completion a valid second layer command as signalled by the PROT_OK signal, either a read or write command of the program register is issued. This command consists of three bits of address to specify one of eight bytes for writing, followed by five unused bits, followed by eight bits of data. First the address byte would be issued (LSB first): [A7-A0] only bits A0–A2 are significant to specify byte address and A3–A7 must be ones. Next follows the data bits (LSB first): [D7-D0] Each byte is buffered in an eight bit shift register which may be verified prior to providing the programming high voltage. If verify operation is not desired than a 12 V programming voltage of sufficient duration is immediately applied and subsequently two bytes of new row addresses and data can be shifted into the command register and the process repeated. This method accelerates programming speed for applications where the communication link is not suspect. Note that the device generates separate row and column high voltage signals and provides isolation of low voltage circuits. A special single bit of EPROM may be written to disable subsequent writes to lock the EPROM with a known pattern. The architecture of this EPROM is expandable and larger memories with incremental buffered write capabilities are possible.

Module 2400 may be powered by a direct connection to Vdd on board 2420 or it may include an internal power source such as a battery or it may tap power from the one-wire bus with a diode plus storage capacitor. Module 2400 may also have a second diode plus storage capacitor for the programming high voltage. Of course, if module 2400 is in the form of a token, then either the battery power or the tap from the one-wire bus must be used because only two terminals are available.

Module 2400 may be attached to the motherboard of a (personal) computer (either hardwired or as an inserted token) or to some other node accessible by central microprocessor input/output, and the identification contents within module 2400 can be checked in software prior to a program being run so that the program will not run if the identification does not match a prescribed set of identifications. Indeed, a multiplicity of module token receptacles on a single board could be used, and software could have traps that permit execution if any one of the modules has the proper identification. Alternatively, the modules with identifications for software users could be inserted to an external token receptacle device such as the parallel port plug extension 2600 schematically illustrated in FIGS. 26A–C and in copending U.S. application Ser. No. 631,929, filed Dec. 19, 1990 (DSC-316) Indeed, parallel port plug extension 2600 includes spaces for five tokens 2602 (one permanently affixed for plug extension 2600 identification and four replaceable for user tokens), Zener diode 2610, Schottky diodes 2620, and 1K ohm resistor 2630. Note that a personal computer typically uses the parallel port for connection to a printer, and that plug extension 2600 does not affect the printer operation because the printer strobe line remains high during the one-wire bus communication between host and token. Also, printer communications do not use line no.13 although this line and others were in the original $I_{BM}$ parallel port definition. Note also that multiple plug extensions 2600 may be stacked to provide for more tokens 2602 on the same bus. If more than one module 2400 connects to a one-wire bus, then further control logic as previously described must be included in the modules to allow the bus master controller to distinguish among the modules and read the identification of each one separately such as by the SEARCH ROM DATA command. Preferred embodiment module 2602 includes the identification capabilities of module 2400 and further provides for multiple modules on a single one-wire bus as in FIG. 26C. Note that the use of a unique identification number for each module which is built in at the time of manufacture (48 bits implies more than $10^{14}$ different available identification numbers) plus the capability of multiple (removable) modules on a single bus permits great convenience and compactness for applications such as software protection.

A personal computer's parallel port pins may have EMI filters which include capacitors that would stretch out rising edges and disrupt the 1-wire signals to modules 2602. In such a case, the use of two parallel port pins with spaced falling edges feeding a NOR gate as in FIG. 26D will provide correct 1-wire signals.

READ ROM DATA for module 2602 is the same as the read command (0F Hex) for module 2400; that is, when bus master pulls the bus low each of the modules 2602 accesses the bit at the current address (which has been reset to start at 00) of ROM and either pulls down the bus or releases the bus to indicate a 0 or 1 in ROM. And this is repeated to read out all 64 bits of ROM. Clearly this will not work to read ROM data if more than one module 2602 is on the bus; but, in fact, it will bitwise give the AND of the corresponding bits from the various modules on the bus. That is, the bus will be high only if all modules have a 1 bit, and the bus will be pulled low if any one of the modules 2602 has a 0 bit. Thus the bus is a hardwired AND. Introducing an instruction to complement the ROM contents before driving the pull down transistor of module 2602 will likewise yield a bitwise hardwired NOR of the ROM contents. The READ ROM DATA command makes a module 2602 duplicate a module 2400, and a number of modules 2400 on the bus will similarly bitwise read the ANDs of the corrresonding bits of the ROMs.

MATCH ROM DATA puts module 2602 into a mode to compare its 64 bits in ROM against 64 bits written by the bus master host; if a written bit agrees with the corresponding ROM bit, then module 2602 waits for the next bit to be written; whereas, if a written bit disagrees with the corresponding ROM bit, then module 2602 stops and remains inactive until a reset. Note that if the serial number is the only item of interest in the module, then the MATCH ROM DATA command is typically not used.

SEARCH ROM DATA permits bus master to sequentially determine the ROM contents of all modules 2602 on the bus as previously described. Indeed, if the bus master first attempts to read by using READ ROM DATA as if a single module were on the bus, it will obtain the ANDs of the bits as described above. Now the CRC algorithm will almost certainly indicate an error. Hence, the bus master will try again and come up with the same result; so the bus master will, after receiving repeated read errors (the number depending upon the number of tries it makes to read), presume that more than one module 2602 is attached to the bus and change approach to Search ROM Data. Thus the bus master issues a reset for the modules and then loads Search ROM Data into the command registers of the modules. Then using the Search ROM Data routine, the bus master generates a list of all identifications in modules on the bus, and then can check whether a program should be run by comparison of this module identification list with a list of permitted user identifications which have been inserted into the program.

Figure 26A:
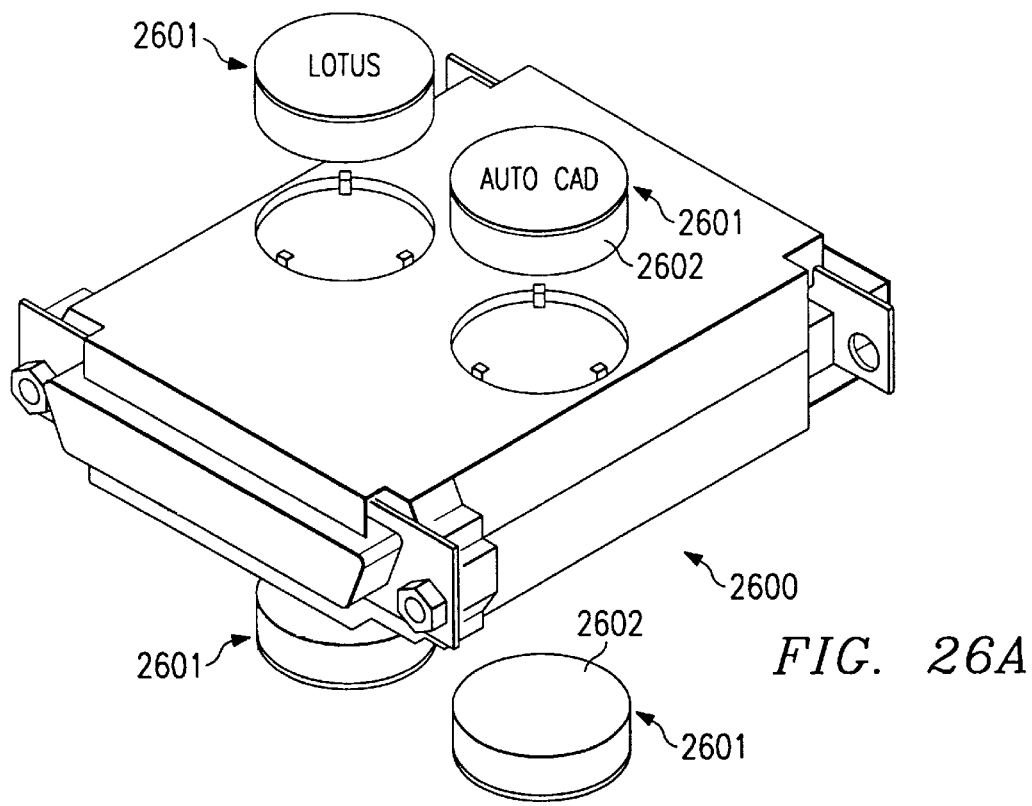
FIGS. 26A, 26B, 26C, and 26D show parallel port connections of the embodiments.
Figure 26B:
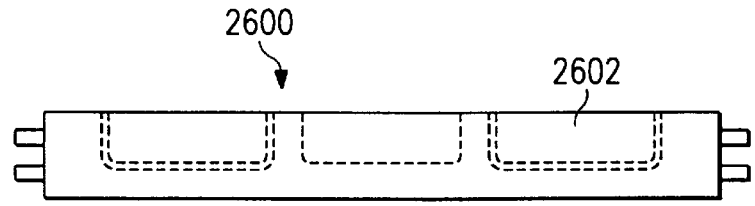
Figure 26C:
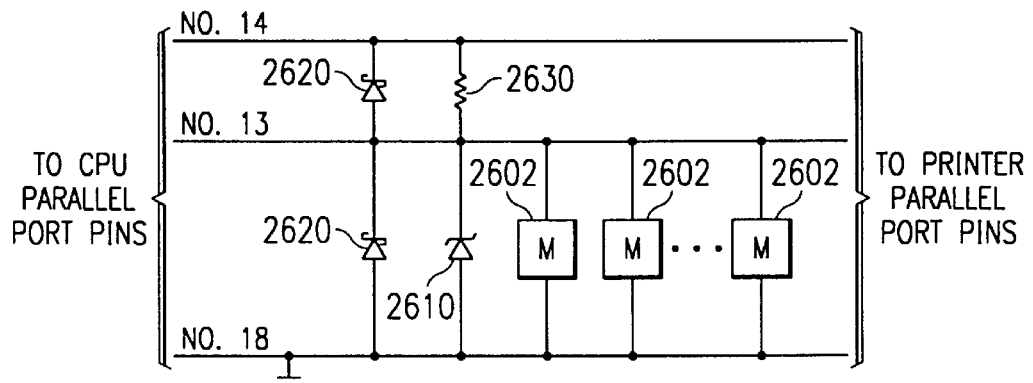
Figure 26D:
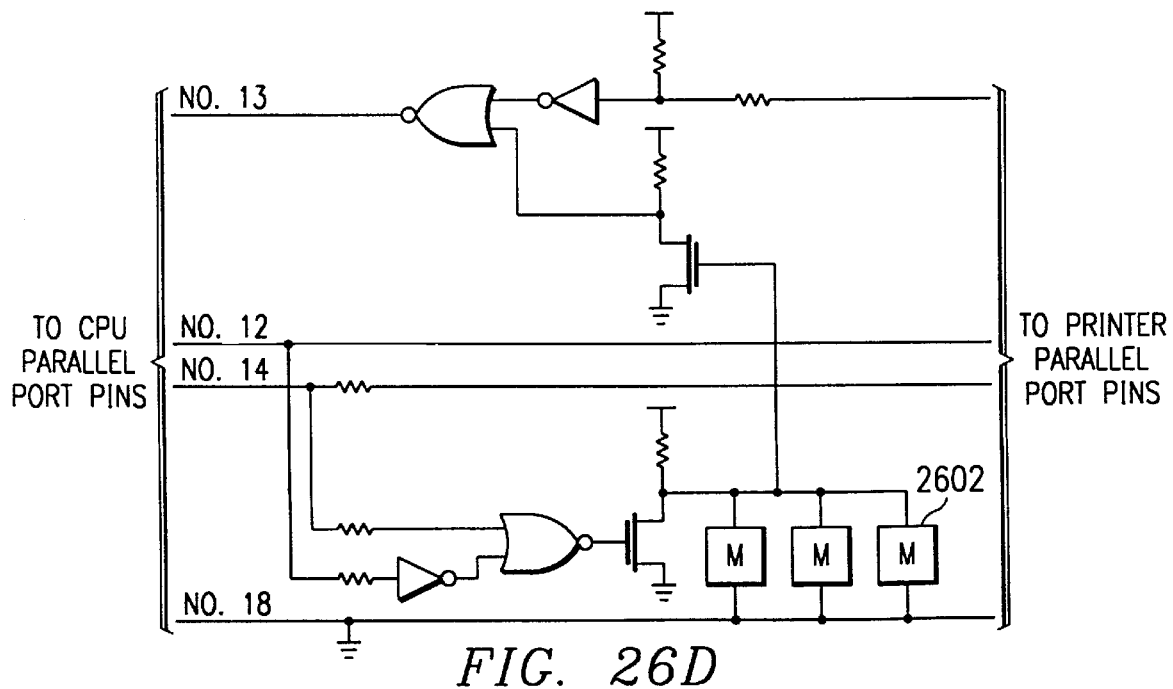

Rather than use of a parallel port pin for the 1-wire bus as in FIGS. 26A–C, other pins could be used for the 1-wire bus.

For example, a 1-wire bus could attach to a data/address line from a microprocessor/microcontroller port to external memory because the line will typically be held high except for short (less than 1 microsecond for processor running at more than 1 MHz) low pulses during data reads and writes, and such pulses will not likely write any recognizable first level command into a module. Indeed, anything written into the command register would probably be all 1's due to the usually high condition of an address/data line. Further, such lines will not be low for 480 microseconds to reset any modules except for power up situations. In a power up, if the processor avoids any memory communication for 480 microseconds, then the presence detect signal provided by the modules on the 1-wire bus will not cause any disruption. (Alternatively, a module which does not emit a presence detect signal could be used.) Conversely, during communication with the modules, the chip enable signal from the processor to the memory will keep the memory inactive and the lows on the address/data line will have no effect on the memory.

Similarly, a serial port could have an attached 1-wire bus, and hardware has been developed for this interface.

The typical use of an applications program by a personal computer user involves obtaining a copy of the program on a floppy disk, copying the program from the floppy disk to the hard disk of the user's personal computer, and then running the program using the hard disk copy. The program typically consists of many files with the .EXE and .COM extension files the ones initially loaded and executing. If the personal computer has one or more modules 2602 on a bus connected to its microprocessor (such as by the parallel port plug extension of FIG. 26A or hardwired to the mother board as in FIG. 24C), then the ROM identification can be used to limit execution of the program. A first approach, described in connection with FIG. 27A, includes code in the program to access the modules and check identification. An alternative is to use a PROTECT program to reformat all of the hard disk files with .EXE or .COM extensions to incorporate a listing of all of the current ROM identifications in these modules 2602 and to also incorporate a routine that causes the microprocessor to SEARCH ROM DATA prior to any future execution and compare the found ROM identifications to the incorporated list and deny execution if none of the found ROM identifications matches any of the incorporated identifications. This reformating hard disk files for such identification protection permits both machine identification (such as the affixed module in parallel port plug extension of FIG. 26A or the mother board hardwired module of FIG. 24C) to be incorporated into the .EXE and .COM files, but also user identification by insertable modules (as the 2602 modules of FIG. 26A). Thus software manufacturers could provide an insertable module with identification plus .EXE and .COM files which already have the identification incorporated or which can only be executed one time without incorporated identification and during this execution the identification of the module (or the machine's or the user's other modules) is incorporated.

Figure 27:
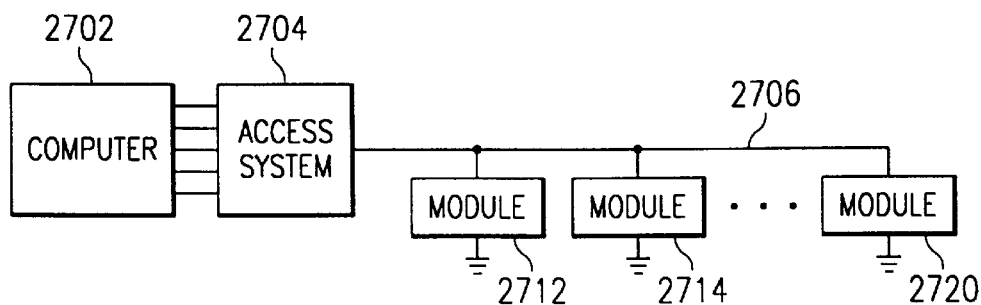
FIG. 27 illustrates the hardware arrangement for a module access system.

FIG. 27 illustrates a host computer 2702 which has a module access system 2704 (which may be either software or firmware or a mixture) that connects computer 2702 to 1-wire bus 2706 with attached modules 2712, 2714, . . . 2720. As in the previous examples, modules 2712, 2714, . . . 2720 may be on a 1-wire bus that connects to the host at its parallel port as in FIGS. 26A–C, or on a bus attached to a memory address/data line and located on a PC board, or to a contact on a keyboard. Note that module access system 2704 is analogous to a network controller card in a computer which is connected to a local area network. That is, access system 2704 provides for computer 2702 to communicate with only a chosen one of the modules 2712, 2714, . . . 2720 on bus 2706. A preferred embodiment access system includes the following software functions:

Function SETUP (PN: Byte): Boolean;

This function must be called before any of the other functions to establish the printer port number to be used and to perform time calibration of the computer's machine cycle for a conversion to the approximate 60 microsecond period of the modules' time periods. The function returns True if 1<=PN<=3 and the printer port referenced by PN exists, otherwise it returns False. This function can be called at any time to recalibrate timing and/or switch to a different printer port.

Function FIRST: Boolean;

This function returns False if SETUP has not yet been called successfully. If SETUP was successful, it issues a Reset signal and returns False if no Presence pulse was detected. If a Presence pulse was detected, it performs the ROM search algorithm to find the first ROM data pattern on the one-wire bus. It returns True if the search succeeds and False otherwise. The ROM data pattern that was found is stored in an internal eight byte buffer.

Function NEXT: Boolean;

This function returns False if SETUP has not yet been called successfully. If SETUP was successful, it issues a Reset signal and returns False if no Presence pulse was detected. If a Presence pulse was detected, it performs the ROM search algorithm to find the next ROM data pattern on the one-wire bus. It returns True if the search succeeds and False otherwise. The ROM data pattern that was found is stored in an internal eight byte buffer. (The first time NEXT is called in a program, it is equivalent to the FIRST function. Before returning a False value, the code resets its internal pointers so that the following call to Next is equivalent to a call to FIRST.)

Function ACCESS: Boolean;

This function returns False if SETUP has not yet been called successfully. If SETUP was successful, it issues a Reset signal and returns False if no Presence pulse was detected. If a Presence pulse was detected, it transmits the ROM match command followed by the specific pattern in the internal eight byte buffer and returns True.

Function DATABYTE (X: Byte): Byte;

This function returns the value X if the function ACCESS has never been called or if the most recent call to ACCESS returned a False value. Otherwise, it transmits the byte X to the one-wire bus and returns the byte received concurrently from the one-wire bus.

Function ROMDATA: Pointer;

This function returns a far pointer to the internal eight byte buffer.

Appendix A is a listing in assembly language for the Intel 8086, 80X86 family of processors for the preceding access system functions. The access system functions can be used as follows in a program to read secure data from a module for authorization to execute a protected program.

Figure 28A:
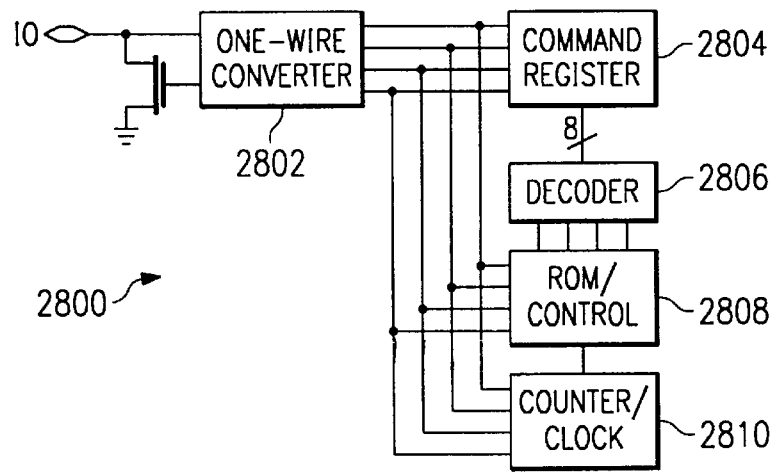
FIGS. 28A-B show blocks and circuitry for embodiments including a clock or counter.

Found:=False;
LptNo:=1;
While not Found and SETUP(LptNo) do Begin If FIRST then Repeat KeyNo:=0;
While not Found and (KeyNo <3) and ACCESS do Begin
    <Use DATABYTE to read ID from key number KeyNo>;
Found:=(ID=TargetID);
If not Found then Inc(KeyNo);
End;
Until Found or not NEXT;
If not Found then Inc(LptNo);
End;
If Found then Begin
    <Use DATABYTE to send the Password>;
    <Use DATABYTE to read the Secure Data>;
    <Execute the protected program>;
End else <Abort program because key not found>;

FIG. 28A shows preferred embodiment module 2800 which includes counter 2810 in addition to converter 2802, command register 2804, decoder 2806, and ROM and control 2808, as in the module of FIG. 21. Indeed, module 2800 roughly replaces the RAM 2110 of the module of FIG. 21 with counter 2810. Module 2800 may be mounted on a PCB to keep track of the total time that PCB is active by using its internal clock to drive counter 2810. Counter 2810 can be read over the 1-wire bus by a host in a manner similar to reading the RAM of module 2100: the host resets module 2800 (counter 2810 does not reset except by a command in the command register), and then loads the Read Counter command into the command register and then reads the contents of counter 2810. Note that an estimate of the frequency of internal clock of module 2800 can simply be made by reading counter 2810 at two times with a known time interval between the reads. However, the accuracy of the internal clock may be much greater than that of the read timing, and this estimation would be unnecessary. Internal clock turns off if a low on the bus persists for more than 2 milliseconds and stays off (in reset idle state 00000) until the bus returns high. Thus if the PCB is powered down, and module 2800 has a weak pull down of node IO, the bus will be low and internal clock will stop without affecting the contents of the counter which is battery powered. Thus the total powered up time of the PCB can be fairly easily assessed by simply reading counter 2810; this permits a low cost tracking of PCBs such as in mainframe computers where down time from aging components can be deterred. An alternative embodiment could have two counters and a continuously running clock: one counter would again measure total powered-up time, and the second counter would measure total time to assess age. The following copending applications of common assignee disclose subject matter related to module 2800 and are hereby incorporated by reference: U.S. Ser. No. 07/728,230, filed Jul. 10, 1991, abandoned, U.S. Ser. No. 07/727,618, filed Jul. 10, 1991, abandoned, U.S. Ser. No. 07/727,619, filed Jul. 10, 1991, abandoned, U.S. Ser. No. 07/727,638, filed Jul. 10, 1991, abandoned, U.S. Ser. No. 08/103,724, filed Jul. 9 1993, abandoned, U.S. Ser. No. 07/727,639, filed Jul. 19, 1991, U.S. Pat. No. 5,297,099, U.S. Ser. No. 07/728,229, filed Jul. 10, 1991, abandoned, U.S. Ser. No. 07/727,270, filed Jul. 10, 1991, abandoned, and U.S. Ser. No. 07/727,273, filed Jul. 10, 1991, U.S. Pat. No. 5,166,545.

Figure 28B:
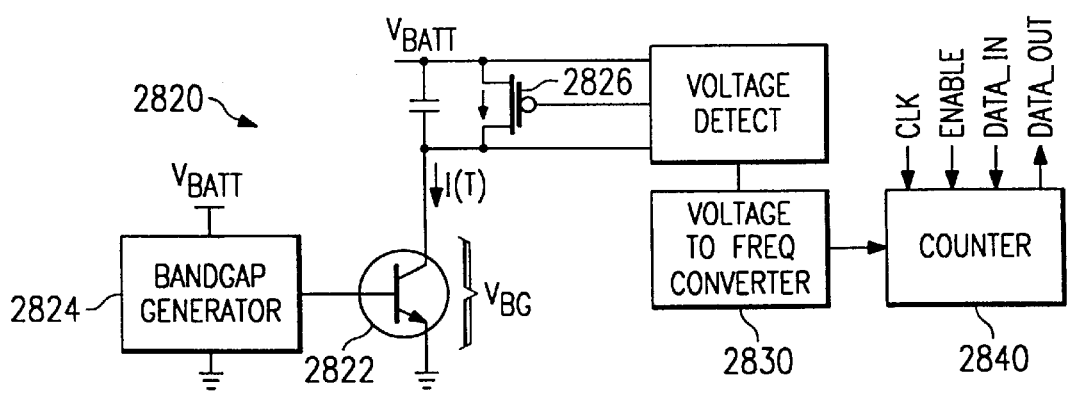

FIG. 28B schematically illustrates a temperature-controlled counter/clock 2820 for preferred embodiment module 2800 in place of counter/clock 2810. The clock rate of counter/clock 2820 depends upon temperature, and counter/clock 2820 can thus measure thermal accumulation and history. In particular, a chemical reaction theoretically proceeds at a rate that depends upon temperature as $\sqrt{T} \exp(-E_a/RT)$ with T the absolute temperature, $E_a$ the activation energy per mole, and R the gas constant. Expressing the activation energy in terms of energy per molecule yields the temperature dependence form as $\sqrt{T} \exp(-E_a/kT)$ with k Boltzmann's constant. In practice the exponential dependence swamps the square root dependence, and a temperature dependence expressed by the exponential alone suffices and constitutes Arrhenius's Law. Arrhenius's Law is the basis of the well-known chemical rule of thumb which states that reaction rates approximately double for each 10 degree rise in temperature. Typical values of the activation energy are roughly 50 to 100 kJ/mol or, equivalently, about 0.5 to 1.0 eV/molecule.

Counter/clock 2820 is a timer which measures chemical equivalent time, based on temperature according to Arrhenius's Law. Such a timer could be used to substantially extend the useful life of drug, enzyme, and other chemical and biological stocks by providing the actual relevant thermal history instead of using a fixed lifetime specification based on the worst-case (i.e., highest) temperature. The same timer may also be useful for indicating the freshness of food products. The timer would be a circuit in a token format module 2800, and token 2800 would just be placed in proximity to the chemical or biological stocks of interest to insure thermal equilibrium with the stocks. Then to take a lifetime measurement, either bring a host to read the token or carry the token to a host to read and then return the token to the stock proximity.

Counter/clock 2820 operates as follows. It is well-known that the current through a semiconductor diode with a forward bias of V volts theoretically depends on temperature by:

$$I = CT^3 \exp(-E_{gap}/kT)[\exp(qV/kT)-1]$$

where C is a constant, T is the absolute temperature, $E_{gap}$ is the bandgap of the semiconductor, q is the electronic charge in coulombs, and k is Boltzmann's constant. For diode biases of greater than 0.12 volts and temperatures in the range of 0 to 100 degrees C the $-1$ term can be ignored compared to the $\exp(qV/kT)$ term, so I depends on T as $T^3 \exp(-[E_{gap}-qV]/kT)$. As with the square root dependence for reaction rates, the cubic dependence is swamped by the exponential dependence. Thus the diode current has the Arrhenius's Law form with the activation energy equal to $E_{gap}$. Silicon has a $E_{gap}$ equal to 1.12 volts, so with forward biases in the range of 0.12 to 0.62 volts for a silicon diode the current through the diode will emulate Arrhenius behavior with an activation energy in the range of 50 to 100 kJ/mol. The use of a wide bandgap semiconductor, such as gallium arsenide, would provide for emulation of higher activation energies, and the use of a narrow bandgap semiconductor, such germanium or InGaAs, would provide for lower activation energies.

Thus if the voltage across the diode is held at a constant value V, then the current through it will follow Arrhenius's Law. This provides a means to exactly match the current equation to a specified chemistry, so that the total charge flow (in coulombs) is exactly proportional to the elapsed chemical time (Arrhenius time). In counter/clock 2820 the diode of interest is the base-emitter junction of npn transistor 2822, and bandgap generator 2824 generates a temperature independent output voltage $V_{bg}$ which applies across the base-emitter junction. Thus the base current and the collector current depend upon temperature according to Arrhenius's Law. Hence, converting the collector current to a frequency and using this frequency to drive counter 2840 will measure the total charge flow and emulate Arrhenius time. For counter/clock 2820 the current to frequency conversion arises from the collector current passing through p-channel FET 2826 which acts as a resistor and the voltage drop across FET 2826 drives a voltage-to-frequency converter 2830. The output of voltage-to-frequency converter 2830 drives counter 2840. The dynamic range required of converter 2830 depends upon the activation energy and temperature range involved; but very roughly, a doubling of the current for every 10 degree rise implies a converter dynamic range of about 1000 for a 100 degree temperature range. For example, a converter with a 1 mV to 1 V input range and an output of 10 Hz to 10 KHz would suffice. Ultrawide-sweep multivibrators and charge balancing converters can both meet such requirements.

Measurements of the temperature dependence (from 10° C. to 80° C.) of the collector current through a particular silicon npn transistor with various voltages V applied across the base-emitter junction were fit to straight lines of the Arrhenius form $\ln(I)=\ln(I_o)-E_a/kT$ to compute $E_a$ as a function of V. Recall that theoretically $E_a=E_{gap}-qV$. The experimental results gave good fits to straight lines and yielded the following effective activation energies:

| V | $E_a$ |
|---|---|
| 0.3 V | 0.91 eV |
| 0.4 V | 0.81 eV |
| 0.5 V | 0.71 eV |
| 0.6 V | 0.56 eV |
| 0.7 V | 0.44 eV |

This shows that a desired value of effective activation energy could be achieved by selecting an appropriate value of V to produce the desired effective band gap. As previously noted, chemical reactions typically have activation energies in the range of 0.5 to 1.0 eV; so the silicon npn transistor collector current can provide the appropriate temperature dependence. Of course, for large activation energies, the transistor will operate in a mode with small collector currents, and noise may become a limitation. Conversely, for small activation energies, the collector current will be large and drain the battery plus generate heat. In this case intermittent operation would suffice: rather than continually monitoring the collector current, counter/clock 2820 could just turn on the bandgap generator and the npn for a few milliseconds every ten seconds (or whatever time period would be appropriate for speed of ambient temperature change) and thereby effectively sample the collector current. The clock used to control the intermittent operation does not need to be accurate, as long as it's duty cycle remains constant. Note that the current gain of the npn transistor implies a small current supplied by the bandgap generator supports a large collector current supplied by the battery.

An alternative circuit used a thermistor to have the Arrhenius temperature dependence in the form of a changing resistance; experimentally the effective activation energy was 0.376 eV. The thermistor was used as the R in an RC oscillator and the accumulated counts from the oscillator over small intervals of time were squared before adding them to the Arrhenius time accumulator, then the effective gap would be doubled to 0.752 eV, very nearly the desired value of 0.768 eV for the "typical" reaction. In general, with a fixed (i.e., not voltage-controlled) effective band gap, it is still possible to realize an exact match to the exponential coefficient in Arrhenius's Law by sampling the counts over small intervals and taking them to the appropriate power before summing them onto the Arrhenius time accumulator. This requires more computing power than the adjustable effective gap method, since a mathmatical power must be computed each time a temperature measurement is taken. It might still be possible to realize this method with a dedicated special purpose microprocessor circuit utilizing logarithm tables in ROM to accomplish the computation with addition.

The following contains an analysis of the consequences of having an exponential coefficient in the Arrhenius time measuring device which is not an exact match to that of the chemistry which is to be modelled. This mismatch may be due to imperfect calibration of the Arrhenius exponential coefficient in the device or to imperfect knowledge of the chemistry. It is shown that in the right circumstances, a very substantial increase in useful shelf life can be realized even with a poorly calibrated instrument, although the largest increase is achieved with the correct calibration.

Assume that a given chemical substance is required to be maintained within the temperature range $Tmin \leq T \leq Tmax$, and that it has a specified useful shelf life based on Arrhenius's Law (with $E_a/k$ abbreviated as Tc) evaluated at the maximum temperature Tmax:

Specified Lifetime=At*exp(Tc/Tmax)

At another temperature T within the allowed range, the true useful shelf life of the substance is given by Arrhenius' Law:

True Lifetime=At*exp(Tc/T)

The Arrhenius clock measures a useful shelf life given by:

Arrhenius Lifetime=Aa*exp(Tg/T)

Let P=The percentage increase in the useful shelf life when the Arrhenius Lifetime is used in place of the Specified Lifetime.

P=100*(Arrhenius Life/Specified Life−1)

P=100*[(Aa*exp(Tg/T))/(At*exp(Tc/Tmax))−1]

To calibrate the linear coefficient for the Arrhenius clock, we must apply the condition that: Arrhenius Lifetime ≤ True Lifetime for all $Tmin \leq T \leq Tmax$. This calibration condition divides into two distinct cases, depending on whether $Tg \leq Tc$ or $Tg \geq Tc$, as follows:

Case A: $Tg \geq Tc$ (Arrhenius Life at Tmin=True Life at Tmin)

Aa*exp(Tg/Tmin)=At*exp(Tc/Tmin)(Cal. Cond.)

P=100*{exp[Tc*(1Tmin−1/Tmax )−Tg*(1Tmin−1/T)]−1} for $Tg \geq Tc$.

Case B: $Tg \leq Tc$ (Arrhenius Life at Tmax=True Life at Tmax)

Aa*exp(Tg/Tmax)=At*exp(Tc/Tmax)(Cal. Cond.)

P=100*{exp[−Tg*(1/Tmax−1/T)]−1} for $Tg \leq Tc$.

These results show the following characteristics:
1. In Case A, if

T>Tg/[(Tg/Tmin )−(Tc/Tmin )+(Tc/Tmax)]

then the Arrhenius clock gives a lifetime that is less than the specified lifetime. This is an undesirable result, indicating that Tg>Tc is not a good choice.
2. Case B produces an increase in lifetime for all temperatures in the allowed range (except Tmax, where the Arrhenius Lifetime is equal to the Specified Lifetime)
3. In Case B, the lifetime extension is greatest when Tg=Tc. (The larger the band gap, the greater the savings, provided that it doesn't exceed that of the chemistry.)
4. The savings in Case B don't depend on the Arrhenius coefficient of the chemistry,Tc.

As a numerical example, suppose a "typical" chemistry (Tc=8912 deg) has a specified storage range of 273.15 deg to 303.15 deg. What is the maximum P when measured with an Arrhenius clock based on our "typical" thermistor (Tg= 4363 deg) with no correction for the disparity in exponential coefficients?

Pmax=100*{exp [Tg*(1/Tmin−1/Tmax)]−1 }

Pmax=100*{exp [4363*(1/273.15−1/303.15)]−1 }

Pmax=100*{exp [1.58]−1}

Pmax=386%

What is the maximum P when measured with a band gap adjusted to match the chemistry (Tg=Tc=8912 deg)?

Pmax=100*{exp[8912*(1/273.15−1/303.15)]−1}

Pmax=100*{exp[3.23]−1}

Pmax=2425%

While the exact match is clearly superior, the lifetime savings with the very approximate match is still substantial.

Further embodiments of counter/clock 2820 include a programmable (whether EPROM or just in RAM) determination of the npn transistor bias V by storing bits that are feed to a digital-to-analog converter to generate the bias V. Also, multiple npn transistors could be available, and the number used depend upon the bias; this will permit the total collector current (and thus counting rate) at a particular temperature to be somewhat independent of the activation energy selected. Note that at a V of about 0.5 volts, a change of 8 mV in the bias will result in a 40% change in the current, and bandgap generators can maintain such tolerances.

The module 2800 with the Arrhenius count/clock 2820 provides the following features:

Miniature chemical freshness metering system sealed in a 16 mm microcan.

Self-powered with greater than ten years life from lithium battery.

Measures chemical equivalent time, based on temperature according to Arrhenius' Law Allows reading of the fraction of useful life remaining with a hand-held reading device.

Allows reading of time during which the module was above (below) the maximum (minimum) temperature limits specified for a particular chemical process.

Provides ROM containing a unique serial number for absolute identification and traceability.

Provides RAM to contain information about the chemical product that it is shipped with.

Provides RAM to contain factory calibration data so that the module can give accurate measurements of Arrhenius time.

Can be programmed with the Arrhenius coefficients and limiting temperatures for a specific chemistry with a hand-held programming device.

Could be designed for one-time use to provide permanent short to ground (or short to internal battery) on expiration, to activate a simple continuity meter or an electrolytic color indicating overlay.

The Arrhenius time computation may also be packaged in containers other than that of module 2800 and may communicate by means other than that of a 1-wire bus. Indeed, a package containing only the elements indicated in FIG. 28B plus a liquid crystal display (LCD) to display the contents of the counter would provide a Arrhenius time device totally independent of the 1-wire communications.

Figure 29A:
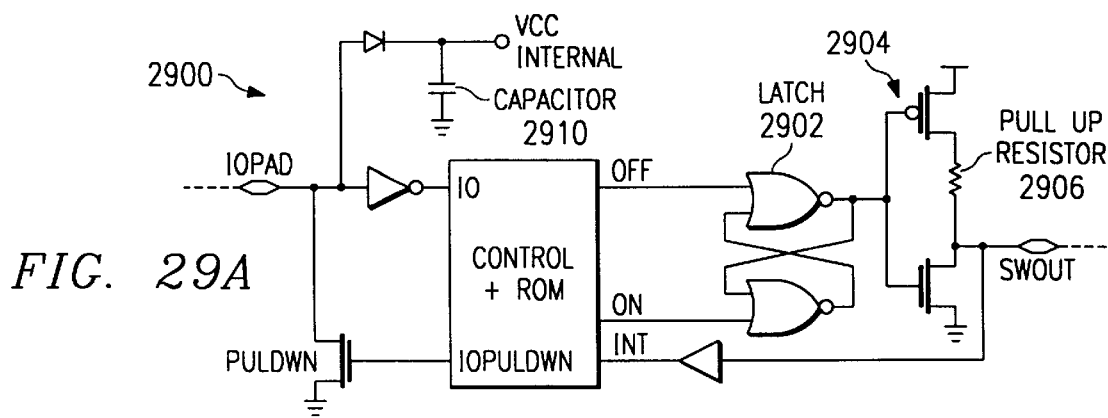
FIGS. 29A, 29B, 29C, 29D, 29E, and 29F illustrate embodiments with an additional terminal.
Figure 29B:
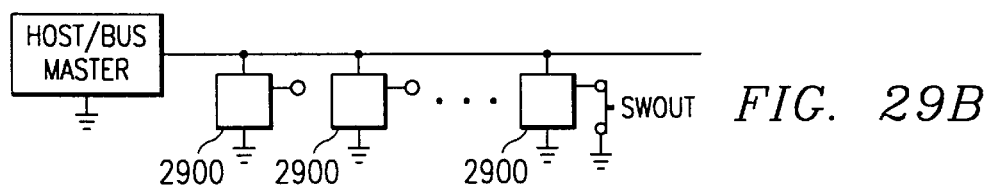
Figure 29C:
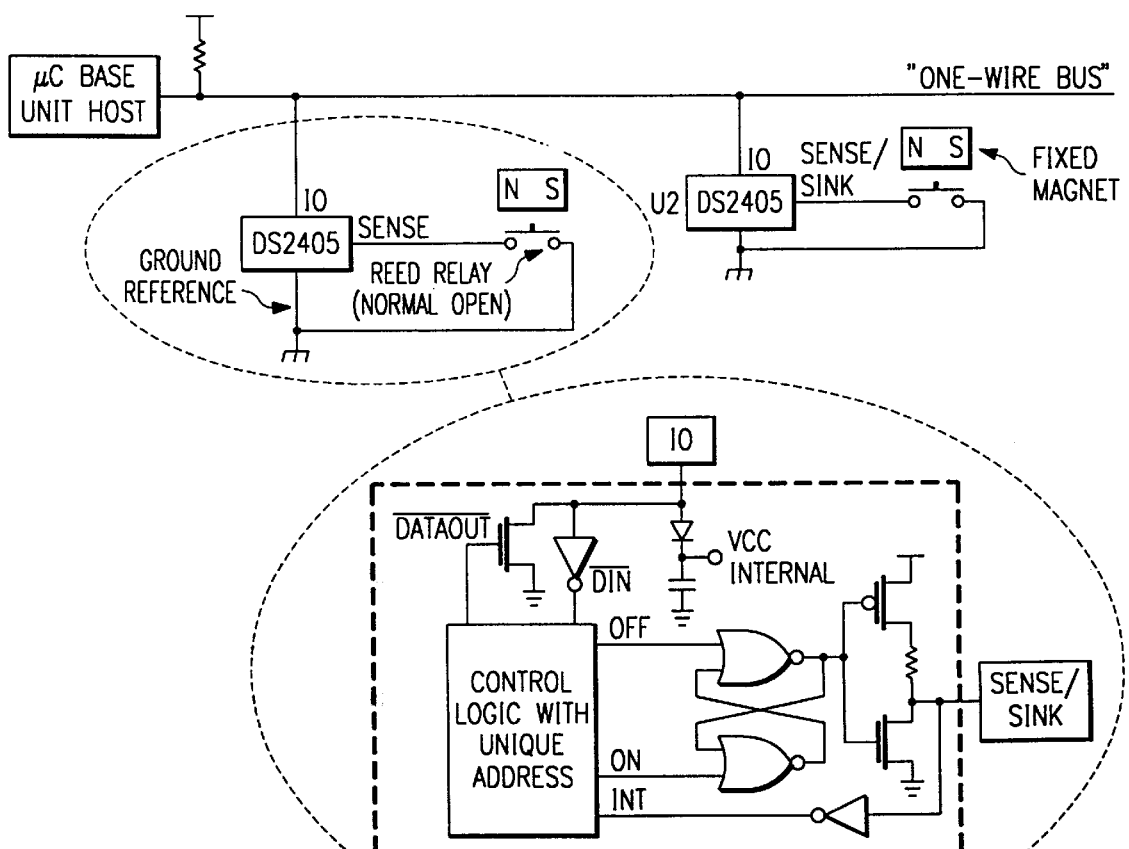

Preferred embodiment module 2900 includes features of modules 2400 and 2602 but also provides a third terminal for control or sensing of external events. FIG. 29A is a schematic block diagram of module 2900 including a controlled switch, and FIG. 29B illustrates a distributed switch and sensor application of modules 2900. In particular, FIG. 29A shows that each module 2900 includes input/output terminal IOPAD, control logic and ROM analogous to that of modules 2400 and 2602 plus latch 2902 and output CMOS inverter 2904 with a large (e.g., 1 Mohm) pull up resistor 2906 to switch/sense terminal SWOUT plus an interrupt input INT from terminal SWOUT. Current drain through pull up resistor 2906 can be avoided simply by eliminating resistor 2906 and the p-channel transistor of inverter 2904, but this will limit applications. Use of the sense input leads to distributed address content keypads as illustrated in FIG. 29C where each SWOUT would be connected to a pushbutton. Of course, FIG. 29B more generally shows a bus with a mixture of modules 2900, some with control switches connected to SWOUT and some with sensors connected to SWOUT. Also, FIG. 29A specifically shows a power supply that draws power from a 1-wire bus connected to IOPAD through a diode and stores it on capacitor 2910; this power supply option and the battery power supply option were already noted in connection with module 2400. Of course, if the output SWOUT drives some other electrical devices, then there may be external power available; but if module 2900 is in a TO-92 package, then no fourth terminal exists for a direct power supply for module 2900.

Figure 29D:
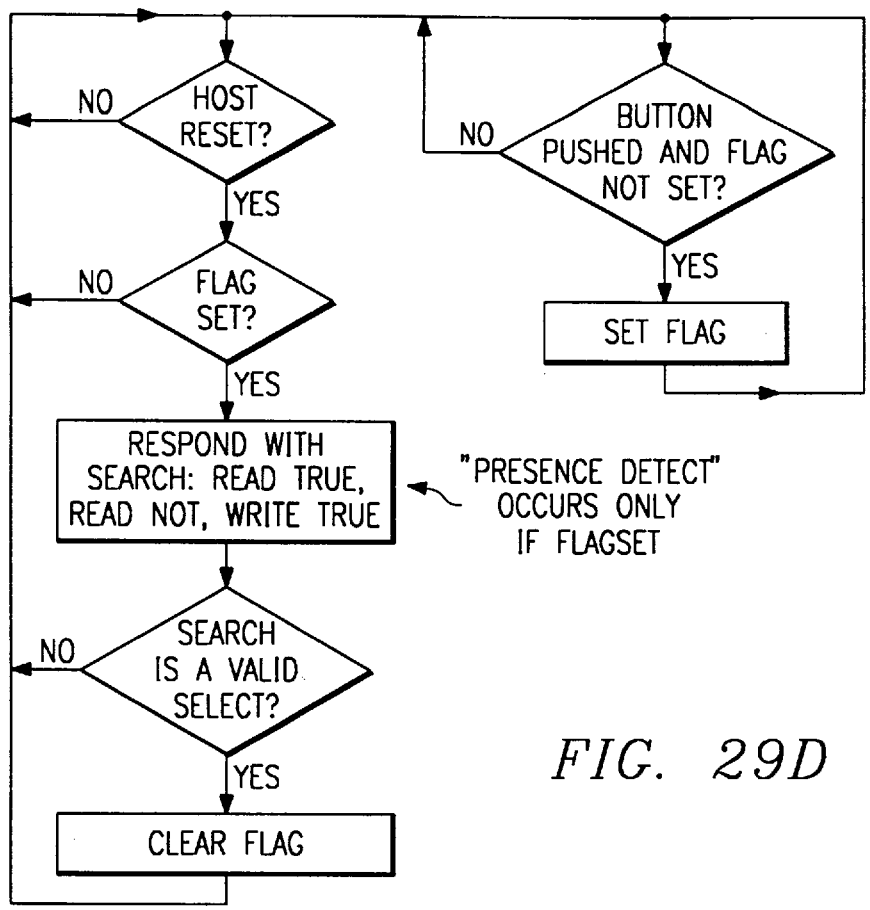
Figure 29E:
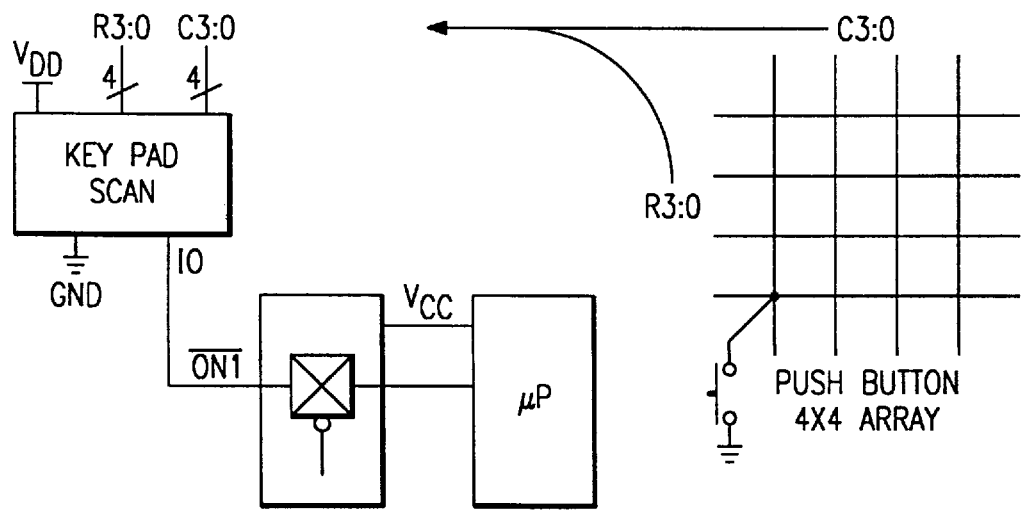
Figure 29F:
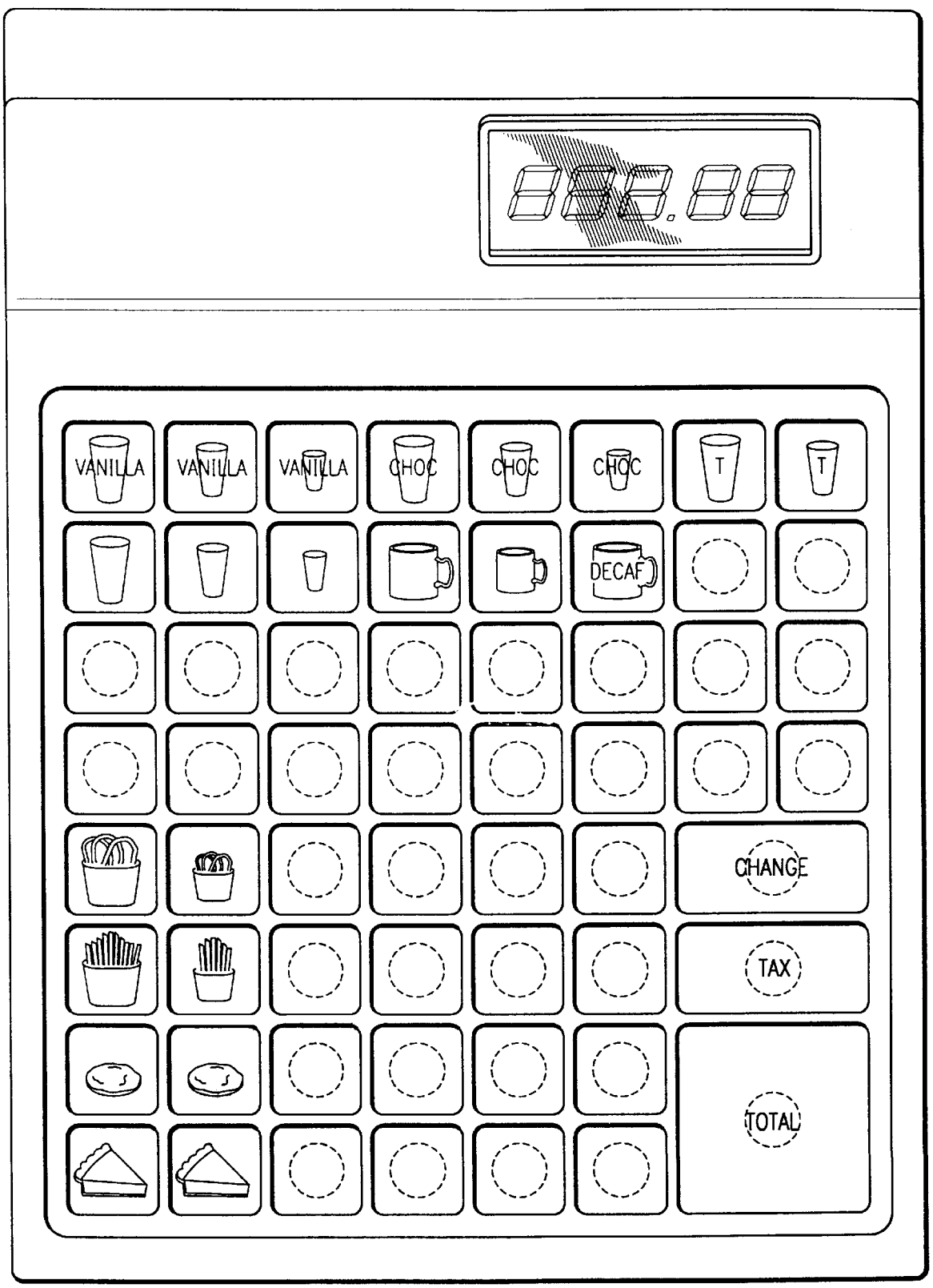

The distributed keypad of FIG. 29C can be used for various systems such as a burglar alarm: each sensor connects to a window or door, and when the window or door is opened, the adjacent module senses this and sets an internal flag which enables the presence detect when reset by the host. The host periodically (e.g., once a second) resets the modules and imediately tracks down any received presence detect. FIG. 29D is a flow diagram for such a system module. This system would also lend itself to use in a key pad scan input with wakeup as illustrated in FIG. 27E. FIG. 29F illustrates such a system with the modules corresponding to items and keys on a cash register.

Alternatively, in the system of FIG. 29C the sensing of the window or door opening could generate an interrupt for the adjacent module, and then, if the module were in reset idle state 00000, apply a pull down to IO for about 4 milliseconds followed by a usual presence detect, or, if the module were in an active state, when the host next sends a reset, the module responds with a pull down of IO for 4 milliseconds rather than the presence detect pull down. See the discussion in connection with state 00010 in FIG. 22E. After the interrupt pull down is released, the module performs its usual presence detect and switches into reset idle state 00000. In general, interrupts may be generated by modules on a 1-wire bus to request the host to read a status from the module or perform some other operation; this could be used in place of polling on the sensor system. Various interrupt signals and timings are available; and each particular interrupt type may require special circuitry or general purpose circuitry may be programmable to implement particular interrupts. In particular, with a hardwired system as shown in FIGS. 29B-C there is no worry about a spurious pull down of IO as could occur in a token system when a new token is added to the bus. Periodic searches should be performed by the bus master to determine if any devices have been removed from the system also indicating an alarm condition (a disconnection of a sensor to circumvent the alarm signalling).

Temperature sensing module has a preset temperature range which if exceeded causes an interrupt request to the one-wire state machine. A multitude of variously positioned and conditioned modules may be used to monitor the temperature of a complex system through a single wire. The module contains an extremely low power real time clock and programmable periodic internal signal which causes the temperature sensing circuitry to power up and perform a measurement. This relatively higher current temperature sensing circuit consists of a PTAT (proportional to absolute temperature) voltage source and an A->D converter. The ability to use the low power oscillator to periodically perform temperature measurement reduces the effective DC current by the duty cycle which can be three orders of magnitude or more. This temperature sensor is configurable such that time/temperatures pairs are automatically stored in non-volatile memory so as to provide a time/temperature profile.

The distributed switch or sensor operation of module 2900 mimics that of module 2300: the host may reset all modules 2900 on the bus by pulling the bus low for at least 480 usec and then releasing the bus. After another 480 usec (which includes the presence detect signals generated by modules 2900), the host can load one of the commands Match ROM Data or Search ROM Data into the command registers of all modules simultaneously. As with module 2300 and explained in connection with FIG. 23 Match ROM Data and Search ROM Data have the host sequentially send bits to all modules 2900 on the bus and each module 2900 compares the received bit with its corresponding identification bit and decides to continue if the bits match or to stop and wait for a reset if the bits mismatch; see flow diagram FIG. 23A. Of course, at most only one module 2900 will have 64 identification and CRC bits matching the 64 sent by the host. If a module 2900 does match all 64 bits, then this module 2900 is the only module on the 1-wire bus that is not stopped and waiting for a reset and it loads the next eight bits sent (in the usual write 0 or write 1 manner) by the host into its function register. The function register contents are decoded to either turn on switch transistor or leave it off or to respond to further bits sent by host to determine turn on/turn off. With module 2900 in sensor function operation, the status of the pushbutton switch is sensed and either stored in a latch for host to read, or an interrupt is generated to inform the host of a particular status. Note that the sensing of the status of pushbutton switch can be on a periodic basis (such as roughly once a second) using the internal clock of module 2900.

Figure 30A:
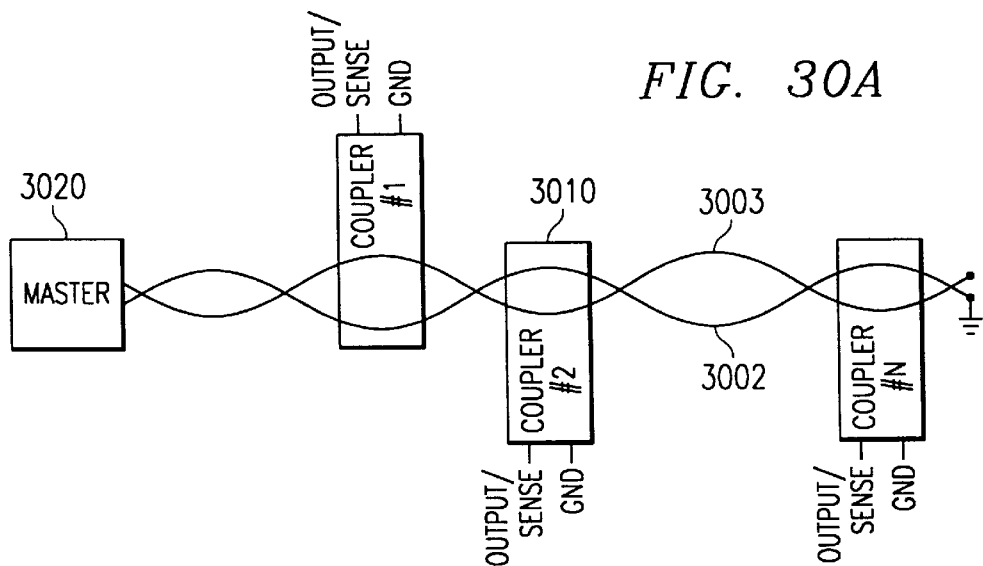
FIGS. 30A, 30B, and 30C show a packaging scheme for an embodiment of FIGS. 29.
Figure 30B:
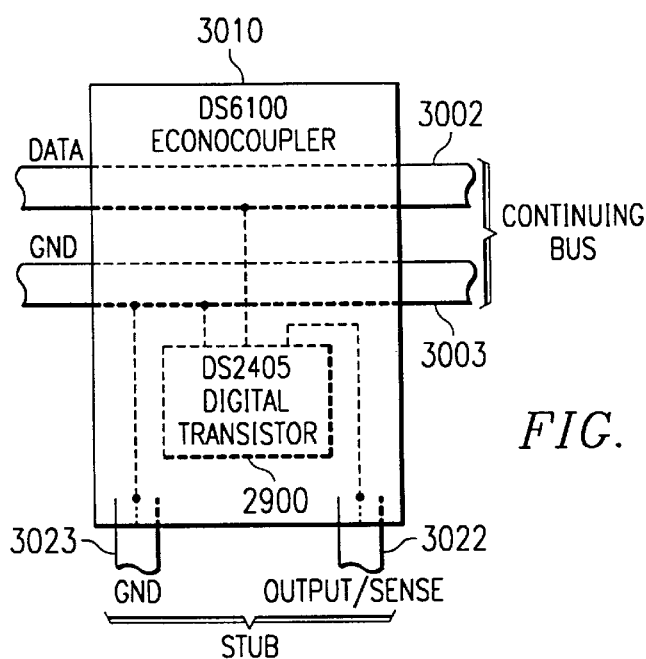
Figure 30C:
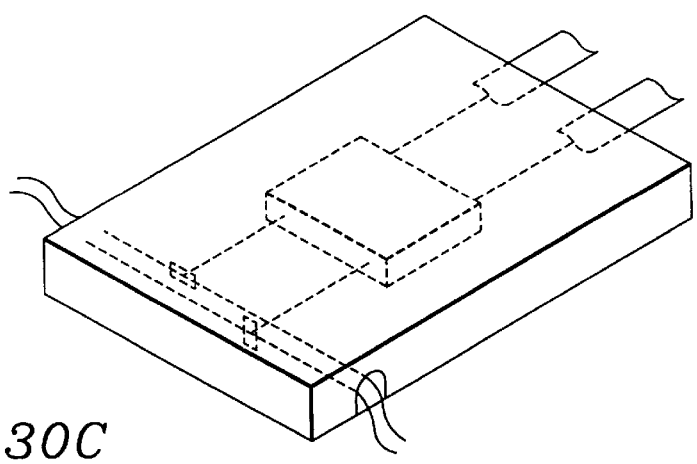

FIGS. 30A–C illustrate a preferred embodiment system with module 2900 which allows simple assembly of systems such as those shown in FIGS. 29B-C. FIG. 30A shows the 1-wire bus as a twisted pair of wires 3002-3003 with three couplers 3010 attached, each coupler 3010 includes a module 2900 with output stub wires 3022-3023 as shown schematically in FIG. 30B. FIG. 30C is a perspective view of coupler 3010 including snap on contacts which cut through the insulation on the twisted pair wires 3002-3003 for electrical contact during assembly. Coupler 3010 measures about 10 mm by 5 mm by 5 mm and may be packaged in molded plastic for use in harsh environments.

Figure 31A:
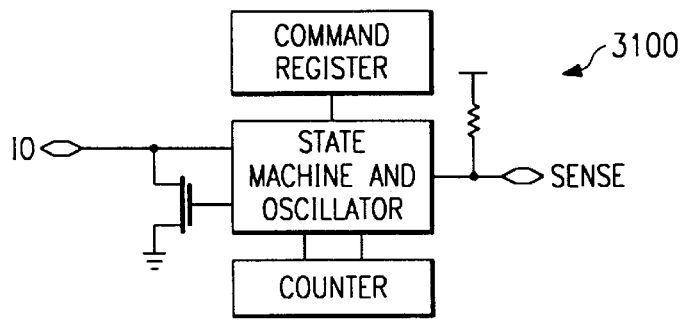
FIGS. 31 A-B illustrate an embodiment application in a mouse.
Figure 31B:
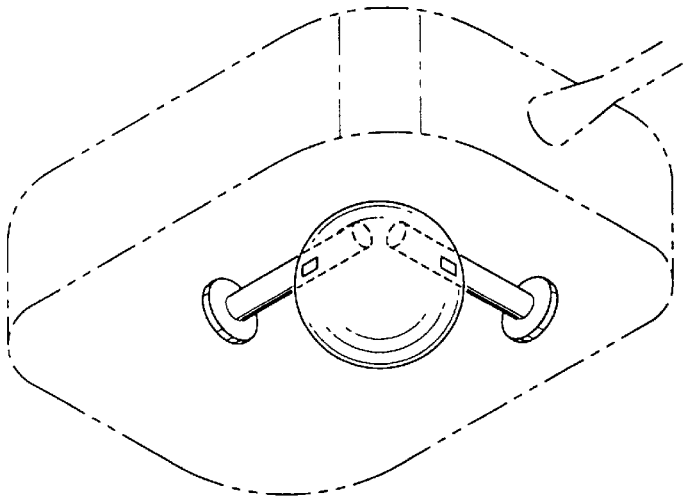

Another type of system uses modules 3100 similar to those of FIG. 29C, but with each module 3100 including a counter to keep track of the number of sensings. See FIG. 31A. The counters are read by the host on a periodic basis, and the counters may be reset at each read. Such a system could be used, for example, in a mouse for a graphic display system; the mouse rollers will drive two sensors, one for each planar direction, and two modules for each sensor (one for increasing and one for decreasing) will keep track of the distance moved by the mouse. This would replace the current system of . . . The sensing pulses may come at a rate of one every millisecond, and the accuracy need not be high, so no special high speed counter is needed. See FIG. 31B.

Figure 32:
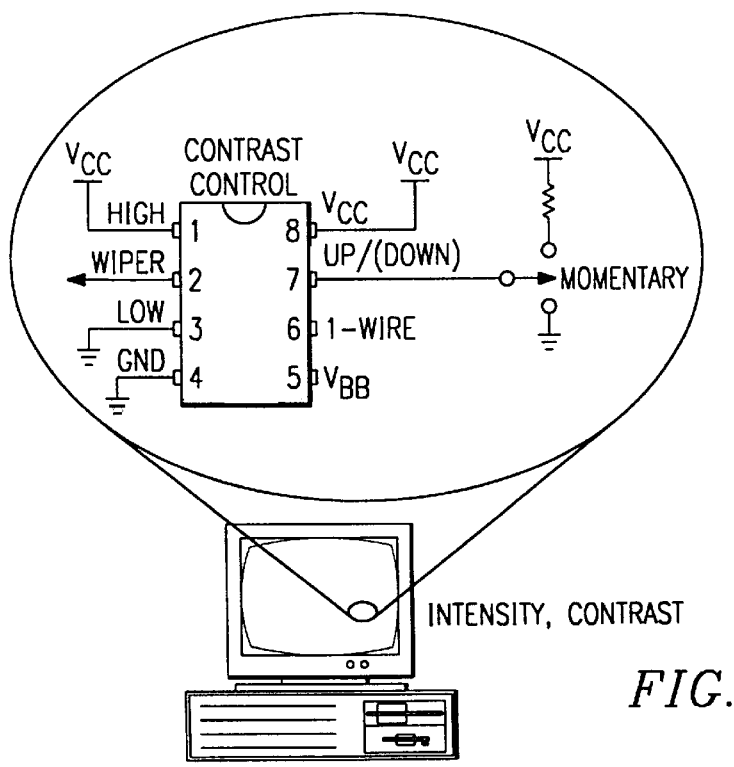
FIG. 32 shows an embodiment application for adjustment control.

A different type of one-wire bus device is shown in FIG. 32 and includes a digital potentiometer (the resistance between pin WIPER and pins HIGH and LOW can be adjusted by storing a setting byte in an internal wiper register) which is configured so that a toggle switch (UP/DOWN) permits incrementing or decrementing the wiper setting byte, and the contents of the wiper register can be read or loaded through the 1-wire terminal just as with modules described above. Such a digital potentiometer can be used for control of adjustments such as intensity, contrast, and volume of televisions, computer monitors, and so forth. And if the contents of the wiper registers are stored in nonvolatile memory, then after a power on (and self test), the stored contents for the wiper registers can be loaded into the wiper registers with the identification of the particular modules for the different adjustments selected with the MATCH ROM DATA commands as previously described. In this manner, adjustments can be remembered.

Figure 37A:
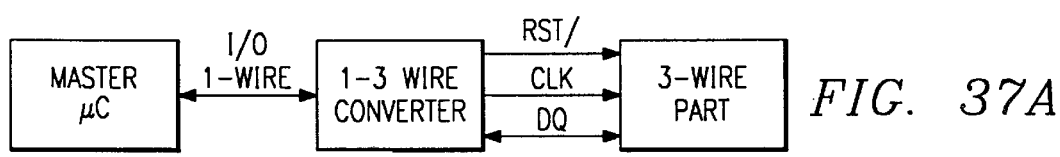
FIGS. 37A-B illustrate a 1-wire to 3-wire interface arrangement.
Figure 37B:
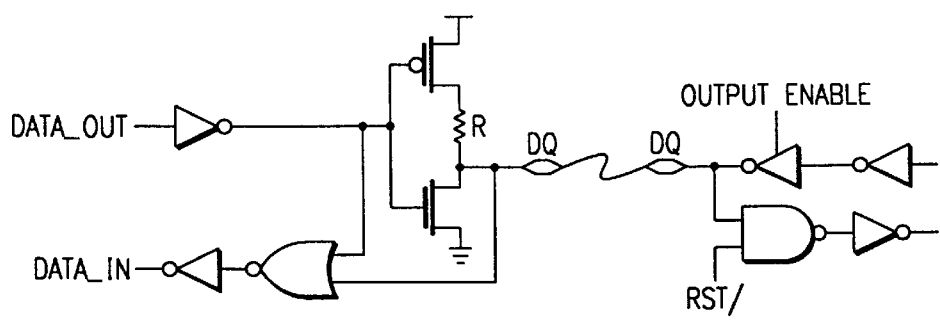

A variety of three wire parts are available from Dallas Semiconductor as well as other manufacturers, and an ability to communicate with several of these devices through a single wire eases the system communication requirements. A system application could incorporate pairs of DS1267's (digital potentiometer) and a 1–3 wire converter requiring only ground and one other wire for communication. This would allow for example a piece of equipment such as an oscilloscope to have many independent calibration adjustments performed through an external mono jack connector. A one-to-three wire bidirectional transceiver enables this operation and could be based on converter 2102 by coupling the DATA_IN and DATA_OUT to a single mode. The second layer commands and register 2104, decode 2106, and ROM and control 2108 could also be part of a one-to-three wire transceiver; see FIG. 37A. A possible implementation of this transceiver would require a great deal of additional circuitry and signals to control the data direction (i.e. whether the bidirectional D/Q port was configured as an input or an output). In a preferred embodiment the need for such additional circuitry is obviated by a passive determination of data direction. This is accomplished by writing a resistive high logic 1 and relying on the 3-wire part to overdrive this to a zero if a read 0 was indicated; see FIG. 37B.

Figure 33:
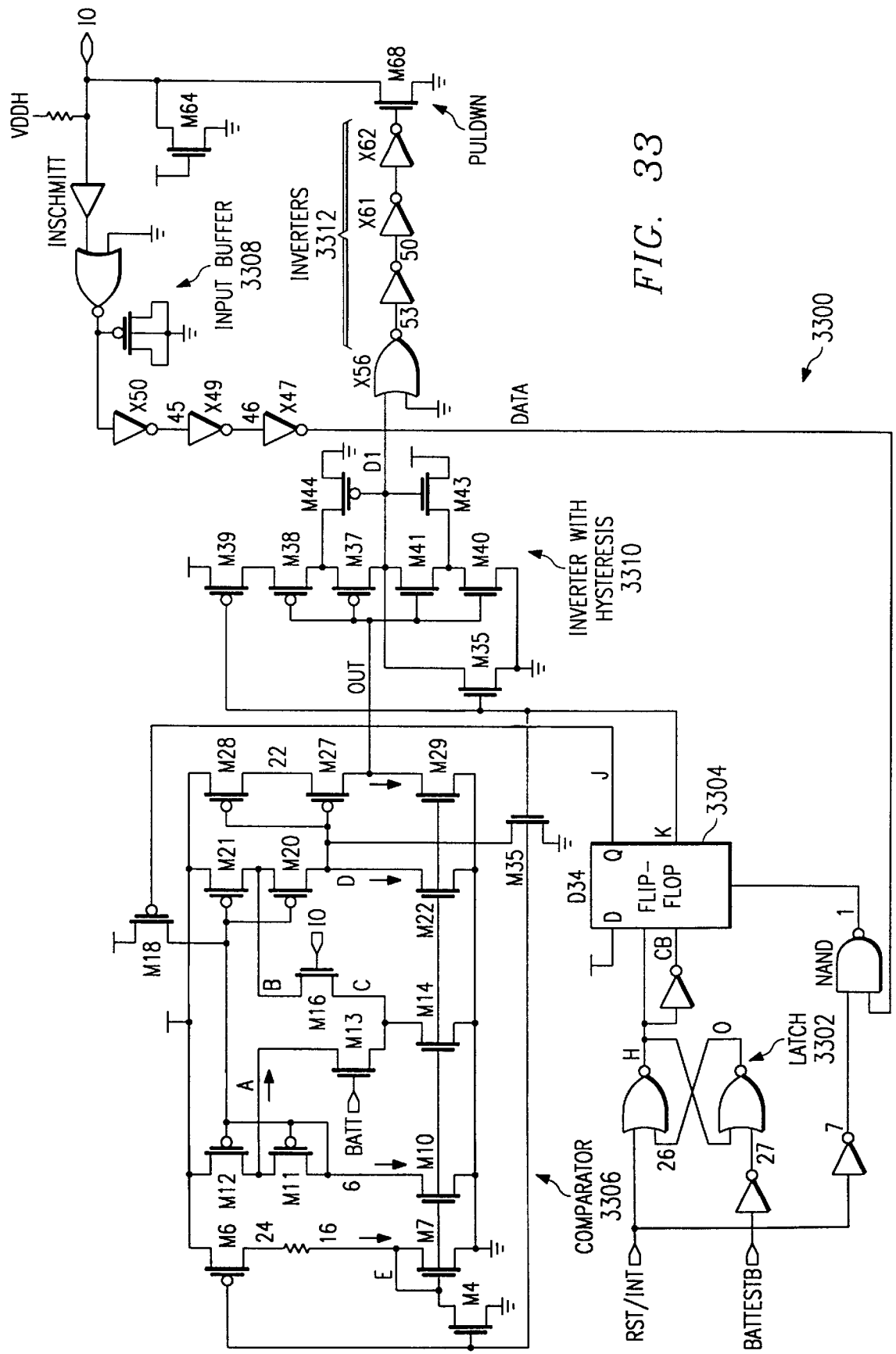
FIG. 33 is a schematic diagram of a module battery test circuit.

FIG. 33 schematically shows test circuitry 3300 that may be included in modules 2400, 2602, . . . to permit testing of an on board battery or a battery embedded within a module and hence inaccessible for voltage level and thereby determine the expected remaining useful battery lifetime. Test circuitry 3300 includes node IO connected to the IOPAD terminal, nodes BATTESTB and RSTINT as inputs to latch 3302, flip-flop 3304, comparator 3306 with positive input node P and negative input node N, input buffer 3308 including a Schmitt trigger and RC filter, inverter with hysteresis 3310 and output pulldown n-channel transistor PULDWN. Comparator 3306 has positive input node P connected to the bus at node IO and negative input node N connected to the battery and output node OUT feeding inverter 3310 which then drives output pulldown transistor PULDWN through inverters 3312. Test circuitry 3300 operates with an analog tester host controlling and sensing the 1-wire bus as follows: The tester host first resets all modules on the bus; then the tester host sequentially writes the 8-bit command Battery Test into the command register of the modules as previously described, and then the tester host sequentially writes 64 identification bits which the module matches bitwise as described for the Match ROM Data command to select out a particular module for battery testing. The selected module then enters test mode by driving BATTEST low which switches latch 3302 to clock flip-flop 3304 to J=1 and thereby activate comparator 3306 and K=0 to activate inverter with hysteresis 3310. The tester host has so far been operating as the typical host by using 5 volt highs; but now the tester host drops the voltage to about 1.7 volts because the battery voltage is in the range of about 1.55 volts down to about 1.0 (lower than 1.0 volt and module is inoperable). Next, the tester host begins slowly decreasing the voltage on the bus in increments of 25 mV with each increment of duration about 100 microseconds. When the voltage on the bus reaches the battery voltage, comparator 3306 switches from an OUT high to OUT low and this turns on pull down transistor PULDWN and pulls the bus low which the tester host senses and thus determines the battery voltage as the last voltage applied to the bus prior to it being pulled down by the selected module. After holding the bus low for roughly 50 nanoseconds, the selected module releases the bus by driving RSTINT high to reset flip-flop 3304 to J=0 to inactivate comparator 3306 and K=1 which inactivates inverter with hysteresis 3310 and turns off pull down transistor PULDWN and also returns BATTESTB high. Note that if the battery voltage is very low, then the tester host will have the voltage on the bus going low which will cause input buffer 3308 to switch from high to low and reset flip-flop 3304 if RSTINT is still low; this prevents inadvertent battery drain.

Figures 34A, 34C:
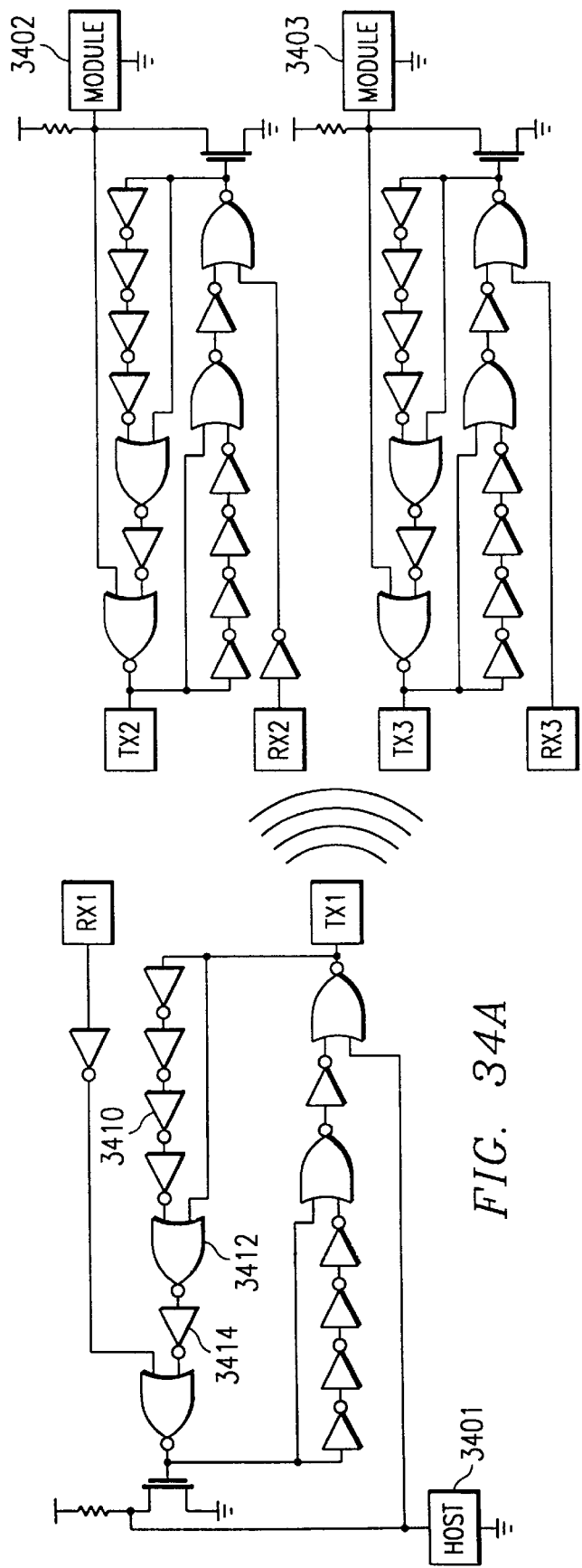

FIG. 34A shows host 3401 and modules 3402-3403 which communicate over a radio frequency or infrared band in place of the one wire bus. The discussion will be in terms of radio frequency (RF) communication. Host 3401 has associated transmitter TX1 and receiver RX1, and modules 3402-3403 have associated transmitters TX2 and TX3 and receivers RX2 and RX3. The transmitters are drawn to broadcast an RF signal upon a high input, and the receivers are drawn to output a high while receiving an RF signal. Only a single RF transmission band is used because transmitted and received data are time-multiplexed on the same band, analogous to the half-duplex signals on a one wire bus. A frequency of of at least 1 MHz is used and this is sufficient to demodulate the 8 microsecond time domain signals required.

The NOR gates and wave shapers coupling the transmitters and receivers to the host and modules insure that a transmitter and receiver for a single device never operate at the same time and also provide delays that account for system speed limitation to allow possible communication, so the transmitter and receiver could be designed as a transceiver and thus share much of the same analog circuitry. Note that the wave shapers (the inverter string 3410 plus NOR gate 3412 and inverter 3414) provides for a short delay for a rising edge and a longer delay on a falling edge due to the inverter string. The delay times can be set by RC time constants, delay lines, inverter propagation as in FIG. 34A, or other devices. The transmitter-receiver fully supports the capabilities of the one wire bus as previously described, and no RF transmission occurs during idle, so power (and battery life) is conserved. Note that the NOR gates plus transmitter and receiver arrangement is the same for host 3401 and modules 3402-3403, so a common transceiver design could be used for both. A low on a one wire bus corresponds to transmission and reception in the RF band, and that a high on a one wire bus coresponds to no transmission in the RF band. When host 3401 or a module 3402-3403 is outputting a low and its receiver is not receiving, then the inputs to the NOR gate to the transmitter are both low and the transmitter is activated. But then the high output of this NOR gate holds the NOR gate from the receiver low even if the receiver begins to receive a signal. Once host 3401 or a module 3402-3403 outputs a high, then the NOR gate to the transmitter goes low and turns off the transmitter plus releases the NOR gate from the receiver to allow reception to pass to the host or module.

FIG. 34B is a timing diagram for the reads and writes over the RF band. Note that most of the transmissions come from host 3401 which typically will have a standard power supply and not be relying upon batteries as do modules 3402-3403.

The RF band in place of a hardwired one wire bus permits use of modules in token form or other form for applications such as security badges, . . . where physical contact would be awkward or inconvenient. The form for an RF module could be a token as in FIGS. 1A-B with one face made of metal (RF ground plane) and one face made of plastic and having an opening for connection from the internal elements to a spiral arm inductor running from the opening outward and acting as the antenna. See FIG. 34C for a perspective view. Preferably the antenna operates well below its lowest resonant frequency. If it is desired to lower the antenna's lowest self-resonant frequency (to increase RF coupling), the spiral inductor can be extended out onto the cylindrical portion of the token (made of plastic) and be capacitively loaded by the metal RF ground plane face. Contrarily, if it is desired to raise the resonant frequency, then the inductor can be configured as a multiarm spiral, or can be less tightly wrapped. If it is desired to lower the Q of the antenna, the spiral can be made of narrower metal or can be tapered towards its end. Further, a ferrite may be placed in proximity to the antenna to increase its effective RF cross section.

The RF module could also use non-resonant RF transmission techniques with a direct driving of signal edges onto a radiating structure to achieve a small-amplitude transmission. With such a transmission scheme, time domain relationships can be used to achieve processor gain. In the frequency domain, such a transmission would appear as a weak broad-band signal; however, the processing gain of such signals can be analyzed using orthogonal basis function sets other than transcendental functions, as is often done in analysis of spread-spectrum communications. Indeed, in spread-spectrum techniques a message to be transmitted is involved with a very long binary sequence, and the resulting signal is used to modulate a RF transmitter. The resulting RF signal can be transmitted with very low spectral power density (so low that a receiver which does not have at least some information about the binary sequence may be unable even to detect that a transmission is being made) and still be accurately received by the intended receiver, which uses the same binary sequence for decoding.

Figure 35A:
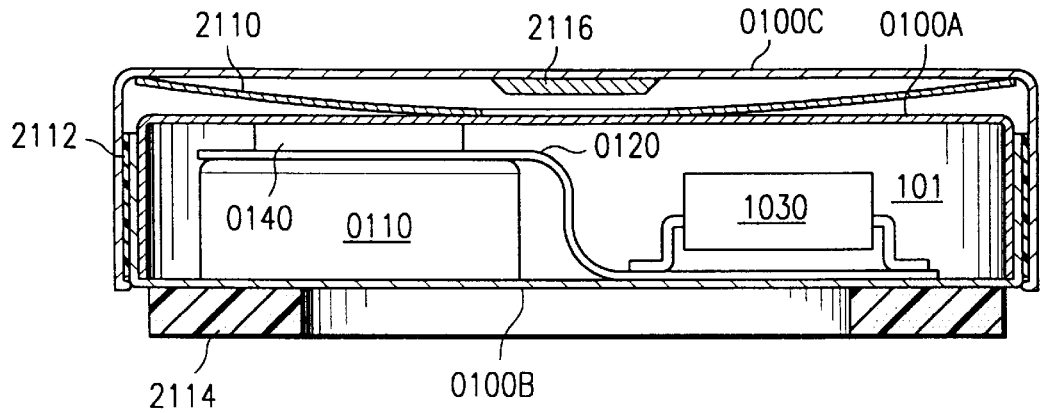
FIGS. 35A, 35B, and 35C illustrate alternative token packaging of embodiments and a token reader.
Figure 35B:
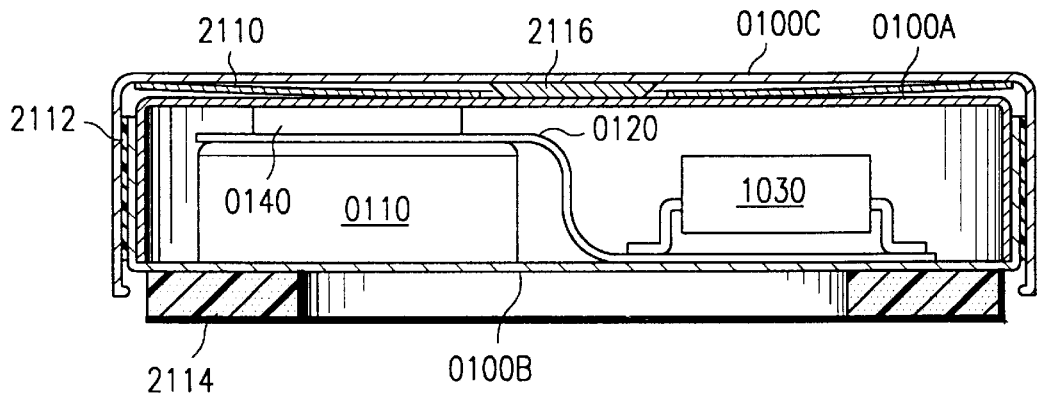

Note that there is no problem of cross-talk if the transceiver transmit and receive links operate at different frequencies. A two frequency approach however requires that two different receiver/transmitter links be available thereby complicating the implementation. The RF transceiver is essentially an inverting transceiver and thus demonstrates the duality of the 'wired or' and 'wired and' operation of the link. Whereas the open drain one-wire operates in a 'wired and' mode, if the half duplex RF communication in air is considered as the one wire link it is clear that if any device is signalling the receiver will detect this and thus a "wired or" operation is apparent. Nonetheless the "search" algorithm is possible and uniquely identifies multiple devices in the field and isolates conversation to individual devices. Note that other non-resonant mode electromagnetic communication methods are possible. These methods may incorporate close range inductive coupling by which the master may induce a signal which is demodulated with a non-linear element followed by a low pass filter (envelope detection) in order to provide the correct time domain electrical signals to the device. In order to read the one-wire device requires the ability to sense whether the n-channel MOS device is on which normally pulls the one-wire electrical line low. This is accomplished by measuring the energy delivered to the transmitting inductor since the energy absorbed by the coupled inductor is greater if the MOS device is on than off. A second approach utilizes two transmit frequencies and couples these to the pickup coil. If the MOS device is on the non-linearity of the diode is manifested through mixing terms which are not otherwise present and thus these are in turn coupled back to the transmit coil where bandpass filtering and envelope detection is employed for sensing a one or zero. These standard RF techniques allow the 'touch' devices to become proximity devices capable of contactless communication. FIGS. 35A-B are cross sectional elevation views of a pushbutton token in which the mechanical switching action implies that the moving piece 100C is electrically connected to shell 100A (through contact 2116) when the moving piece has been depressed as shown in FIG. 35B. A dome-shaped spring 2110 with a hole in the center to permit passage of contact 2116 is coated with an insulator (or placed on an insulating washer, not shown) so that it does not make electrical contact to the moving piece 100C. A teflon sleeve 2112 insulates the sliding contact between piece 100C and shell 100B and also provides some dirt exclusion. Spring 2110 provides some mechanical hystersis to help debounce the contact. The height of contact 2116 is selected to provide the desired degree of travel and resistance. If sleeving 2112 is dimensioned for a tight fit, air resistance will add to the effective force of spring 2110; whereas, if sleeving 2112 is dimensioned for a somewhat looser fit, air turbulence will add a damping force to the switch's action.

In pushbutton token structures the substrate is preferably used to provide two contacts: a fixed protrusion from the substrate which extends up through ring-shaped insulator 2114, locates the token, and makes contact to the bottom shell 100B; another contact is positioned to be contacted by moving piece 100C when it is depressed as shown in FIG. 35B. The simplest way to implement this is with a substrate which includes a dense array of token-receiving sites: each token would have to be placed on a token-receiving site, but a wide variety of resulting configurations could be achieved.

Figure 35C:
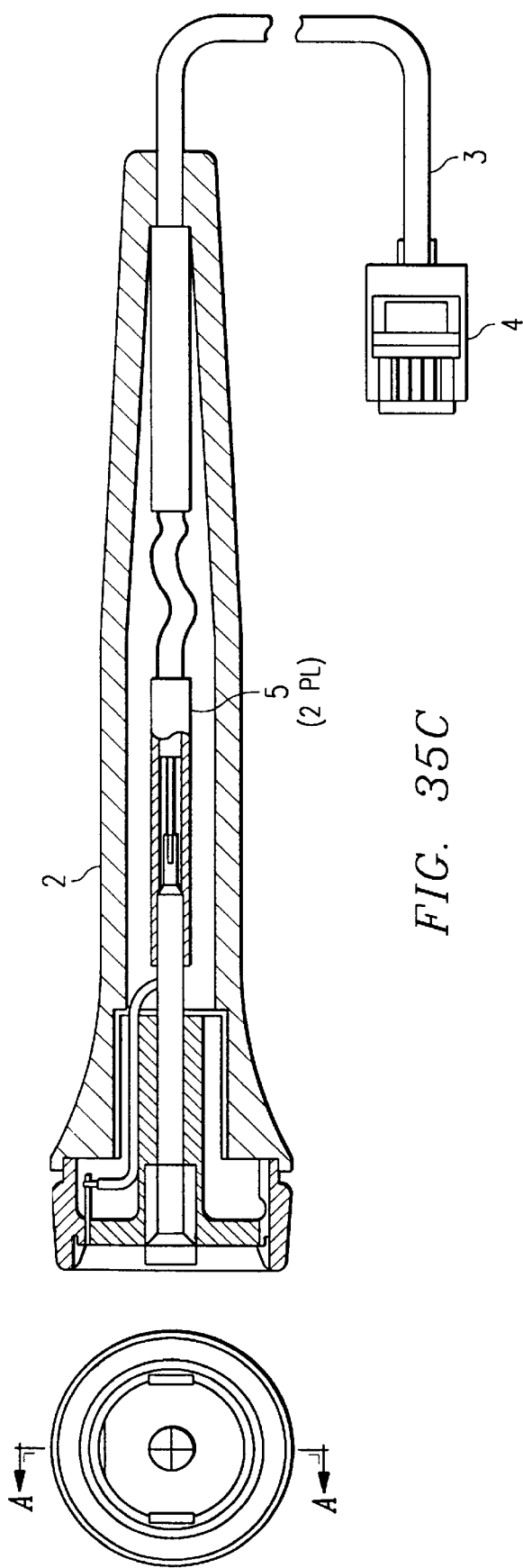

FIG. 35C shows a simple, handheld token reader in cross sectional view.

Figure 36:
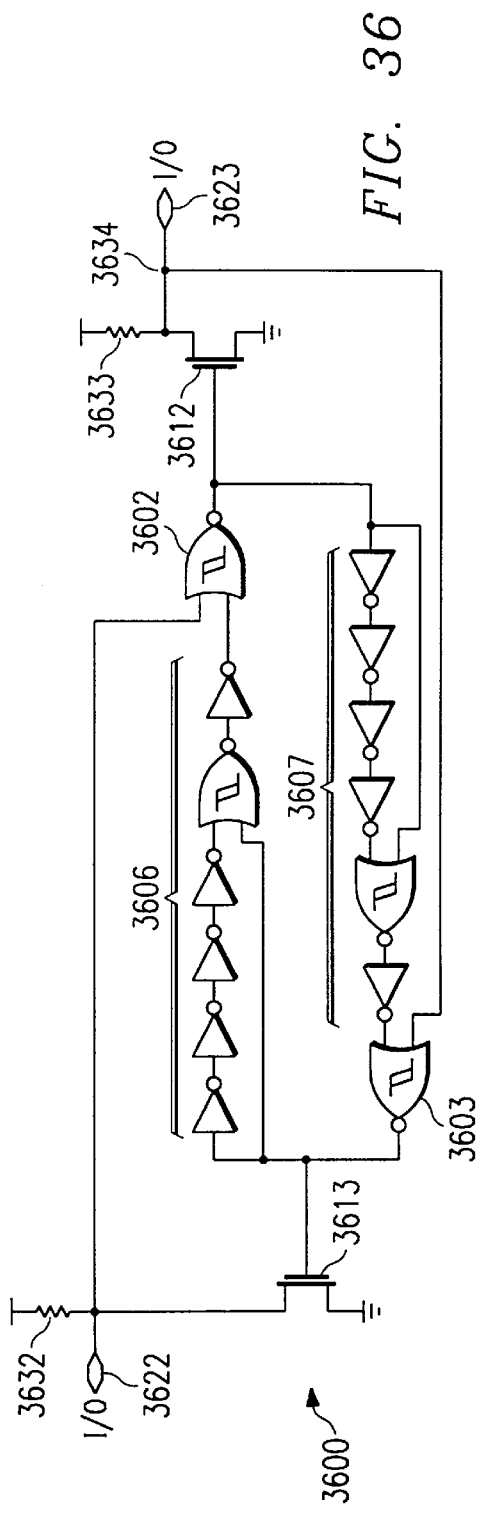
FIG. 36 is a schematic circuit diagram of a bus repeater.

FIG. 36 is a schematic circuit diagram of repeater 3600 for use with a one wire bus. Long busses present a large capacitive load to the host and modules on the bus, and these devices may have insufficient power to provide short rise and fall times for signals. Inserting one or more repeaters 3600 into a bus with the bus connected to the I/O terminals of repeater 3600 will lessen the load seen by the host or modules. Repeater 3600 operates as follows. When the bus is in an inactive high, NOR gates with hystersis 3602-3603 are both low and pull down transistors 3612 and 3613 are both off. Now if a device connected to the portion of the bus connnected to I/O terminal 3622 pulls that portion of the bus low, then NOR gate 3602 will have two low inputs and switch to a high output. The high from NOR gate 3602 turns on transistor 3612 and pulls down I/O terminal 3623 and thus drives the portion of the bus connected to I/O terminal 3623 low. The high from NOR gate 3602 also drives wave shaping circuit 3607 to input a high to NOR gate 3603 after a delay of about 200 nanoseconds which is less than the time it takes node 3634 to go low. Thus NOR gate 3603 has one high input and one low input or two high inputs during this switching, although the inputs switch, and the hystersis of NOR gate 3603 insures that it remains with a low output. Thus transistor 3613 remains off. Then when the portion of the bus connected to I/O terminal 3622 is released and goes high, NOR gate 3602 switches low and turns off transistor 3612 and provides a low input to wave shaper 3607 which delays this low about 200 nanoseconds to NOR gate 3603. Resistor 3633 connected to a power supply then pulls the portion of the bus connected to I/O terminal 3623 high in less time than the delay of wave shaper 3607. NOR gate 3603 again has one input high and one input low that switch, and the delay of wave shaper 3607 and the NOR gate's hystersis holds it in the low output state. Hence, the portion of the bus connected to I/O 3623 follows a low signal on the portion of the bus connected to I/O terminal 3622. For a device active on the portion of the bus connected to I/O terminal 3623 the operation of repeater 3600 is symmetrical and the portion of the bus connected to I/O terminal 3622 will follow a low.

Rather than providing a one wire bus, possibly with repeaters, the host and modules of the foregoing embodiments could tap off of an existing bus which has a fully defined bus architecture, such as a VME bus. Indeed, in a bus which includes a serial bus portion, the D/Q line can be used as a one-wire bus whenever the CLK and RST lines are inactive.

Numerous applications of tokens as convenient, secure information carriers exist: the National Bureau of Standards has promulgated a Data Encrytion Standard (DES). A token could contain one 64 bit key and be readable by a computer which also does the decoding of a published encoded message, or the 64 bit key could be read out of a module and into a dedicated DES Processor such as the DS2160 as manufactured by Dallas Semiconductor Corp. Similarly, a token could contain a generator polynomial for a spread-spectrum binary sequence to decode spread-spectrum transmissions. This could be adapted for pay-per-view TV broadcasts.

Further Modifications and Variations

It will be recognized by those skilled in the art that the concepts disclosed in the present application can be applied in a wide variety of contexts. Moreover, the preferred implementation can be modified in a tremendous variety of ways. Accordingly, it should be understood that the modifications and variations suggested below and above are merely illustrative. These examples may help to show some of the scope of the inventive concepts, but these examples do not nearly exhaust the full scope of variations in the disclosed novel concepts.

For example, by including integrated circuits with more security features (such as a DS1207 TimeKey™ from Dallas Semiconductor Corporation), the module bus architecture can also be used for applications where security is a high priority. Advantageous applications of this type may include "smart cards", personnel identification badges, and electronically verified currency.

For example, the RAM/ROM hybrid cell of FIG. 11 could alternatively be implemented with EPROM-type transistors. In this case, the combination of fuse 1130 and transistor 1140 would be replaced by a single floating-gate transistor. For another example, the laser-blown fuses 1130 used in the presently preferred embodiment of FIG. 11 could be replaced by electrically-blown fuses instead.

For another example, many advantages can be obtained by adapting the disclosed concepts to a module which included electrically programmable elements (EEPROM memory or EEPAL logic) instead of battery-backed memory and logic. Such a module would be more expensive, and would require a modified bus protocol (so that the module could be powered from the data line while in contact with the host).

For another example, the board in the module of FIG. 11 can be flexible or rigid, and can be made of conventional or other printed-circuit-board construction. Similarly, the one or more integrated circuits in the module can be packaged in a SOIC or other conventional package, or mounted using chip-on-board or chip-on-flex techniques, or mounted in other ways, as long as sufficient hermeticity is achieved. (Preferably the packaging technique is also selected to minimize cost.)

For another example, the system and method disclosed for interfacing an electronic token to an RS232 port can be applied to serial ports using other standards. Even without exploiting the capabilities of UART chips, tokens can be interfaced to a very wide variety of serial ports, or to ports such as pins of the parallel printer port on a standard PC.

The contents of the data field in the module can be chosen by the systems designer, and a wide variety of formats can be used. Of course, some additional software would normally be used on the host side for Data Error Checking. For example, cyclic redundancy check bits may be encoded with the stored data, using a variety of methods.

Of course, a much more accurate time base in the module can be provided by using a higher battery voltage. However, the use of the low battery voltage of the presently preferred embodiment is advantageous in providing low cost and low power consumption. It should be noted that (in line with the discussion above regarding FIGS. 5A and 5B) that a more accurate time base could also be achieved by modifying the CMOS processing to lower the transistors' threshold voltages $V_{TP}$ and $V_{TN}$. However, as is well known to those skilled in the art of CMOS design, such a modification would carry its own costs (e.g. increased subthreshold current), and therefore is not presently preferred. However, it is important to note that some of the advantages of some of the disclosed innovations could be realized in such an environment.

It must be understood that the many teachings set forth herein can be used separately. For example, a symmetric two-sided token package could be used instead, with a contact in the center of each face. This would not be as cheap nor as robust as the package of FIG. 1A, but many of the teachings could be adapted for use in such an embodiment. Symmetry can also be achieved with the previously described embodiments by reading with a reader with two signal lines, with the "data" and "ground" functions of these two lines periodically interchanged.

For another example, the charge consumption due to precharge of columns which are not being read during a memory access could be reduced by configuring the memory as multiple subarrays. (This might be particularly advantageous when using larger memory sizes.)

An additional second layer command is possible available only for interrupt capable devices. This command is similar to "SEARCH" but only devices with active interrupts respond. This command enables a multi-drop system to be quickly polled to determine the source of interrupts.

For another example, the packaging of the module can be widely varied, even within the context of a module which interfaces to a one-wire bus. For example, it is contemplated that a standard connector configuration (such as a subminiature 3/32" phone plug) could be used to define pin placement for a data module. While such configurations are believed to be as advantageous as the principal preferred package embodiments, such alternative package embodiments do have their own advantages, and many the teachings set forth herein can be used in such a context.

As will be recognized by those skilled in the art, the concepts described in the present application can be modified and varied over a tremendous range of applications, and accordingly their scope is not limited except by the allowed claims.

Further Token Embodiments

Figure 38A:
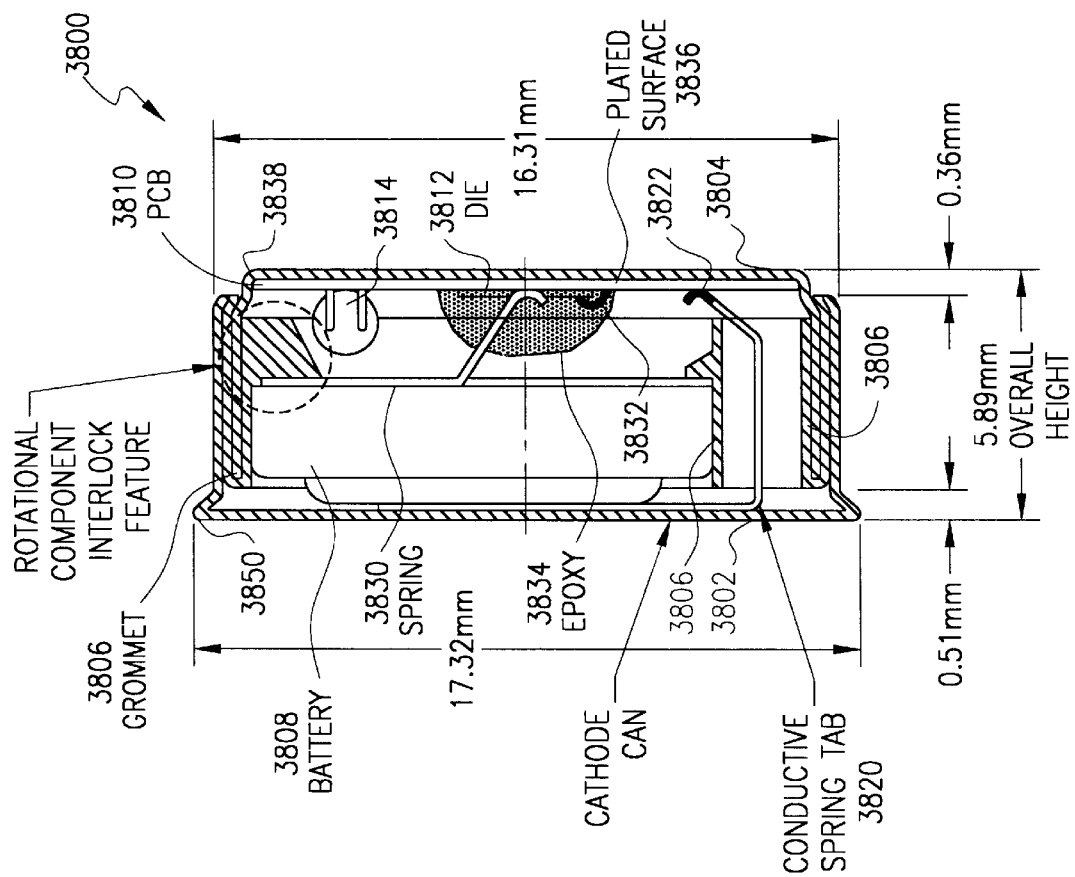
FIGS. 38A-B show cross sectional and plan views of a preferred embodiment token containing a battery.
Figure 38B:
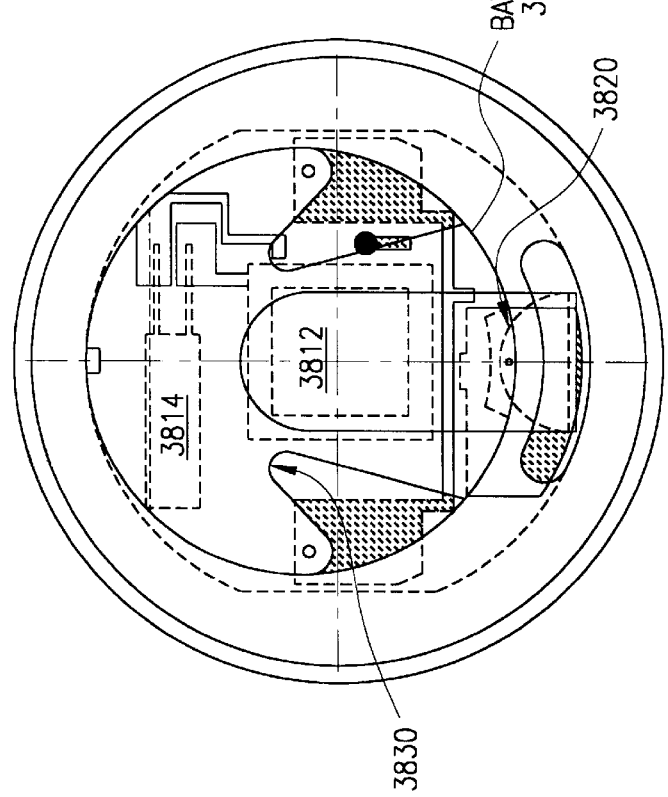

FIGS. 38A-B are cross sectional elevation and plan views of a further preferred embodiment token (integrated circuit plus battery in a can), generally denoted by the reference numeral 3800, as including stainless steel ground contact piece 3802, stainless steel data contact piece 3804, sealing and insulating grommet 3806, 3 volt battery 3808, printed circuit board (PCB) 3810, integrated circuit die 3812 mounted on the PCB, oscillator crystal 3814 mounted on the PCB, battery ground spring 3820 which connects the negative terminal of battery 3808 to ground contact piece 3802 and to ground pad 3822 on the PCB, and battery spring 3830 which connects the positive terminal of battery 3808 to a power supply pad on the PCB. Integrated circuit 3812 has bond wires 3832 to pads on the PCB and has epoxy 3834 encapsulating the die plus bond wires and affixing the die to the PCB. PCB 3810 has a metal-plated backside 3836 for contact with data contact piece 3804 and a conductive via from backside to frontside to make contact from data contact piece 3804 to a signal pad on the PCB frontside.

Assembly of embodiment 3800 proceeds by loosely setting the various parts in data piece 3804, putting ground contact piece 3802 over the parts and data contact piece 3804, and then pressing pieces 3802 and 3804 together to compress springs 3820 and 3830 followed by crimping the open end of piece 3802 in towards shoulder 3838 of piece 3804. This crimping of piece 3802 compresses the adjacent portion of grommet 3806 to form a seal and provides the mechanical strength to hold pieces 3802 and 3804 together under the spring forces. Springs 3820 and 3830 hold battery 3808 and PCB 3810 in place within the assembled structure. Ground spring 3820 may have a bow in the portion between ground piece 3802 and battery 3808 to insure good contact points. Grommet 3806 basically has two concentric circular parts for insulating the cylindrical portion of data piece 3804 plus an extension part for insulating the ground spring 3820 from the sides of battery 3808.

Flange 3850 formed in ground piece 3802 assists in various attachment methods for embodiment 3800 as described in more detail in the following.

Electrical Equivalent

The following table shows alternative combinations of features possible for modifications of embodiment 3800. Note that a ROM or EEPROM may be used without a battery and thereby permit smaller (thinner) tokens (mircocans) and that an identification number may be stored in ROM at the time of manufacture.

| ROM | RAM | EEPROM | Battery | Clock crystal |
|-----|-----|--------|---------|---------------|
| yes | no  | no     | no      | no            |
| yes | yes | no     | yes     | no            |
| yes | yes | no     | yes     | yes           |
| yes | no  | yes    | no      | no            |

For a RAM to be nonvolatile, continuous battery power may be needed; similarly, for a clock/calendar using a crystal oscillator, continuous battery power would be needed to run the oscillator. EEPROM, either with or without a battery, may require a charge pump plus voltage regulator.

Figure 39A:
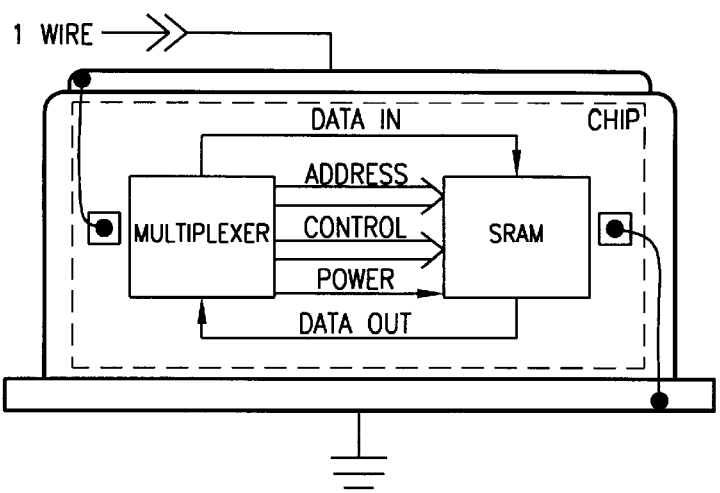
FIGS. 39A, 39B, and 39C show electrical equivalent circuits of a token.
Figure 39B:
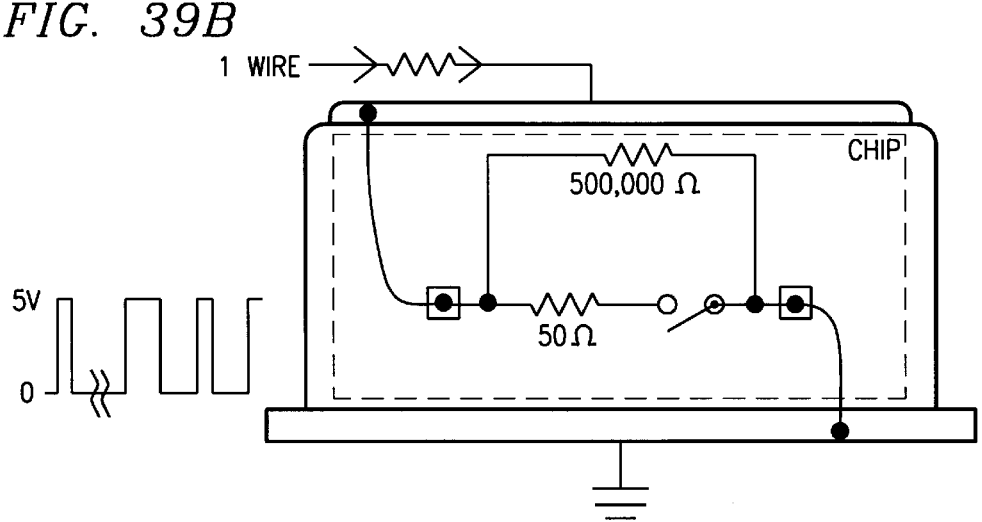
Figure 39C:
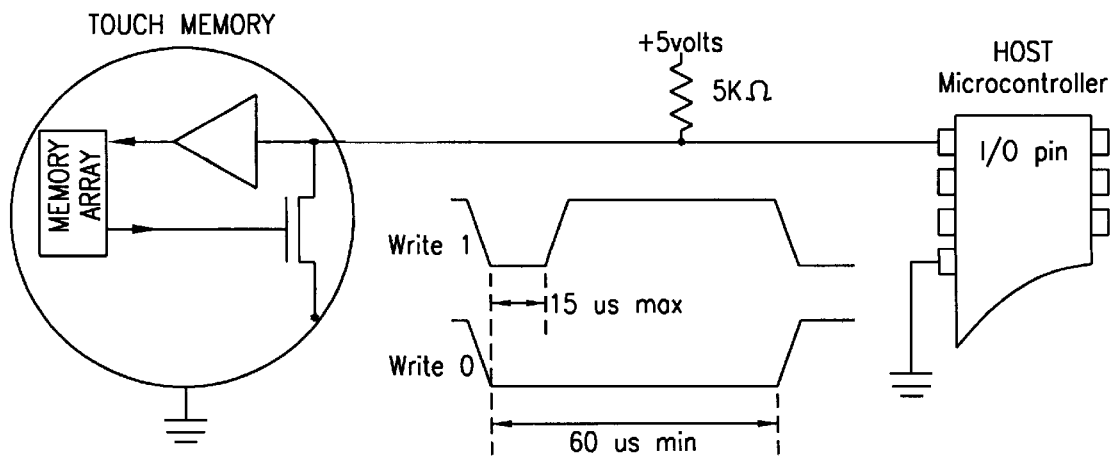

FIGS. 39A-B illustrate equivalent circuits for the electrical behavior of a version with RAM (and battery). As described in the parent application, a host will supply a data line with, typically, +5 volts relative to ground, and pull downs by either the host or embodiment 3800 generates signals for the other with the pull down duration determining the difference between a 0 and a 1 and other special signals. FIG. 39C heuristically illustrates the signalling.

Mounting

Figure 40A:
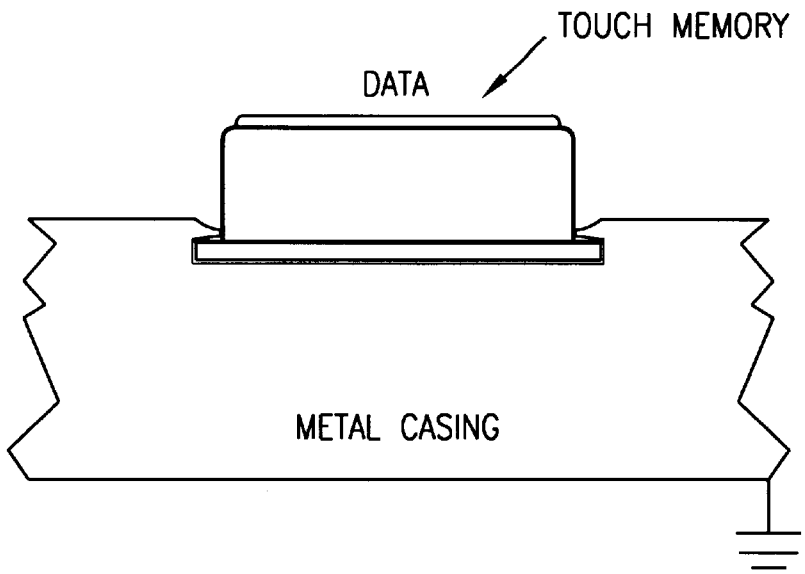
FIGS. 40A, 40B, and 40C illustrate press fit tokens.
Figure 40B:
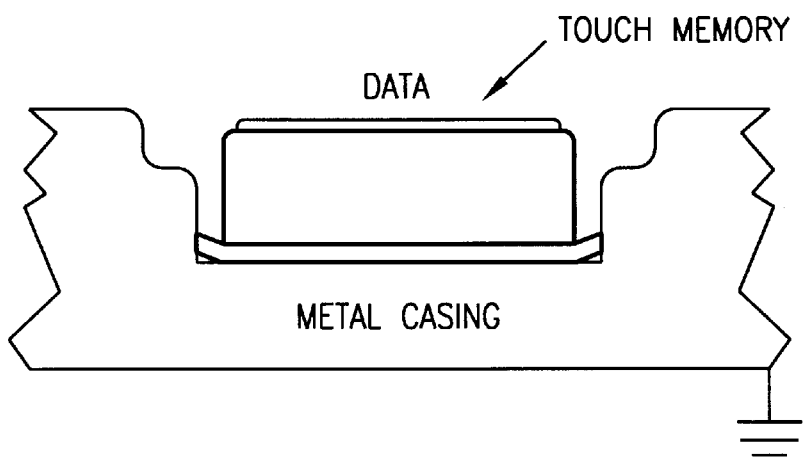
Figure 40C:
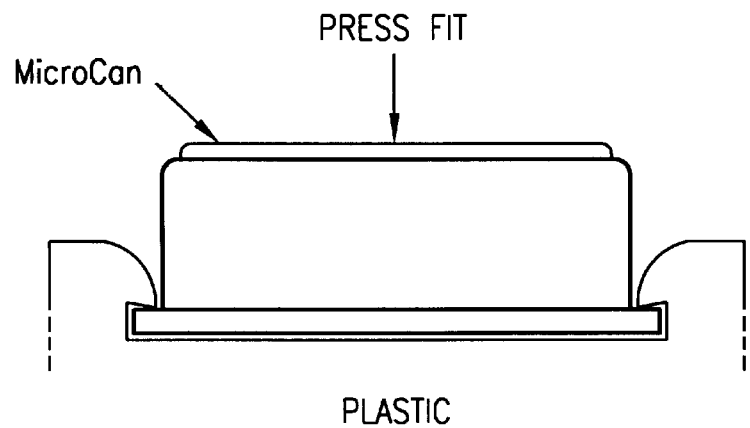

FIGS. 40A–C illustrate in cross sectional elevation views of use of flange 3850 for mounting embodiment 3800 in conductors such as ferrous or nonferrous materials (FIGS. 40A-B) or insulators such as plastic (FIG. 40C). In effect, flange 3850 provides a projection on embodiment 3800 for mechanical binding. In the case of a conductive mounting, the mounting material may be used as the ground contact, so embodiment 3800 need not extend above the surface plane. Contrarily, for a mounting in plastic (which may be easily deformed about flange 3850 for thermoplastics by heating), a sufficient amount of the cylindrical portion of the ground contact must extend above the mounting surface to permit a probe to make a good electrical connection.

Figure 41A:
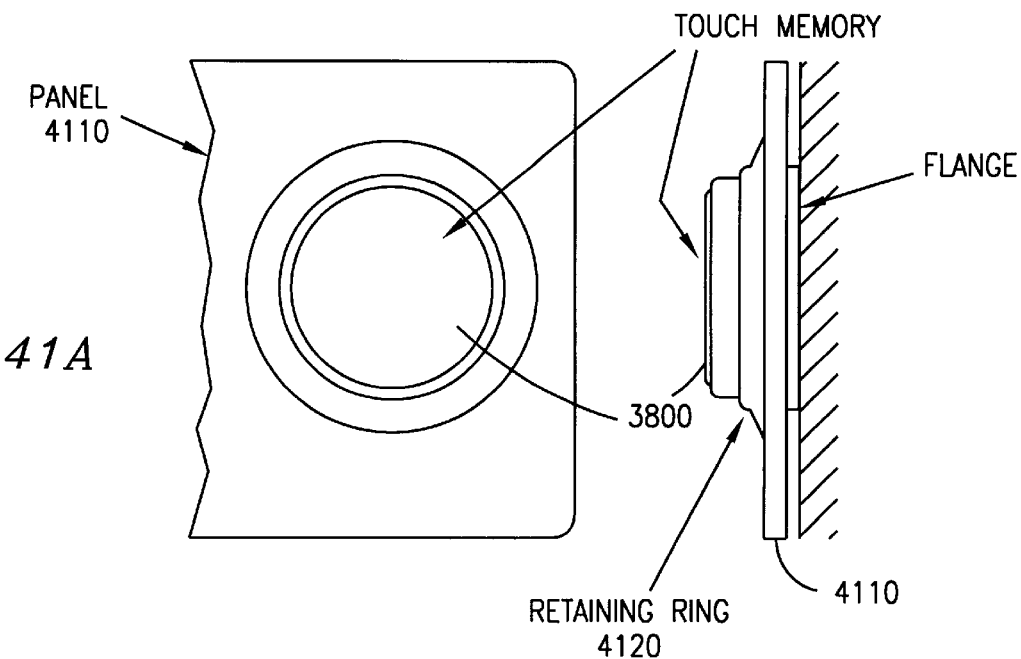
Figure 41B:
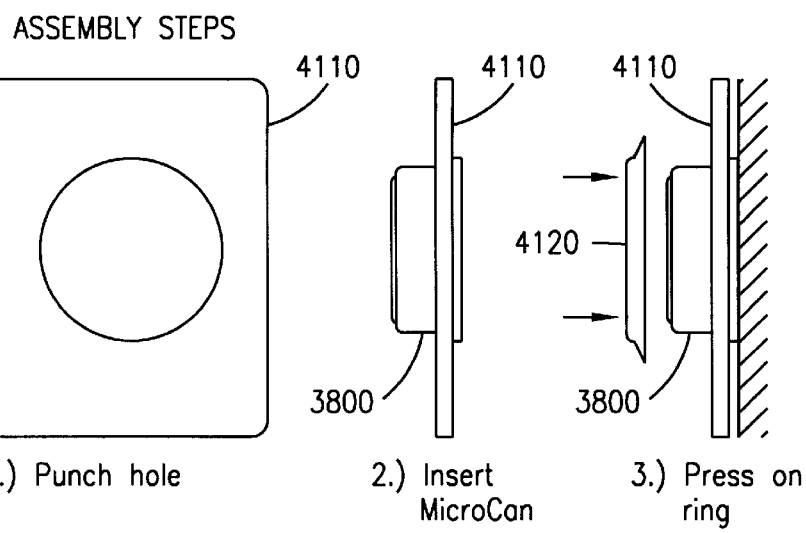

FIGS. 41A-B show plan and elevation views of embodiment 3800 mounted on a planar substrate 4110 of thickness on the order of 1–2 mm. Substrate 4110 has an opening of diameter slightly greater than 16.3 mm (the diameter of the major portion of embodiment 3800), and retaining ring 4120 has an inside diameter of essentially 16.2 mm so that pressing retaining ring 4120 onto embodiment 3800 deforms ring 4120 to provide the mechanical connection. Ring 4120 conveniently has a conical washer shape for ease in the press fitting. Ring 4120 may be made of soft steel or copper and thereby provide an electrical extension of the ground contact of embodiment 3800. The outside diameter of ring 4120 is about 18 mm, and the overall thickness is about 1 mm. Thus at least 2 mm of the cylindrical sidewall portion of the ground contact will extend out beyond ring 4120; this provides sufficient area for probe connection even when ring 4120 is made of an insulator such as plastic.

Figure 41C:
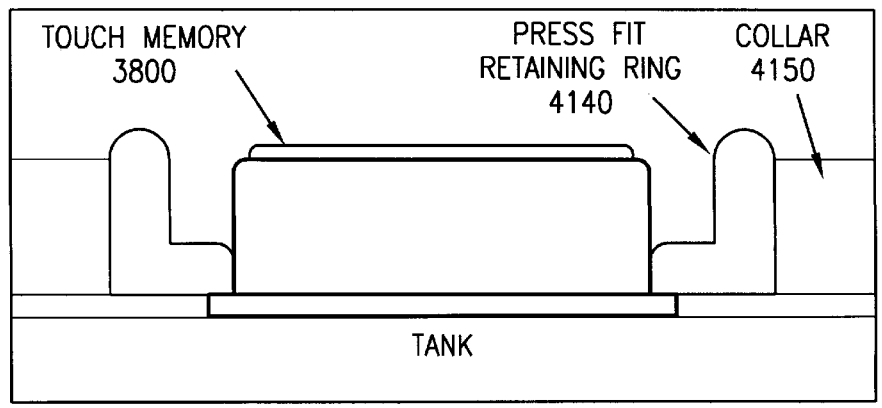

FIG. 41C shows retaining ring 4140 as mechanically binding to the inside of an opening in collar 4150 and no necessarily binding to embodiment 3800. Thus retaining ring 4140 has an outside diameter mating with the inside diameter of the collar opening as opposed to retaining ring 420 which has an inside diameter mating with the outside diameter of embodiment 3800. Retaining ring 4140 may be a conductor such as copper or an insulator such as plastic.

FIGS. 41D–G shows retainer 4160 which may be conveniently used with a printed circuit board. In particular, retainer 4160 begins as a single piece of metal (perspective view in FIG. 41D) and then evolves as follows. Initially, retainer 4160 is soldered to printed circuit board pads at two locations: center 4162 which will be the data line and outer flat portion 4164 which will be the ground line. The first insertion of embodiment 3800 into the retainer breaks connector 4166 and thereby eliminates the short between the data and ground lines. FIG. 41E shows the plan view and FIGS. 41F-G are cross sectional elevation views along lines F—F and G—G, respectively, of FIG. 41E. Leaf springs 4168 apply an upward force (and electrical contact) on an inserted embodiment 3800 but side latches 4170 hold it in retainer 4160. Thus, when one (or both) side latch 4170 is moved outwards to release embodiment 3800, leaf springs 4168 make embodiment 3800 pop up for easy manual removal. Leaf springs 4168 provide the data contact and side latches 4170 provide the ground contact to an inserted embodiment 3800. Note that retainer 4160 does not use the flange on embodiment 3800 and it may be omitted.

FIGS. 41H-I illustrates in plan and cross sectional elevation views another mounting of token 3800. In particular, planar piece 4180 has a built-in clip 4182 which is slightly more than half a circle. Clip 4182 is made of an elasotmeric material so a token 3800 may be pushed into clip 4182 from the open end (that is, upwards in FIG. 41H), and the defomation of clip 4182 will hold token 3800 by its flange. FIG. 41I shows token 3800 held by clip 4182 against planar piece 4180. As is apparent from FIG. 41I, token 3800 extends from clip 4182 analgous to the situation for the retaining ring mountings in FIGS. 41A–C; this permits simple communication with token 3800 even for planar piece 4180 and clip 4182 made of insulating material such as plastic. Additionally, slot 4184 in planar piece 4180 allows for ground contact access to token 3800 from the backside of planar piece 4180.

Probes

Probes to make electrical connection with the data and ground contacts of embodiment 3800 may be simple devices because only two contacts are needed. FIG. 35C shows a probe. Probe 4200 of FIGS. 42A-B (plan and cross sectional elevation views) provides data contact 4210 and ground contact 4220 plus adds magnet 4230 to hold embodiment 3800 to the contacts. Probe 4200 is useful for applications such as reading an embodiment 3800 affixed to a cow's ear for lifetime tracking; pursuading a cow to hold still while data is read out or written in may be difficult. The magnetic attachment of a loosely held probe 4200 overcomes this and extends range of convenient applications for embodiment 3800.

Figure 42C:
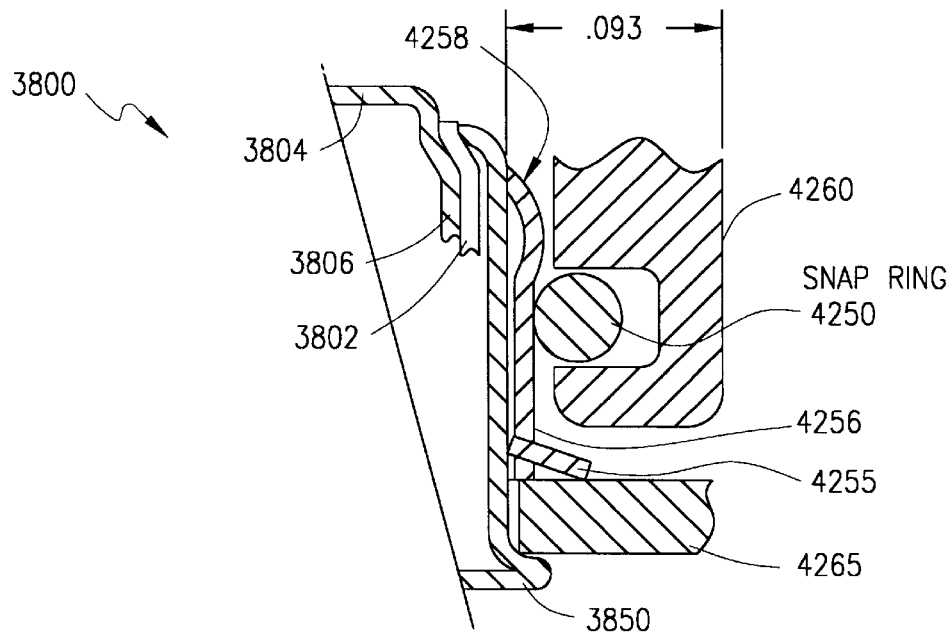
Figure 42D:
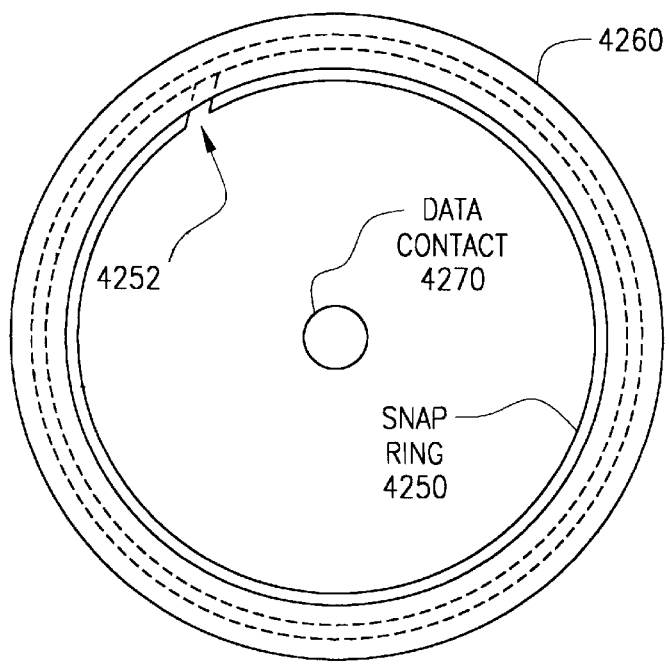

FIGS. 42C-D show in cross sectional elevation and plan view of snap ring 4250 which may be incorporated into a probe as shown in FIG. 35C or probe 4200 without the magnet; snap ring 4250 holds the probe to mounted token 3800. In particular, token 3800 is mounted as shown in FIGS. 41A-B or FIG. 41C by retaining ring 4255 to hold token 3800 against substrate 4265. Retaining ring 4255 also has extension sleeve portion 4256 having a bow 4258 for engaging snap ring 4250. Probe ground contact 4260 contains a groove for holding snap ring 4250, and snap ring 4250 is a split metal ring which expands at its split 4252 to pass over bow 4258 as the probe is pressed over the mounted token. The data contact 4270 of the probe is spring-loaded and holds snap ring 4250 against bow 4258 which is affixed to the ground contact of token 3800, and snap ring 4250 thereby insures electrical connection from probe ground 4260 to the ground contact of embodiment 3800.

FIGS. 42E-F illustrate in plan and cross sectional elevation views another snap ring type mounting of token 3800. In particular, cylindrical piece 4280 has an interior diameter slightly larger than the outside diameter of the flange on token 3800 plus has interior lip 4282 which has an interior diameter between the flange outside diameter and the outside diameter of the main portion of token 3800. Thus token 3800 will fit against lip 4282 when inserted from the end of piece 4280 which is remote from lip 4282. Groove 4284 on the inside of piece 4280 is located about a flange thickness from lip 4282. Thus when C-ring 4286 (a split ring analogous to snap ring 4250) is compressed and inserted from the end of piece 4280 remote from lip 4282, C-ring 4286 can be moved up to and expand into groove 4284. C-ring 4286 in groove 4284 will hold token 3800 against lip 4282 and thereby provide a mounting of token 3800 in piece 4200. Token 3800 extends beyond lip 4282 and this permits probe contact. Further, cylindrical piece 4280 could be conductive and provide the ground contact to token 3800.

Contact Extension

The physical size of the data and ground contacts of embodiment 3800 may be extended by attachment to large conductors; this allows for greater tolerance in making electrical connections to read and write data. In particular, FIG. 43A shows work tote 4310 (made of an insulator such as plastic) with two conductors (such as metal foil or stampings), 4320 and 4330, which make electrical connection to the data and ground contacts, respectively, of embodiment 3800. The dimensions for tote 4310 may be on the order of 40 inches long, 20 inches wide, and 15 inches high with conductors 4320 and 4330 on the order of 4 inches wide and extending around both the side and bottom corners. FIG. 43B is a close up view of embodiment 3800 held by tension from fingers 4331-4334 formed in extended ground contact 4330. FIG. 43A also shows portions 4302 and 4303 of extended contacts 4320 and 4330 formed into a simulation of data and ground contacts so that a probe designed for directly reading embodiment 3800 if it were not held behind fingers 4331-4334 (e.g., a probe such as probe 4200) could still be used for reading and writing embodiment 3800 despite its occlusion by fingers 4331-4334. That is, extended data contact 4320 has a portion 4328 raised to simulate a data contact, and extended ground contact 4330 has portions 4338 protruding to simulate part of the cylindrical portion of a ground contact and center a probe applied to make electrical connection.

Figure 43C:
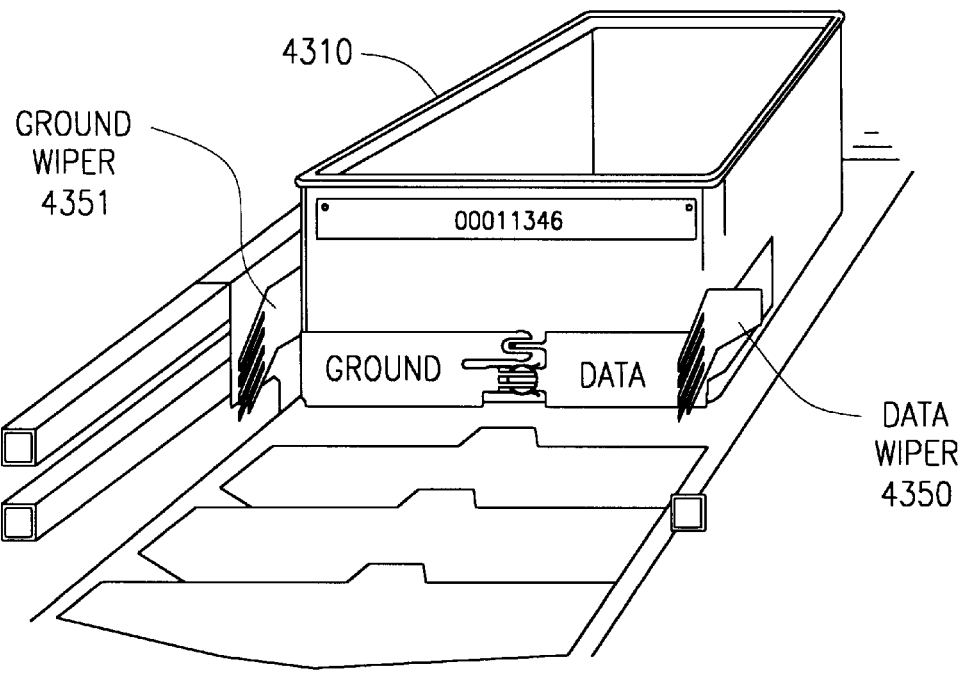
Figure 43D:
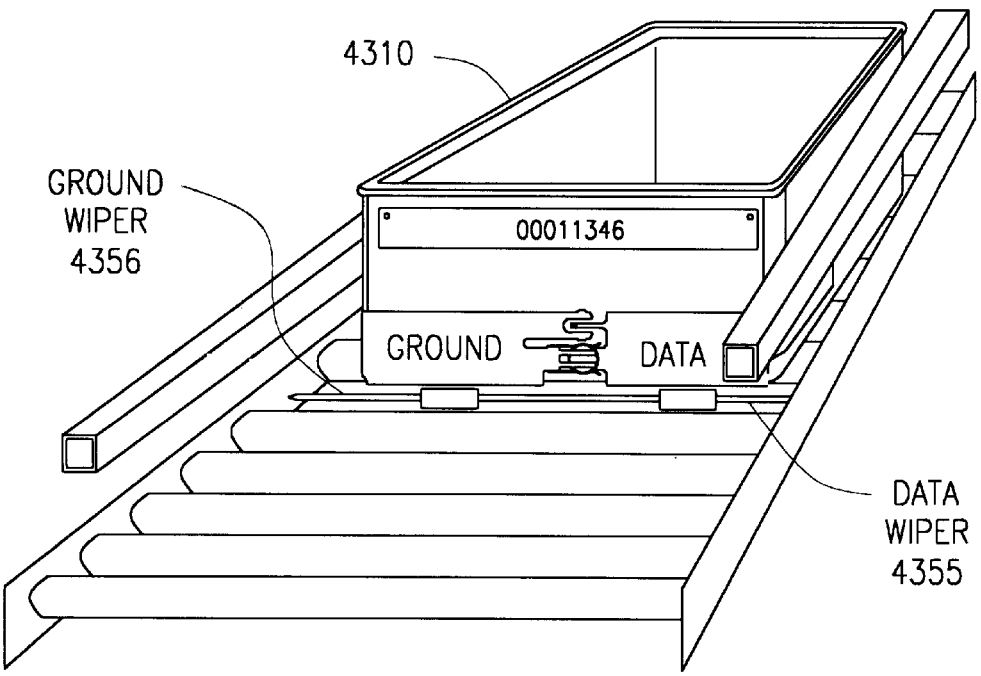
Figure 43E:
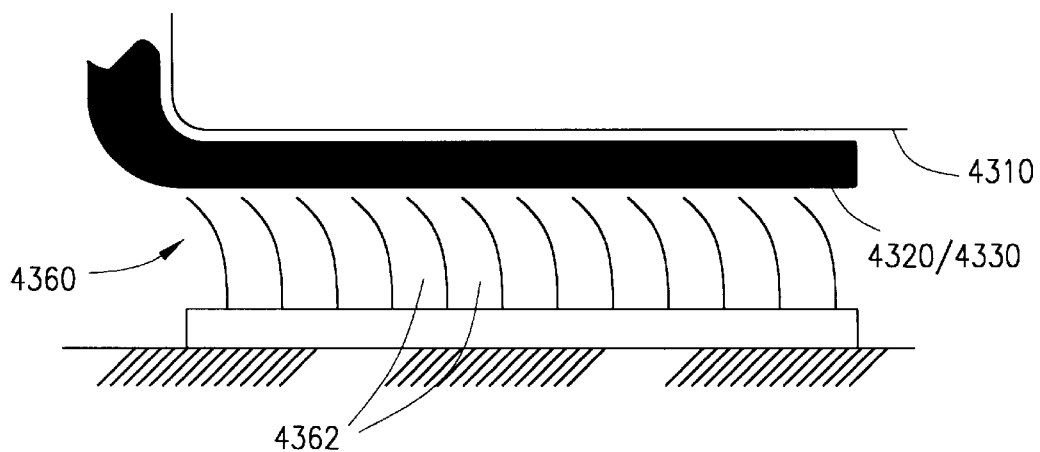

FIGS. 43C–E show methods of making electrical connections with the extended data and ground contacts by using wiping electrodes. In particular, FIG. 43C shows side-mounted finger-like electrodes 4350-4351 for an insulated conveyor belt, and FIG. 43D shows bottom-mounted electrodes 4355-4356. The particular electrodes of FIGS. 43C-D could be replaced with brush-like electrodes 4360 as shown in FIG. 43E. The brush electrode provides multiple stainless steel bristles 4362 for parallel electrical connections, the large number of bristles making connection at any one time insures relatively low (e.g., 500 ohms) maximum contact resistance.

Figure 43F:
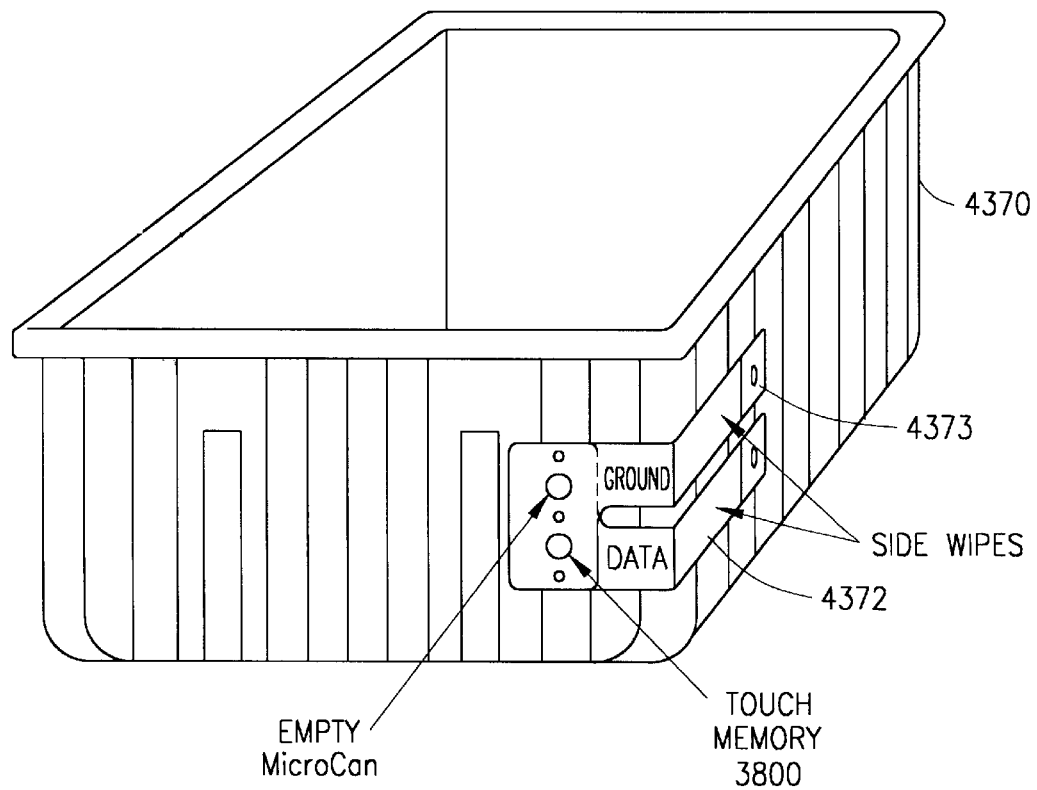
Figure 43G:
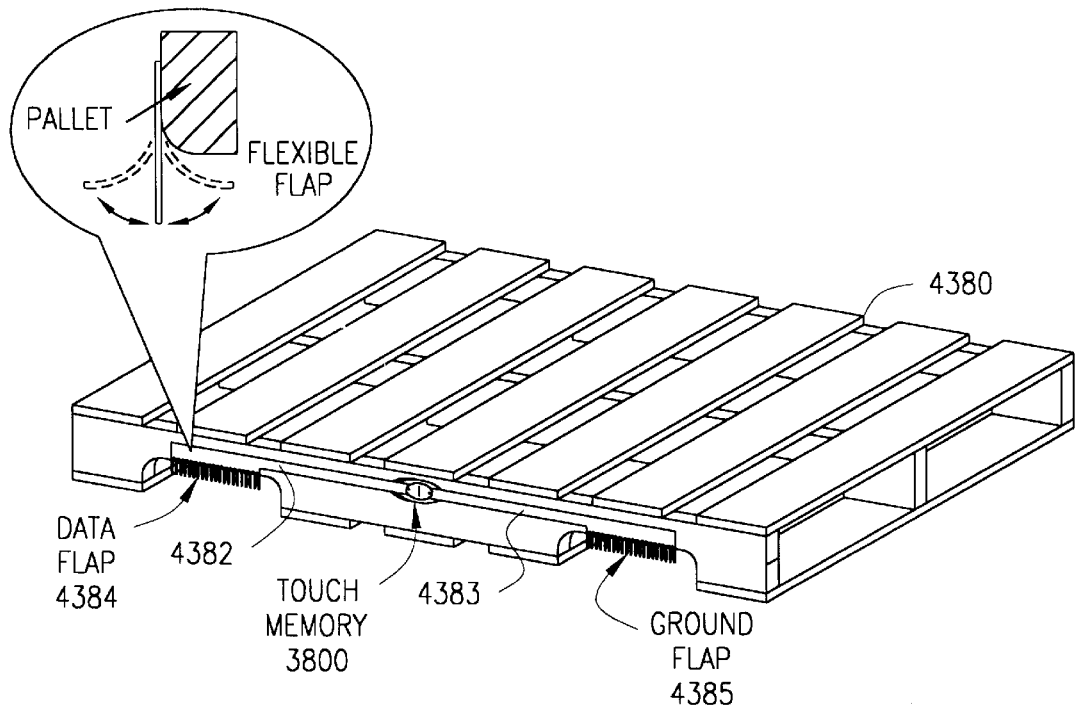
Figure 43H:
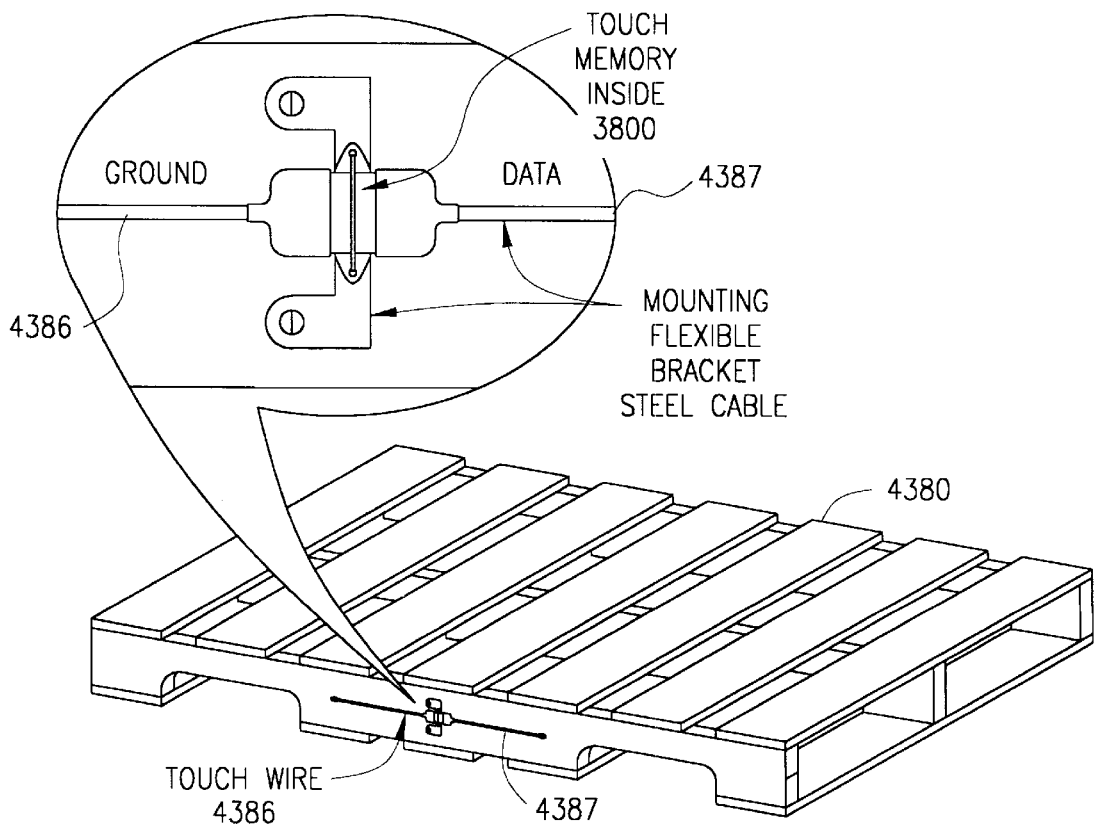
Figure 43I:
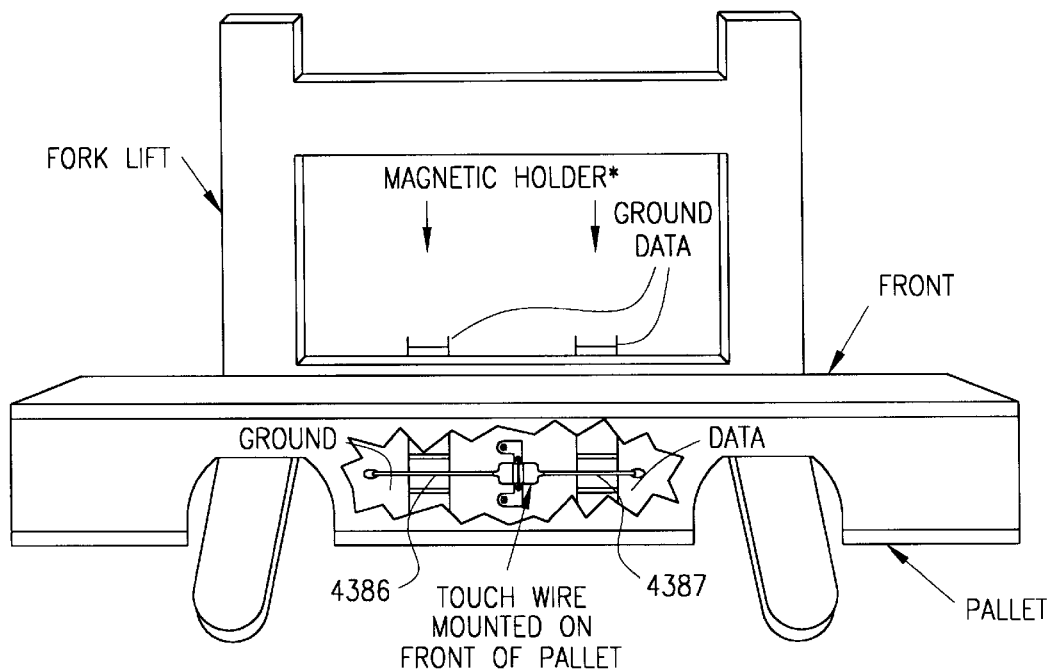

FIG. 43F shows extended data contact 4372 and extended ground contact 4373 formed on the front and a single side of work tote 4370 for embodiment 3800. Wiping electrical connections can be made to the extended contacts with the same types of structures as illustrated in FIGS. 43C–E. And a simulation of data and ground contacts for probe electrical connection may be made in the same manner as in FIG. 43B Similarly, FIG. 43G shows pallet 4380 with extended contacts 4382-4383 for embodiment 3800 with hanging pieces 4384-4385 for making electrical connection with electrodes which may be mounted on fork lift truck arms and which engage when a fork lift truck picks up pallet 4380. FIGS. 43H-I show alternative extended contacts 4386-4387 for pallet 4380 which use suspended cables and engage electrodes (which may be magnetic for continual connection)

mounted on the fork lift truck arm support. Note that these mountings do not require the flange of embodiment 3800, and the flange may be omitted.

Mechanical and Infrared Tracking System

Figure 44A:
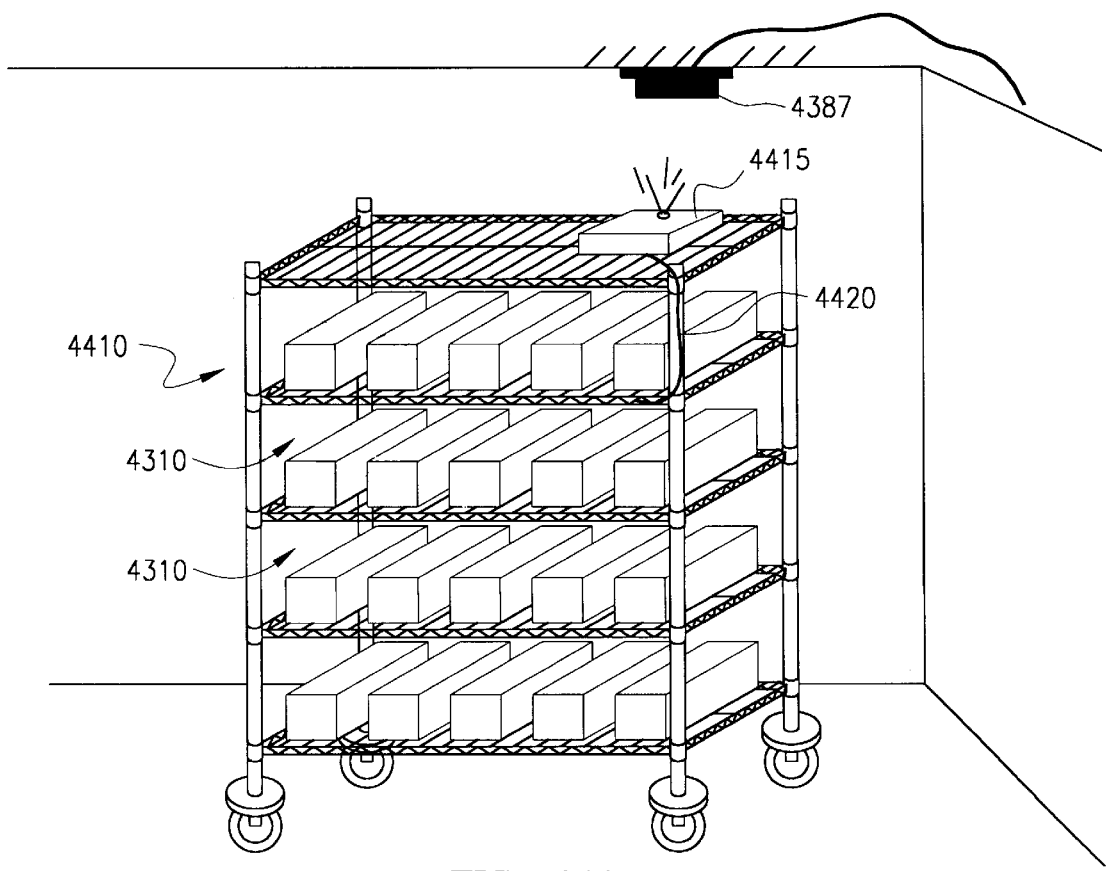
FIG. 44A-B show carts for tracking transport of the token of FIG. 43A.
Figure 44B:
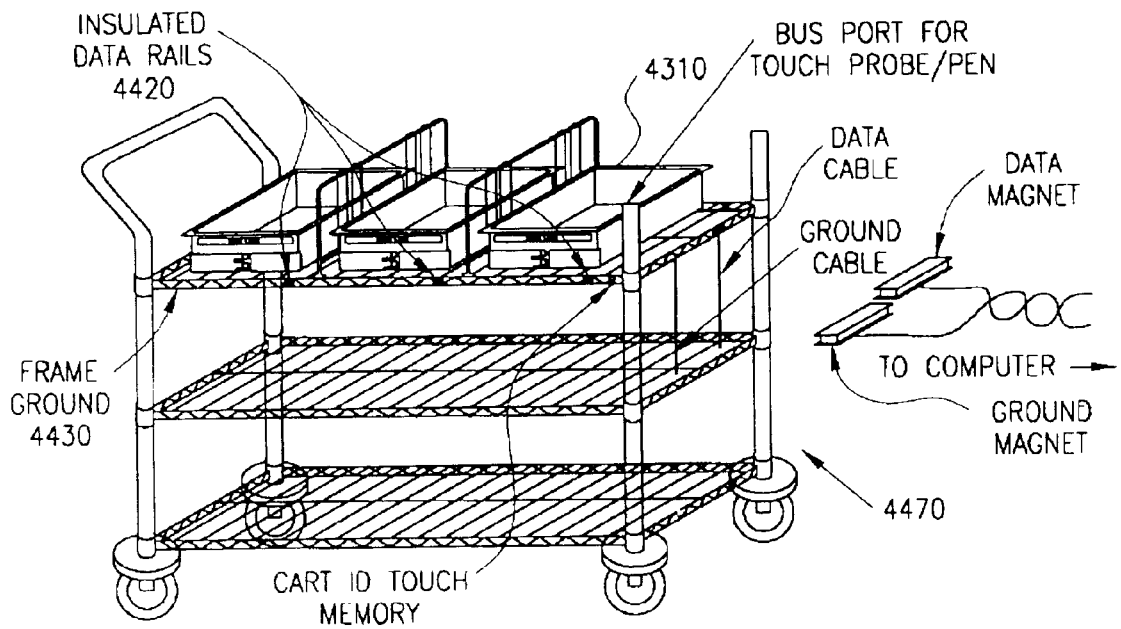

FIGS. 44A-B show use of multiple work totes 4310 of FIG. 43A in conjunction with an overhead infrared tracking system or direct cart connection system. Indeed, cart 4410 has partitions for locating totes 4310 in position to have extended contacts 4320–4330 make electrical connection with isolated data electrode 4420 and ground 4430 which makes up most of the structure of cart 4410. Because multiple embodiments 3800 may be connected to a single data line and distinguished by serial number, cart 4410 only needs a single ground electrode and a single data electrode. Then the infrared system of FIG. 44A uses an infrared link 4415 from cart 4410 to an overhead infrared link 4417 which is part of a series of overhead links connected to a host processor for identification and tracking of totes 4310 in cart 4410. Infrared link 4415 includes a battery for powering the data line and a processor for generating and sensing the communication pull downs of the data line.

The communication between link 4415 and overhead link 4417 may also be by radio frequency or ultrasound. And link 4415 may also have data and ground contacts in the form of a token so that probes for communication as described in the foregoing section "Probes" can be directly applied to communicate with the tokens on cart 4410. Further, variations of link 4415 include specialization to take a form analogous to a snap held probe (FIGS. 42C-D) for holding a single token rather than the setup of cart 4410.

FIG. 44B shows an alternative to the overhead infrared link; namely, cart 4470 with a simple mechanically engaged electrical connection analogous to those of FIGS. 43G–I.

Light in a Can

Figure 45:
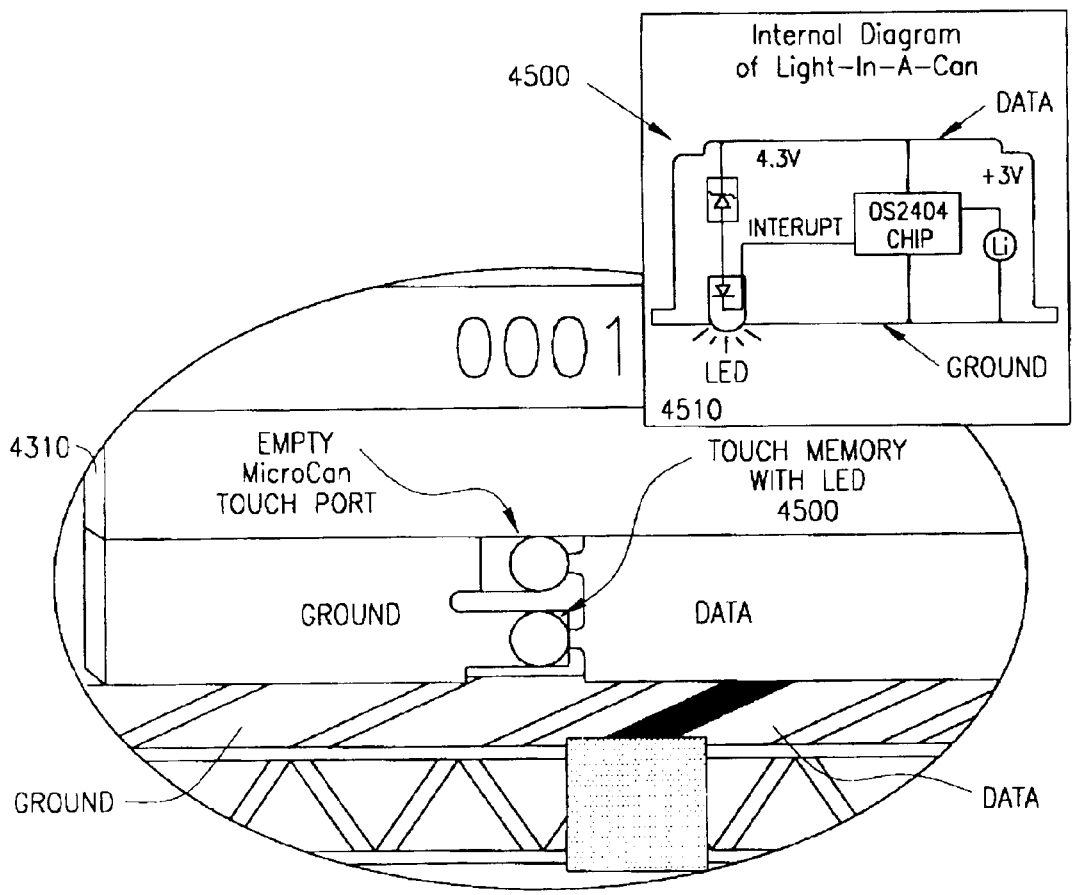
FIG. 45 illustrates a light-emitting diode token.

FIG. 45 is a heuristic cross sectional elevation view of preferred embodiment 4500 which has the components of embodiment 3800 (or a variant) plus light emitting diode (LED) 4510 and circuitry for turning on LED 4510. LED 4510 is powered from the data line, and a command communicated to embodiment 4500 turns on LED 4510. Embodiment 4500 can be used in systems as FIGS. 44A-B for visual location of a particular tote 4310 among all of the totes on carts 4410 and 4470. Indeed, the host processor, when in communication with embodiments 4500 of totes 4310 on cart 4410 or cart 4470, merely searches serial numbers to select the desired tote for communication and then sends a command to light the LED 4510. The selected tote then can be easily visually located by a worker. Of course, other location aids, such as sound, could be built into embodiment 3800 or 4500 or variants.

Warehousing

Figure 46:
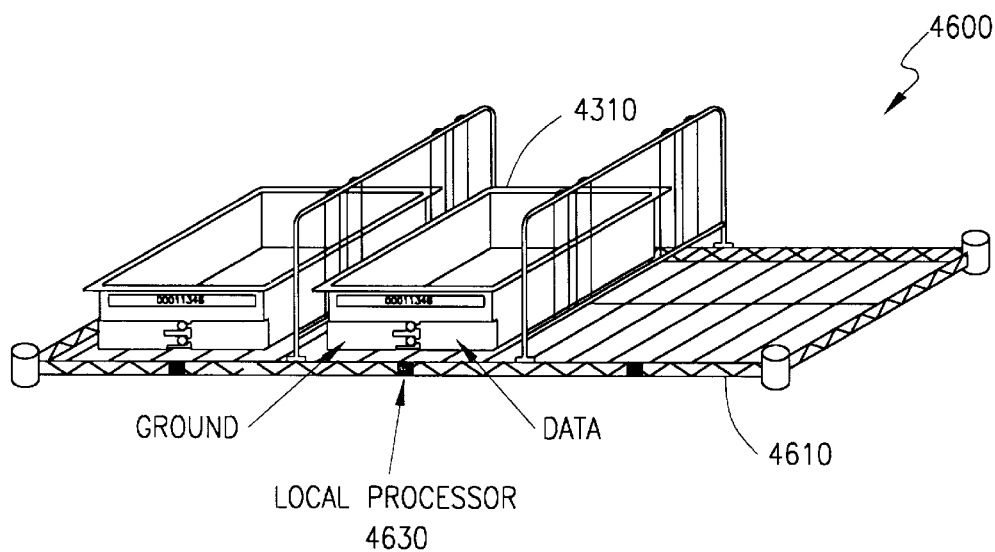
FIG. 46 shows a warehouse system with token identification for shelved items.

FIG. 46 illustrates fixed warehouse inventory system 4600 analogous to the cart system of FIGS. 44A-B and using embodiments 4500. Indeed, system 4600 includes multiple fixed racks 4610 with partitions to force totes 4310 to be placed so that embodiments 4500 of the totes all have their data contacts connected to the one-wire data line, and a host processor monitors all activity with regard to removal and insertion of totes. The host processor simply periodically polls the embodiments 4500 of all totes on racks 4610 to detect serial numbers and notes additions and subtractions. If a particular tote is to be located, then the host processor simply commands that embodiment 4500 to light up for visual location. Of course, a system with embodiments 3800 (or variants) could also be used, and although the tracking of the totes would be as with embodiments 4500, the simple visual location feature could be missing.

Inventory system 4600 may be enhanced by inclusion of a local rack processor 4630 at each potential tote location. Processor 4630 would have its own serial number and communicate with the host over the data line, and processor 4630 would also communicate with a tote 4310 having embodiment 3800 at its location. In this manner, the host polls local rack processors 4630 as to whether a tote is present and, if one is present, its embodiment 3800 serial number. Thus when a particular tote is selected, the known location of the corresponding local rack processor 4630 permits easy location. Additionally, local rack processors 4630 could have LEDs to further aid location.

Sample Tubes and Syringes

Figure 47A:
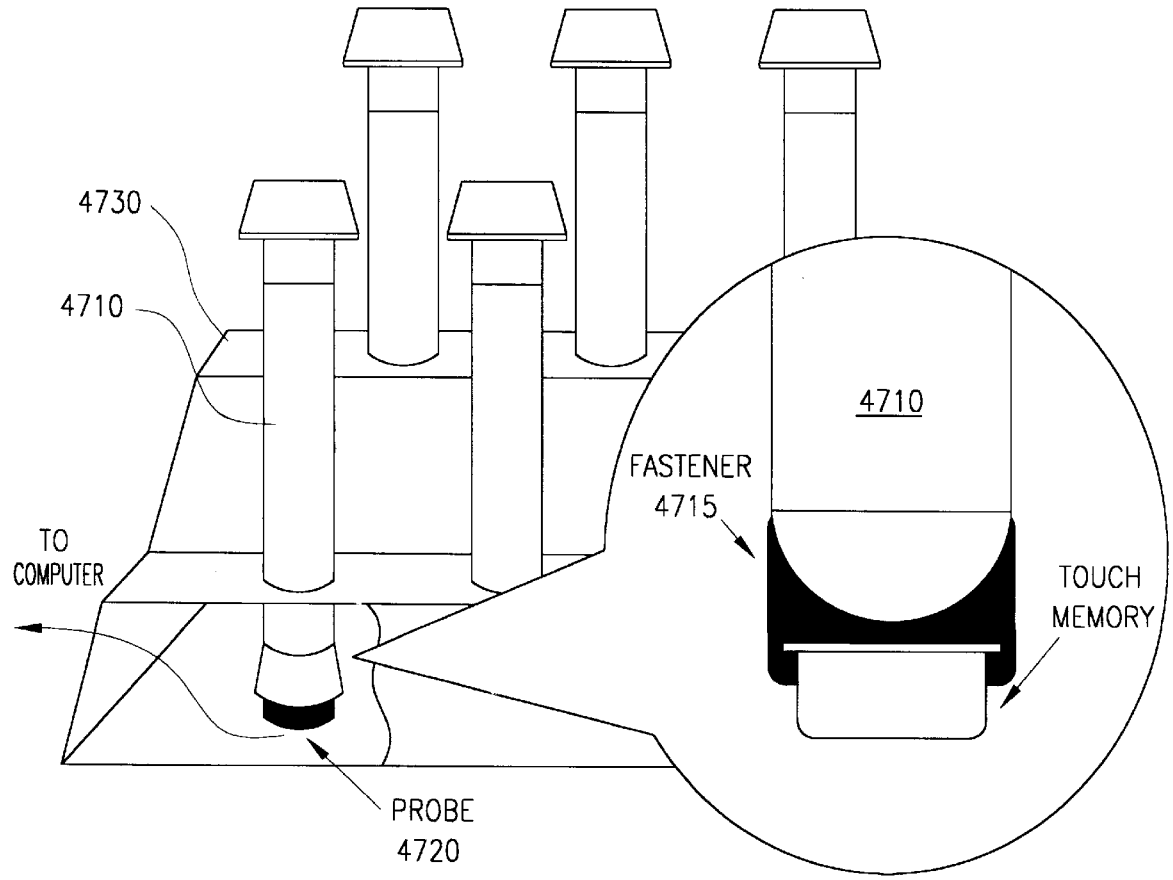
FIGS. 47A, 47B and 47C show medical applications of tokens.

FIG. 47A shows embodiment 3800 affixed to the bottom of medical sample tube 4710 and gravitationally held in electrical connection with probe 4720. Each sample tube in rack 4730 similarly has an embodiment 3800 and sits in a probe with all of the probes connected in parallel and to a host computer. In a manner similar to inventory system 4600, the host keeps track of sample tubes 4710 and their contents.

Figure 47B:
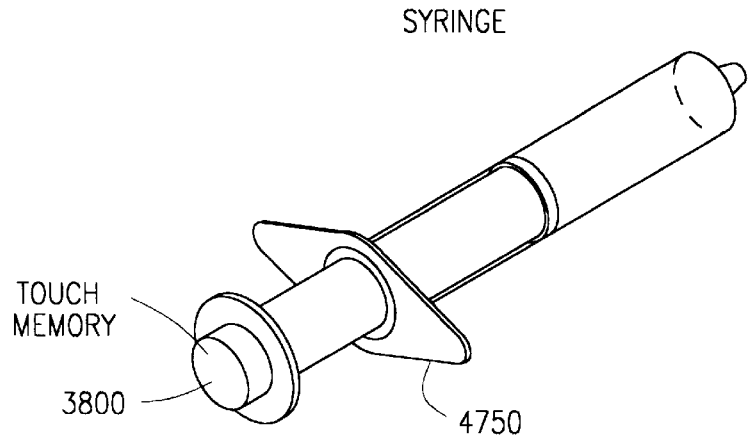
Figure 47C:
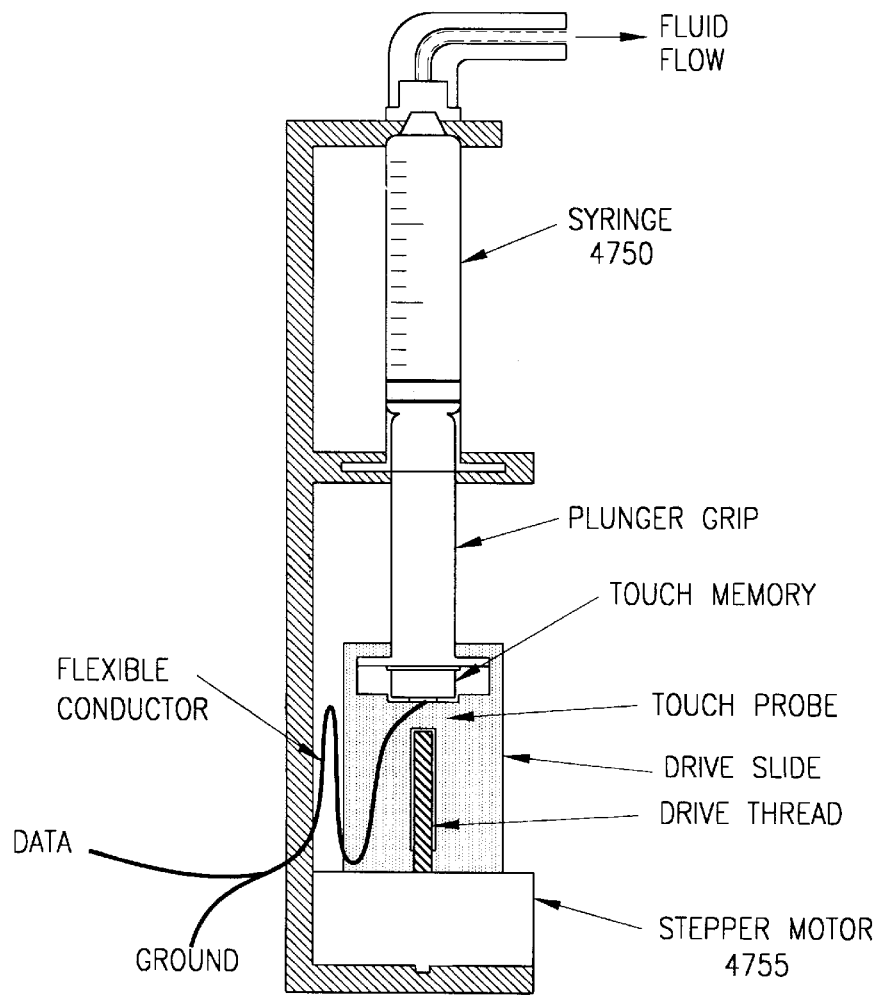

Indeed, FIG. 47B shows syringe 4750 with embodiment 3800 affixed to the plunger, and FIG. 47C shows host control of removal (or inclusion) of material from syringe 4750. The serial number identification of syringe 4750 plus host control of stepper motor 4755 permits tracking of syringe contents. And if sample tubes 4710 are filled from syringe 4750, this also permits tracking of tube contents. Of course, other automatic devices may be used for filling tube 4710, and host control of such devices also permits the tracking of the tube contents. For tubes filled with noncontrolled devices, manual entry of the contents into host will be needed.

Variants of tube 4710 and tube rack 4730 include, again analogous to system 4600, location aids such as an LED (embodiment 4500) which would be visible through transparent fastener 4715 and local processors attached to probes 4720 which communicate with the host and with embodiment 3800 (or 4500).

Direct Die Mounting

Figure 48B:
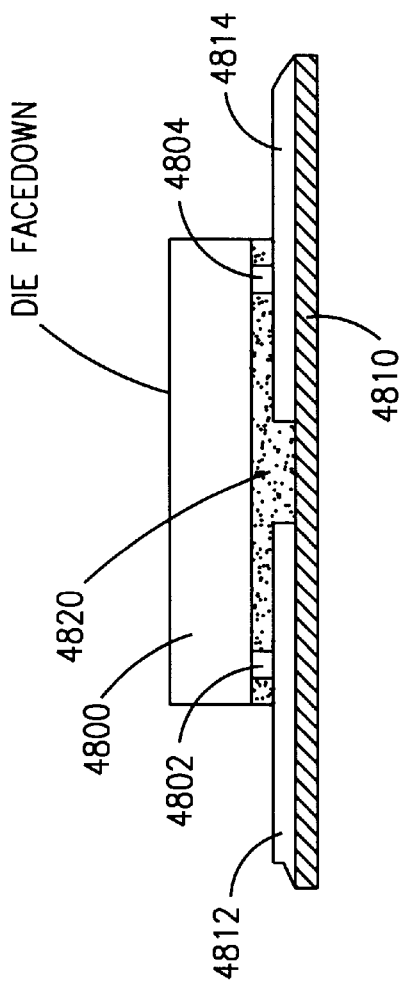
Figure 48A:
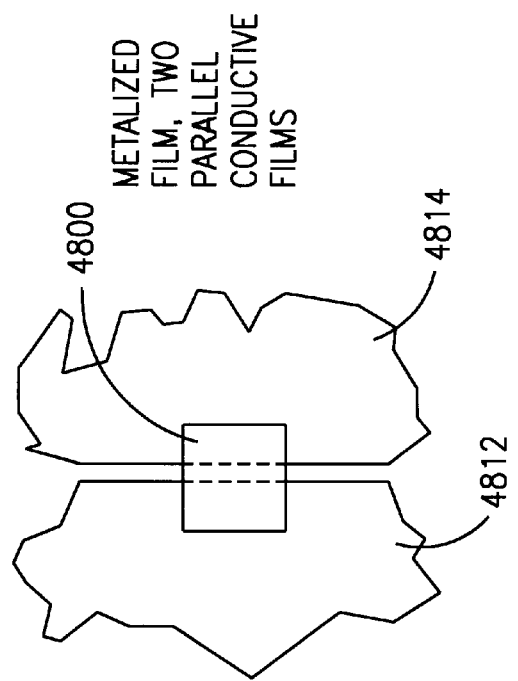

For applications which require very small size and do not require a battery, a silicon die containing module circuitry can be directly mounted. In particular, the ROM or EPROM module 2400, or EEPROM or flash EEPROM versions, which can derive power and programming voltage from the data communication line as illustrated in FIG. 25 may be mounted with contact extensions analogous to those of FIGS. 43A–I in diverse ways. For example, FIGS. 48A-B show plan and elevation views of module die 4800 affixed to insulating substrate 4810 which has conductive films 4812 and 4814 by glue 4820. Tab or bump bonds 4802 and 4804 make the electrical connection through glue 4820. With this mounting a memory module 4800 may be attached to a note pad as illustrated in FIG. 49, and information may be read from and written to memory module 4800 by contact to the contact extensions 4812–4814. Die 4800 typically would be covered by a protective epoxy and form a small (1 cm diameter) spot on the FIG. 49 note pad.

Figures 50A, 50B:
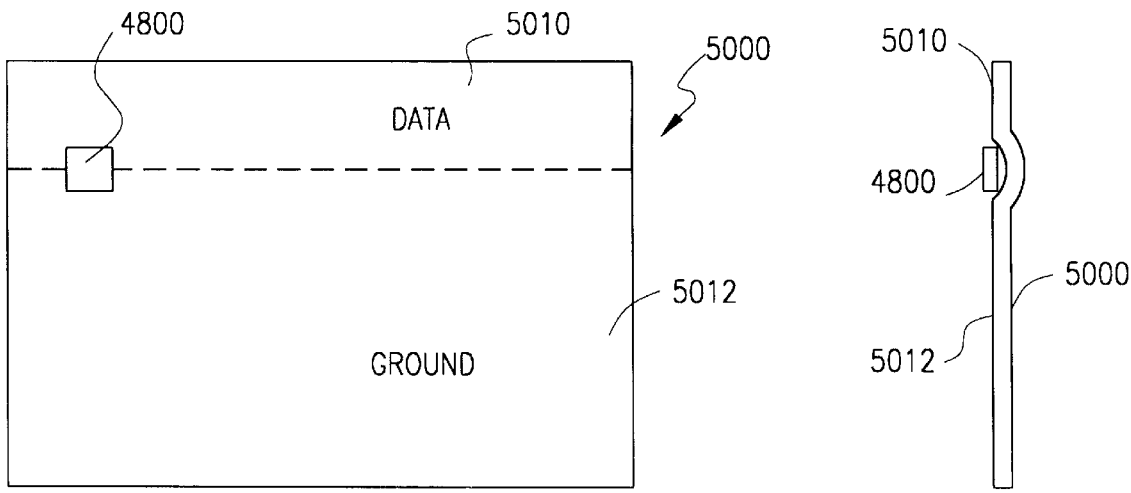
FIGS. 50A, 50B, 50C, and 50D show a card mounted module die.
Figure 50C:
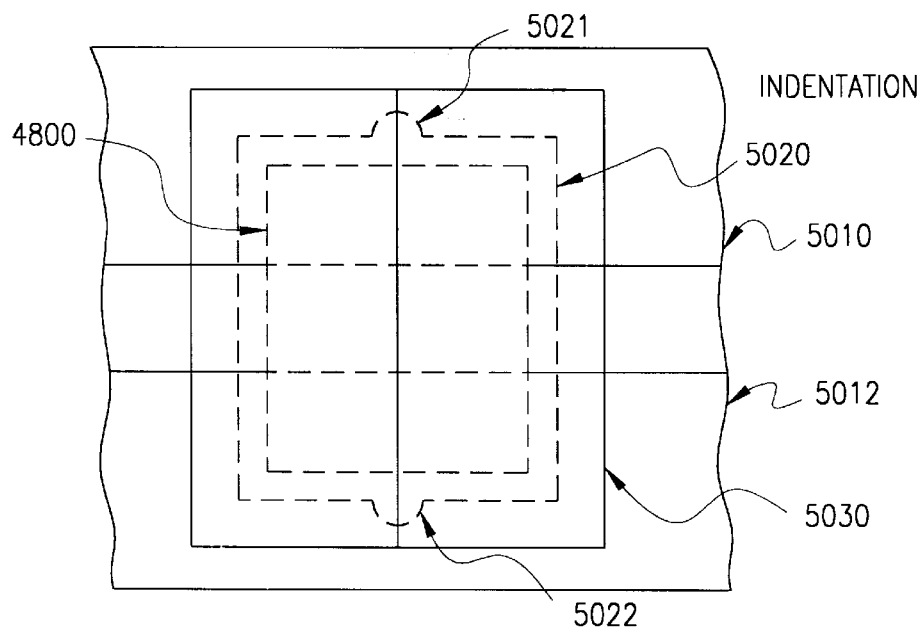
Figure 50D:
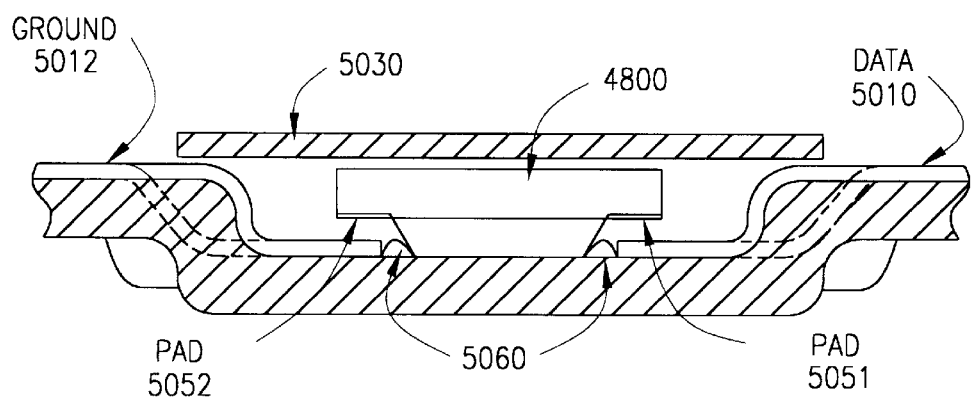

Direct module die 4800 mounting also conveniently adapts to credit card and like information cards. FIGS. 50A-B show in plan and cross sectional views credit card 5000 with conductive surface electrodes 5010 and 5012 for data and ground contacts to die 4800. Die 4800 is mounted in a indentation in card 5000, the indentation is similar to embossed numbers in common credit cards. Again, surface electrodes 5010 and 5012 provide contact extensions for easy communication. FIGS. 50C-D are enlarged views of the parts of FIGS. 50A-B showing die 4800. Indentation 5020 is slightly larger than die 4800 and has two extensions 5021-5022 for injection of conductive epoxy to affix die 4800 to card 5000 plus provide electrical connection from data and ground pads 5051-5052 to data and ground electrodes 5010–5012, respectively. When indentation 5020 is formed, data and ground electrodes 5010–5012 extend into indentation 5020 and barriers 5060, which are just portions of card 5000, are formed. Card may be plastic, so the indentation embossing can easily form barriers 5060. Then when epoxy is injected into extensions 5021–5022, barriers 5060 will prevent epoxy flow to short out the data and ground electrodes. Protective patch 5030 seals everything together after assembly and gluing.

In order to insure good electrical contact, data and ground pads 5051-5052 are made very large on die 4800. In particular, about one third of the area of die 4800 is occupied by each of pads 5051-5052 with the remaining one third an insulated space between the pads.

Fabrication of card 5000 may proceed as follows. First, fabrication of die 4800 is relatively routine: wafer level integrated circuit processing; direct laser writing of serial numbers and so forth, special steps for make the large data and ground pads; wafer level testing; and lastly sawing into dice. Next, the plastic card processing begins with frontside (opposite die 4800) visual labelling of a plastic blank which is large enough for several cards; deposit aluminum on the backside; evaporate thin strips of the aluminum to separate what will eventually be the data and ground electrodes; form indentations which includes simultaneous barrier formation; dispense a drop of conductive epoxy in each indentation extension; pick and place dice 4800 into the indentations; dispense drop of protective encapsulent over each die; apply the protective patches; and lastly separate the blank into cards.

What is claimed is:

1. A system comprising:

a portable data carrier in the form of a token having a flange, said token formed from two conductive surfaces separated by an insulating member, said token for housing an integrated circuit and a battery, said flange extending from one of said two conductive surfaces; and an elastomeric element having a first arm and a second arm that can receivingly hold said token, said first arm and said second arm defining grooves that surround a portion of said token's flange, said portion having an upper surface and a lower surface, such that each of said upper surface and lower surface is covered by said elastomeric element.

2. The system of claim 1, wherein said first arm and said second arm join at their distal ends so as to completely surround a held token.

3. The system of claim 2, further comprising a C-ring disposed within the grooves defined by said arms.

4. A system comprising:

a portable data carrier in the form of a token having a flange, said token formed from two conductive surfaces separated by an insulating member, said token for housing an integrated circuit, wherein said flange extends from one of said two conductive surfaces; and an elastomeric element having a first arm and a second arm that can detachably hold said token, said first arm and said second arm defining grooves that surround a portion of said token's flange, said portion having an upper surface and a lower surface, such that each of said upper surface and lower surface is covered by said elastomeric element.

5. The mounting system of claim 4, wherein said first arm and said second arm join at their distal ends so as to completely surround a held token.

6. The mounting system of claim 4, further comprising a C-ring disposed in the grooves defined by said arms.

7. The mounting system of claim 4, further comprising a host system connected to said mounting system, said host system adapted to communicate with said integrated circuit.

8. A system comprising:

a portable data carrier in the form of a token having a flange, said token formed from two conductive surfaces separated by an insulating member, said flange extending from one of said two conductive surfaces;

receiving means for receiving said token in a detachable manner by engaging at least a portion of said flange, said portion having an upper surface and a lower surface, such that each of said upper surface and lower surface is covered by said receiving means; and means for stopping said token from being pressed too far into said receiving means, said stopping means for abutting said upper surface and said lower surface of said portion.

9. The mounting system of claim 8, wherein said means for receiving comprises a clip for holding said flanged token in said means for receiving.

* * * * *